(12) United States Patent
Nefulda et al.

(10) Patent No.: US 12,399,599 B2
(45) Date of Patent: Aug. 26, 2025

(54) DEVICES, METHODS, AND GRAPHICAL USER INTERFACES FOR IMPROVING ACCESSIBILITY OF INTERACTIONS WITH THREE-DIMENSIONAL ENVIRONMENTS

(71) Applicant: Apple Inc., Cupertino, CA (US)

(72) Inventors: John M. Nefulda, Oakville, CA (US); Daniel M. Golden, Sunnyvale, CA (US); James T. Turner, San Jose, CA (US); Christopher B. Fleizach, Gilroy, CA (US); Kristi E. S. Bauerly, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 153 days.

(21) Appl. No.: 18/233,841

(22) Filed: Aug. 14, 2023

(65) Prior Publication Data

US 2024/0061547 A1 Feb. 22, 2024

Related U.S. Application Data

(60) Provisional application No. 63/470,782, filed on Jun. 2, 2023, provisional application No. 63/409,620, filed on
(Continued)

(51) Int. Cl.
*G06F 3/04815* (2022.01)
*G06F 3/01* (2006.01)
(Continued)

(52) U.S. Cl.
CPC ........ *G06F 3/04815* (2013.01); *G06F 3/0482* (2013.01); *G06F 3/04842* (2013.01); *G06F 3/04847* (2013.01); *G06F 3/011* (2013.01)

(58) Field of Classification Search
None
See application file for complete search history.

(56) References Cited

U.S. PATENT DOCUMENTS

2001/0002126 A1* 5/2001 Rosenberg ............ A63F 13/285
345/156
2006/0288314 A1* 12/2006 Robertson ........... G06F 3/04842
715/858

(Continued)

*Primary Examiner* — Linda Huynh
(74) *Attorney, Agent, or Firm* — Morgan, Lewis & Bockius LLP

(57) ABSTRACT

While a view of a three-dimensional environment is visible via a display generation component of a computer system, the computer system receives, from a user, one or more first user inputs corresponding to selection of a respective direction in the three-dimensional environment relative to a reference point associated with the user, and displays a ray extending from the reference point in the respective direction. While displaying the ray, the system displays a selection cursor moving along the ray independently of user input. When the selection cursor is at a respective position along the ray, the system receives one or more second user inputs corresponding to a request to stop the movement of the selection cursor along the ray and, in response, sets a target location for a next user interaction to a location in the three-dimensional environment that corresponds to the respective position of the selection cursor along the ray.

31 Claims, 75 Drawing Sheets

Related U.S. Application Data on Sep. 23, 2022, provisional application No. 63/398,509, filed on Aug. 16, 2022.

(51) Int. Cl.
*G06F 3/0482* (2013.01)
*G06F 3/04842* (2022.01)
*G06F 3/04847* (2022.01)

(56) References Cited

U.S. PATENT DOCUMENTS

| | | | |
|---|---|---|---|
| 2008/0040689 A1* | 2/2008 | Balakrishnan | G06F 3/04817 715/848 |
| 2014/0215398 A1* | 7/2014 | Fleizach | G06F 3/0487 715/823 |
| 2014/0372957 A1* | 12/2014 | Keane | G06F 3/011 715/852 |
| 2017/0060230 A1* | 3/2017 | Faaborg | G06F 3/017 |
| 2018/0059901 A1* | 3/2018 | Gullicksen | G06F 3/04815 |
| 2019/0361521 A1* | 11/2019 | Stellmach | G06F 3/04812 |
| 2019/0377487 A1* | 12/2019 | Bailey | G06F 1/163 |
| 2021/0090341 A1* | 3/2021 | Ravasz | G06V 40/193 |
| 2021/0096726 A1* | 4/2021 | Faulkner | G06F 1/1686 |
| 2021/0141444 A1* | 5/2021 | Speelman | G06F 3/012 |
| 2023/0140550 A1* | 5/2023 | Furtwangler | G06F 3/016 345/156 |

* cited by examiner

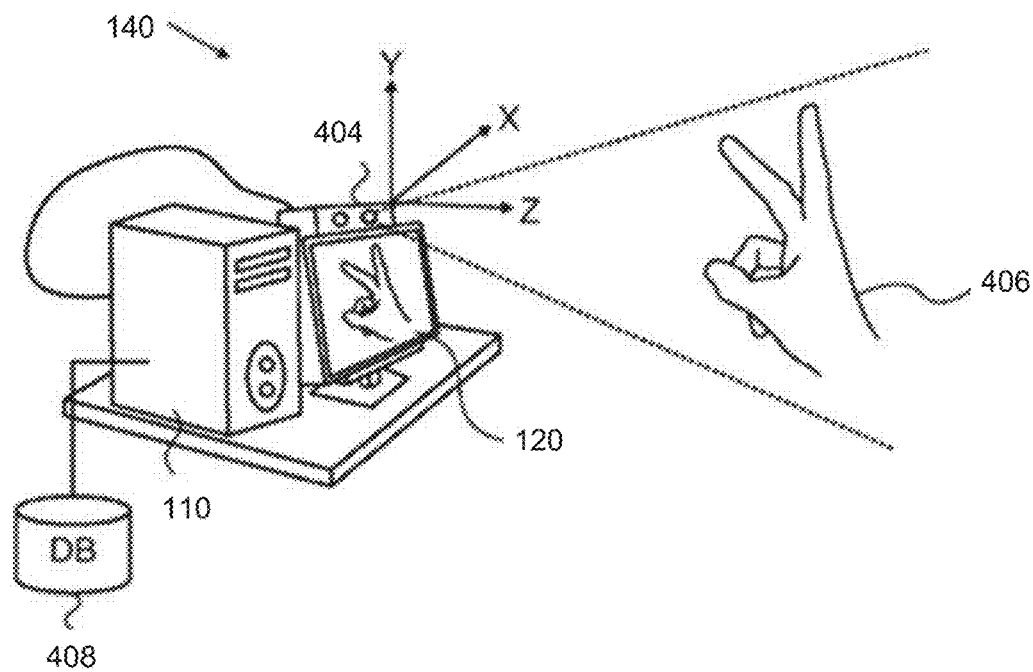
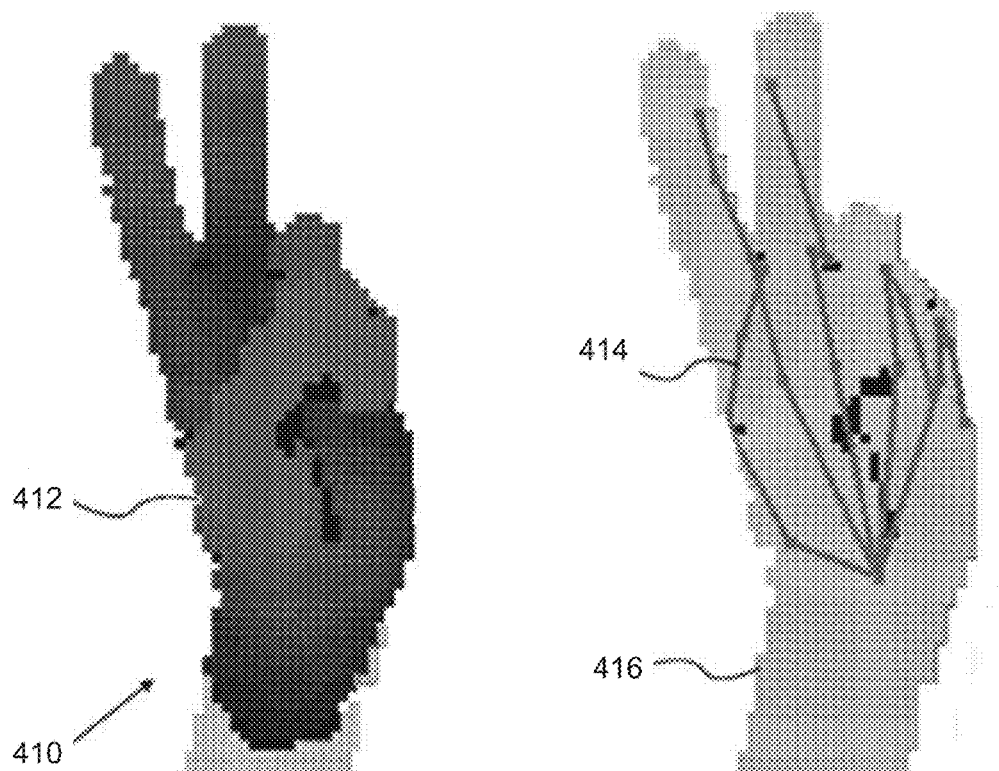
Figure 4

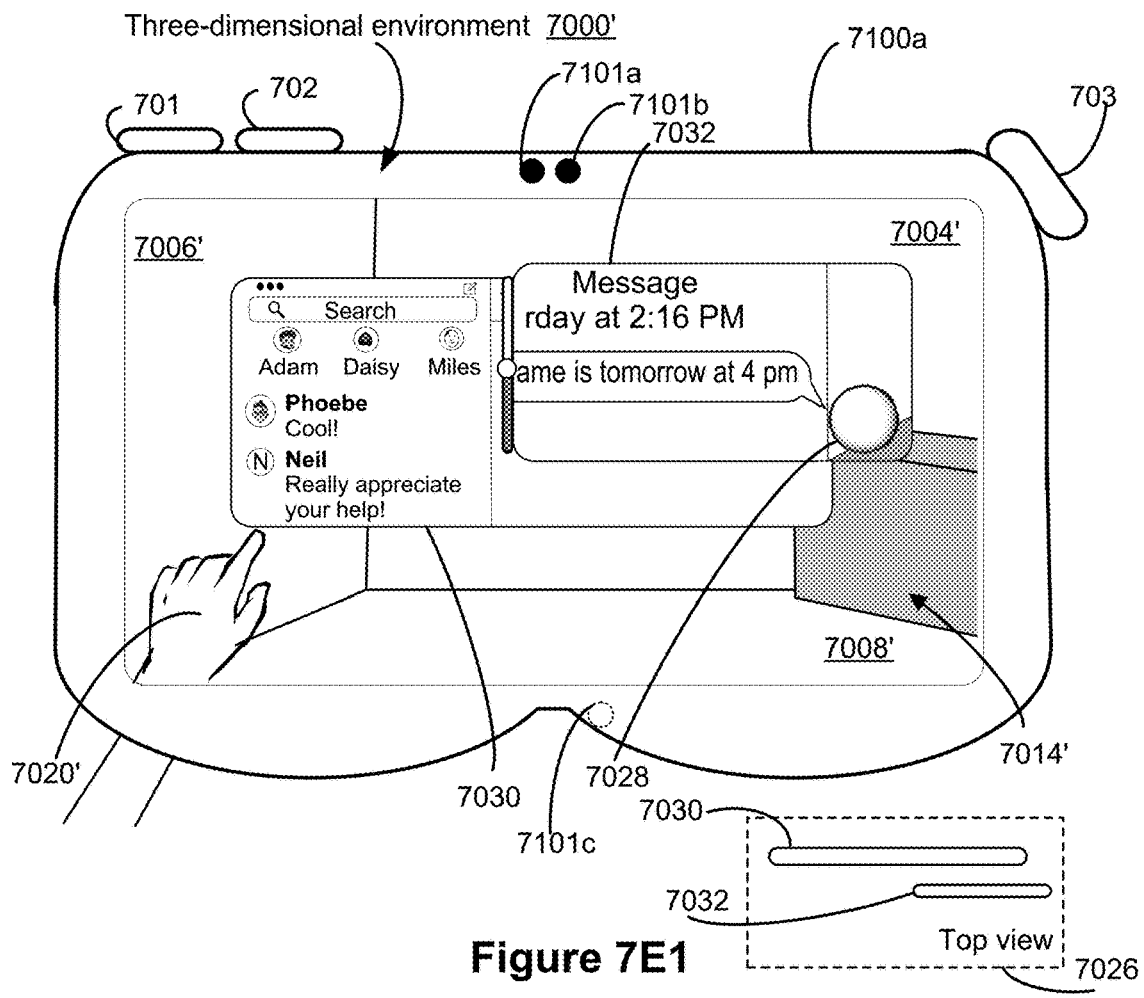
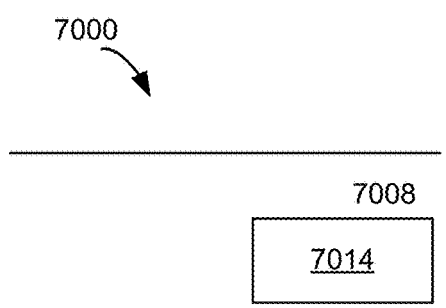
Figure 7E1
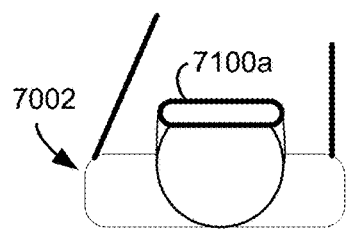
Figure 7E2

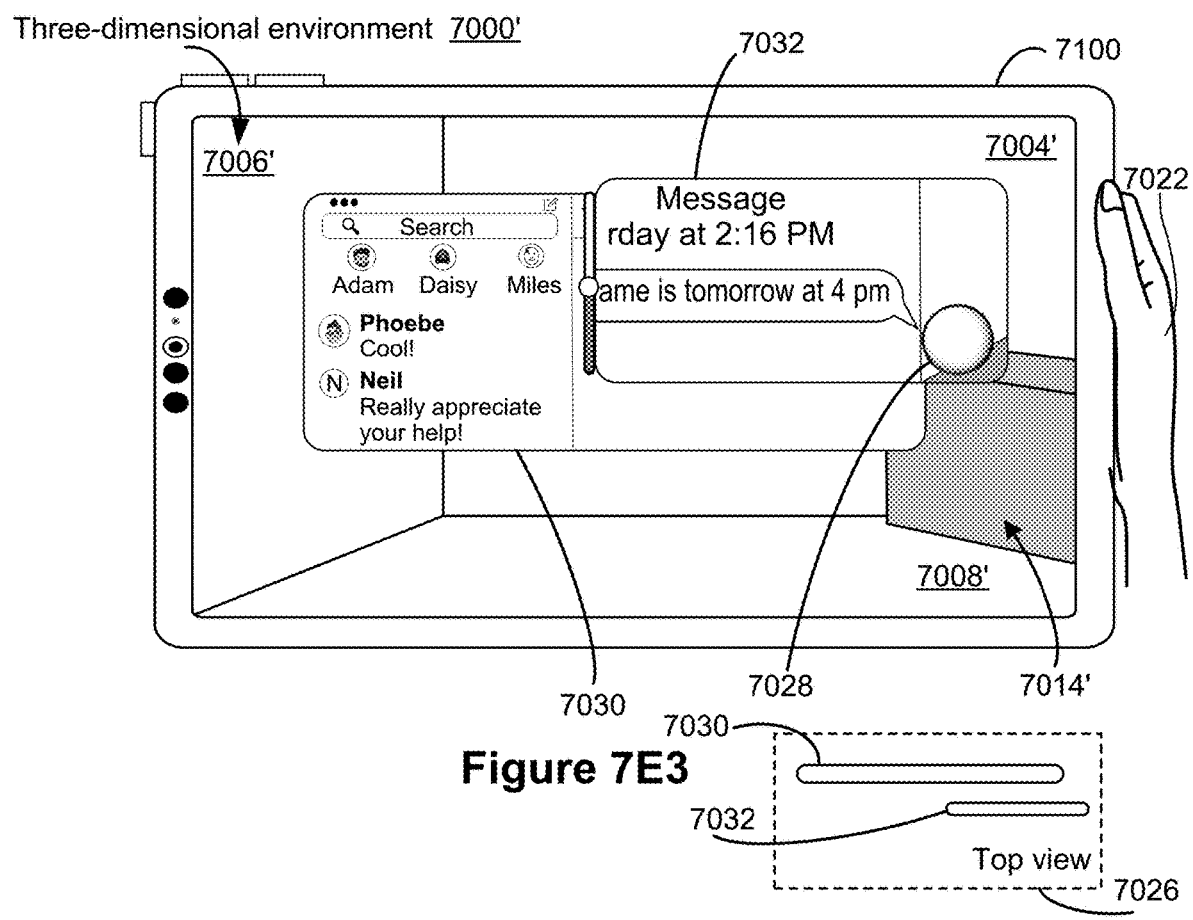
Figure 7E3

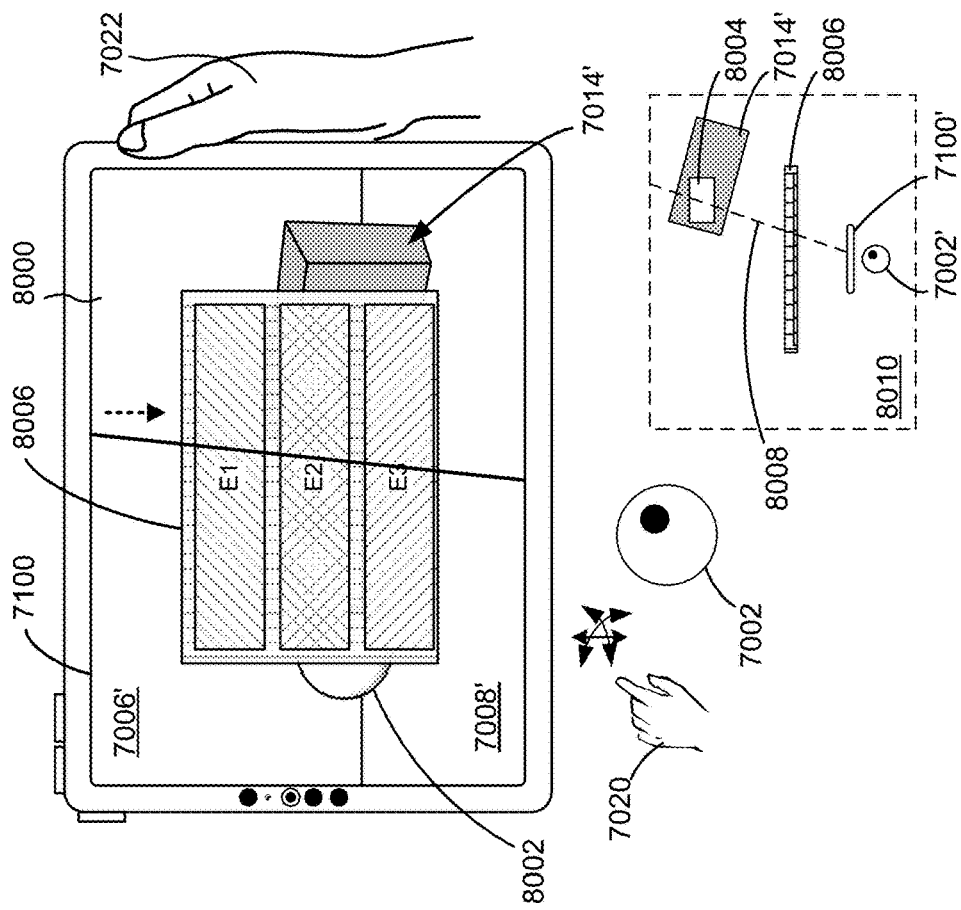
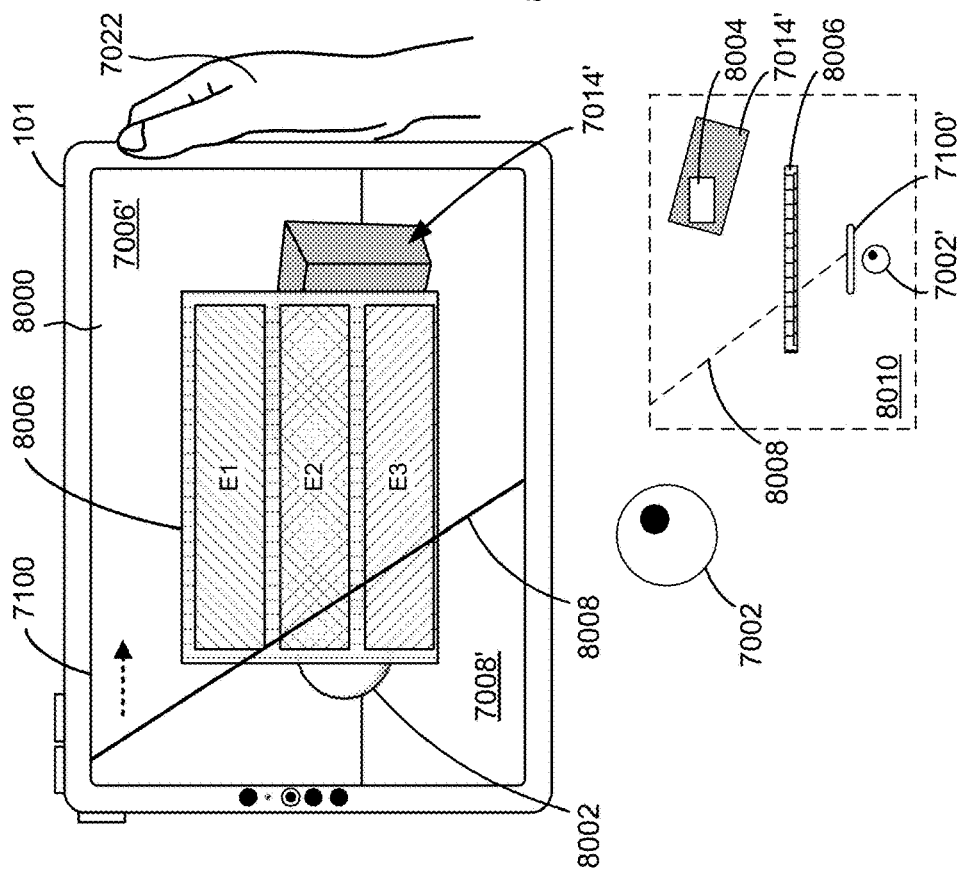
Figure 8A
Figure 8B

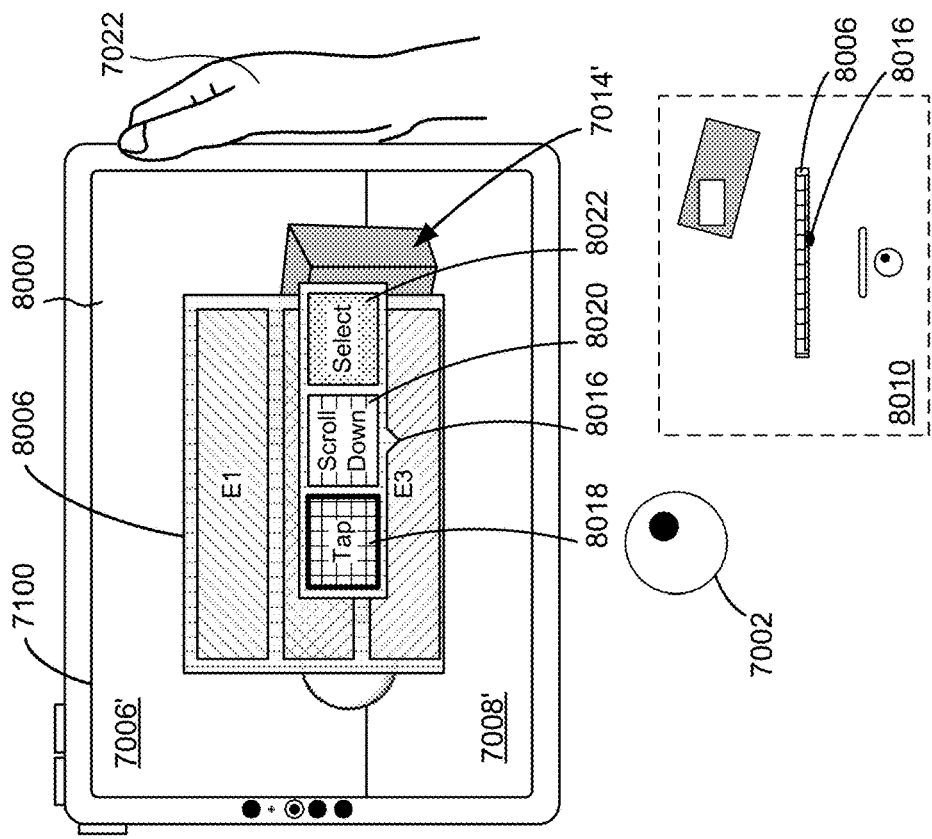
Figure 8F1
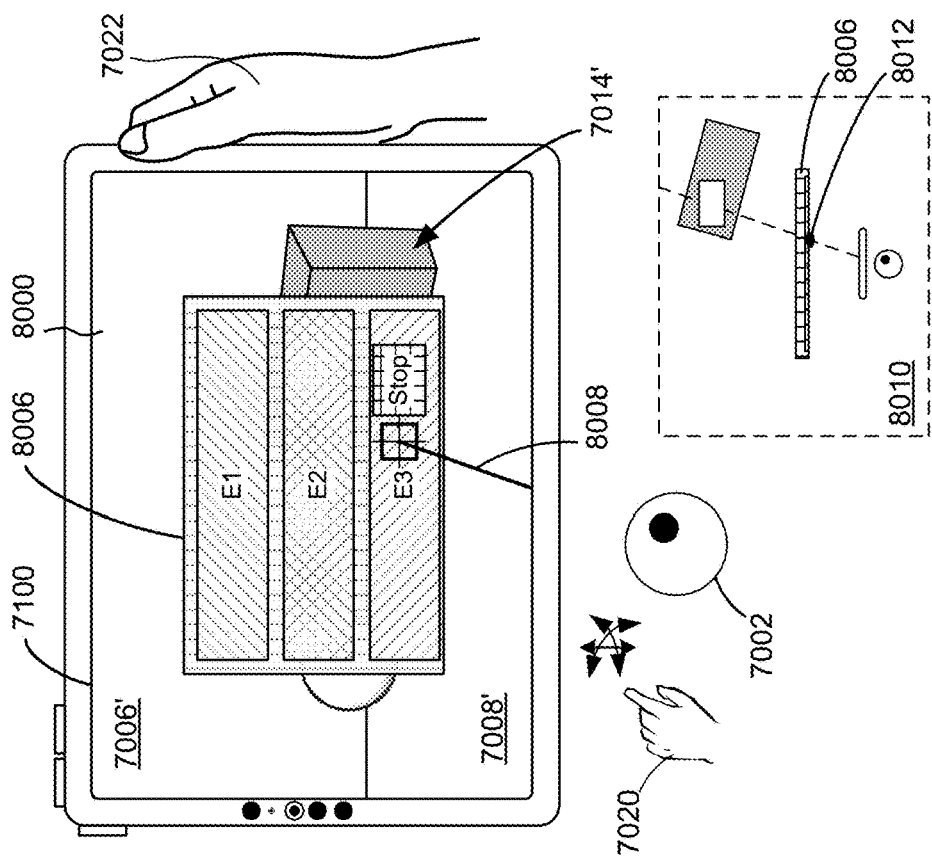
Figure 8E

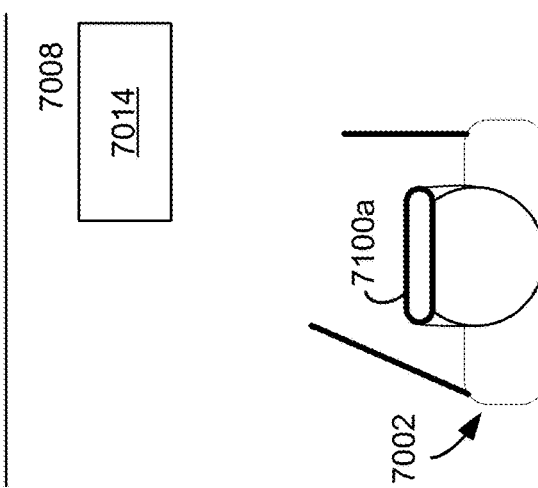
Figure 8F3
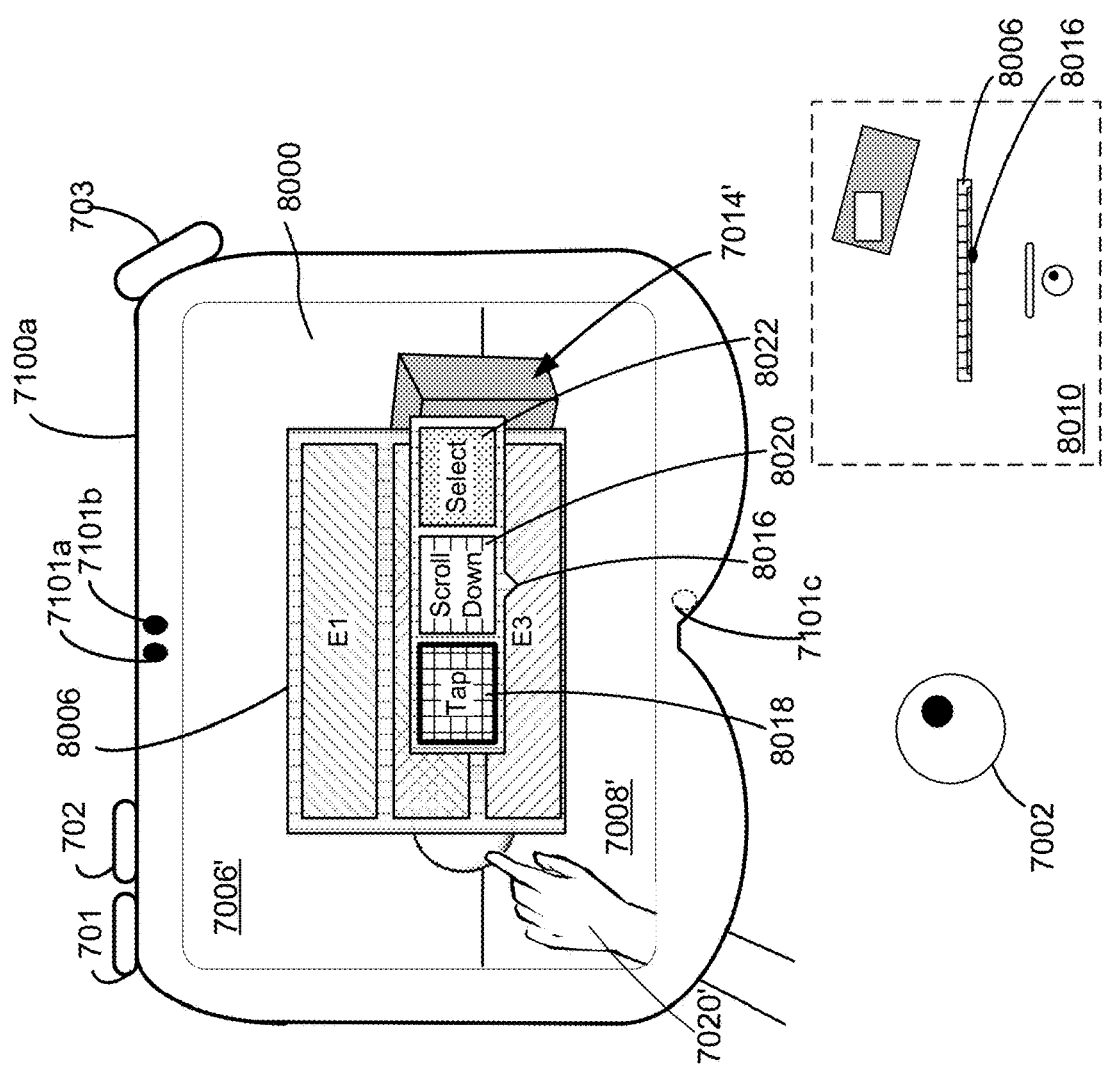
Figure 8F2

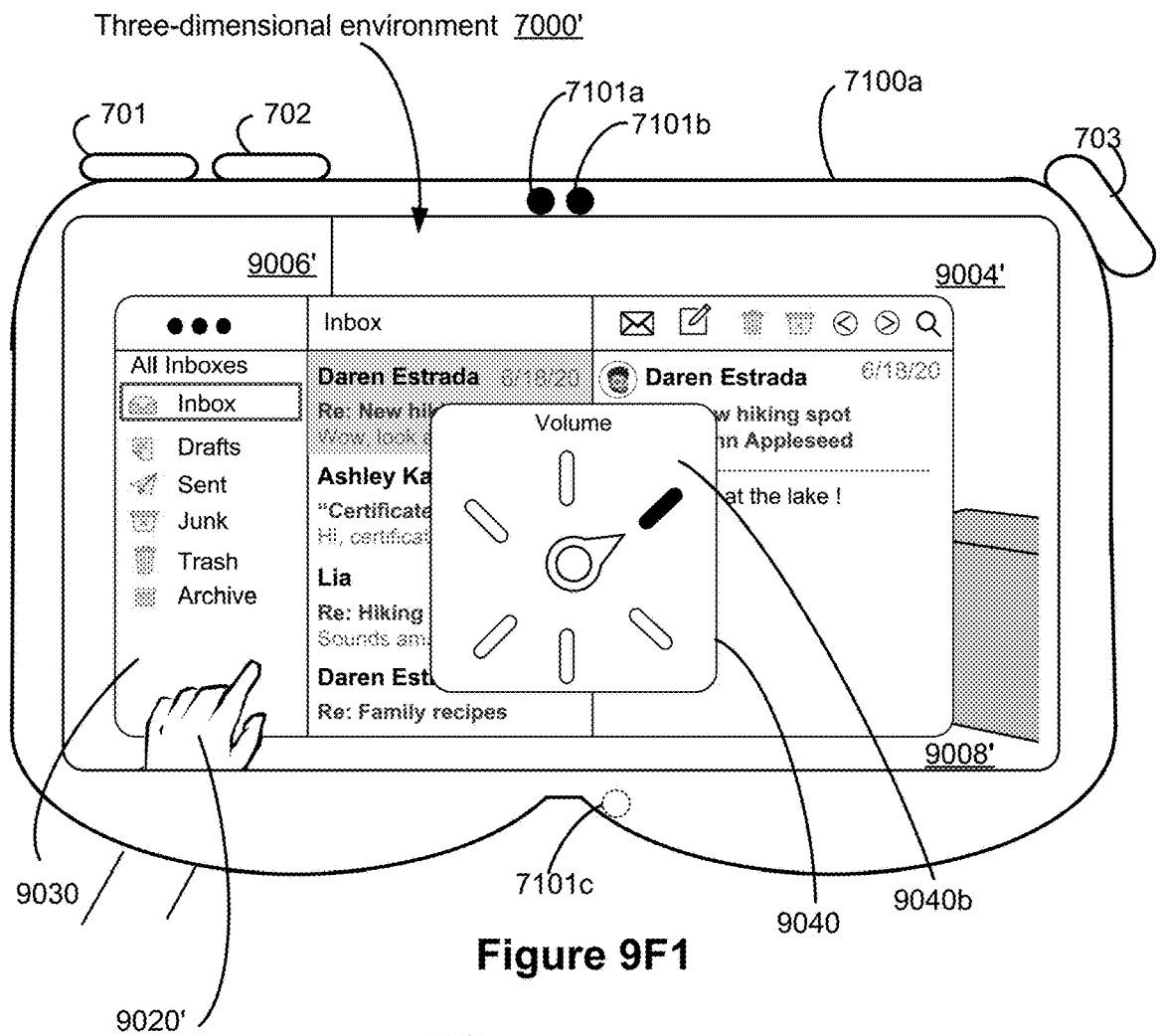
Figure 9F1
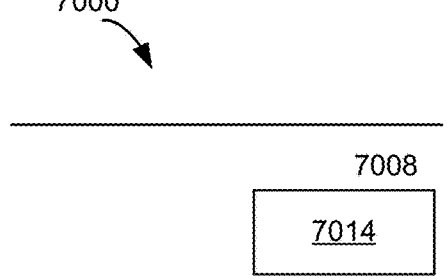
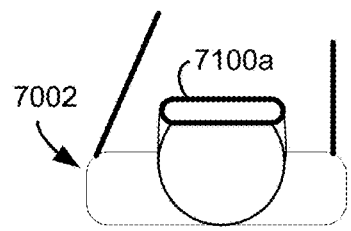
Figure 9F2

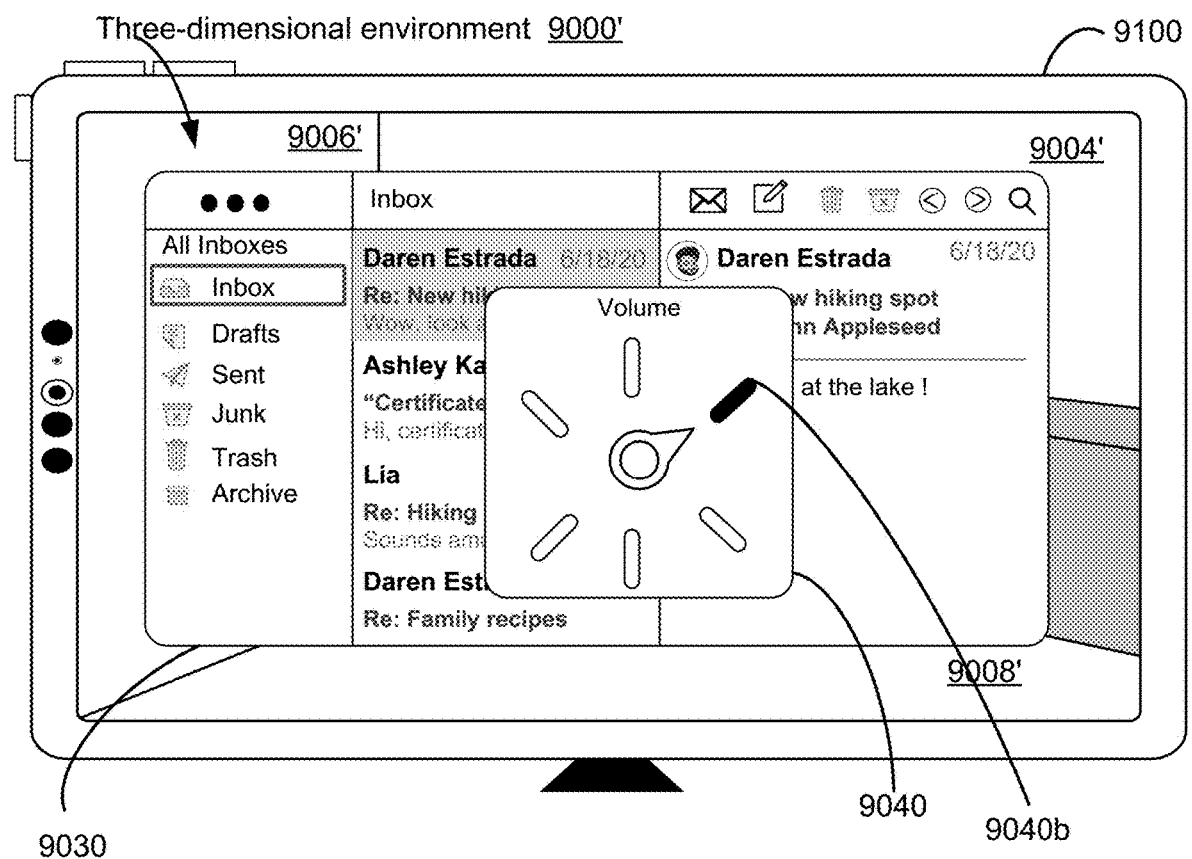
Figure 9F3

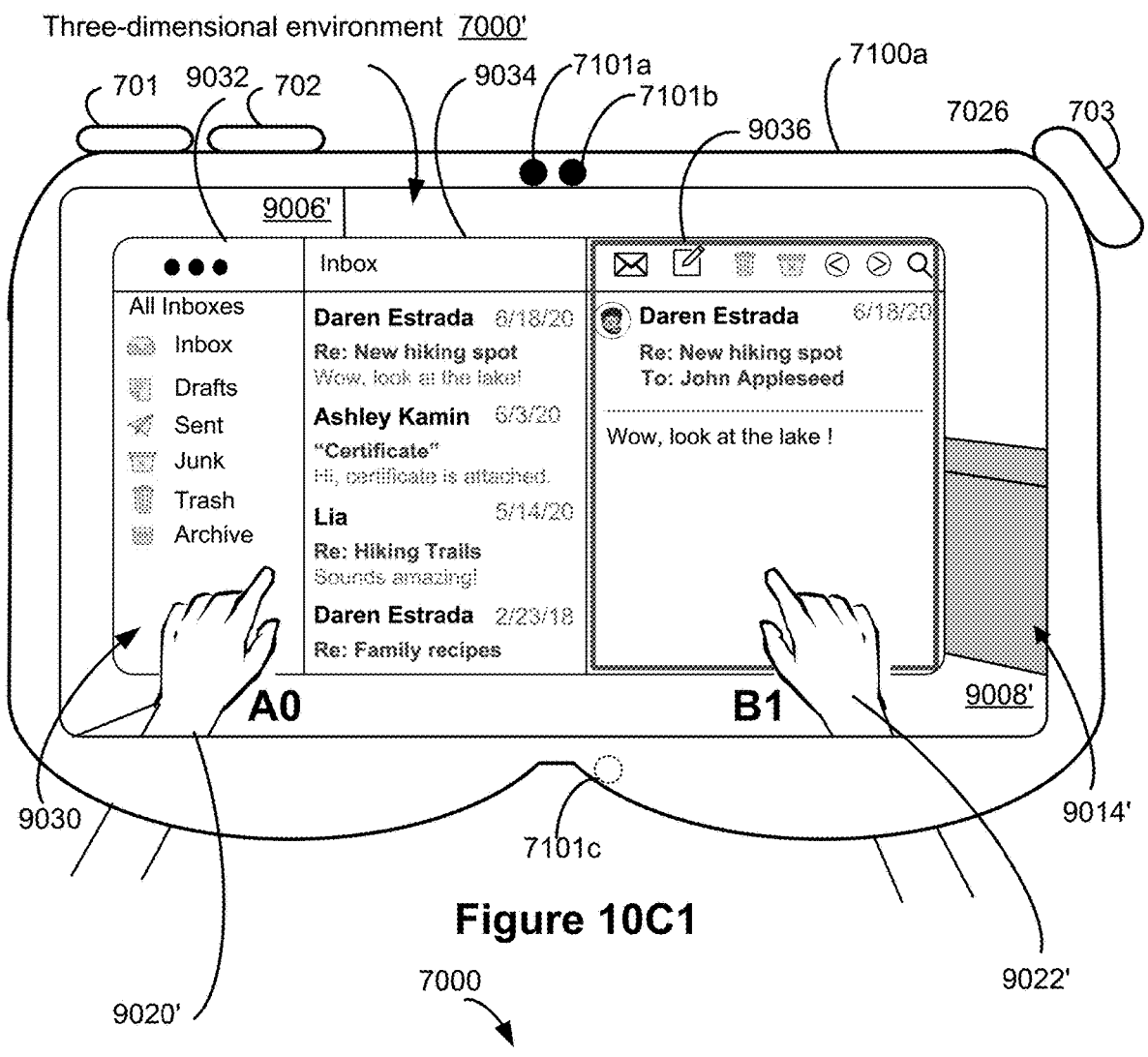
Figure 10C1
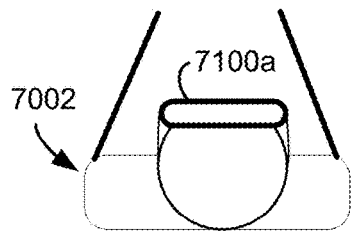
Figure 10C2

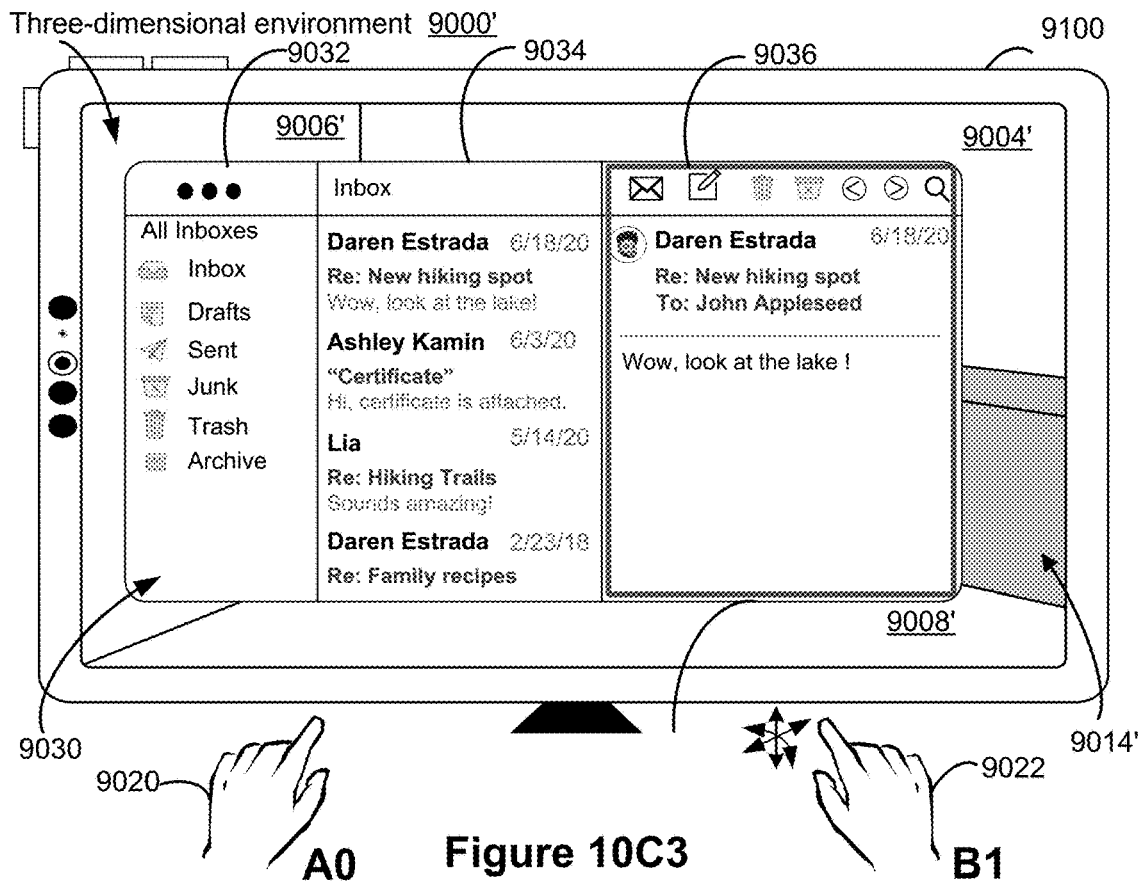
Figure 10C3
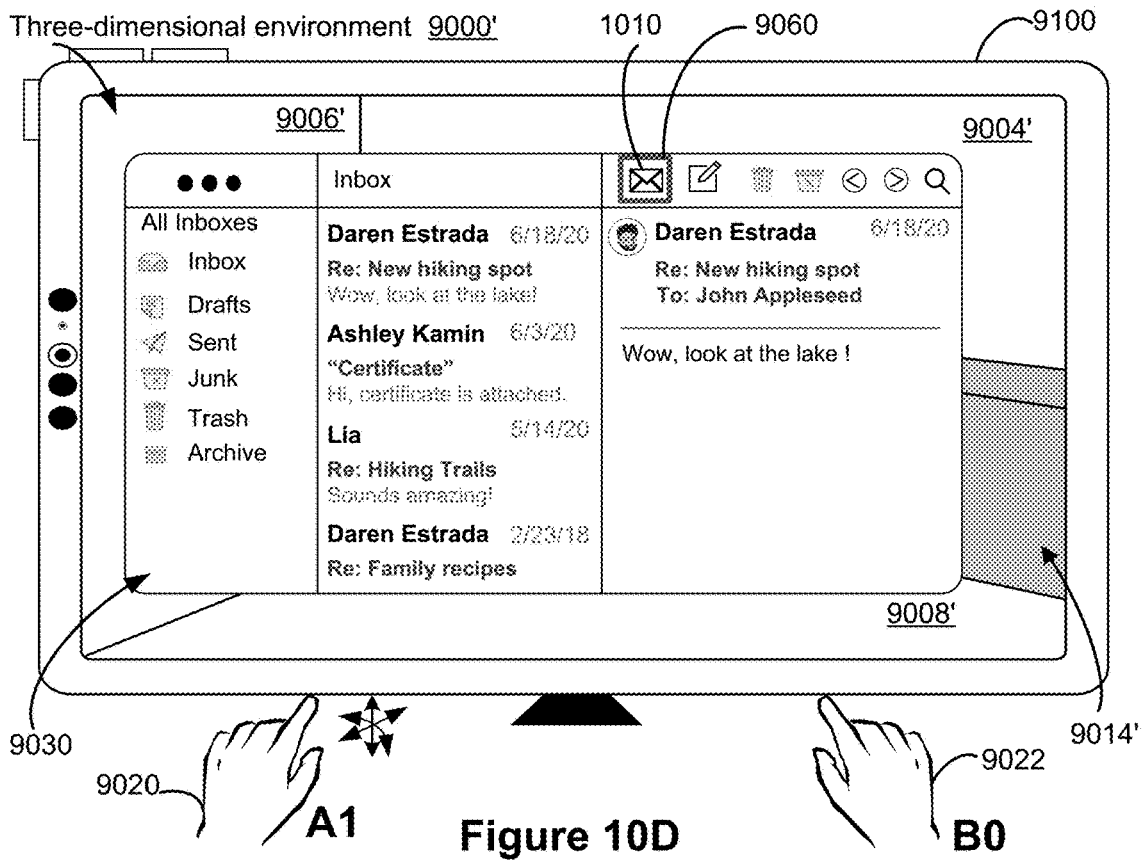
Figure 10D

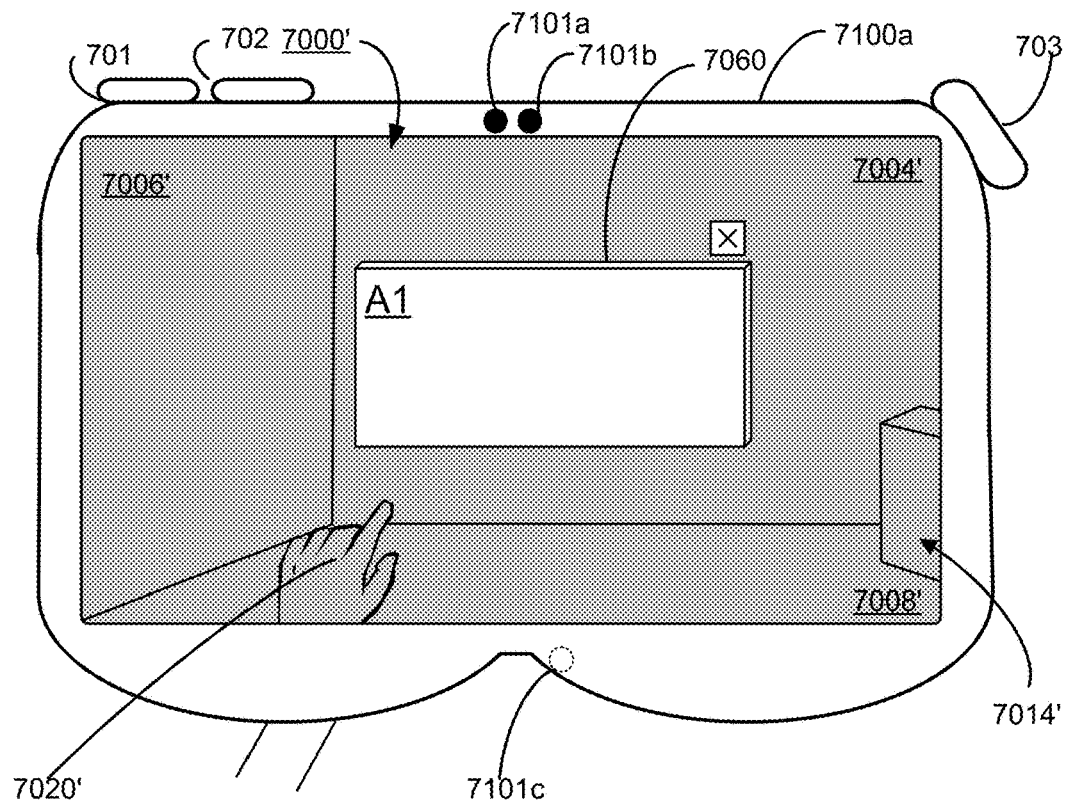
Figure 15E1
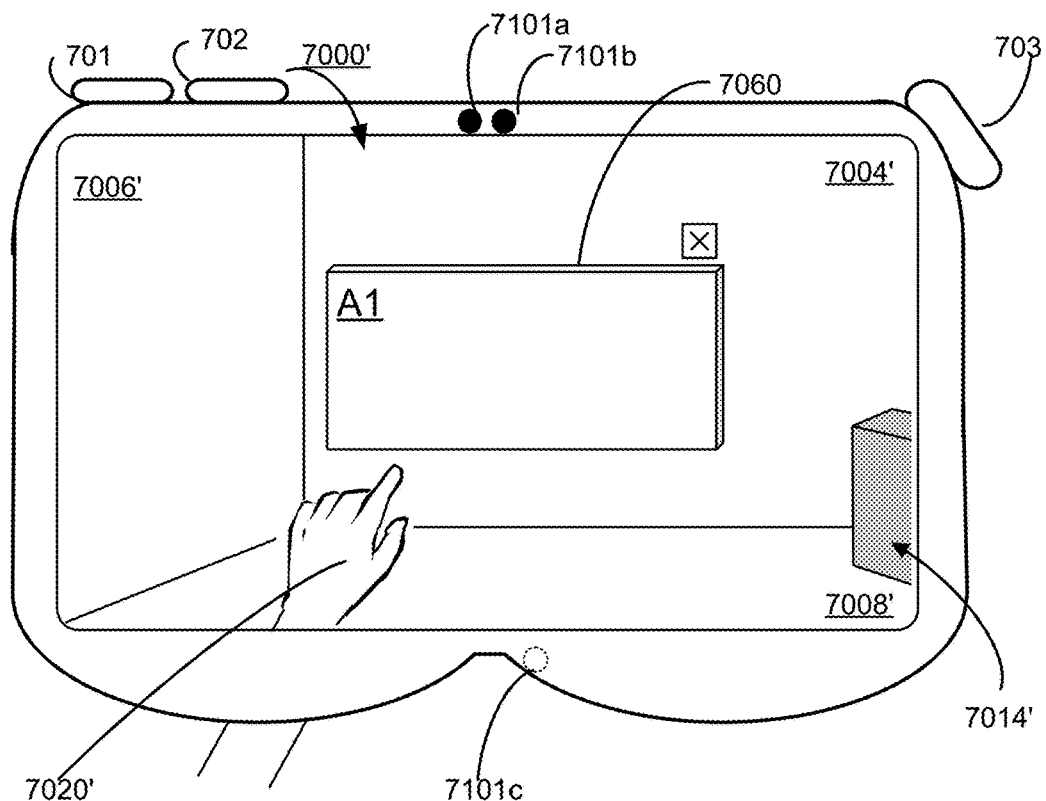
Figure 15F1

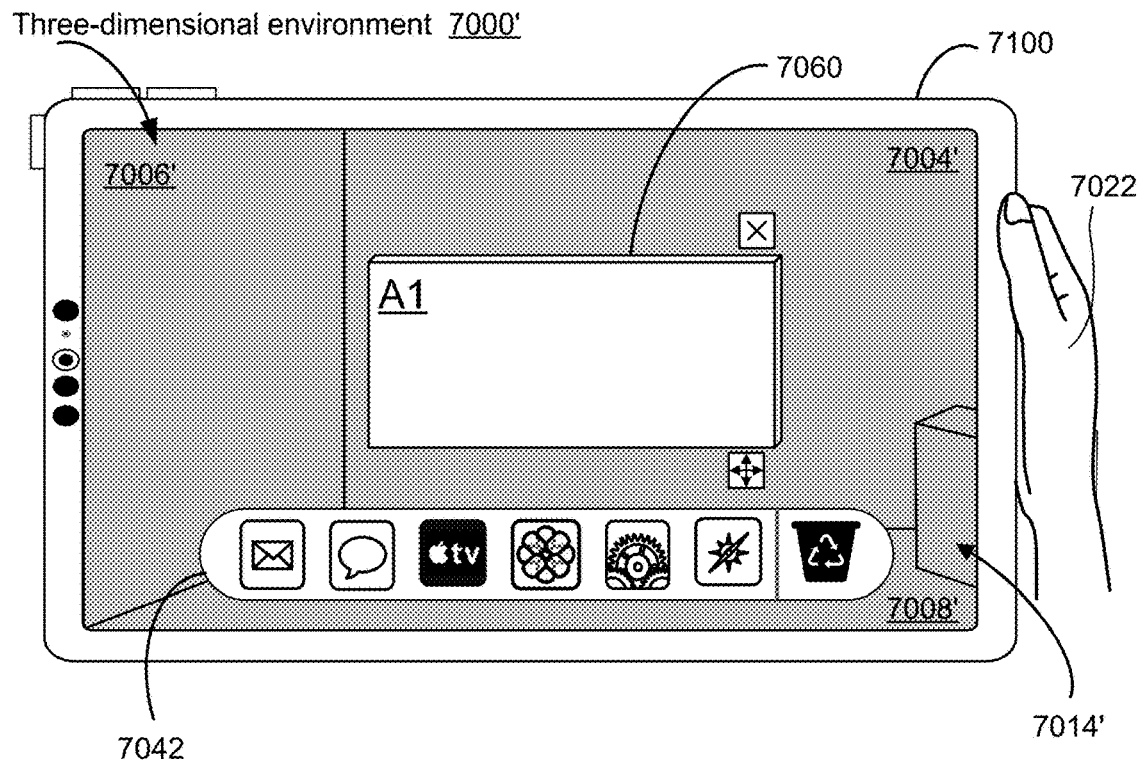
Figure 15E2
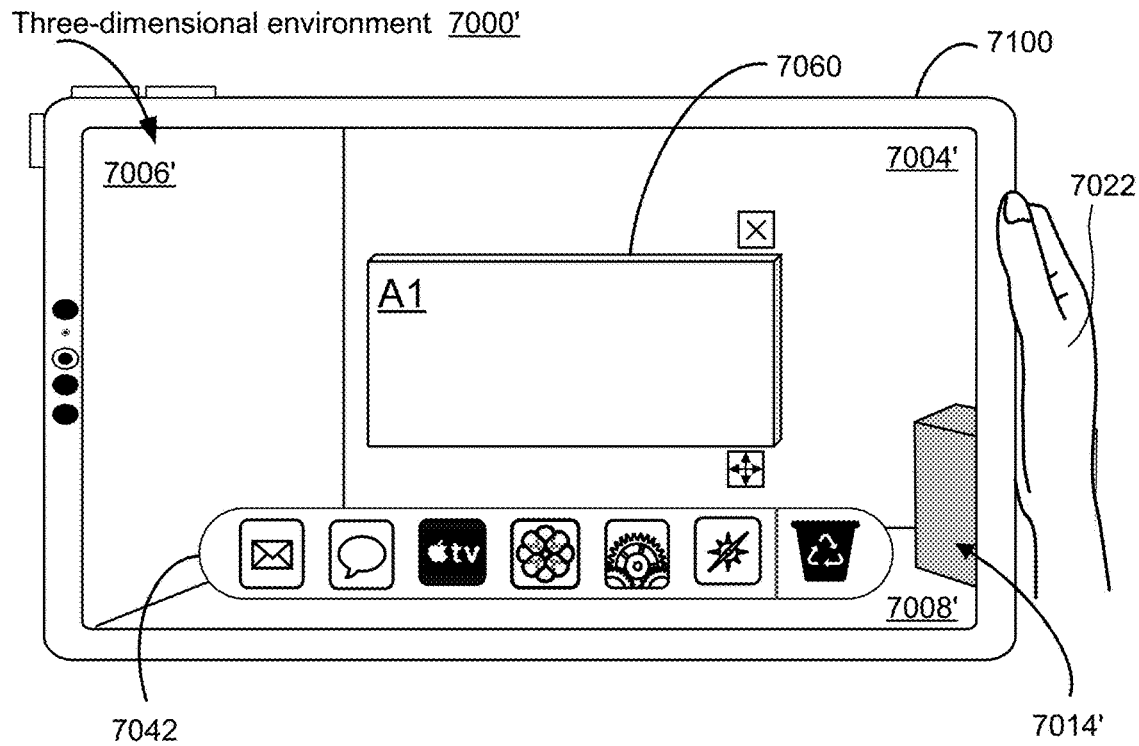
Figure 15F2

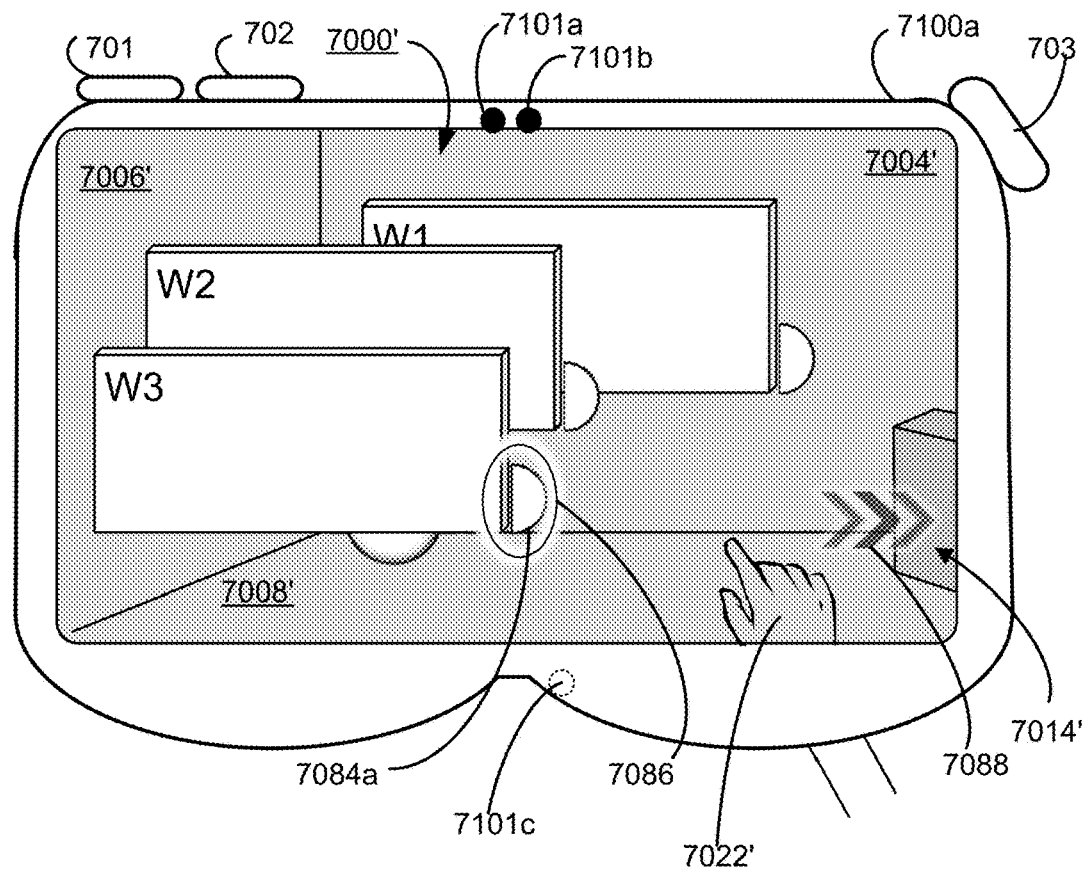
Figure 16D1
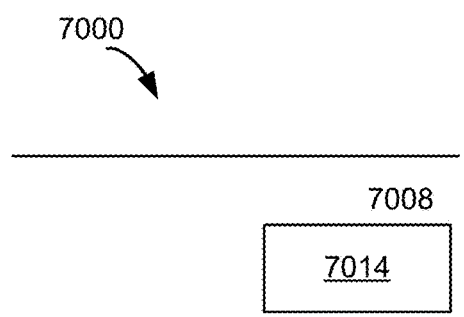
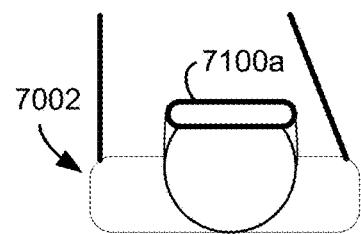
Figure 16D2

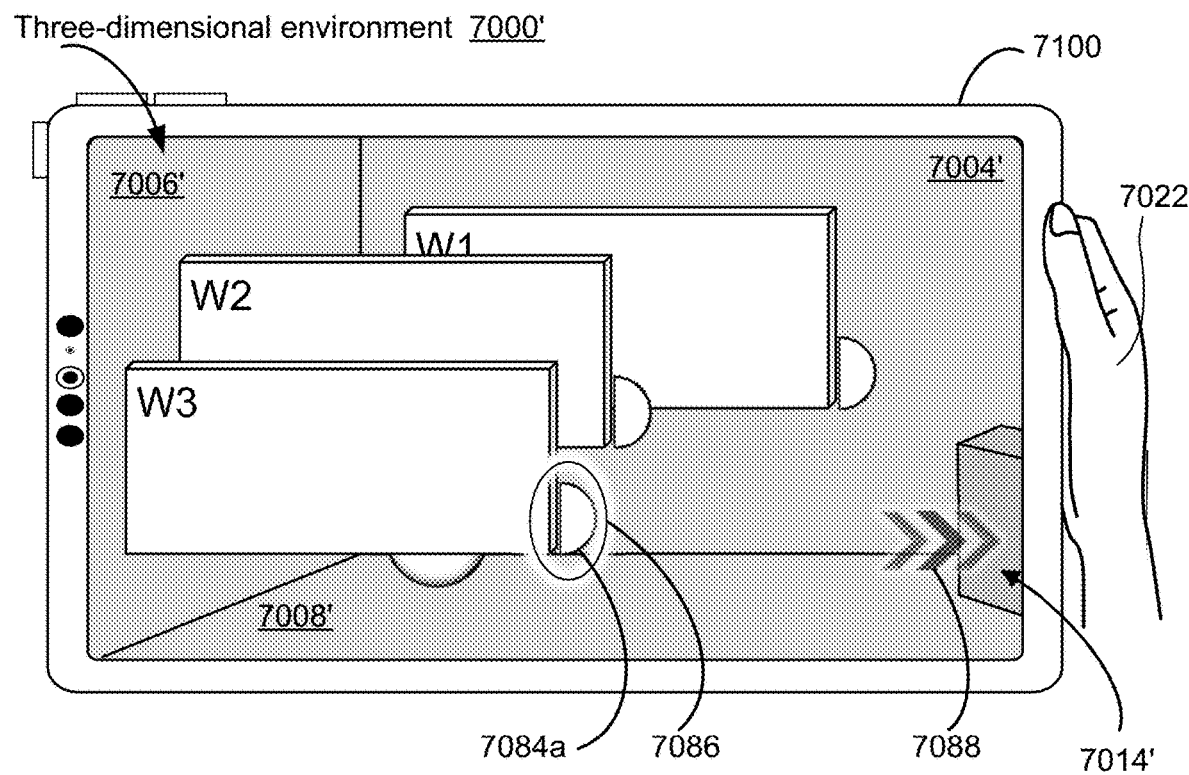
Figure 16D3

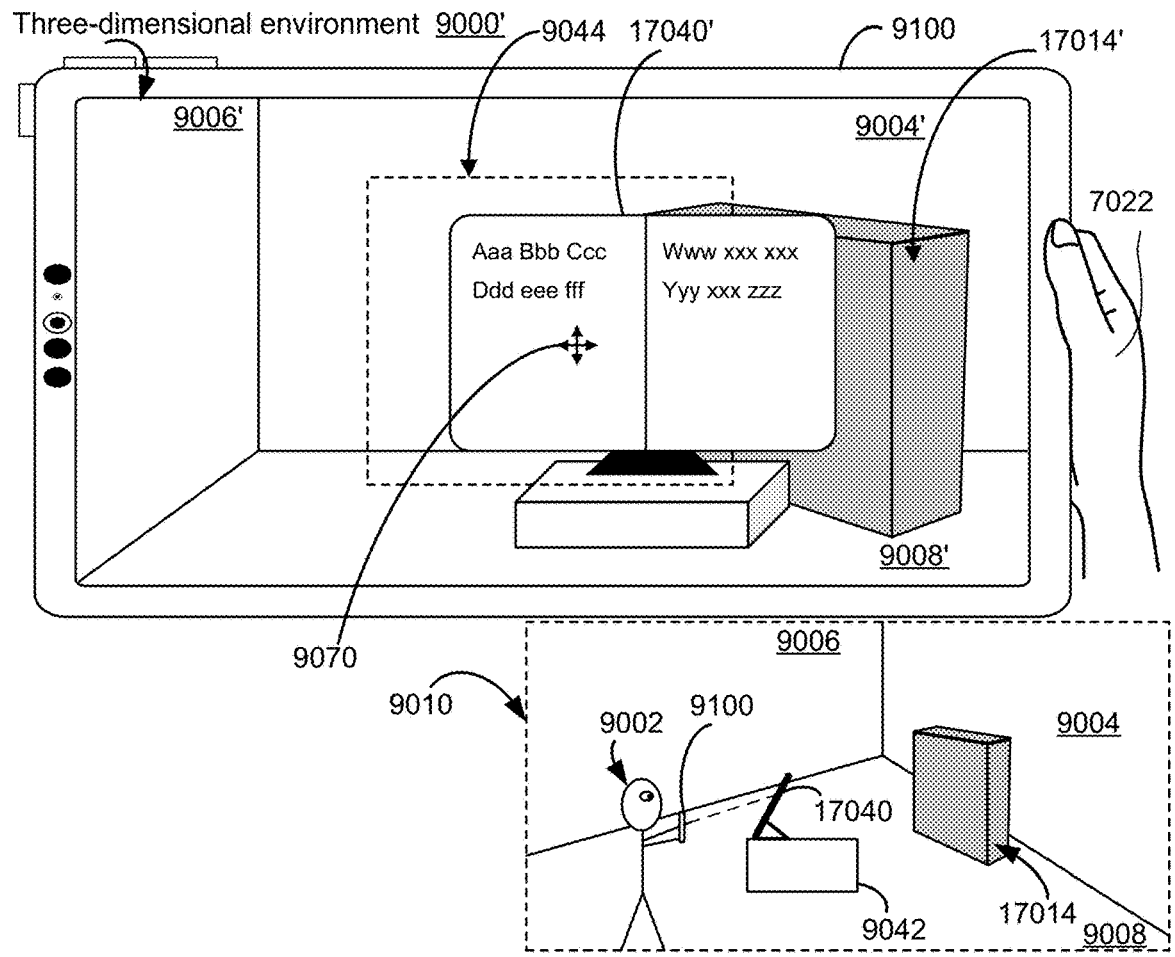
Figure 17C
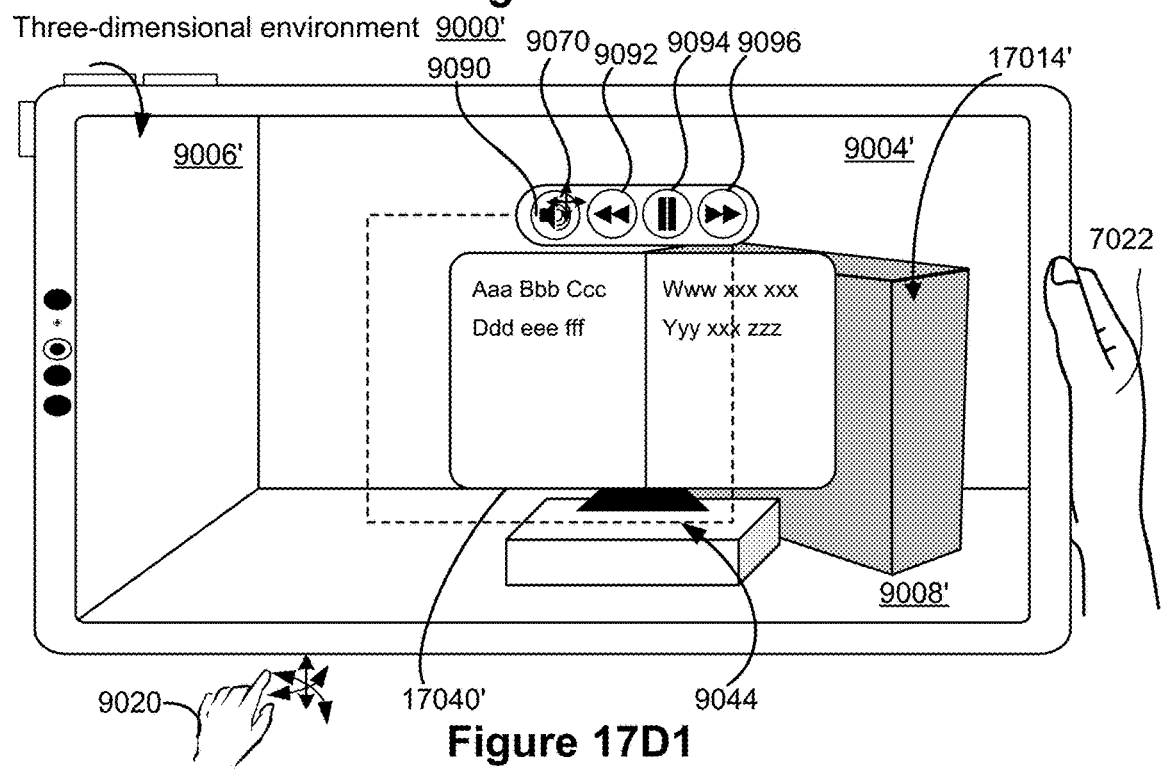
Figure 17D1

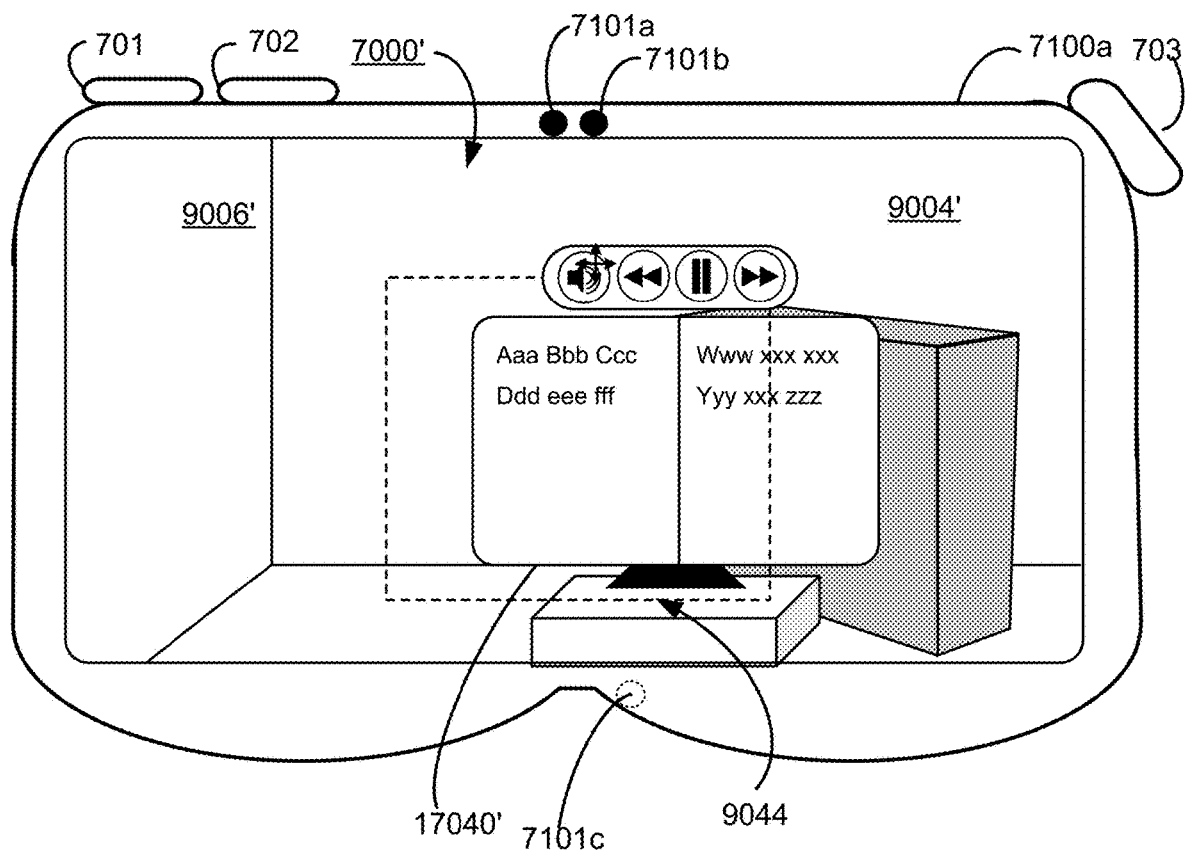
Figure 17D2
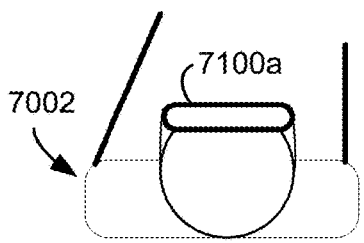
Figure 17D3

1800

1802 While a view of a three-dimensional environment is visible via the display generation component, wherein the three-dimensional environment includes a foreground and a background that is distinct from the foreground, detecting occurrence of an event corresponding to a change to an appearance of the background of the three-dimensional environment

1804 In response to detecting the occurrence of the event corresponding to a change to the appearance of the background of the three-dimensional environment:

1806 in accordance with a determination that the computer system is in a first mode of operation when the event was detected, update the view of the three-dimensional environment to apply the change to the background of the three-dimensional environment separately from the foreground of the three-dimensional environment, wherein the change to the background of the three-dimensional environment includes changing an appearance of a virtual background element

1808 in accordance with a determination that the computer system is in a second mode of operation that is different from the first mode of operation when the event was detected, forgo applying the change to the background of the three-dimensional environment

Figure 18

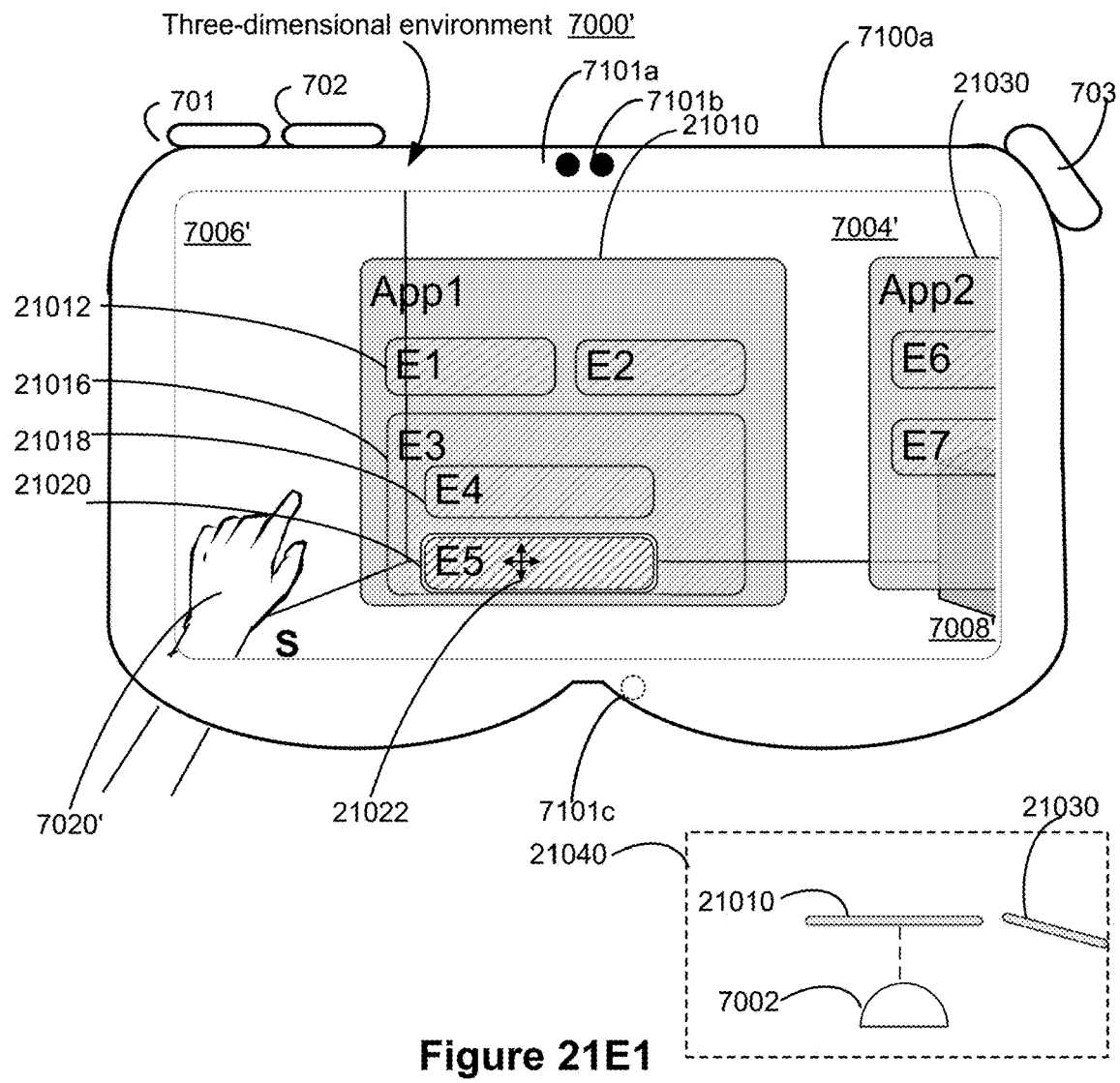
Figure 21E1
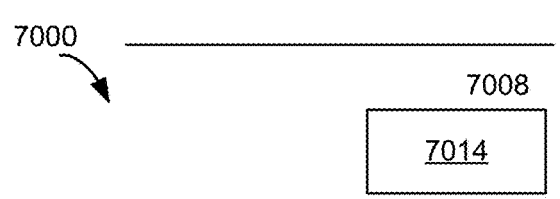
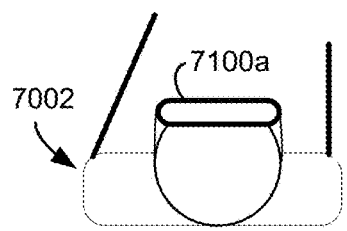
Figure 21E2

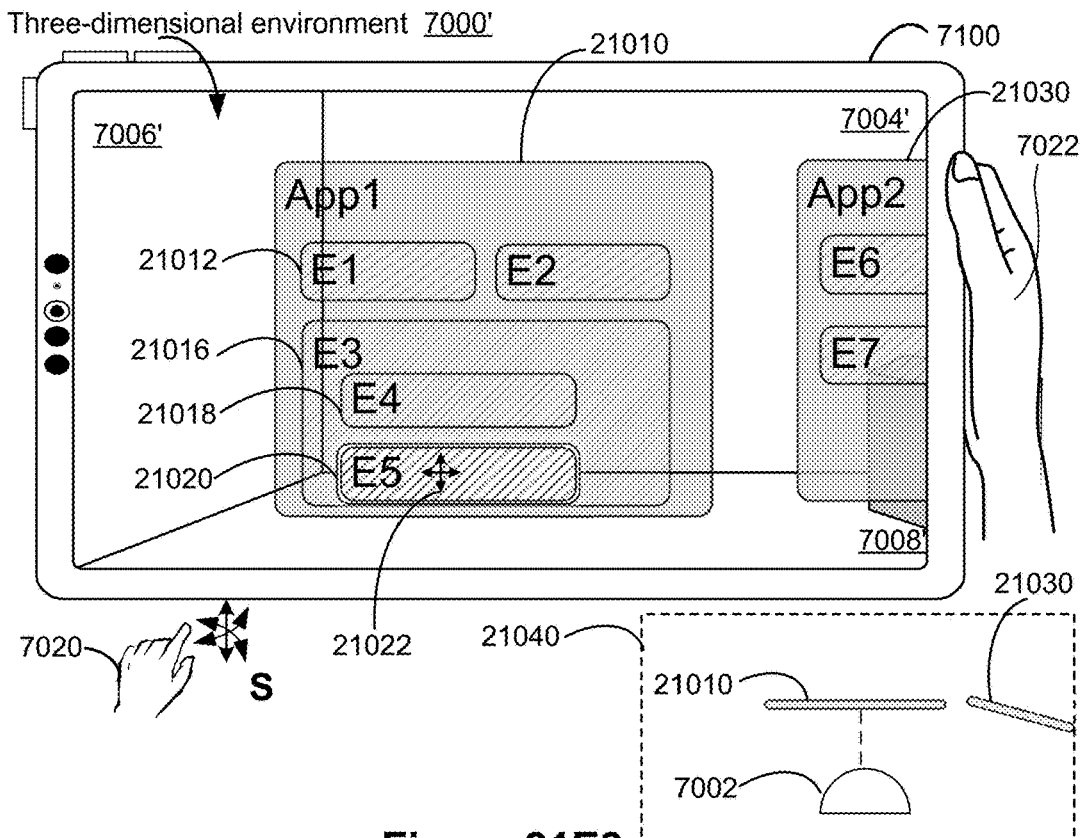
Figure 21E3
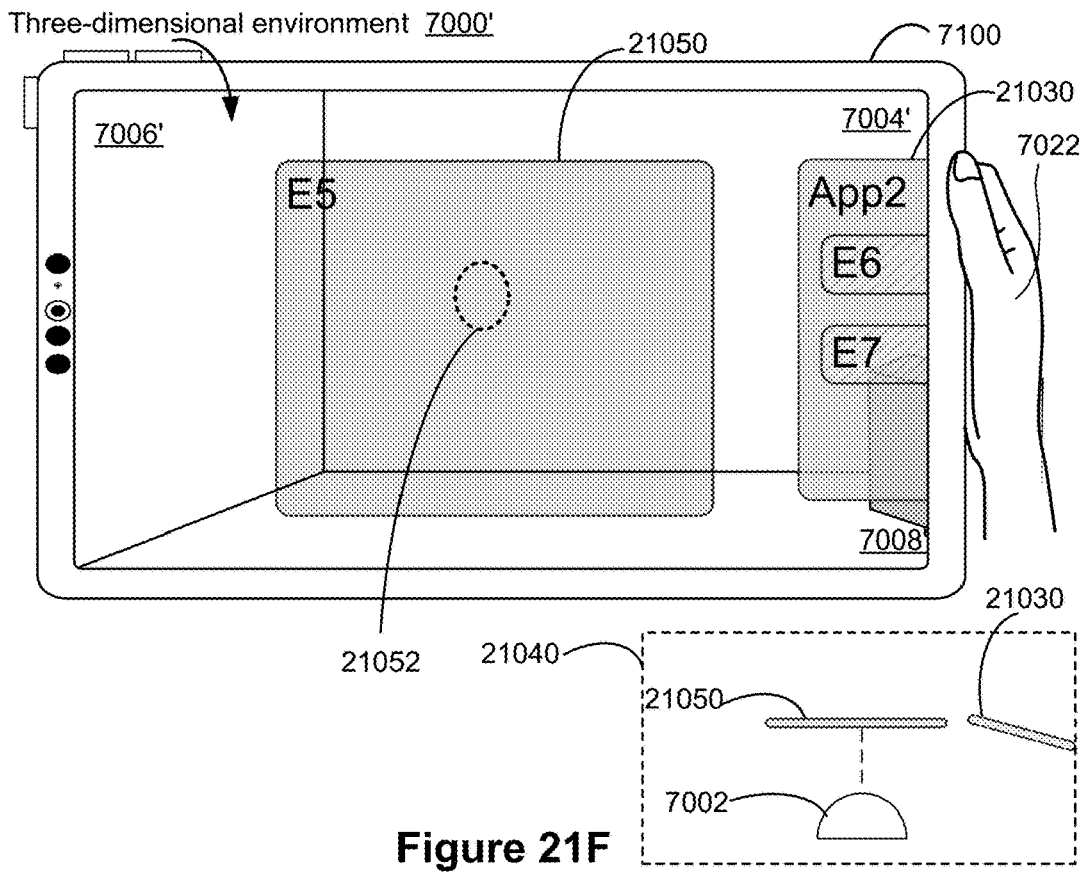
Figure 21F

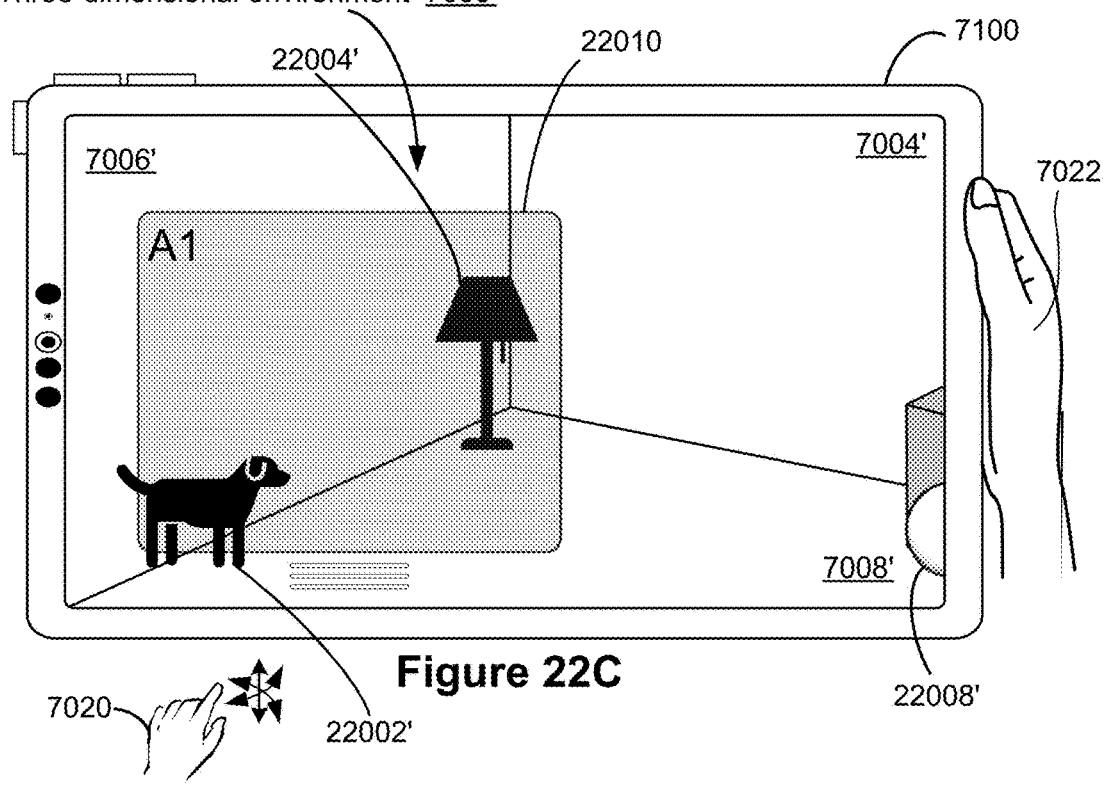
Figure 22C
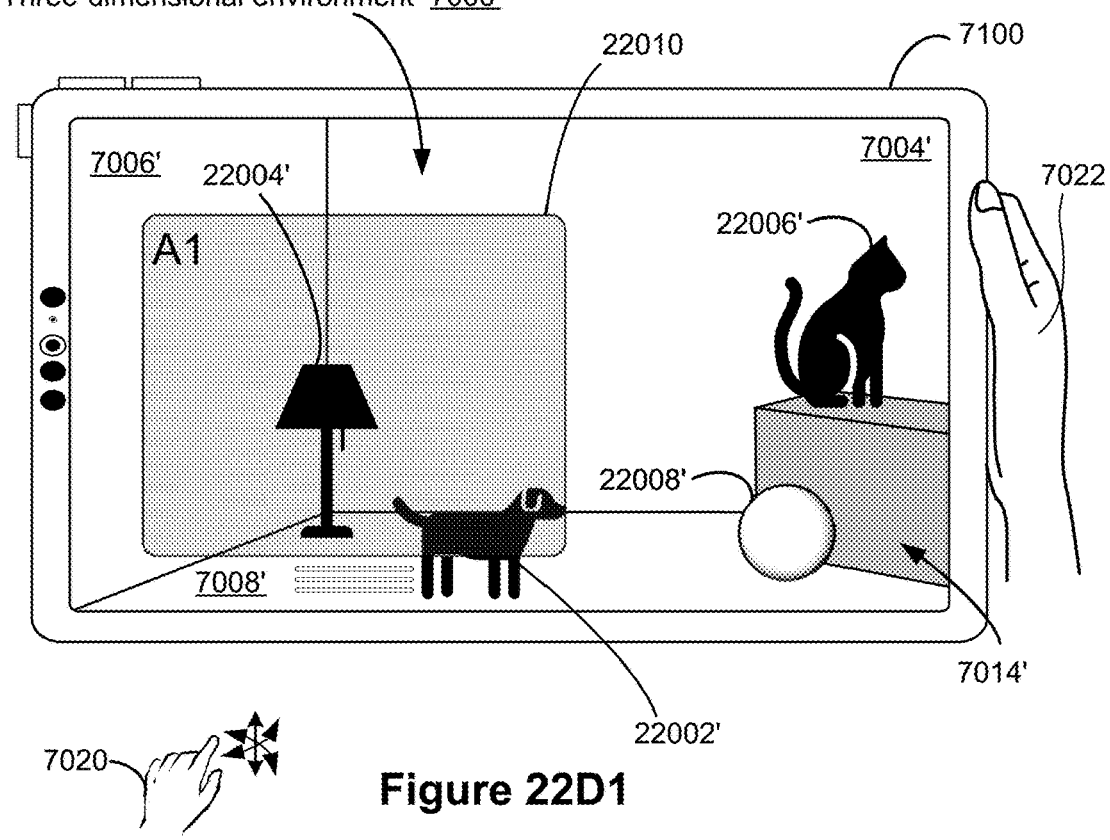
Figure 22D1

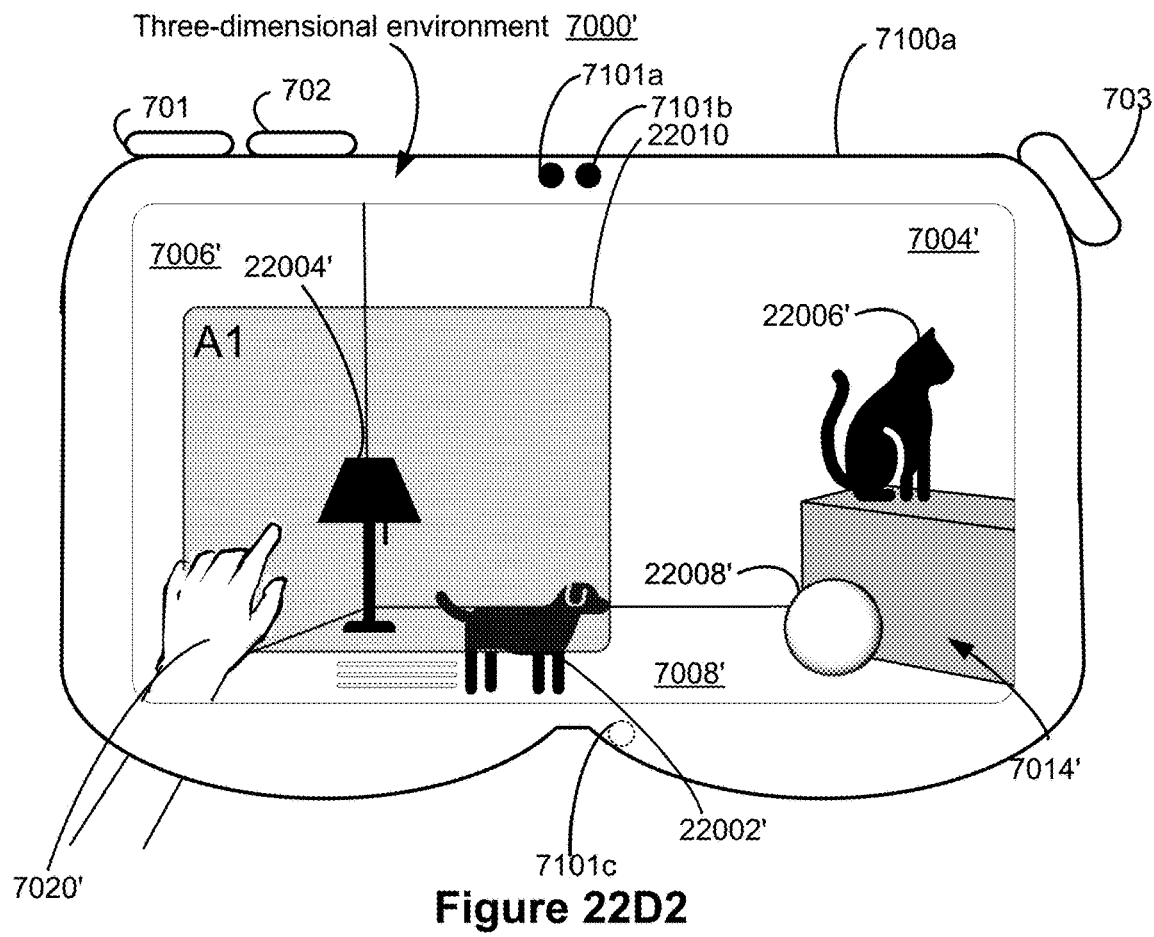
Figure 22D2
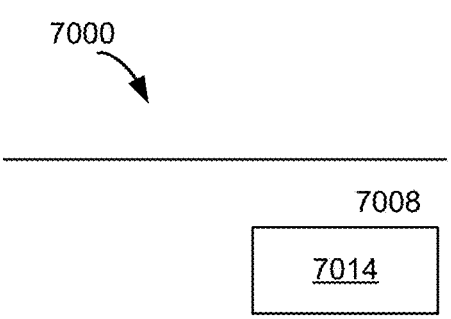
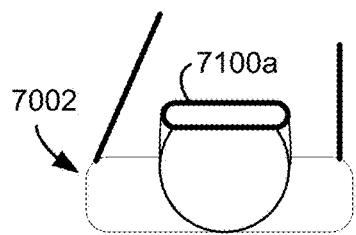
Figure 22D3

DEVICES, METHODS, AND GRAPHICAL USER INTERFACES FOR IMPROVING ACCESSIBILITY OF INTERACTIONS WITH THREE-DIMENSIONAL ENVIRONMENTS

RELATED APPLICATIONS

This application claims priority to U.S. Provisional Patent Application No. 63/470,782, filed Jun. 2, 2023, U.S. Provisional Patent Application No. 63/409,620, filed Sep. 23, 2022, and U.S. Provisional Patent Application No. 63/398,509, filed Aug. 16, 2022, each of which is hereby incorporated by reference in its entirety.

TECHNICAL FIELD

The present disclosure relates generally to computer systems that are in communication with a display generation component and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited, especially for users with visual, motor, hearing impairments, learning and/or cognitive impairments. For example, systems that provide insufficient accommodation for users with visual impairments, systems that provide insufficient accommodation for users with hearing impairments, systems that provide insufficient accommodation for users with motor impairments, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users with visual, hearing, cognitive, and/or motor impairments. Such methods and interfaces optionally complement or replace conventional methods for providing extended reality experiences to users. Such methods allow users with visual and/or motor impairments to interact with XR systems. Further, such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces that enable users with physical and/or cognitive impairments to interact with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is performed at a computer system that is in communication with a display generation component and one or more input devices. The method includes, while a view of a three-dimensional environment is visible via the display generation component, wherein the view of the three-dimensional environment includes one or more real objects and virtual content, displaying, over at least a portion of the view of the three-dimensional environment, a magnifying region that includes a magnified version of a first portion of the three-dimensional environment that includes one or more real objects and virtual content. The method includes detecting a request to magnify a second portion of the three-dimensional environment and, in response to detecting the request to magnify the second portion of the three-dimensional environment, displaying, in the magnifying region, a magnified version of the second portion of the three-dimensional environment. The second portion of the three-dimensional environment is different from the first portion of the three-dimensional environment, and the second portion of the three-dimensional environment includes one or more real objects and virtual content.

In accordance with some embodiments, a method is performed at a computer system that is in communication with a display generation component and one or more input devices. The method includes, while a view of a three-dimensional environment is visible via the display generation component, receiving one or more first user inputs from a user corresponding to selection of a respective direction in the three-dimensional environment relative to a reference point associated with the user. The method includes displaying, via the display generation component, a ray in the three-dimensional environment extending in the respective direction away from the reference point in the three-dimensional environment, and, while displaying the ray, displaying a selection cursor moving along the ray independently of user input. The method includes, when the selection cursor is at a respective position along the ray, receiving one or more second user inputs corresponding to a request to stop the movement of the selection cursor along the ray. The method includes, in response to receiving the one or more second user inputs corresponding to a request to stop the movement of the selection cursor, setting a target location for a next user interaction to a location in the three-dimensional environment that corresponds to the respective position of the selection cursor along the ray.

In accordance with some embodiments, a method is performed at a computer system that is in communication with a display generation component and one or more input devices. The method includes, while a view of a three-dimensional environment is visible via the display generation component, displaying, overlaid on the view of the three-dimensional environment, a user interface of a first application associated with the computer system. The method includes, while displaying the user interface of the first application overlaid on the view of the three-dimensional environment, detecting a gesture performed with a first hand, wherein the gesture meets first gesture criteria. The method includes, in response to detecting the gesture that meets the first gesture criteria: in accordance with a determination that a second hand that is different from the first hand has a first configuration, performing a first operation in the first application; and, in accordance with a determination that the second hand has a second configuration that is different from the first configuration, performing a second operation outside the first application.

In accordance with some embodiments, a method is performed at a computer system that is in communication with a display generation component and one or more input devices. The method includes, while a view of a three-dimensional environment is visible via the display generation component, displaying, overlaid on the view of the three-dimensional environment, a user interface of a first application, including displaying in the user interface a plurality of elements. The user interface is associated with a plurality of hierarchy levels, a first hierarchy level corresponds to a first grouping of one or more elements of the plurality of elements, and a second hierarchy level corresponds to a second grouping of one or more elements of the plurality of elements. The method includes, while a focus indicator identifies a first element of the plurality of elements displayed in the user interface, detecting a gesture. The first element is associated with the first hierarchy level of the plurality of hierarchy levels. The method includes, in response to detecting the gesture: in accordance with a determination that the gesture is performed with a first hand, moving the focus indicator from the first element to a second element of the plurality of elements; and, in accordance with a determination that the gesture is performed with a second hand different from the first hand, moving the focus indicator from the first element of the first hierarchy level to a respective element of the second hierarchy level of the plurality of hierarchy levels.

In accordance with some embodiments, a method is performed at a computer system that is in communication with a display generation component and one or more input devices. The method includes, while a view of a three-dimensional environment is visible via the display generation component, wherein the three-dimensional environment includes a foreground and a background that is distinct from the foreground, detecting occurrence of an event corresponding to a change to an appearance of the background of the three-dimensional environment. In response to detecting the occurrence of the event corresponding to a change to the appearance of the background of the three-dimensional environment and in accordance with a determination that the computer system is in a first mode of operation when the event was detected, updating the view of the three-dimensional environment to apply the change to the background of the three-dimensional environment separately from the foreground of the three-dimensional environment. The change to the background of the three-dimensional environment includes changing an appearance of a virtual background element. The method includes, in response to detecting the occurrence of the event corresponding to a change to the appearance of the background of the three-dimensional environment and in accordance with a determination that the computer system is in a second mode of operation that is different from the first mode of operation when the event was detected, applying the change to the background of the three-dimensional environment is forgone.

In accordance with some embodiments, a method is performed at a computer system that is in communication with a display generation component and one or more input devices. The method includes, while a first view of a three-dimensional environment is visible via the display generation component, an audio (or sound) event associated with a respective portion of an object in the three-dimensional environment occurs. In response to the occurrence of the audio (or sound) event associated with the respective portion of the object in the three-dimensional environment and in accordance with a determination that the respective portion of the object is outside of the first view of the three-dimensional environment, displaying, via the display generation component, a first visual effect that indicates a location of the respective portion of the object in the three-dimensional environment relative to the first view. The first visual effect is displayed within the first view and indicates that a location of the audio (or sound) in the three-dimensional environment is outside of the first view. The method includes, in response to the occurrence of the audio (or sound) event associated with the respective portion of the object in the three-dimensional environment and in accordance with a determination that the respective portion of the object is within the first view of the three-dimensional environment, displaying, via the display generation component, a second visual effect that indicates the location of the object within the first view, wherein the second visual effect is different from the first visual effect.

In accordance with some embodiments, a method is performed at a computer system that is in communication with a display generation component and one or more input devices. The method includes, while a view of a three-dimensional environment is visible via the display generation component, automatically detecting an object in the three-dimensional environment. In response to detecting the object and in accordance with a determination that the object includes textual content, automatically displaying, via the display generation component, a user interface element for generating an audio representation of textual content. The method includes, detecting an input selecting the user interface element. In response to detecting the input selecting the user interface element, generating an audio representation of at least a portion of the textual content of the object.

In accordance with some embodiments, a method is performed at a computer system that is in communication with one or more input devices. The method includes detecting, via the one or more input devices, an input that includes a respective gesture. The method includes, while detecting the input that includes the respective gesture: detecting, via the one or more input devices, that a respective portion of a user's body has a first pose that is directed toward one or more first objects in a three-dimensional environment; and, in response to detecting that the respective portion of the user's body has the first pose that is directed toward the one or more first objects, outputting non-visual information that describes the one or more first objects. The method includes detecting, via the one or more input devices, movement of the respective portion of the user's body from the first pose corresponding to the one or more first objects to a second pose that is directed toward one or more second objects in the three-dimensional environment. The method includes, in response to detecting the movement of the respective portion of the user's body to the second pose that is directed toward the one or more second objects, in accordance with a determination that the input that includes the respective gesture continues to be detected, outputting non-visual information that describes the one or more second objects.

In accordance with some embodiments, a method is performed at a computer system that is in communication with a display generation component and one or more input devices. The method includes, while a three-dimensional environment is available for viewing via the display generation component, wherein the three-dimensional environment includes one or more virtual objects and a view of a physical environment that includes one or more physical objects, detecting a gesture via the one or more input devices. The method includes, in response to detecting the gesture: in accordance with a determination that the gesture meets first gesture criteria, outputting audio description of the view of the physical environment that includes information about the one or more physical objects; and, in accordance with a determination that the gesture does not meet the first gesture criteria, forgoing outputting audio description of the view of the physical environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 7A-7G illustrate example techniques for magnifying virtual and real content in a three-dimensional environment, in accordance with some embodiments.

FIGS. 8A-8L illustrate example techniques for selecting and interacting with a point in a three-dimensional environment using a ray and a selection cursor that moves along the ray, in accordance with some embodiments.

FIGS. 9A-9H illustrate example techniques for switching between interacting with an active application in a three-dimensional environment to performing an operation outside the active application, in accordance with some embodiments.

FIGS. 10A-10F illustrate example techniques for navigating within one application hierarchy level or between different application hierarchy levels in a three-dimensional environment, in accordance with some embodiments.

FIGS. 15A-15J illustrate example techniques for restricting various types of changes from occurring in a mixed reality three-dimensional environment when a guided access mode of operation is active, in accordance with some embodiments.

FIGS. 16A-16E illustrate example techniques for localization and visualization of sound in a mixed-reality three-dimensional environment, in accordance with some embodiments.

FIGS. 17A-17I illustrate example techniques for detecting textual content in a mixed-reality three-dimensional environment and generating a respective audio representation of the detected textual content, in accordance with some embodiments.

FIG. 18 is a flow diagram of methods of restricting various types of changes from occurring in a mixed reality three-dimensional environment when a guided access mode of operation is active, in accordance with various embodiments.

FIGS. 21A-21J illustrate example techniques for providing non-visual information (e.g., audio description) about virtual content in a mixed-reality three-dimensional environment, in accordance with various embodiments.

FIGS. 22A-22F illustrate example techniques for providing non-visual information (e.g., audio description) about a view of a physical environment part of a mixed-reality three-dimensional environment, in accordance with various embodiments.

DESCRIPTION OF EMBODIMENTS

Figure 1A:
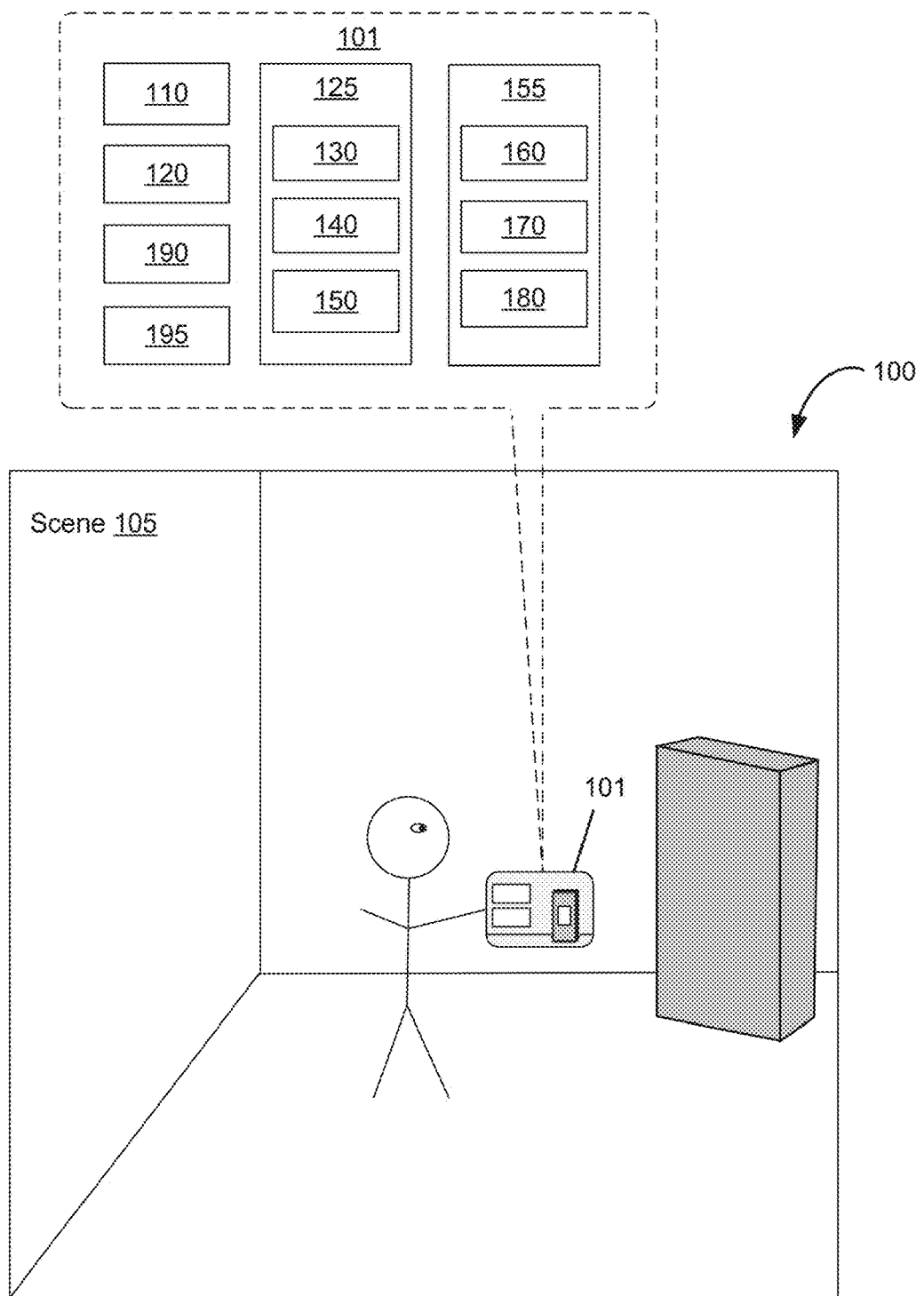
FIG. 1A is a block diagram illustrating an operating environment of a computer system for providing extended reality (XR) experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a magnifying region (e.g., a virtual magnifier) is provided that allows users (e.g., visually impaired users) to interact with a three-dimensional environment (e.g., a virtual or mixed reality environment). The magnifying region automatically magnifies portions of the three-dimensional environment as it is being moved in the three-dimensional environment (e.g., following a user's gaze or other reference point). The magnifying region can magnify both virtual content and real-world content, thereby making it easier for a user to see and interact with the three-dimensional environment (e.g., without the need to use lenses or other devices to assist user's eyesight). In addition, inputs detected at the magnifying region (e.g., as opposed to the underlying content) are forwarded to the underlying content (and processed as if they were detected at the underlying content). Allowing a user to directly interact with magnified content in the magnifying region improves user's ability to interact with the content as the content is easier to see, thereby reducing the amount of time needed to perform an operation in the three-dimensional environment.

In some embodiments, in response to one or more inputs to select a respective direction in a three-dimensional environment, a computer system displays a ray extending in the respective direction away from a reference point associated with the user, such as the user's viewpoint, and displays a cursor moving automatically along the ray. In response to one or more additional inputs from the user to stop the movement of the cursor, the cursor is stopped at a particular position along the ray, and a target corresponding to the particular position of the cursor is selected for further interaction. Selection of a ray direction, optionally from among a plurality of candidate directions through which one or more direction indication automatically moved, followed by selection of a position along the ray by stopping a cursor that moves automatically along the ray reduces the number and extent of inputs needed for the user to select an interaction point or target in three dimensions within the three-dimensional environment. Moreover, in embodiments in which the inputs may be provided using assistive input devices, users with physical impairments, such as motor impairments, are enabled to interact with the three-dimensional environment.

In some embodiments, while a first application is active in a mixed reality three-dimensional environment, an air gesture with a first hand is detected, and depending on a shape, configuration, or a gesture of a second hand (e.g., an opposite hand), an operation is performed in the first application or outside the first application (e.g., in a second application or a system operation). Accordingly, the second hand modifies gesture inputs detected with the first hand, thereby allowing a user to efficiently switch between interacting with user interface elements of a currently active application or to switch to other non-active applications. In some embodiments, audio description of user interface elements that are traversed is generated and output when a focus selector moves through the user interface elements. Where an operation is performed in response to a particular air gesture by a first hand, changing the location where the operation is performed (and accordingly which operation is performed, in some embodiments) based on the configuration of a different second hand enables a greater number of interactions with the computer system without requiring more extensive gestures and without displaying additional controls.

In some embodiments, different modes of navigating or traversing through an organization of a user interface (e.g., a page or a screen) are provided in a mixed reality three-dimensional environment. A first mode of navigation is performed linearly or sequentially, e.g., progressing from one navigable (or traversable) user interface element to another, including through one application hierarchy level to another application hierarchy level of the same application (e.g., when navigable elements of a current hierarchy level are exhausted). A second mode of navigating through an organization is non-linearly. In the second mode, a type of navigable user interface elements is selected, and navigation progresses from one navigable user interface element of the selected type to another (e.g., next in a sequence) navigable user interface element of the selected type, thereby cycling through user interface elements of the selected type. In some embodiments, navigating in the first mode is performed with one hand, and navigating in the second mode is performed with the opposite hand. In some embodiments, navigating between types of navigable elements is performed with a first set of fingers and navigating back and forth within elements of a selected type is performed with a second set of fingers. In some embodiments, bimanual navigation (e.g., via air pinch gestures) is used to navigate through the hierarchy levels of an active application in a mixed reality three-dimensional environment. For example, one hand is used to navigate through user interface elements of one application hierarchy level and another hand is used to switch to navigation to another application hierarchy level (e.g., across application hierarchy levels). Providing bimanual navigation through a hierarchical organization of a user interface enables a greater number of interactions with the computer system (e.g., contactless interaction for visually impaired users) in a mixed reality three-dimensional environment without requiring more extensive gestures and without displaying additional controls.

In some embodiments, when a "guided access" mode of operation is active, a computer system restricts various types of changes or actions from occurring in a three-dimensional environment (e.g., a virtual or mixed reality environment) while allowing such changes or actions to occur when the "guided access" mode of operation is inactive (e.g., a normal mode of operation is active). When a "guided access" mode of operation is active, the computer system does not respond to various user inputs and/or requests including, but not limited to, requests to change an immersion level of the three-dimensional environment, to launch new applications, to move open windows in the three-dimensional environment, to play media content, inputs directed as specific portions of the three-dimensional environment designated as restricted (e.g., background portions of the three-dimensional environment). Restricting changes and actions that can occur in the mixed-reality three-dimensional environment reduces the number of unintended inputs, allows a user to focus on interaction with specific portions of the three-dimensional environment or specific applications while reducing distractions and interruptions, and makes the user-system interface more efficient (e.g., by helping or guiding the user to provide proper inputs).

In some embodiments, different visual effects for visualizing sound location (or indicating a sound source) in a three-dimensional environment (e.g., a virtual or mixed reality environment) are provided depending on whether a location of the sound is within or outside a field of view (e.g., user's field of view or a field of view captured by one or more cameras). If the sound occurs within the field of view, a first visual effect is provided, and if the sound occurs outside the field of view, a second visual effect is provided. Optionally, the first visual effect can be changed to the second visual effect in response to detecting that the location of the sound is moved from within the field of view to outside the field of view. Respectively, the second visual effect is optionally changed to the first visual effect in response to detecting that the location of the sound is moved from outside the field of view to within the field of view. Providing different visual effects for visualizing sound in a mixed-reality three-dimensional environment depending on whether a location of the sound is within or outside a respective field of view, provides visual feedback about sounds that occur in the mixed-reality environment (e.g., thereby augmenting user's experience of the mixed-reality environment) and provides a mechanism for spatially locating sound (e.g., by helping a user determine a position of a sound source in the mixed-reality three-dimensional environment).

In some embodiments, textual content that is visible in three-dimensional environment (e.g., a virtual or mixed reality environment) is automatically detected, and in response, an input mechanism (e.g., a control element) for producing speech synthesis or other audio representation of the detected textual content is displayed. The audio representation is generated and optionally outputted in response to detecting selection of the control, thereby providing additional control to a user (e.g., an option to play the speech rather than playing the speech without providing a user with a choice), and provides visual feedback or cue to the user that there is textual content in the three-dimensional environment that is available to be read. Further, automatically detecting the textual content without the need for user input indicating that textual content is present in the mixed-reality three-dimensional environment, reduces the number and complexity of inputs needed to generate audio representation of textual content.

In some embodiments, while detecting an input that includes a respective gesture, a computer system detects that a respective portion of a user's body has a first pose that is directed toward one or more virtual objects in a three-dimensional environment and, in response, outputs non-visual information that describes the one or more virtual objects, including verbal descriptions of the one or more virtual objects. The computer system detects movement of the respective portion of the user's body to a second pose that is directed toward one or more other virtual objects in the three-dimensional environment and, in response, if the input that includes the respective gesture continues to be detected, the computer system outputs non-visual information that describes the one or more other virtual objects, including verbal descriptions of the one or more other virtual objects. Automatically outputting verbal descriptions of virtual content selected based on a location toward which the respective portion of user's body is directed assists the user with exploring a mixed-reality three-dimensional environment without the need for the user to provide additional inputs and navigate complex user interfaces, thereby reducing the number, complexity, and extent of user inputs, and making user interaction with a mixed-reality three-dimensional environment more accessible to a wider population, including to users with reduced vision or other visual impairments.

In some embodiments, a computer system detects a gesture while a three-dimensional environment is available for viewing, the three-dimensional environment including one or more virtual objects and a view of a physical environment that includes one or more physical objects. In response to detecting the gesture: if the gesture meets first gesture criteria, the computer system outputs non-visual information about the view of the physical environment, including an audio description of the view of the physical environment and optionally information about the one or more physical objects; and, if the gesture does not meet the first gesture criteria, the computer system forgoes outputting the non-visual information and audio description of the view of the physical environment. Outputting a verbal description of a portion of a physical environment included in a mixed-reality three-dimensional environment in response to detecting a respective gesture assists the user with exploring a state of the physical environment while also allowing the user to interact with virtual content in the mixed-reality three-dimensional environment, thereby making user interaction with a mixed-reality three-dimensional environment more accessible to a wider population (e.g., by providing verbally contextual information), including to users with reduced vision or other visual impairments. For example, the verbal description of the physical environment can help users navigate the physical environment, avoid collisions, and otherwise orient themselves in the physical world without the need to cease interaction with the virtual world that is part of the mixed-reality environment.

Figure 11:
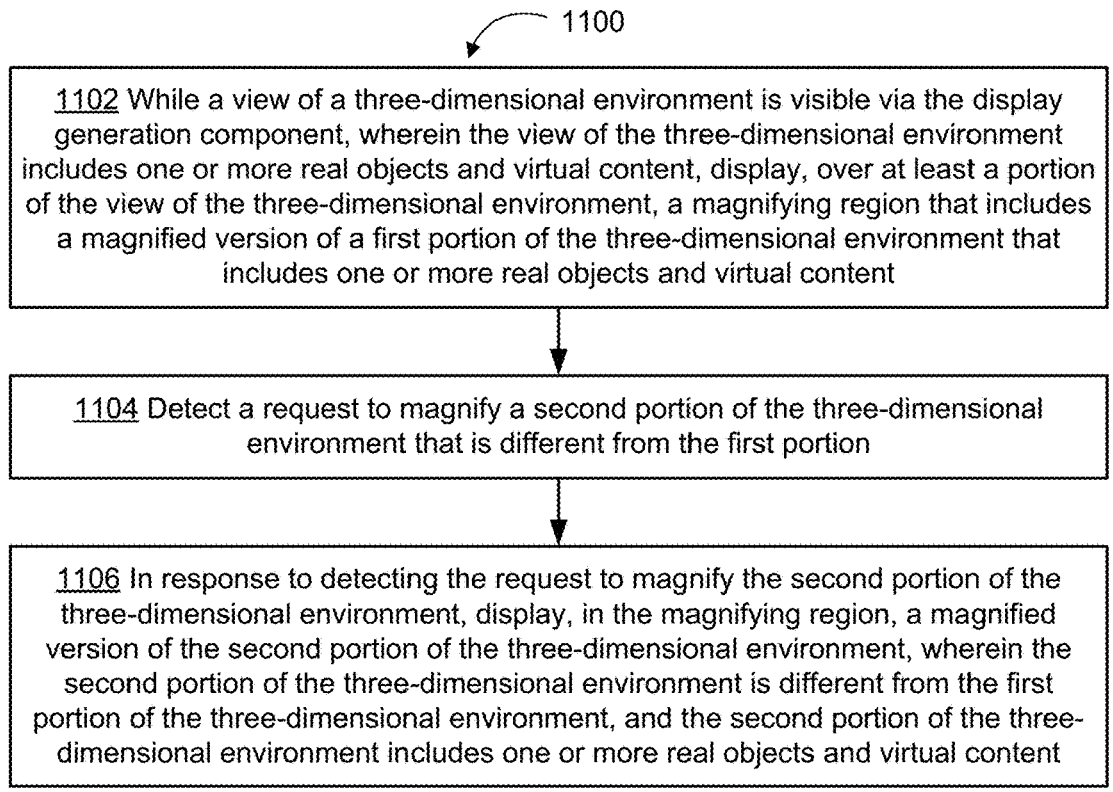
FIG. 11 is a flow diagram of methods of magnifying virtual and real content in a three-dimensional environment, in accordance with various embodiments.
Figure 12:
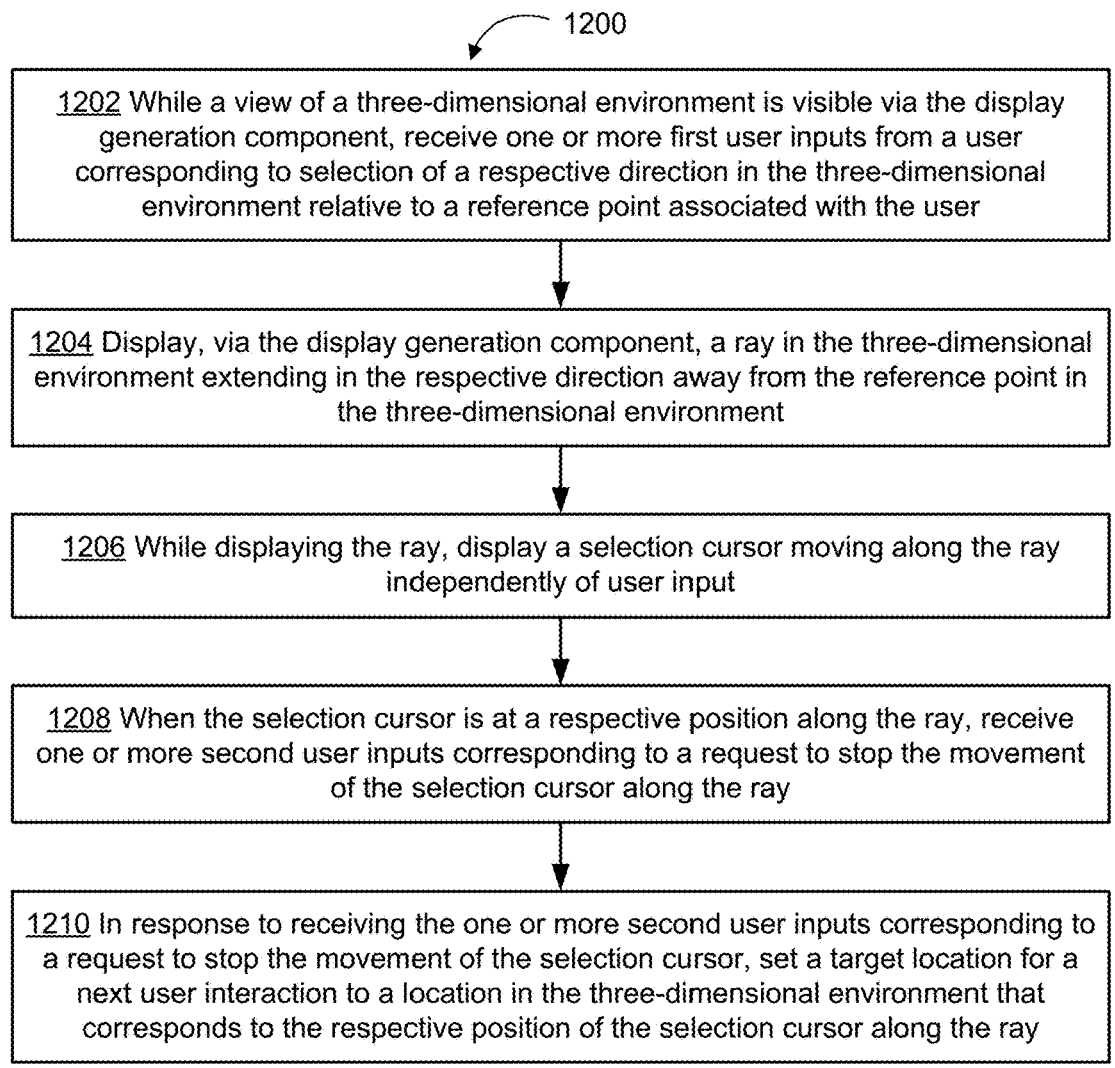
FIG. 12 is a flow diagram of methods of selecting and interacting with a point in a three-dimensional environment using a ray and a selection cursor that moves along the ray, in accordance with various embodiments.
Figure 13:
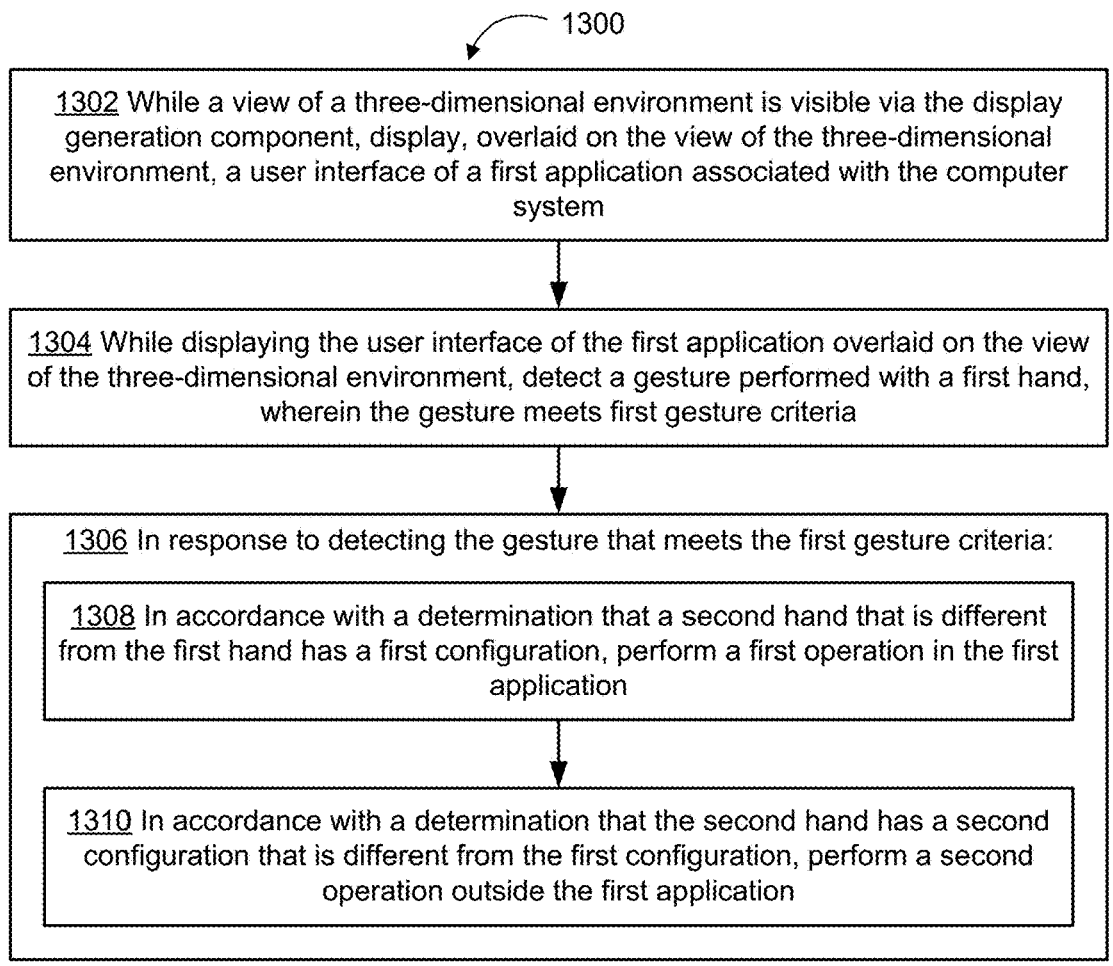
FIG. 13 is a flow diagram of methods of switching between interacting with an active application in a three-dimensional environment to performing an operation outside the active application, in accordance with various embodiments.
Figure 14:
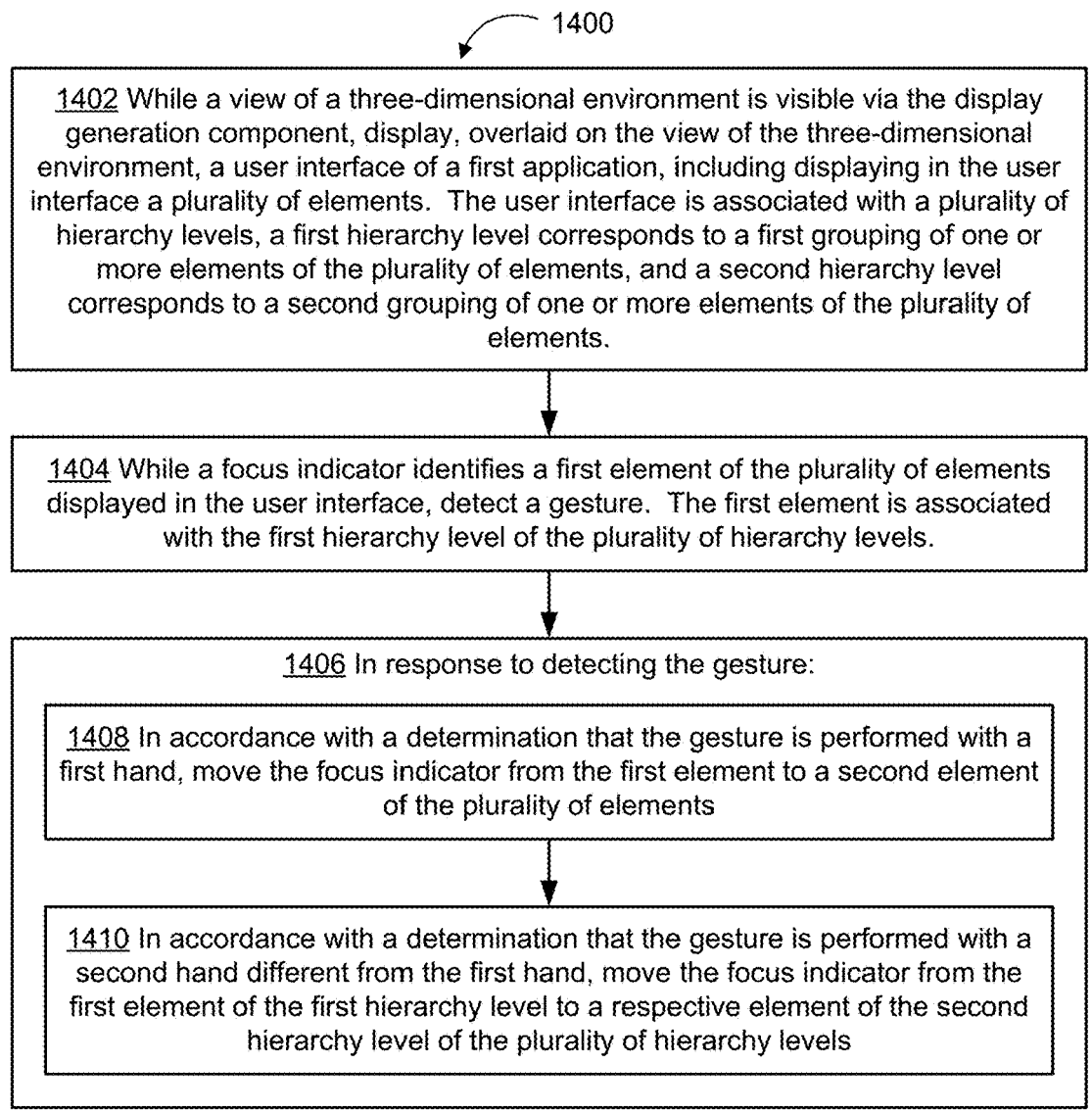
FIG. 14 is a flow diagram of methods of navigating within one application hierarchy level or between different application hierarchy levels in a three-dimensional environment, in accordance with various embodiments.
Figure 19:
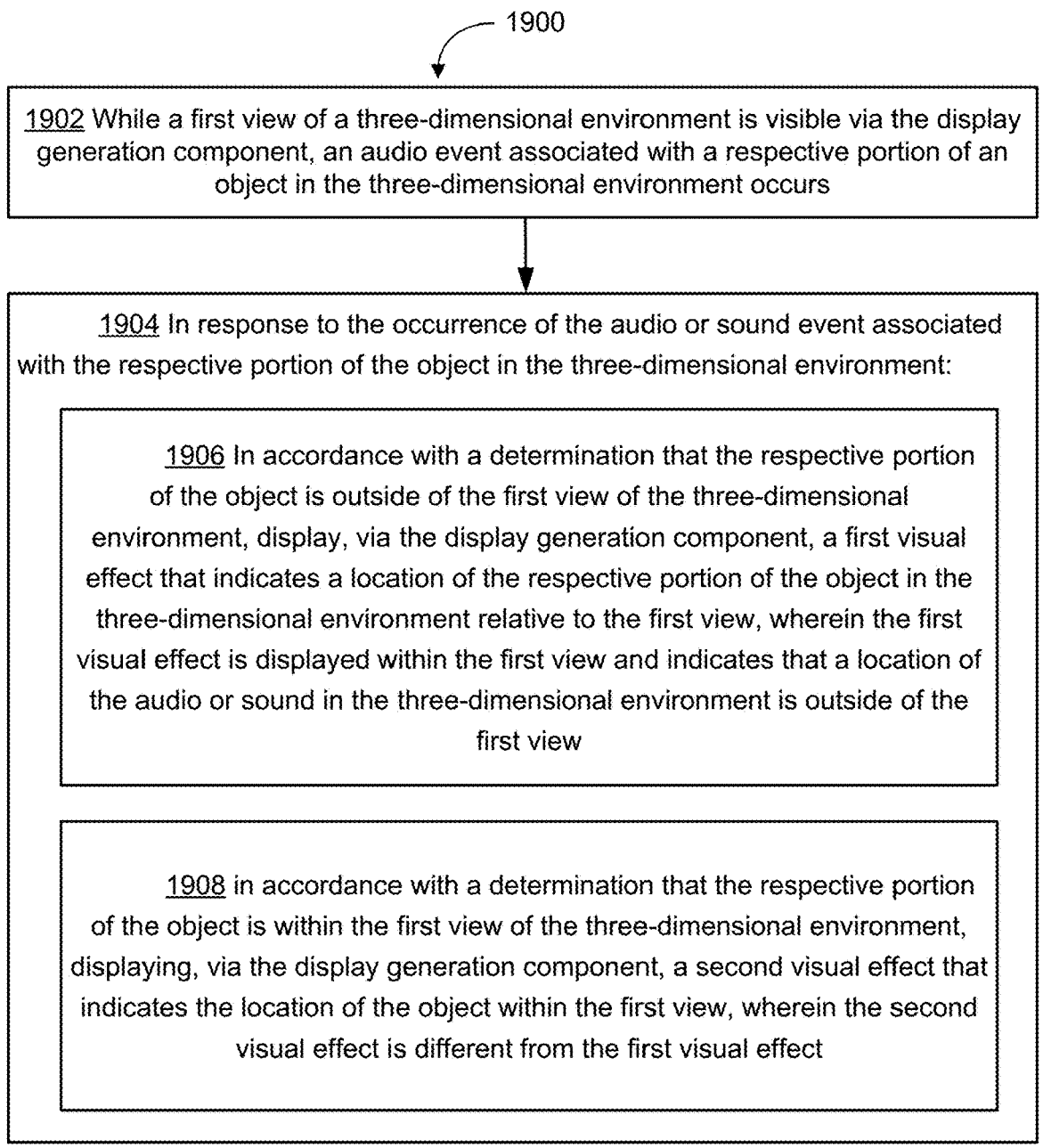
FIG. 19 is a flow diagram of methods of localization and visualization of sound in a mixed-reality three-dimensional environment, in accordance with various embodiments.
Figure 20:
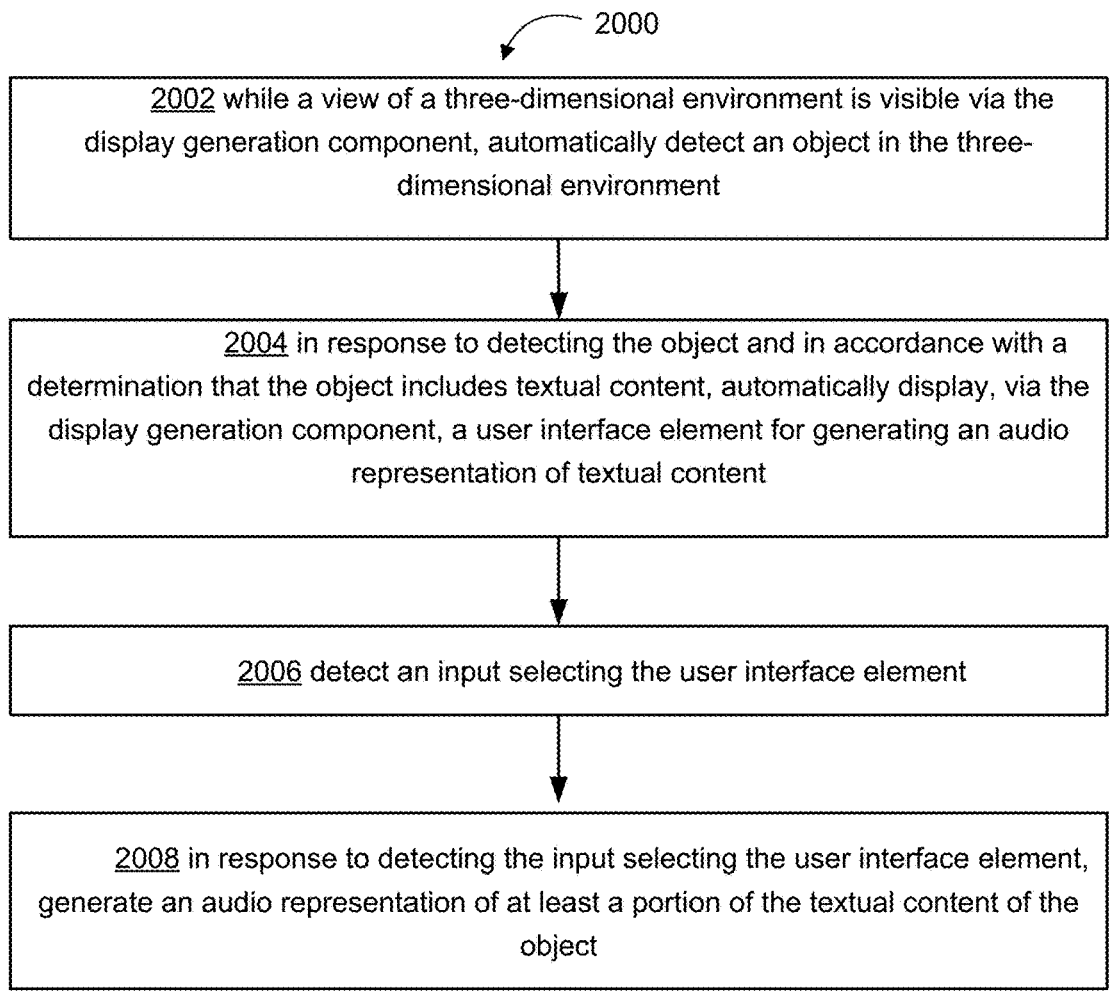
FIG. 20 is a flow diagram of methods of detecting textual content in a mixed-reality three-dimensional environment and generating a respective audio representation of a least a portion of the detected textual content, in accordance with various embodiments.
Figure 23:
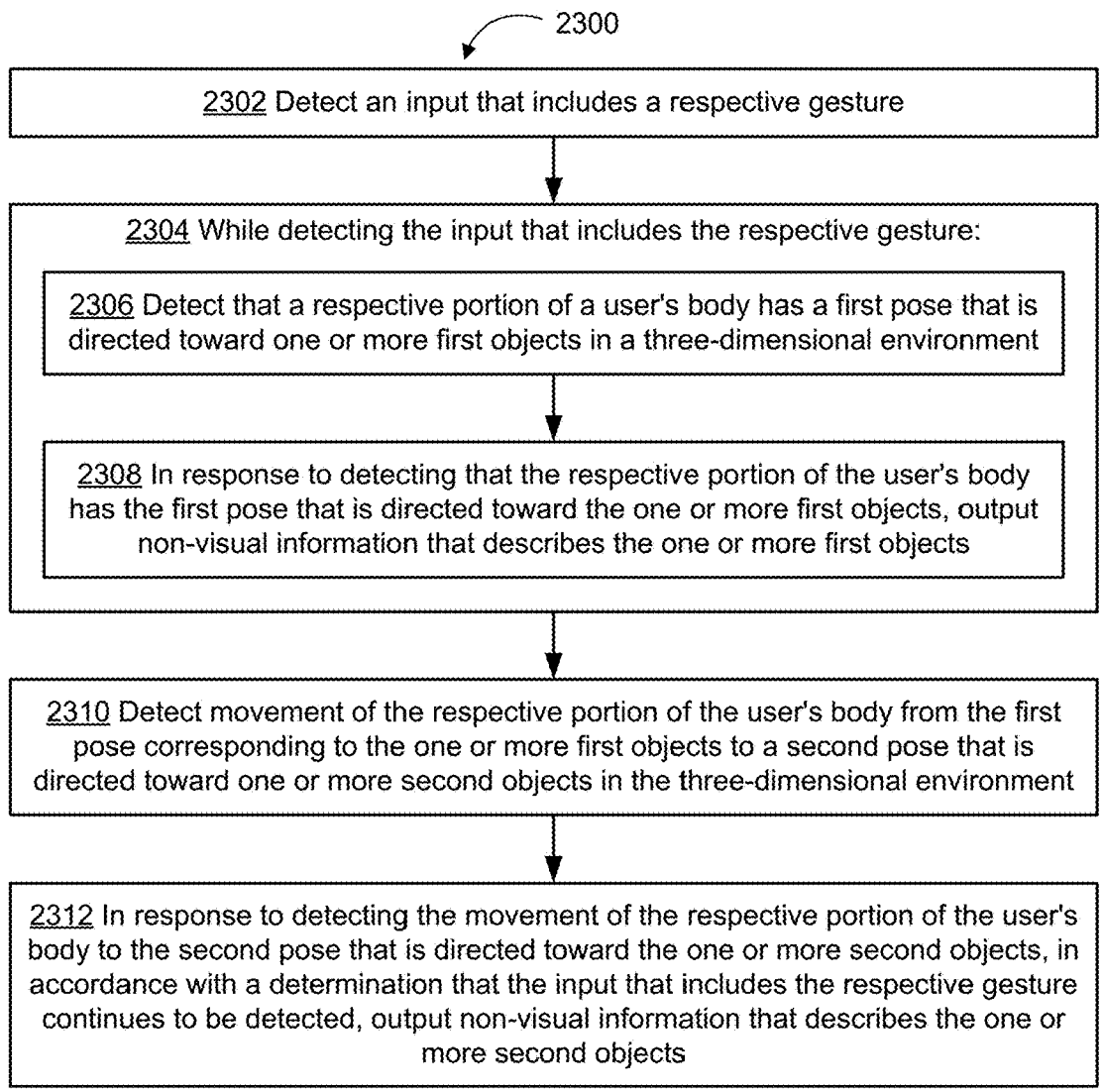
FIG. 23 is a flow diagram of methods of providing non-visual information (e.g., audio description) about virtual content in a mixed-reality three-dimensional environment, in accordance with various embodiments.
Figure 24:
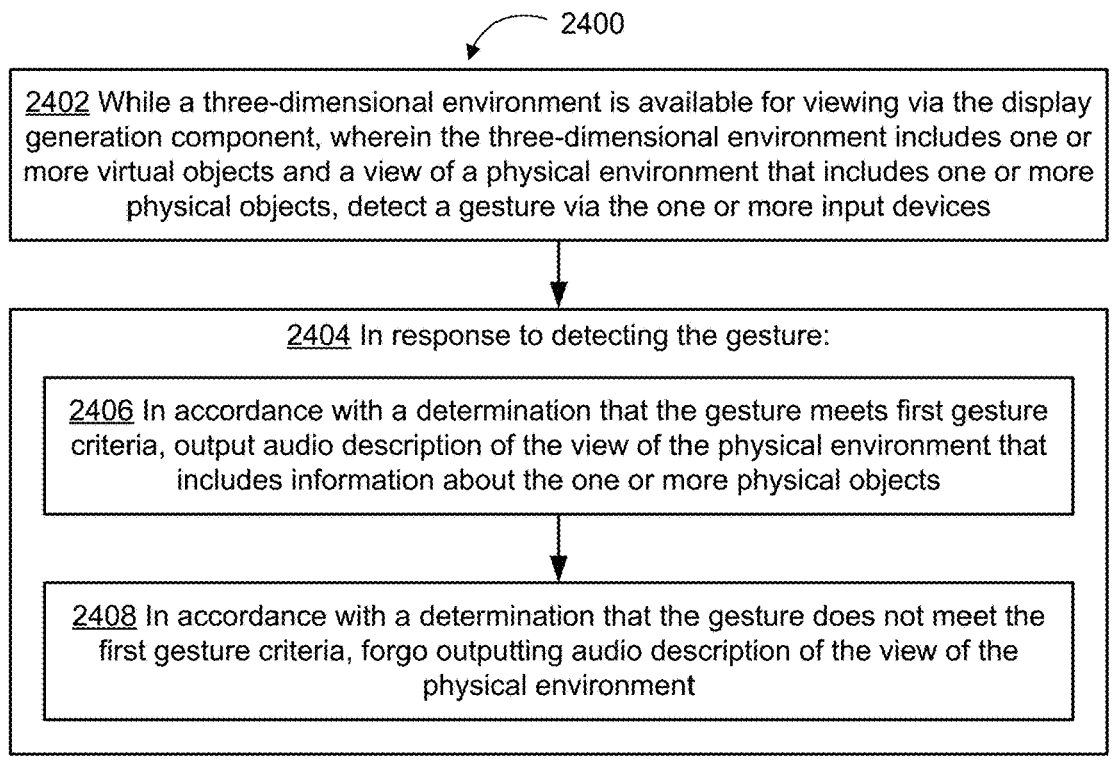
FIG. 24 is a flow diagram of methods of providing non-visual information (e.g., audio description) about a view of a physical environment part of a mixed-reality three-dimensional environment, in accordance with various embodiments.

FIGS. 1A-6 provide a description of example computer systems for providing XR experiences to users. FIGS. 7A-7G illustrate example techniques for magnifying virtual and real content in a three-dimensional environment, in accordance with some embodiments. FIG. 11 is a flow diagram of methods of magnifying virtual and real content in a three-dimensional environment, in accordance with various embodiments. The user interfaces in FIGS. 7A-7G are used to illustrate the processes in FIG. 11. FIGS. 8A-8L illustrate example techniques for selecting and interacting with a point in a three-dimensional environment using a ray and a selection cursor that moves along the ray, in accordance with some embodiments. FIG. 12 is a flow diagram of methods of selecting and interacting with a point in a three-dimensional environment using a ray and a selection cursor that moves along the ray, in accordance with various embodiments. The user interfaces in FIGS. 8A-8L are used to illustrate the processes in FIG. 12. FIGS. 9A-9H illustrate example techniques for switching between interacting with an active application in a three-dimensional environment to performing an operation outside the active application, in accordance with some embodiments. FIG. 13 is a flow diagram of methods of switching between interacting with an active application in a three-dimensional environment to performing an operation outside the active application, in accordance with various embodiments. The user interfaces in FIGS. 9A-9H are used to illustrate the processes in FIG. 13. FIGS. 10A-10F illustrate example techniques for navigating within one application hierarchy level or between different application hierarchy levels in a three-dimensional environment. FIG. 14 is a flow diagram of methods of navigating within one application hierarchy level or between different application hierarchy levels in a three-dimensional environment, in accordance with various embodiments. The user interfaces in FIGS. 10A-10F are used to illustrate the processes in FIG. 14. FIGS. 15A-15J illustrate example techniques for restricting various types of changes from occurring in a mixed reality three-dimensional environment when a guided access mode of operation is active, in accordance with some embodiments. FIG. 18 is a flow diagram of methods of for restricting various types of changes from occurring in a mixed reality three-dimensional environment when a guided access mode of operation is active, in accordance with various embodiments. The user interfaces in FIGS. 15A-15J are used to illustrate the processes in FIG. 18. FIGS. 16A-16E illustrate example techniques for localization and visualization of sound in mixed-reality three-dimensional environment, in accordance with some embodiments. FIG. 19 is a flow diagram of methods of localization and visualization of sound in mixed-reality three-dimensional environments, in accordance with various embodiments. The user interfaces in FIGS. 16A-16E are used to illustrate the processes in FIG. 19. FIGS. 17A-17I illustrate example techniques for detecting textual content in a mixed-reality three-dimensional environment and generating a respective audio representation of the detected textual content, in accordance with some embodiments. FIG. 20 is a flow diagram of methods of detecting textual content in a mixed-reality three-dimensional environment and generating a respective audio representation of the detected textual content, in accordance with various embodiments. The user interfaces in FIGS. 17A-17I are used to illustrate the processes in FIG. 20. FIGS. 21A-21J illustrate example techniques for providing non-visual information (e.g., audio description) about virtual content in a mixed-reality three-dimensional environment, in accordance with some embodiments. FIG. 23 is a flow diagram of methods of providing non-visual information (e.g., audio description) about virtual content in a mixed-reality three-dimensional environment, in accordance with various embodiments. The user interfaces in FIGS. 21A-21J are used to illustrate the processes in FIG. 23. FIGS. 22A-22F illustrate example techniques for providing non-visual information (e.g., audio description) about a view of a physical environment part of a mixed-reality three-dimensional environment, in accordance with some embodiments. FIG. 24 is a flow diagram of methods of providing non-visual information (e.g., audio description) about a view of a physical environment part of a mixed-reality three-dimensional environment, in accordance with various embodiments. The user interfaces in FIGS. 22A-22F are used to illustrate the processes in FIG. 24.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors (e.g., one or more cameras of the computer system 101), light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands) A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content)

obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
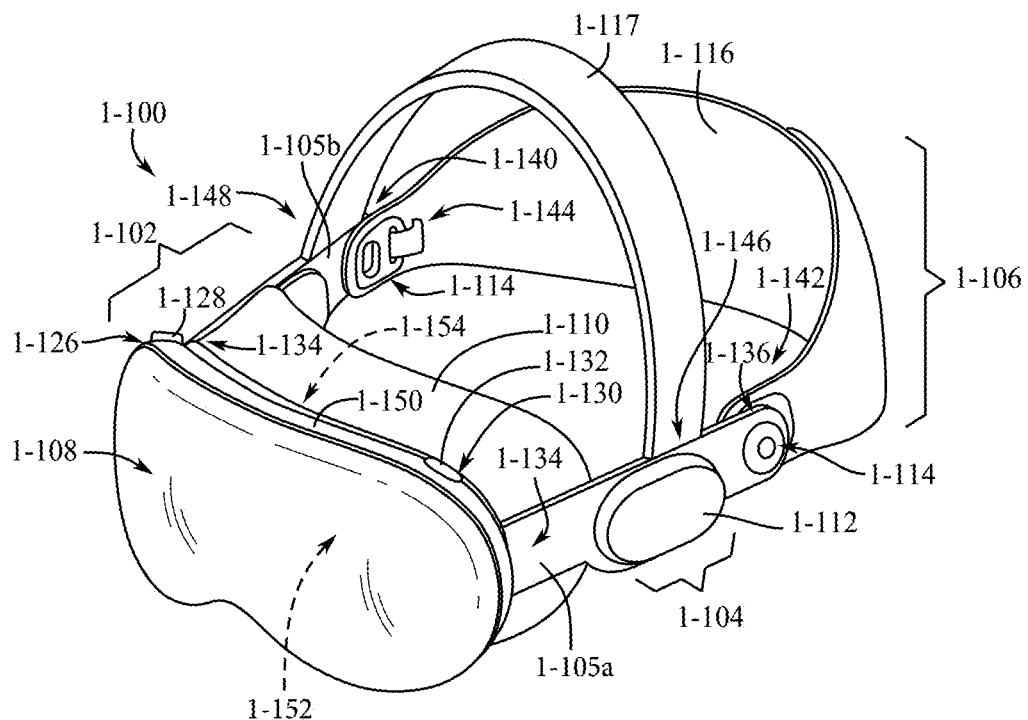
FIGS. 1B-1P are examples of a computer system for providing XR experiences in the operating environment of FIG. 1A.
Figure 1C:
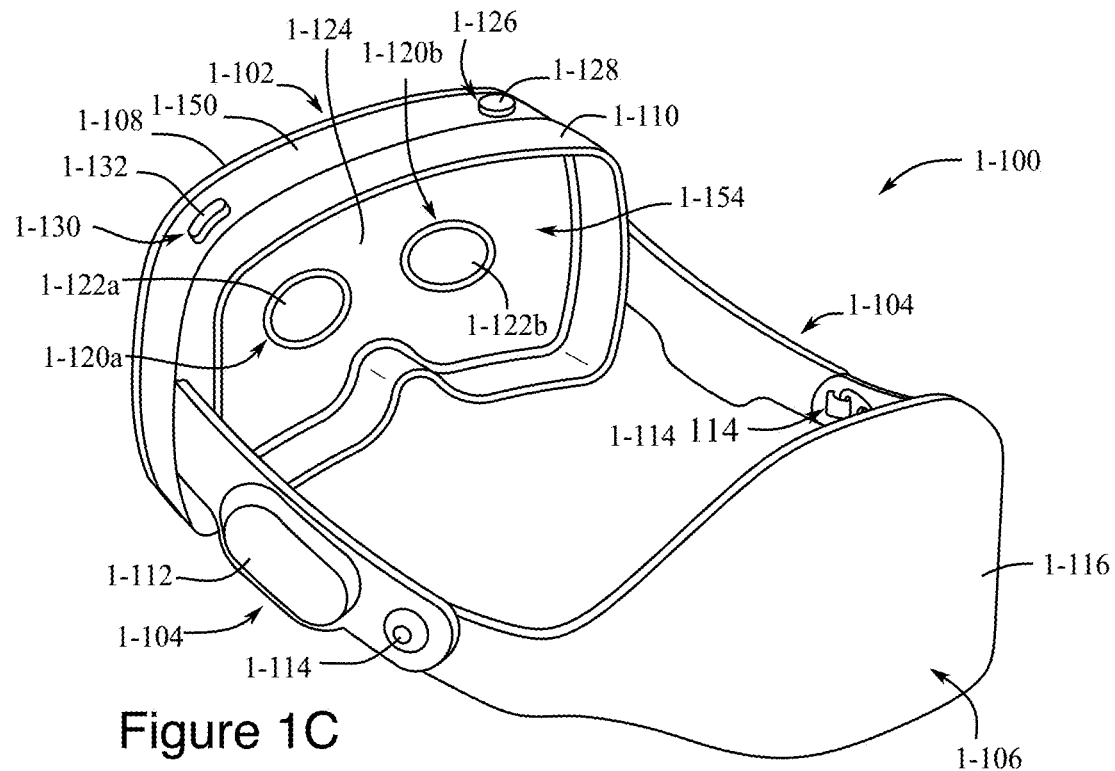
Figure 1D:
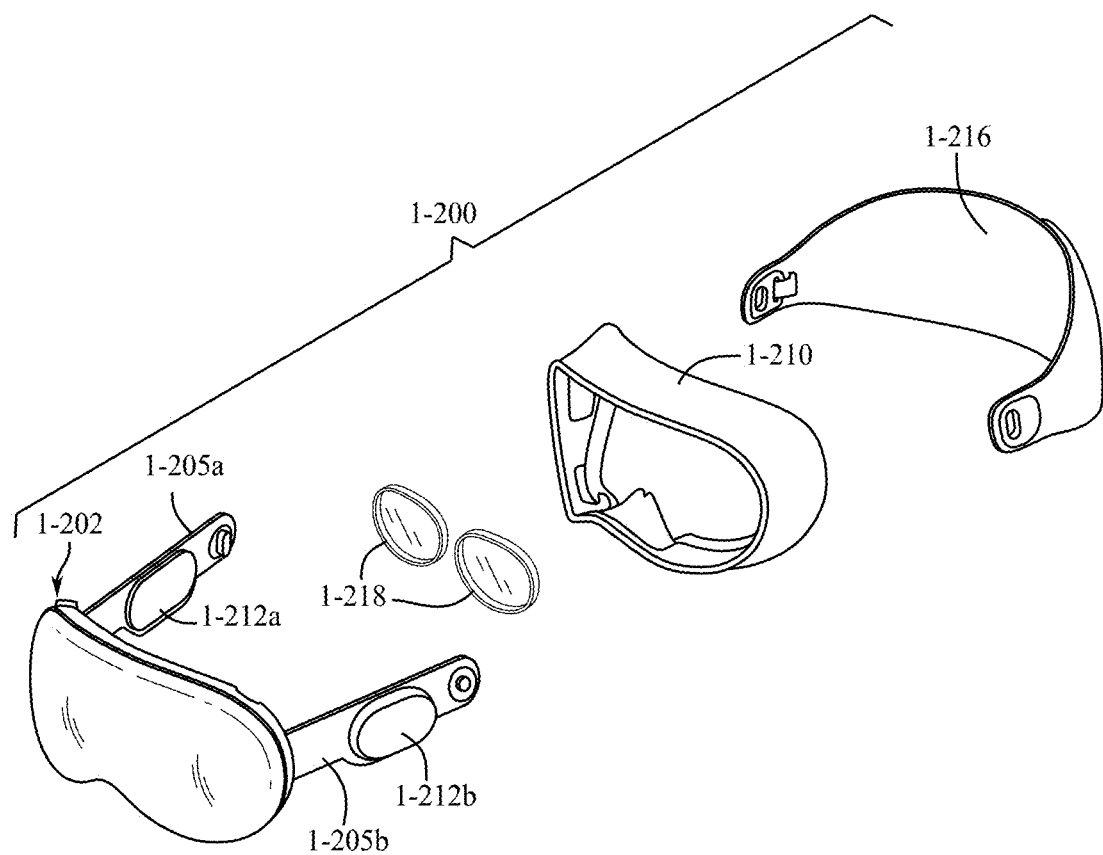
Figure 1E:
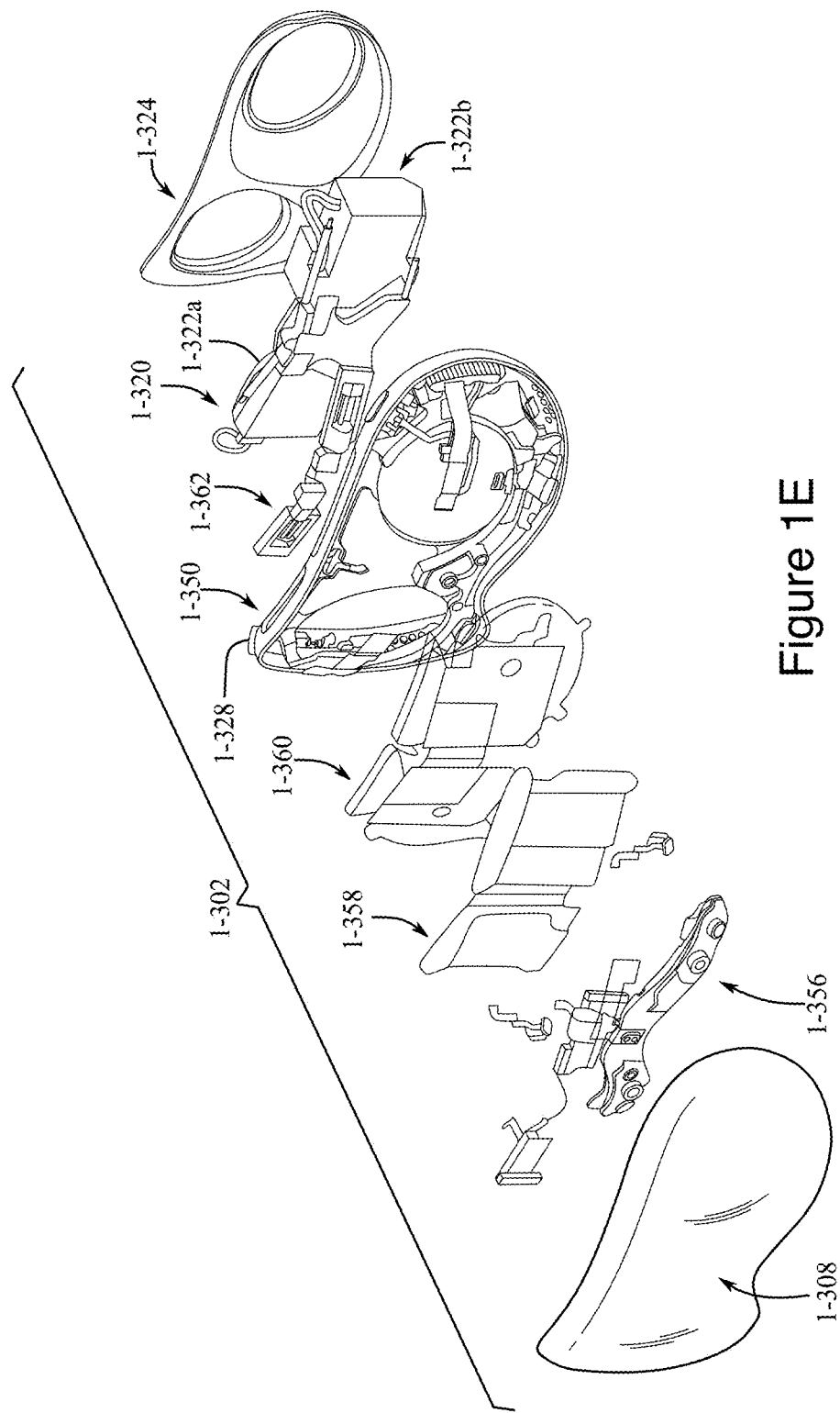
Figure 1F:
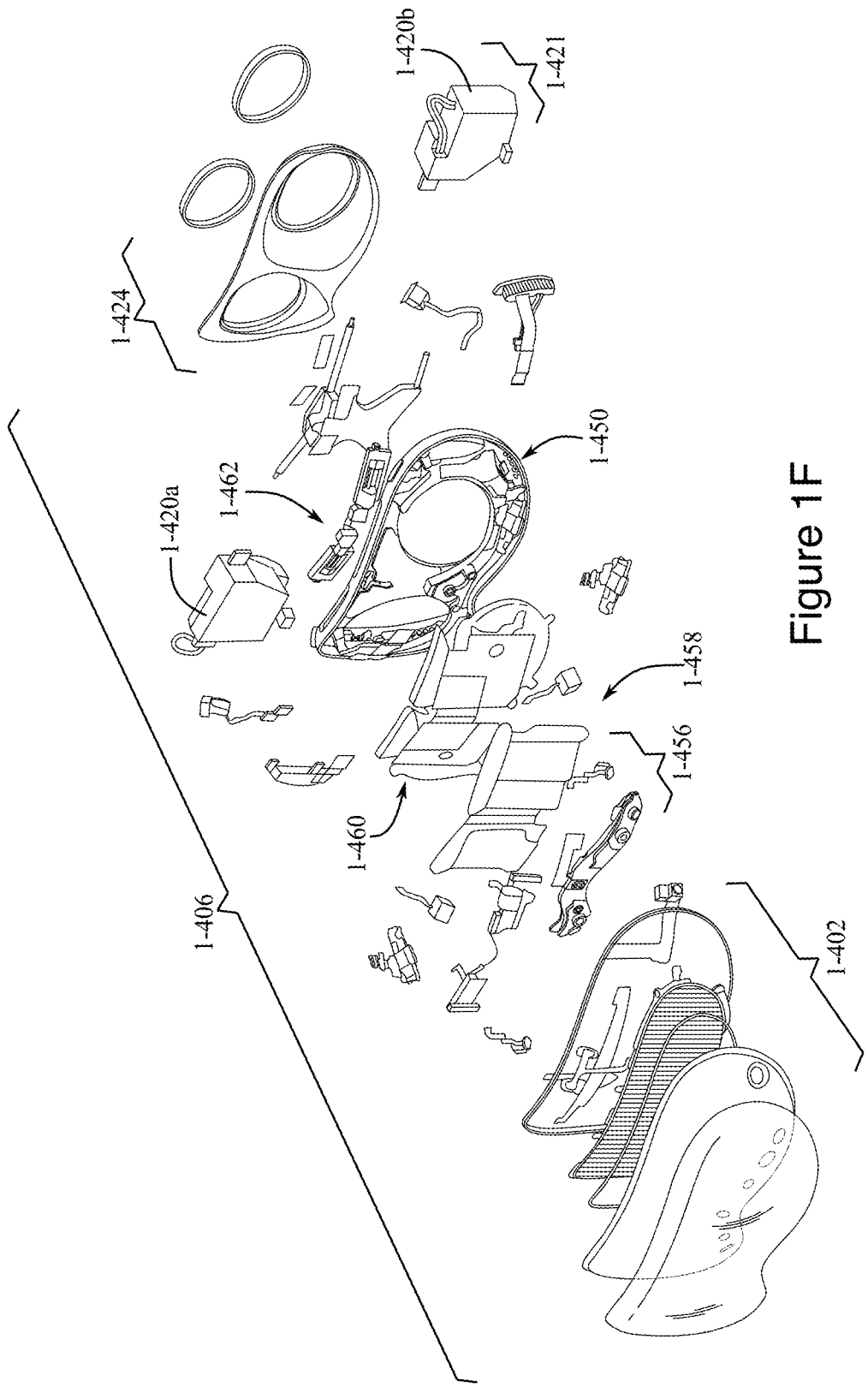
Figure 1G:
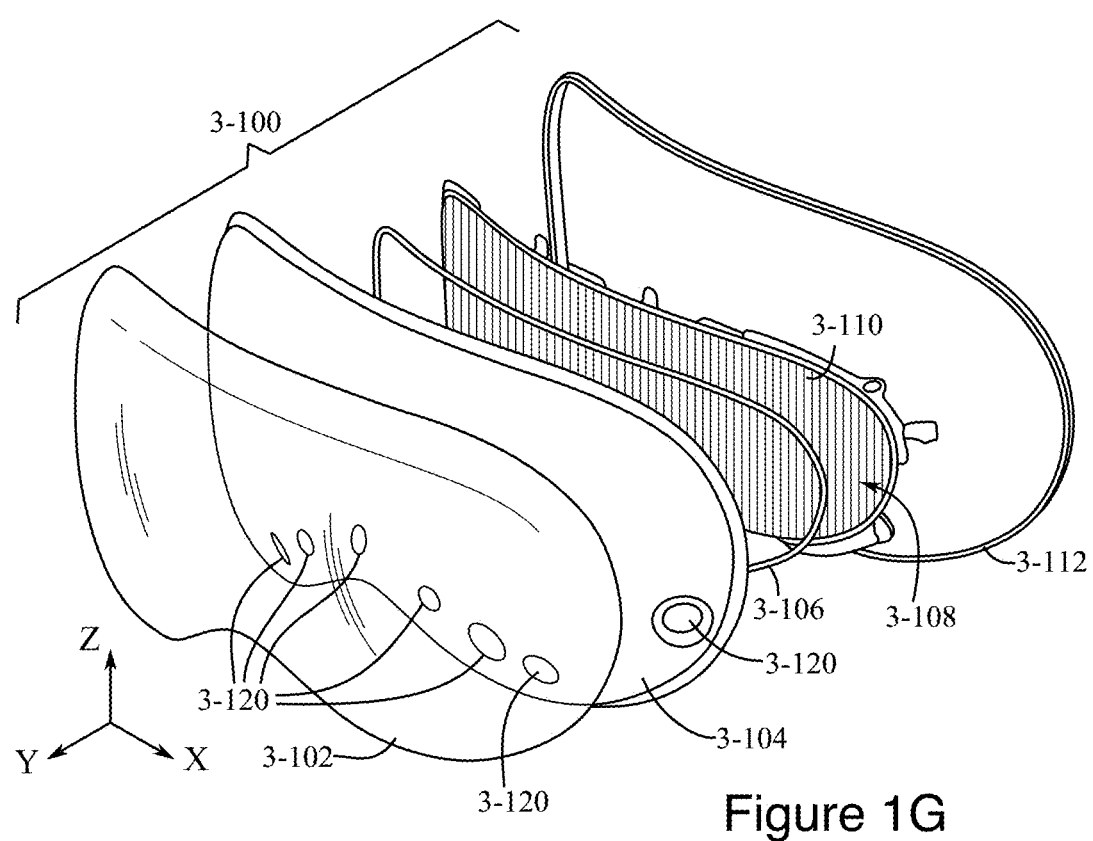
Figure 1H:
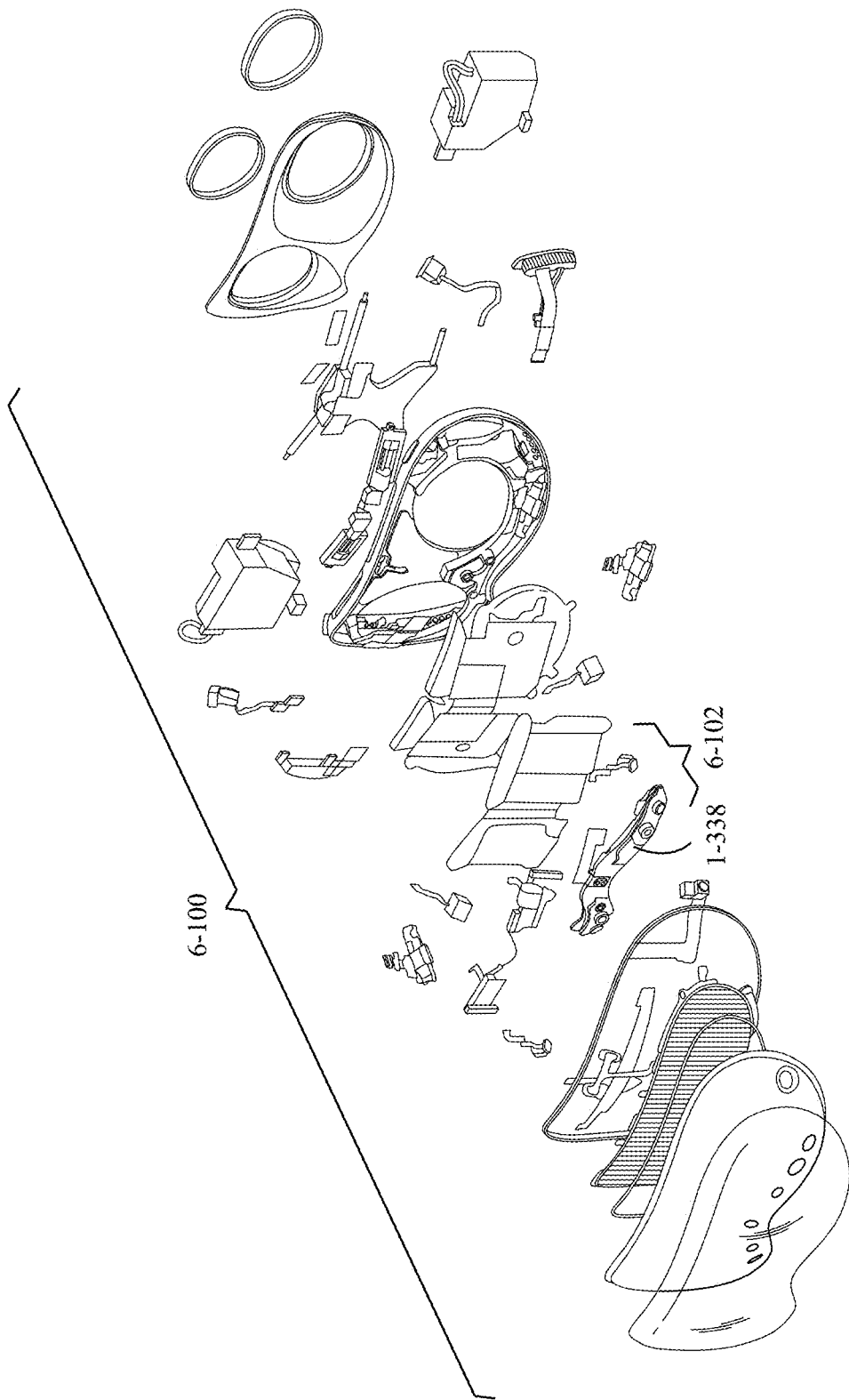
Figure 1I:
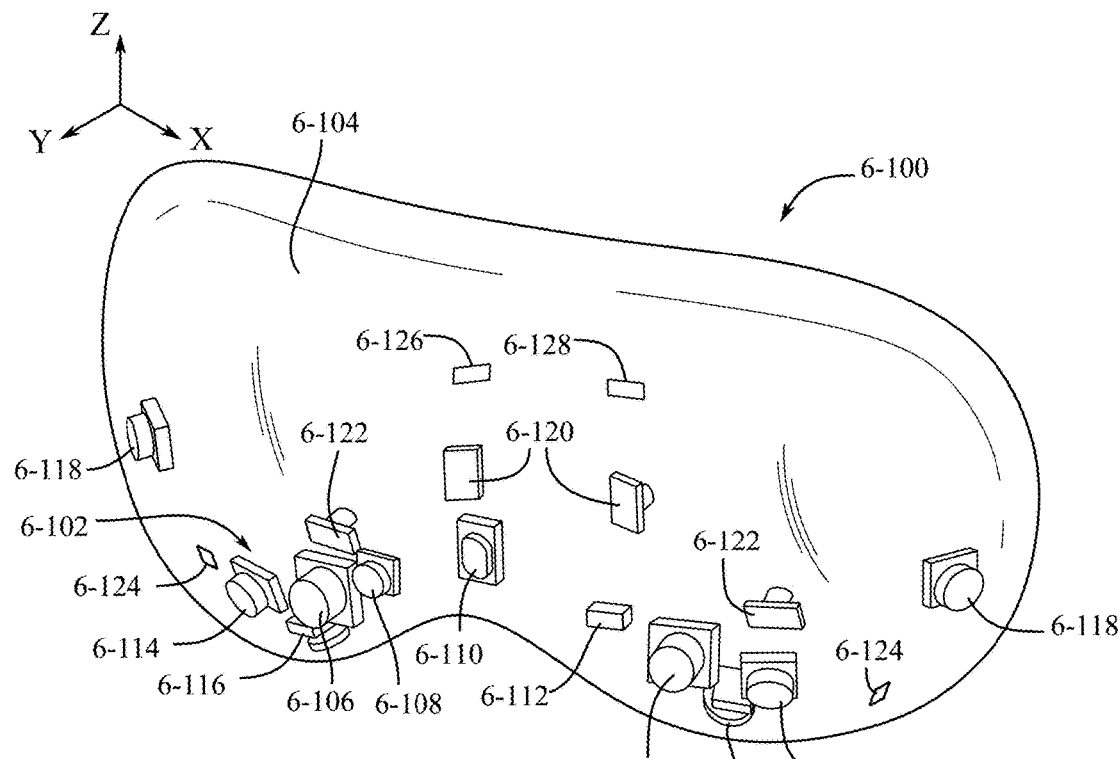
Figure 1J:
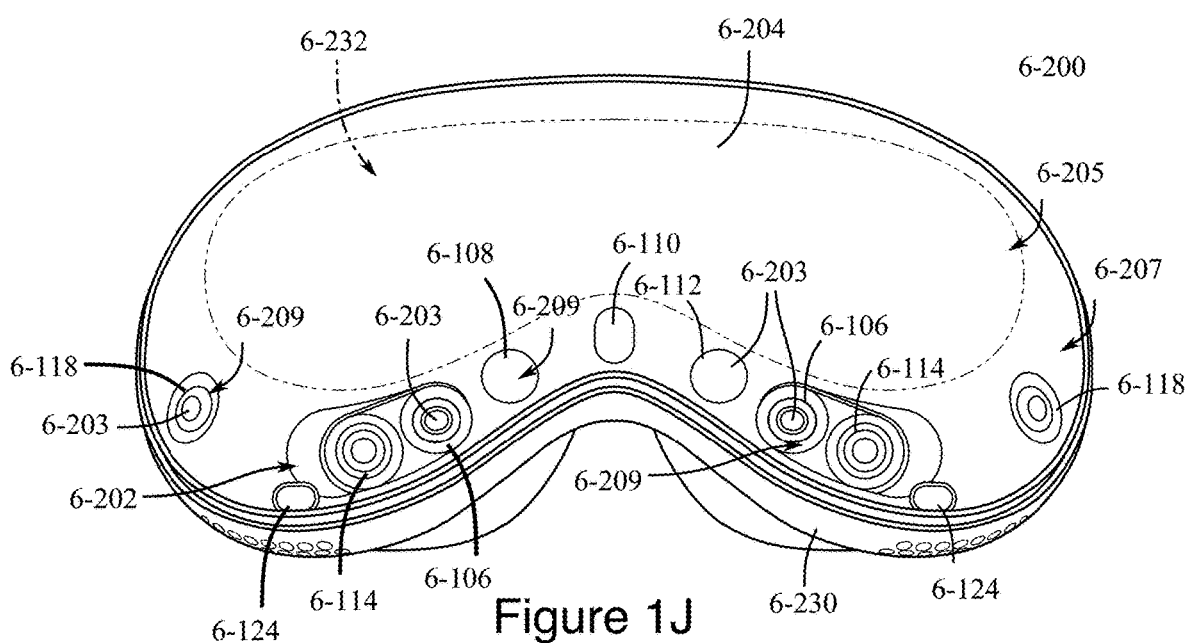
Figure 1K:
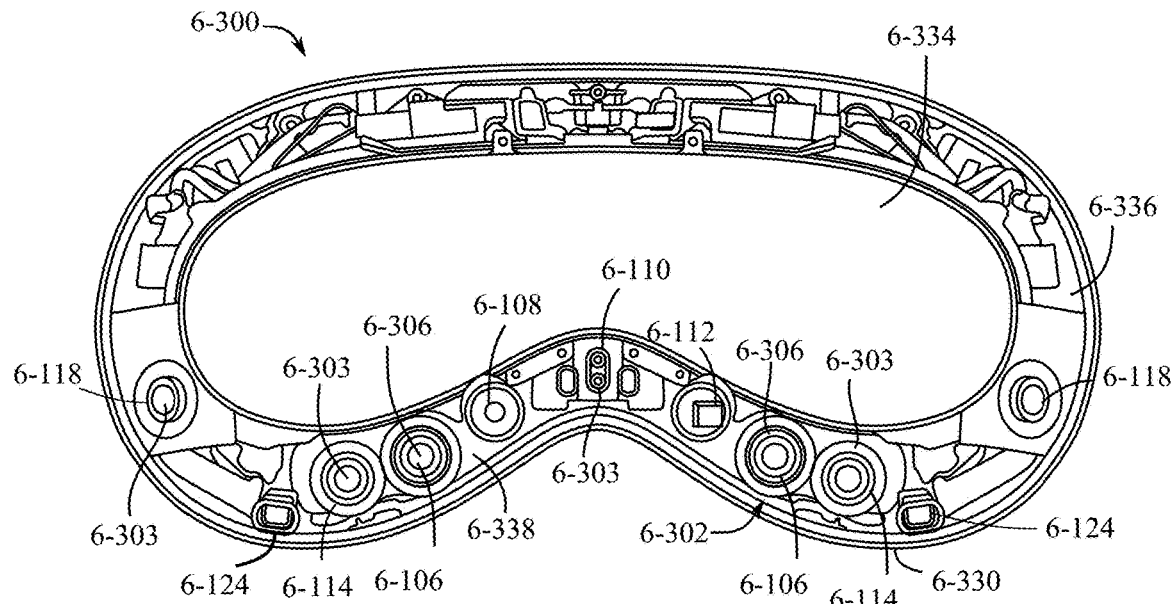
Figure 1L:
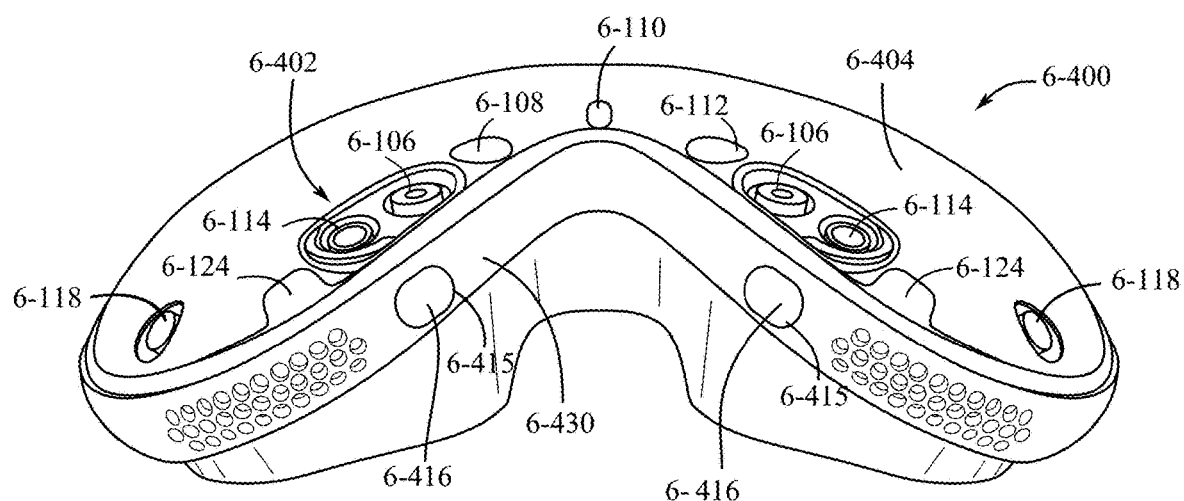
Figure 1M:
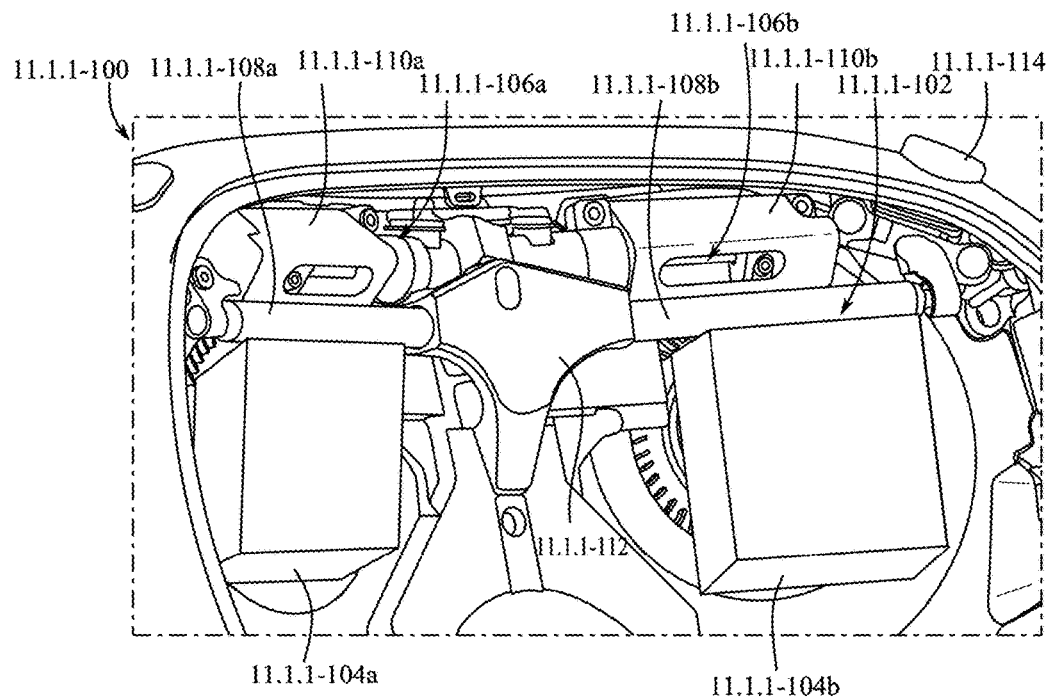
Figure 1N:
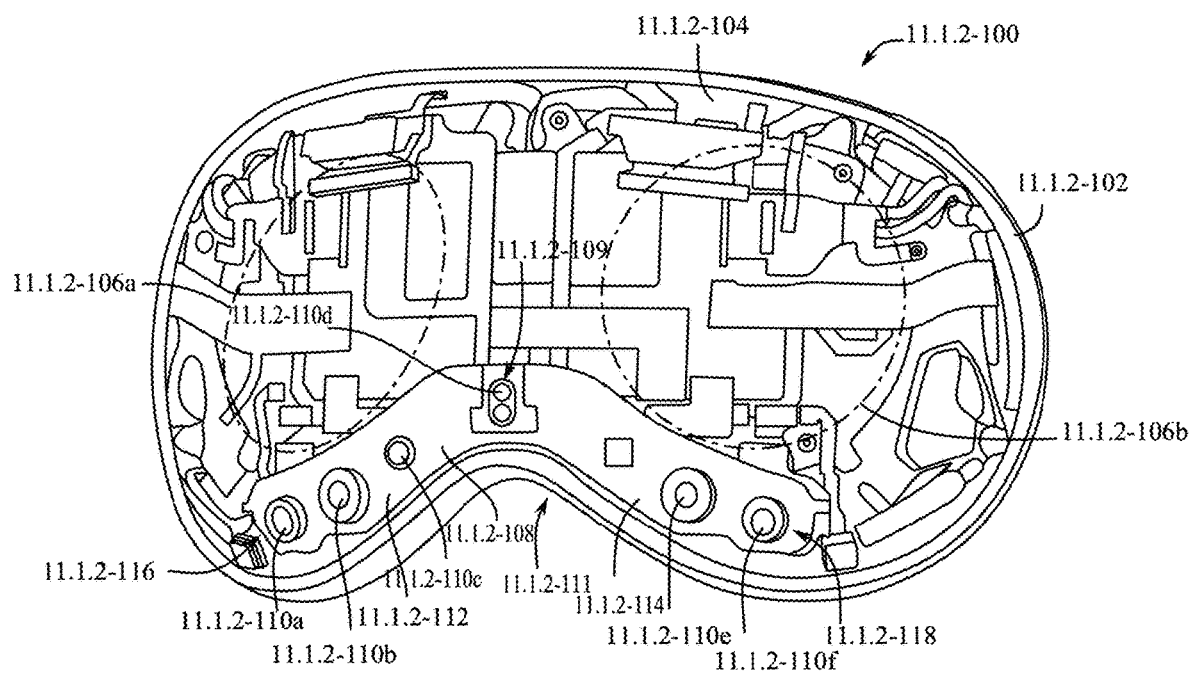
Figure 1O:
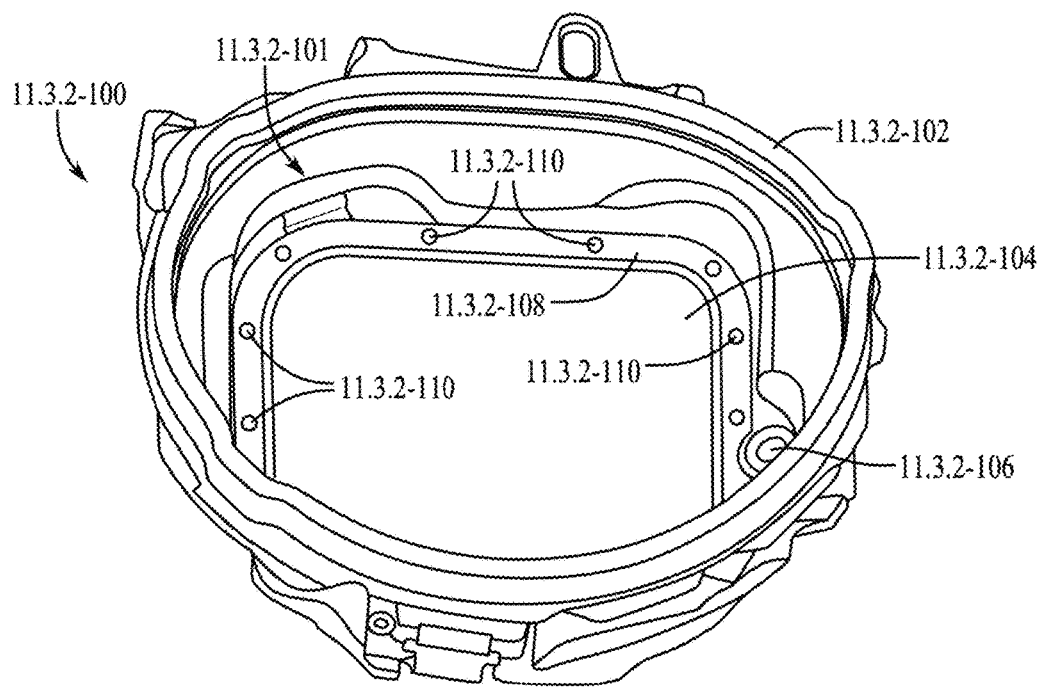
Figure 1P:
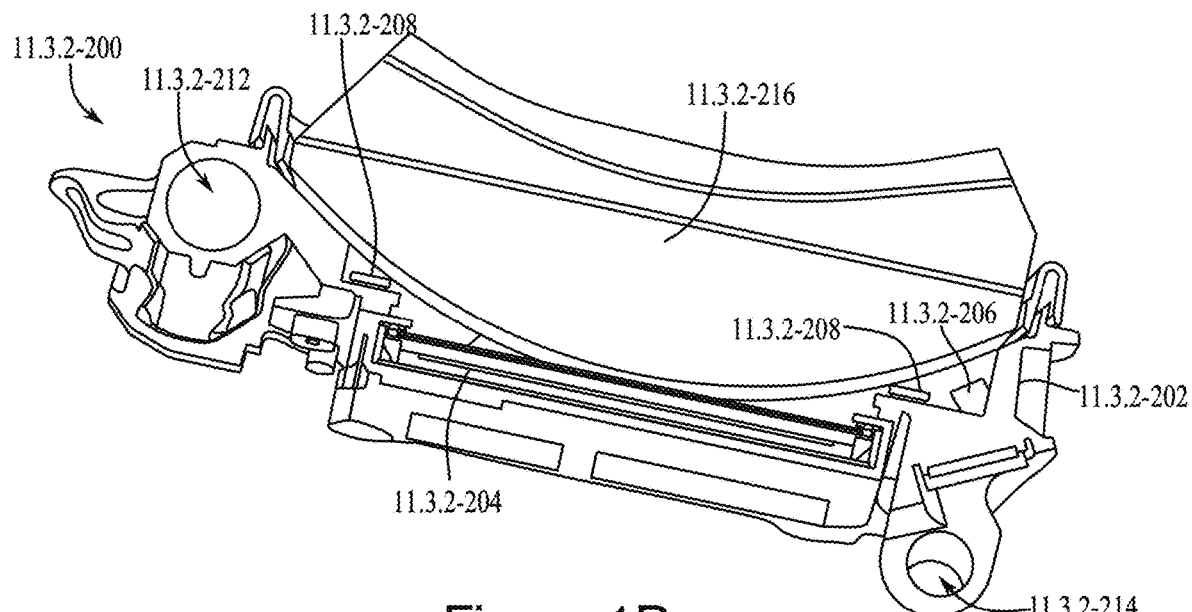

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. H. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. For hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. H.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
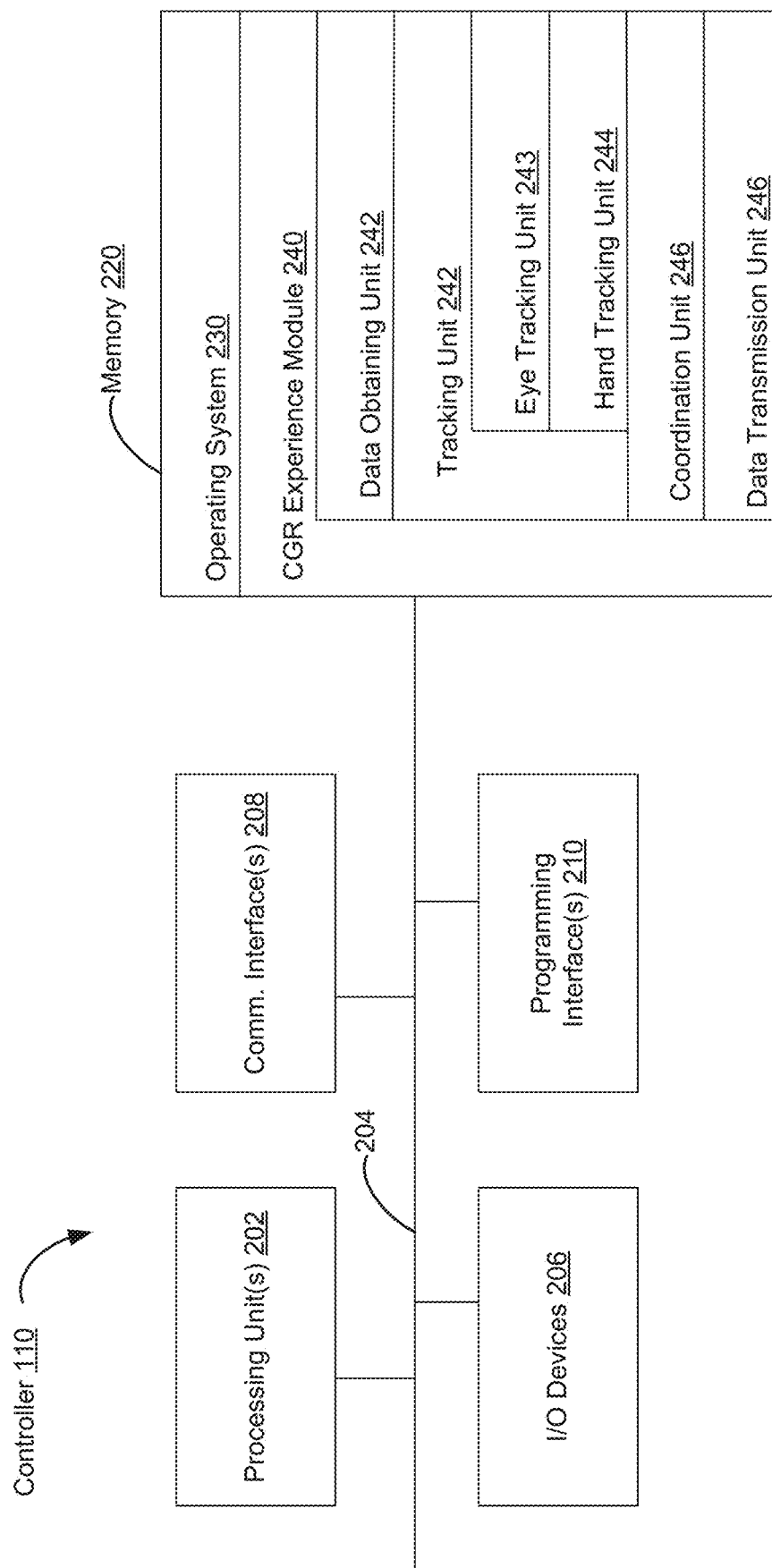
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like, sometimes herein called processors), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
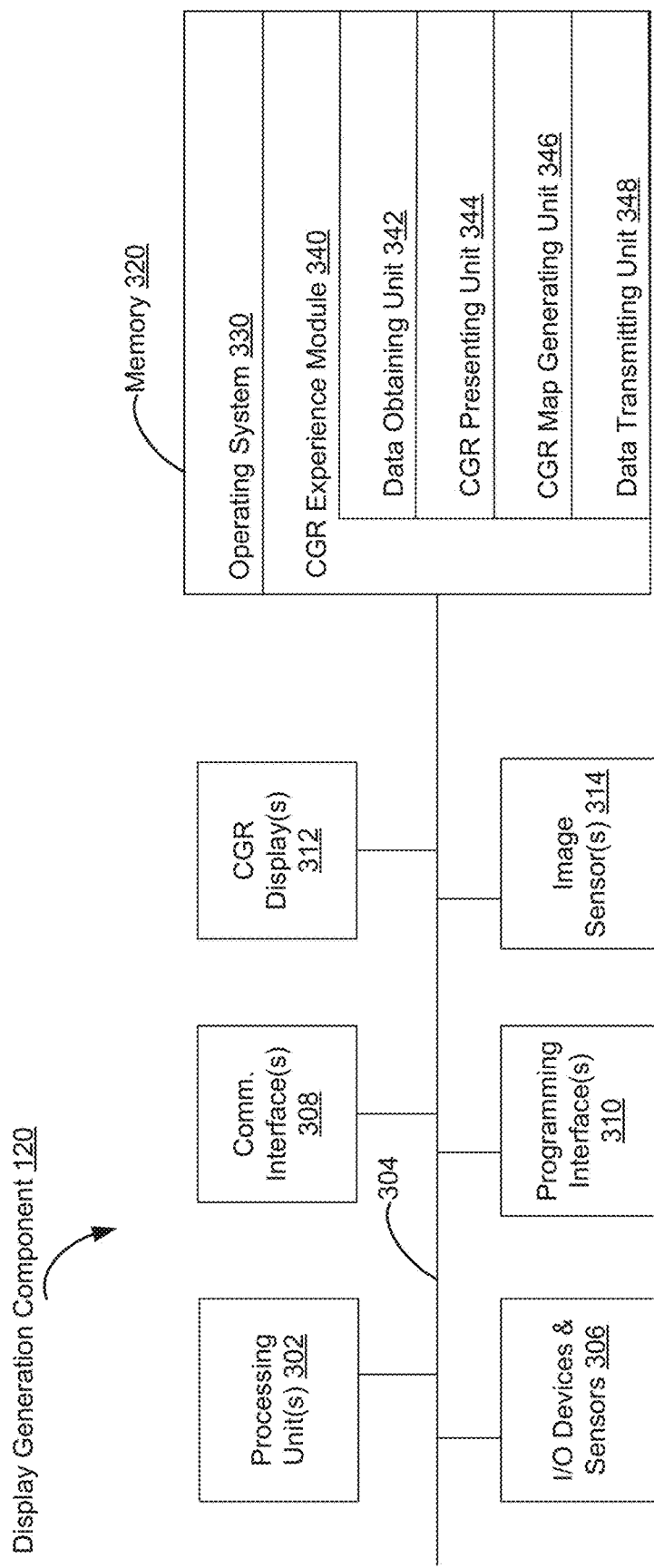
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, a single-finger air pinch gesture includes movement of a thumb finger and another finger of the same hand to make contact with one another (e.g., pinching), optionally followed by a break in contact from each other (e.g., an immediate break or release of the pinch, or a break or release of the pinch within a threshold amount of time). It is not necessary that both fingers move, so as long as contact is made between the thumb finger and the other finger, or at least the thumb finger and the other finger are brought sufficiently close to each other (e.g., within a threshold distance).

In some embodiments, a multi-finger air pinch gesture includes movement of a thumb finger and two other fingers of the same hand to make contact between the thumb finger and the two other fingers (e.g., pinching), optionally followed by a release of the pinch or a break of the contact between the thumb finger and the two other fingers (e.g., an immediate break or release of the pinch or a break or release of the pinch within a threshold amount of time). It is not necessary that the thumb and two other fingers move, so as long as contact is made between the thumb finger and the two other fingers, or at least the thumb finger and the two other fingers are brought sufficiently close to each other (e.g., within a threshold distance).

In some embodiments, a secondary air pinch gesture includes performing or maintaining a single-finger air pinch or a multi-finger air pinch gesture with one hand while in conjunction with a single-finger air pinch (e.g., between a thumb finger and an index finger) on the opposite hand. For example, while a single-finger air pinch gesture is maintained on a first hand, other air pinch gestures performed with a second hand are interpreted by the computer system as secondary air pinch gestures. Releasing the air pinch on the second hand causes the computer system to perform the gesture, and the air pinch gesture that is maintained on the first hand continues to modify any subsequent air pinches performed with the first hand until released. Accordingly, the first hand modifies air pinch gesture performed with the second hand.

In some embodiments, an air pinch-slide gesture includes a pinch gesture (e.g., a single-finger air pinch gesture or a multi-finger air pinch gesture) performed in conjunction with (e.g., followed by) a movement (e.g., a drag or a slide input) in a respective direction (e.g., upward, rightward, leftward, or downward) that changes a position of the user's hand from a first position (e.g., a start position of the slide) to a second position (e.g., an end position of the slide). In some embodiments, the user maintains the pinch gesture (e.g., with the fingers making contact or already in contact with each other at the first position) while performing the slide input, and releases the pinch gesture (e.g., opens their two or more fingers) to end the slide gesture (e.g., at the second position). In some embodiments, the pinch input and the slide input are performed by the same hand (e.g., the user pinches two or more fingers to make contact with one another and moves the same hand to the second position in the air with the slide gesture).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
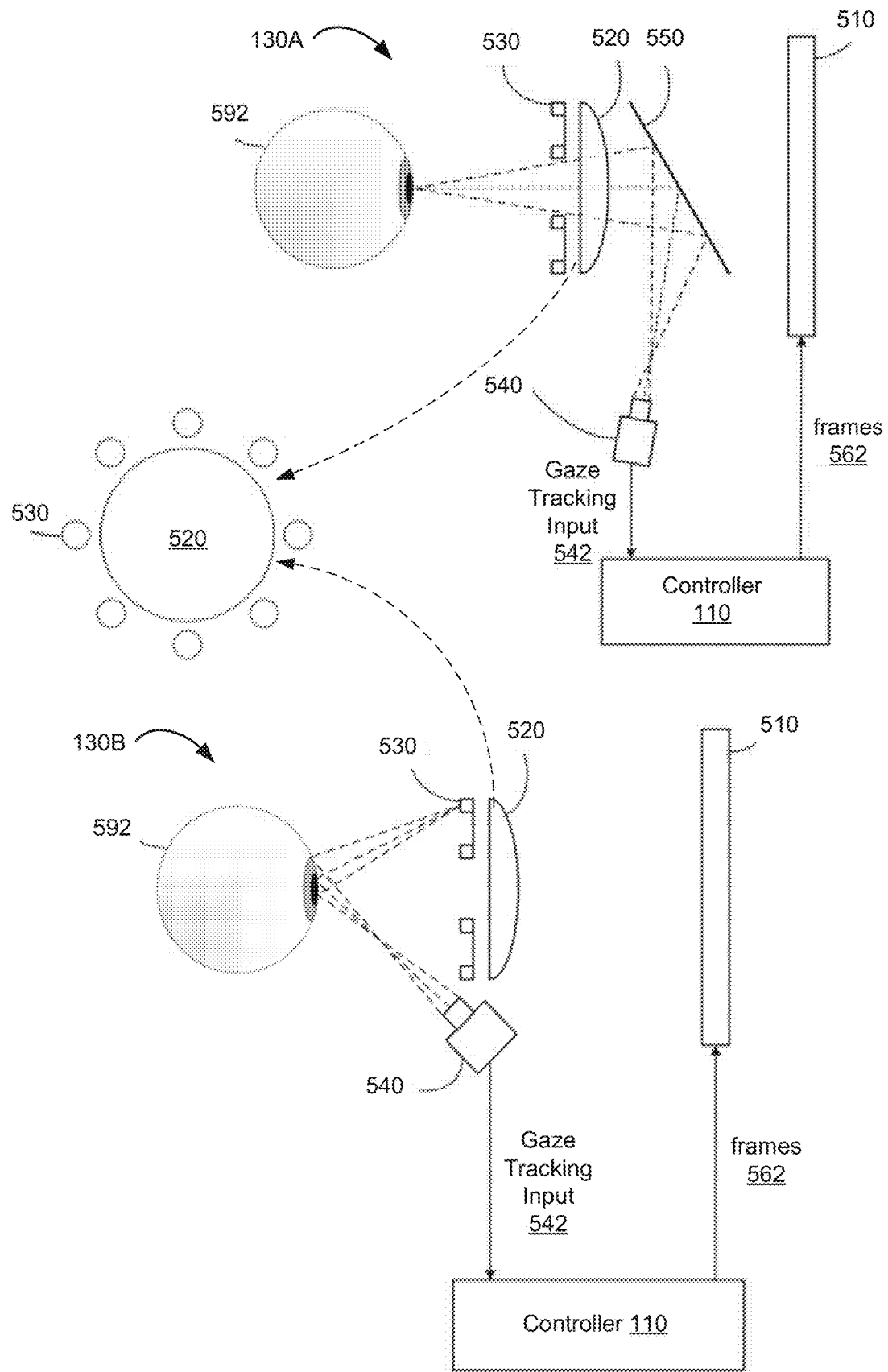
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
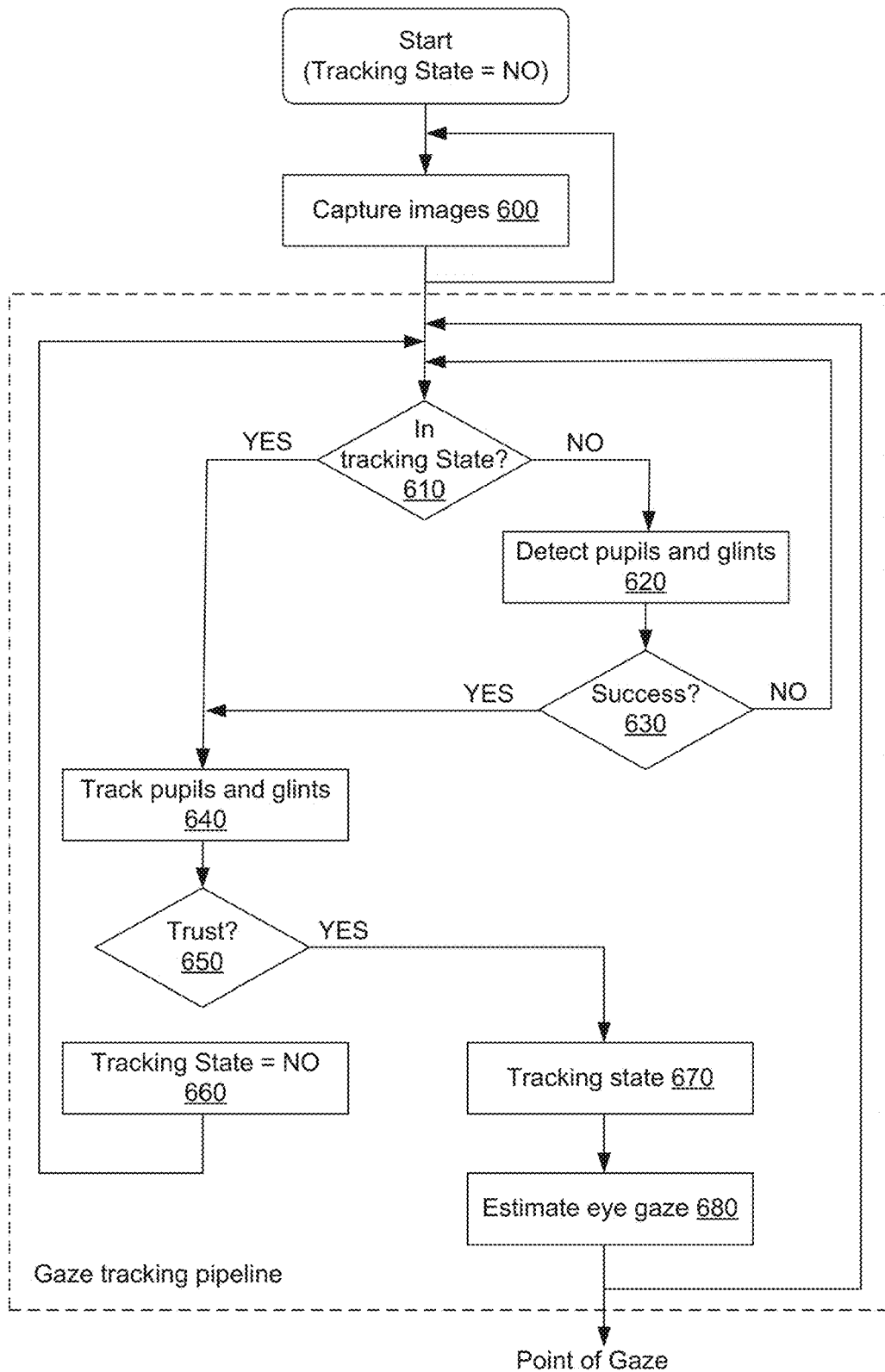
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one or more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and optionally one or more cameras.

FIGS. 7A-7G, 8A-8L, 9A-9H, 10A-10F, 15A-15J, 16A-16E, 17A-17I, 21A-21J, and 22A-22F include illustrations of three-dimensional environments that are visible via a display generation component (e.g., a display generation component 7100, a display generation component 9100, or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand (e.g., with an air gesture, touch gesture, or other hand input) movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user (sometimes called "optical passthrough"). For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "digital passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7G, 8A-8L, 9A-9H, 10A-10F, 15A-15J, 16A-16E, 17A-17I, 21A-21J, and 22A-22F the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

As shown in the examples in FIGS. 7A-7G, 8A-8L, 9A-9H, 10A-10F, 15A-15J and 16A-16E, display generation component 7100 of computer system 101 is a touchscreen held by or otherwise positioned in front of user 7002. In some embodiments, the display generation component of computer system 101 is a head mounted display (e.g., head mounted display 7100a, as shown in FIGS. 7E1-7E2, 8F2-8F3, 9F1-9F2, 10C1-10C2, 15E1-15F1, 16D1-16D2, 17D2-17D3, 21E1-21E2 and 22D2-22D3) worn on user 7002's head (e.g., what is shown in FIGS. 7A-7G, 8A-8L, 9A-9H, 10A-10F, 15A-15J and 16A-16E as being visible via display generation component 7100 of computer system 101 corresponds to user 7002's field of view when wearing a head-mounted display). Similarly, as shown in the examples in FIGS. 17A-17I, 21A-21J, and 22A-22F, display generation component 9100 of computer system 101 is a touchscreen held by or otherwise positioned in front of user 9002. In some embodiments, the display generation component of computer system 101 is a head-mounted display worn on user 9002's head (e.g., what is shown in FIGS. 17A-17I, 21A-21J, and 22A-22F as being visible via display generation component 9100 of computer system 101 corresponds to user 9002's field of view when wearing a head-mounted display). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. For example, in some embodiments, while the user's hand 7020 is within the field of view of the one or more sensors of HMD 7100a (e.g., within the field of view of the user), a representation of the user's hand 7020' is displayed in the user interface displayed (e.g., as a passthrough representation and/or as a virtual representation of the user's hand 7020) on the display of HMD 7100a in some embodiments, while the user's hand 7022 is within the field of view of the one or more sensors of HMD 7100a (e.g., within the field of view of the user), a representation of the user's hand 7022' is displayed in the user interface displayed (e.g., as a passthrough representation and/or as a virtual representation of the user's hand 7022) on the display of HMD 7100a. In some embodiments, the user's hand 7020 and/or the user's hand 7022 are used to perform one or more gestures (e.g., one or more air gestures), optionally in combination with a gaze input. In some embodiments, the one or more gestures performed with the user's hand(s) 7020 and/or 7022 include a direct air gesture input that is based on a position of the representation of the user's hand(s) 7020' and/or 7022' displayed within the user interface on the display of HMD 7100a. For example, a direct air gesture input is determined as being directed to a user interface object displayed at a position that intersects with the displayed position of the representation of the user's hand(s) 7020' and/or 7022' in the user interface. In some embodiments, the one or more gestures performed with the user's hand(s) 7020 and/or 7022 include an indirect air gesture input that is based on a virtual object displayed at a position that corresponds a position at which the user's attention is currently detected (e.g., and/or is optionally not based on a position of the representation of the user's hand(s) 7020' and/or 7022' displayed within the user interface). For example, an indirect air gesture is performed with respect to a user interface object while detecting the user's attention (e.g., based on gaze or other indication of user attention) on the user interface object, such as a gaze and pinch (e.g., or other gesture performed with the user's hand).

In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand (e.g., with an air gesture, touch gesture, or other hand input) relative to the physical environment or relative to the user's head, and changes the viewpoint of the user in the three-dimensional environment in accordance with the movement of the display generation component relative to the user's head or face or relative to the physical environment.

In some embodiments, display generation component 7100 of computer system 101 comprises a head mounted display (HMD) 7100a. For example, as illustrated in FIG. 7E1 (e.g., and FIGS. 8F2, 9F1, 10C1, 15E1, 16D1, 17D2, 21E1, and 22D2), the head mounted display 7100a includes one or more displays that display a representation of a portion of the three-dimensional environment 7000' that corresponds to the perspective of the user, while an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures. In some embodiments, HMD 7100*a* includes one or more sensors (e.g., one or more interior- and/or exterior-facing image sensors 314), such as sensor 7101*a*, sensor 7101*b* and/or sensor 7101*c* for detecting a state of the user, including facial and/or eye tracking of the user (e.g., using one or more inward-facing sensors 7101*a* and/or 7101*b*) and/or tracking hand, torso, or other movements of the user (e.g., using one or more outward-facing sensors 7101*c*). In some embodiments, HMD 7100*a* includes one or more input devices that are optionally located on a housing of HMD 7100*a*, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIG. 7E1 HMD 7100*a* includes one or more of button 701, button 702 and digital crown 703 for providing inputs to HMD 7100*a*. It will be understood that additional and/or alternative input devices may be included in HMD 7100*a*.

FIG. 7E2 (e.g., and FIGS. 8F3, 9F2, 10C2, 15E2, 16D2, 17D3, 21E2, and 22D3) illustrates a top-down view of the user 7002 in the physical environment 7000. For example, the user 7002 is wearing HMD 7100*a*, such that the user's hand(s) 7020 and/or 7022 are physically present within the physical environment 7000 behind the display of HMD 7100*a*, and optionally in front of the box 7014 (e.g., where the representation of box 7014' is displayed as farther away from the viewpoint of the user than the representation of the user's hand(s) 7020' and/or 7022').

Figure 7A:
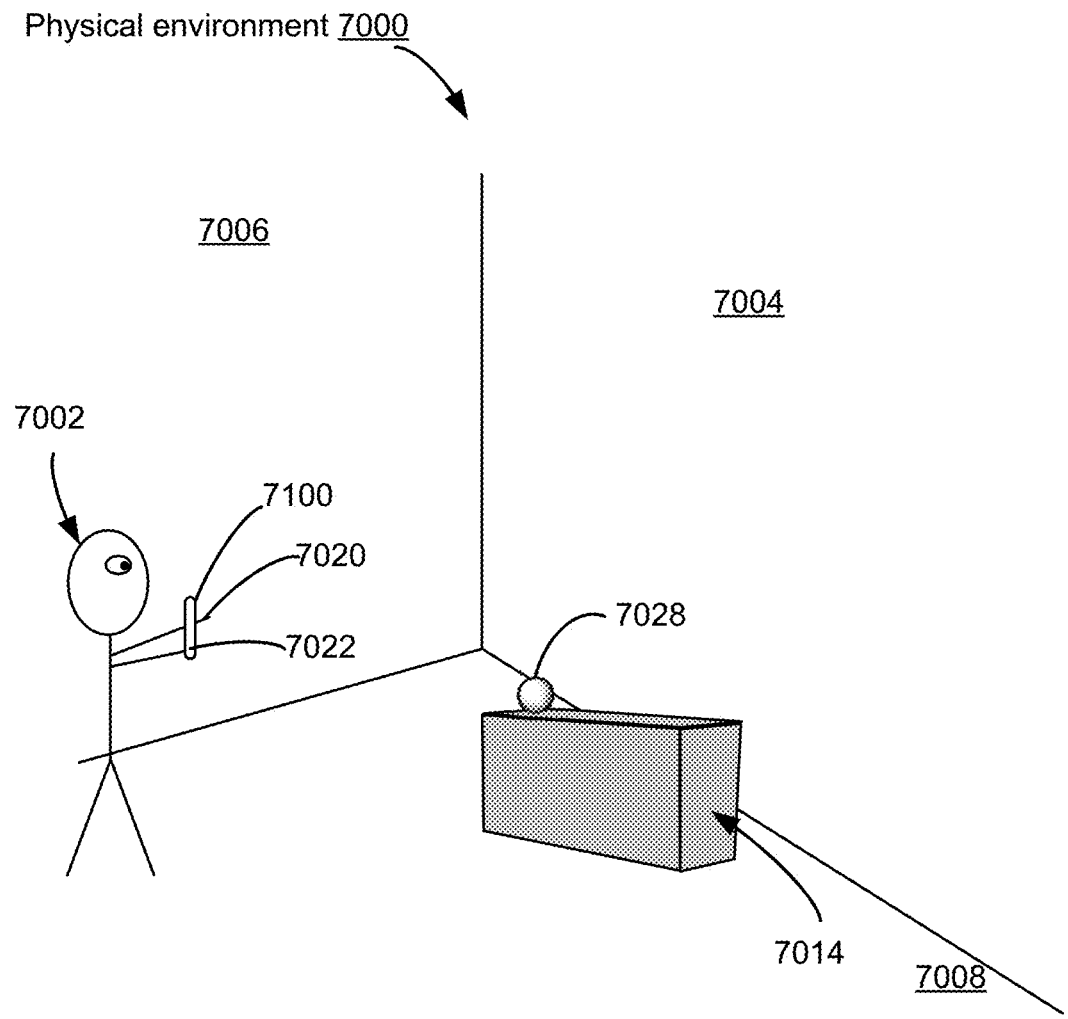

FIG. 7E1 (e.g., and FIGS. 8F2, 9F1, 10C1, 15E1, 16D1, 17D2, 21E1, and 22D2), illustrates an alternative display generation component of the computer system than the display illustrated in FIGS. 7A-7D, 7E3-8F1, 8G-9E, 9F3-10B, 10C3-10F, 15A-15D, 15E3-16C, 16D3-17D1, 17E-17I, 21A-21D, 21D3-22D1 and 22E-22F. It will be understood that the processes, features and functions described herein with reference to the display generation component 7100 described in FIGS. 7A-7D, 7E3-8F1, 8G-9E, 9F3-10B, 10C3-10F, 15A-15D, 15E3-16C, 16D3-17D1, 17E-17I, 21A-21D, 21D3-22D1 and 22E-22F are also applicable to HMD 7100*a*, illustrated in FIG. 7E1 (e.g., and FIGS. 8F2, 9F1, 10C1, 15E1, 16D1, 17D2, 21E1, and 22D2).

FIGS. 7A-7G illustrate examples for magnifying virtual and real content in a three-dimensional environment. FIG. 11 is a flow diagram of an exemplary method 1100 for magnifying virtual and real content in a three-dimensional environment. The user interfaces in FIGS. 7A-7G are used to illustrate the processes described below, including the processes in FIG. 11.

FIG. 7A illustrates physical environment 7000 that is visible to user 7002 via display generation component 7100 of computer system 101. The physical environment includes physical walls 7004, 7006, and 7008. The physical environment 7000 also includes physical ball 7028 placed on top of physical object 7014. User 7002 is holding display generation component 7100 with hand 7020 or hand 7022, or both. Optionally, display generation component 7100 can be placed on a surface or attached to user 7002's body (e.g., a head-mounted display), leaving hand 7020 and hand 7022 free to perform various air gestures. In some embodiments, one or more portions of the view of physical environment 7000 that is visible to user 7002 via display generation component 7100 are virtual passthrough portions that include representations of corresponding portions of physical environment 7000 captured via one or more image sensors of computer system 101. In some embodiments, one or more portions of the view of physical environment 7000 that is visible to user 7002 via display generation component 7100 are optical passthrough portions, in that user 7002 can see one or more portions of physical environment 7000 through one or more transparent or semi-transparent portions of display generation component 7100.

Figure 7B:
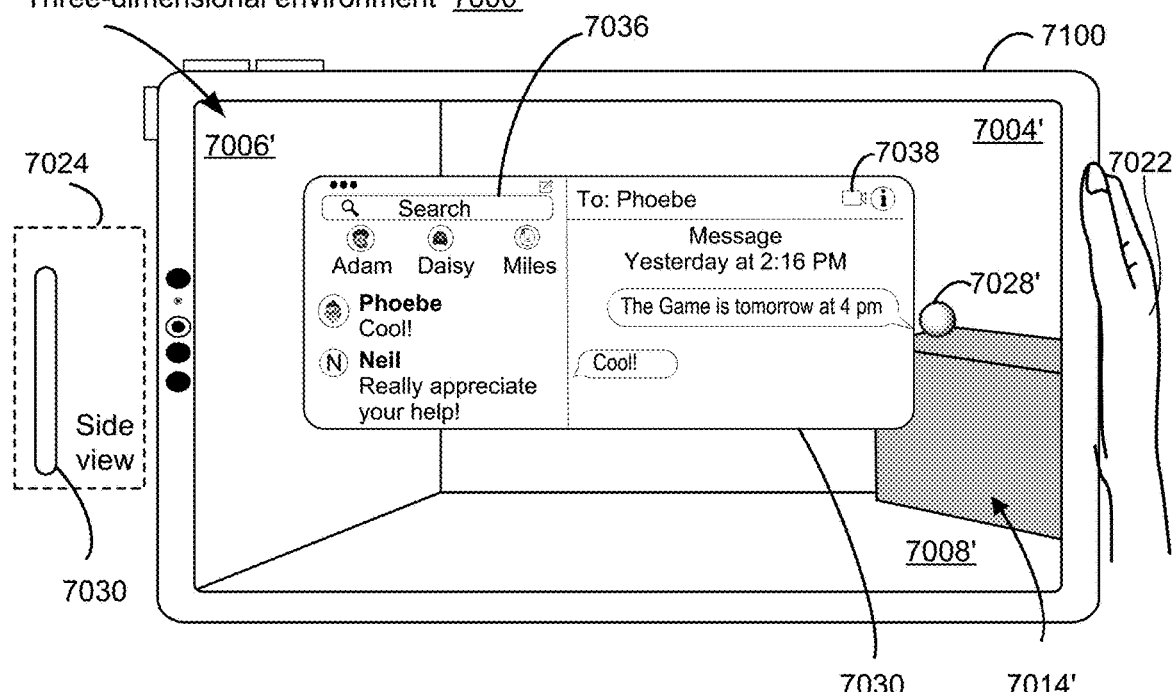

FIG. 7B illustrates a view of a three-dimensional environment 7000' that is visible to user 7002 via display generation component 7100. Display generation component 7100 is held by user 7002 with hand 7022. The view of the three-dimensional environment 7000' includes a representation (or optical view) of portions of the physical environment 7000 as captured by one or more cameras of computer system 101 (or, in some embodiments, an optical passthrough view through one or more transparent or semi-transparent portions of display generation component 7100). The view of the three-dimensional environment 7000' includes representation (or optical view) 7004' of a portion of physical wall 7004, representation (or optical view) 7006' of a portion of physical wall 7006, and representation (or optical view) 7008' of a portion of physical wall 7008. Further, the view of the three-dimensional environment 7000' includes representation (or optical view) 7014' of a portion of physical object 7014 and representation (or optical view) 7028' of physical ball 7028. Further, the view of the three-dimensional environment 7000' includes application user interface 7030 of a messaging application. Application user interface 7030 is virtual content visible in the distance in the view of the three-dimensional environment 7000', where content can be harder to see for some users. In FIG. 7A, side view 7024 illustrates application user interface 7030 as seen from the side (e.g., instead of the front as in the view of three-dimensional environment 7000').

In some embodiments, application user interface 7030 of the messaging application corresponds to a user interface of a software application executing on computer system 101. Application user interface 7030 includes one or more user interface elements, including a search field 7036 and control 7038 for initiating a video call. Other user interface elements are also visible in FIG. 7B but are not described for brevity.

Figure 7C:
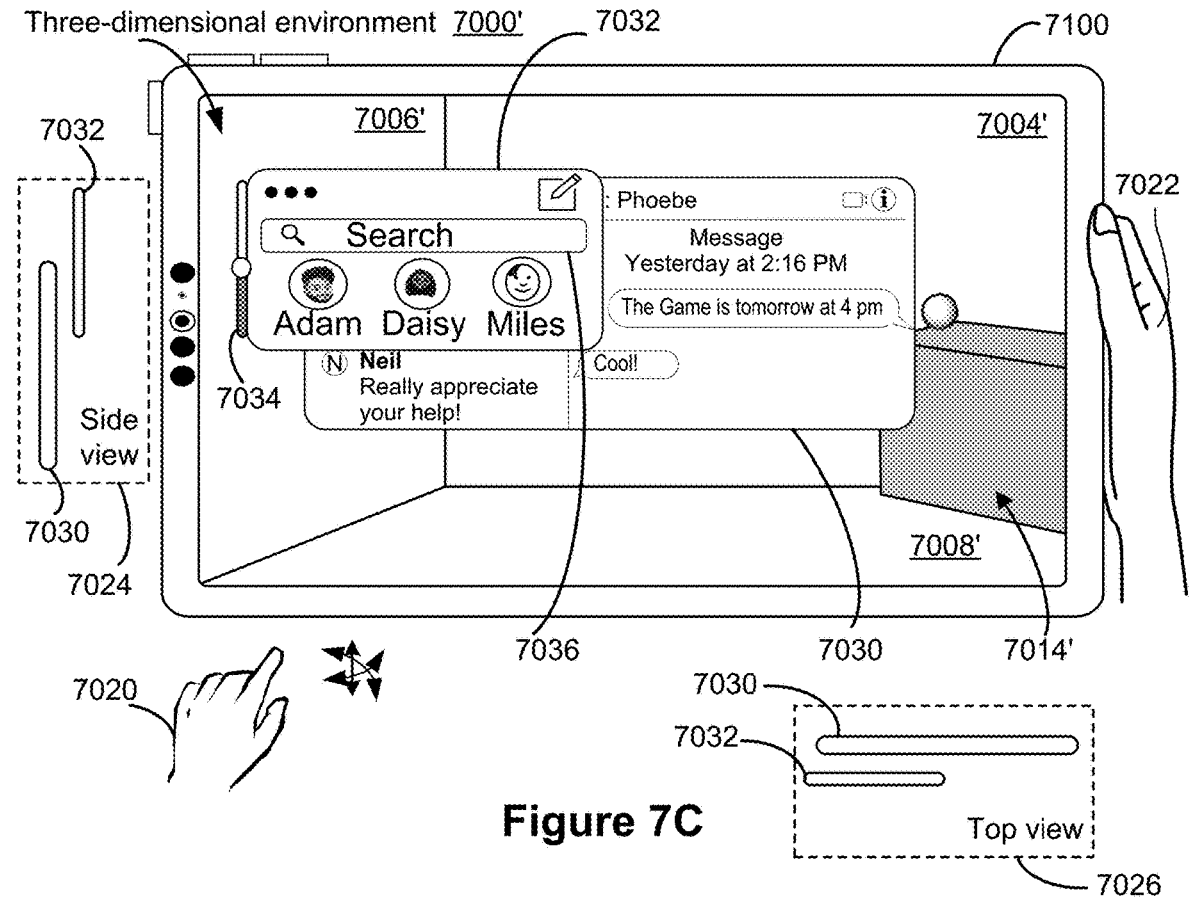

FIG. 7C illustrates a virtual magnifier 7032 magnifying (or increasing the size of) a first portion of application user interface 7030, according to some embodiments. For example, virtual magnifier 7032 magnifies search field 7036, among other user interface elements. In some embodiments, virtual magnifier 7032 magnifies portions of the view of the three-dimensional environment 7000' on which user 7002 is focused, where the focus of the user can be determined in a number of ways (e.g., a location of a gaze, a cursor, a location pointed at by a controller, the user's field of view, or other ways). In some embodiments, different inputs can be used to activate and display virtual magnifier 7032, including, but not limited to, an air gesture, selection of a control for activating an accessibility mode (via an air gesture, a controller, or other selection input), a voice command, or other input.

Virtual magnifier 7032 includes slider 7034, which is a user interface element for adjusting a zoom level of the virtual magnifier 7032. A user can increase or decrease the zoom or magnification level by interacting (e.g., directly, or indirectly) with slider 7034. For example, a gaze input directed at slider 7034 in combination with movement of hand 7020 (e.g., up, or down) can increase or decrease the zoom level, respectively. If the zoom level is increased in response to user's 7002 input directed at slider 7034, the size of the displayed search field and/or other user interface elements (displayed by or within virtual magnifier 7032) increases in accordance with the increased zoom level.

As shown in side view 7024 and top view 7026, virtual magnifier 7032 is spaced apart from application user interface 7030, e.g., virtual magnifier 7032 is separated from the application user interface 7030 in a "z" direction, such that virtual magnifier 7032 and the application user interface 7030 are displayed at different depths in the view of the three-dimensional environment 7000'. For example, in the view of the three-dimensional environment 7000', virtual magnifier 7032 is displayed closer to a viewpoint of user 7002 than the application user interface 7030, e.g., distance from the application user interface 7030 to user 7002 (or other reference point) is greater than the distance from the virtual magnifier 7032 to user 7002 (or the same reference point).

Figure 7D:
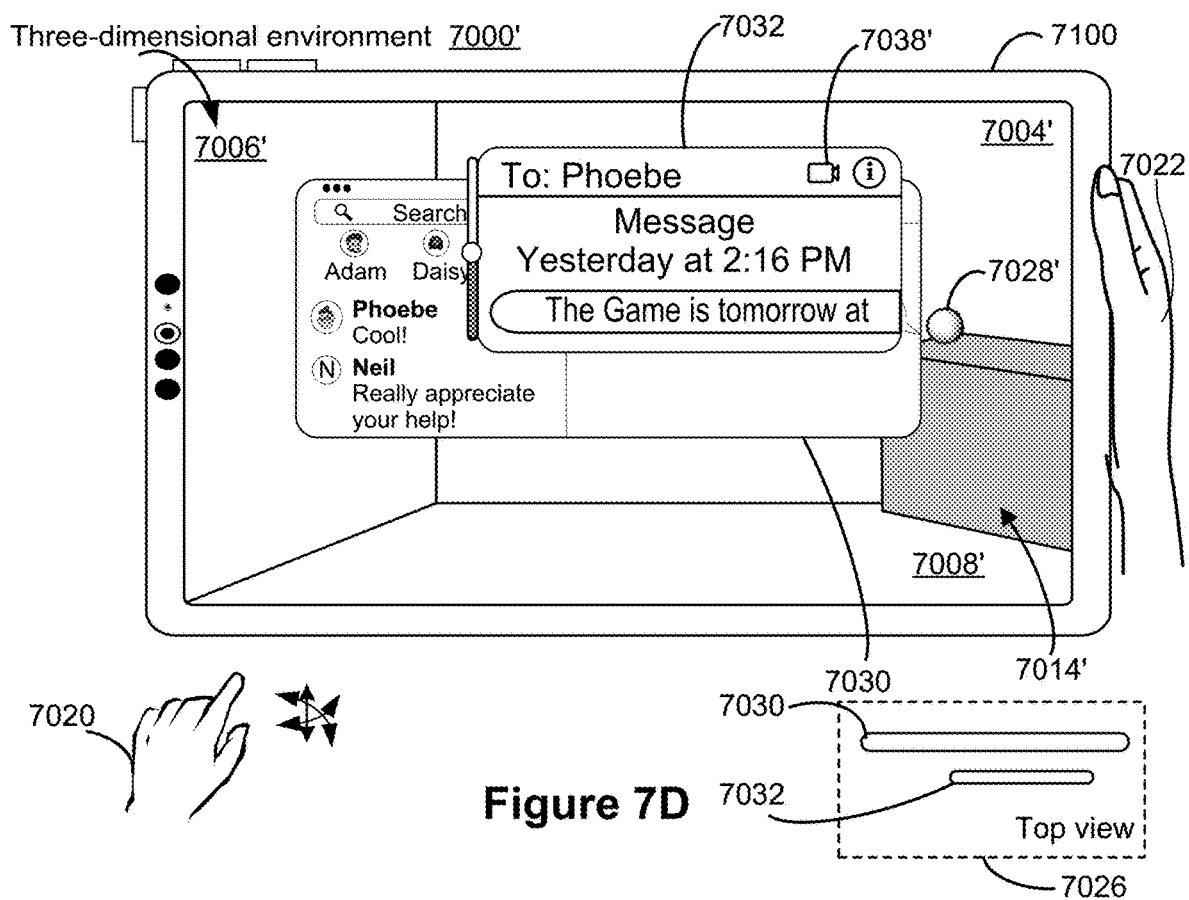

In some embodiments, application user interface 7030 is world-locked and virtual magnifier 7032 is locked to a reference point. As the position of the reference point changes, the position of the virtual magnifier 7032 also changes accordingly, and in turn, the portion of application user interface 7030 that is magnified also changes correspondingly. For example, FIG. 7D illustrates a transition from FIG. 7C in response to user 7002 performing an interaction input using hand 7020, as indicated by hand 7020 shown with arrows in FIG. 7C. In some embodiments, the interaction input includes a hand gesture (e.g., using hand 7020 and/or hand 7022), a gaze input, interaction with a user interface element (e.g., directly or indirectly), a voice input, and/or input with a controller. FIG. 7D shows the virtual magnifier 7032 at a position different from the position at which the virtual magnifier 7032 was in FIG. 7C, thereby magnifying (or increasing the size of) a second portion of application user interface 7030. For example, as shown in top view 7026 in FIGS. 7C-7D, virtual magnifier 7032 is moved from left to right while the distance between the virtual magnifier 7032 and application user interface 7030 remains the same. The second portion of application user interface 7030 that is magnified incudes a magnified version 7038' of control 7038 for initiating a video call.

In some embodiments, the position of the virtual magnifier 7032 in FIG. 7D is changed (e.g., relative to the position of virtual magnifier 7032 in FIG. 7C) in response to changing the position of the reference point to which the virtual magnifier 7032 is locked, where application user interface 7030 remains anchored to or locked to its position in the view of the three-dimensional environment 7000' (e.g., the position of application user interface 7030 in Figure C is not changed in FIG. 7D in response to changing the position of the virtual magnifier 7032). The reference point to which the virtual magnifier is locked can be controlled by the user's 7002 viewpoint; orientation of user's 7002 head; location or movement of the user's hand 7020; orientation, location or movement of the user's 7002 wrist; a location at which a controller is pointing, or other reference point in the view of the three-dimensional environment 7000'. In some embodiments, the position of virtual magnifier 7032 relative to the reference point to which the virtual magnifier 7032 is locked can be changed (e.g., by the user).

FIG. 7E (e.g., FIGS. 7E1, 7E2 and 7E3, where a user interface analogous to the user interface described in FIG. 7E3 is shown on HMD 7100a in FIG. 7E1) illustrates a transition from FIG. 7D in response to user 7002 performing an interaction input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) using hand 7020, as indicated by hand 7020 shown with arrows in FIG. 7C. FIG. 7E illustrates that, in accordance with changing the position of the reference point in a rightward direction from the position of the reference point in FIG. 7D, the position of the virtual magnifier 7032 also changes accordingly, and in turn, the virtual magnifier 7032 magnifies a third portion of application user interface 7030. For example, as shown in top view 7026 in FIGS. 7C-7E, virtual magnifier 7032 moved from left to right. In some embodiments, the interaction input includes a hand gesture (e.g., using hand 7020 and/or hand 7022), a gaze input, interaction with a user interface element (e.g., directly or indirectly), a voice input, and/or input with a controller. Further, FIG. 7E shows that, in addition to magnifying the third portion of application user interface 7030, the virtual magnifier 7032 also magnifies physical ball 7028, which is an example of real-world content that falls magnified by the virtual magnifier 7032. In some embodiments, virtual magnifier 7032 can magnify application user interface 7030 without magnifying real-world content.

In some embodiments, in addition to magnifying content (e.g., virtual content and/or real-world content), filter overlays can be applied to magnified content of application user interface 7030 that is displayed in the virtual magnifier 7032. In some embodiments, filter overlays can be applied to virtual content, such as application user interface 7030, and/or real-world content, such as physical ball 7028. In some embodiments, applying a filter overlay in FIG. 7E can include changing one or more colors of magnified content of application user interface 7030 and/or physical ball 7028. In some embodiments, applying a filter overlay in FIG. 7E can include inverting one or more colors of magnified content of application user interface 7030 and/or physical ball 7028. In some embodiments, applying a filter overlay in FIG. 7E (e.g., FIGS. 7E1, 7E2 and 7E3) can include converting the magnified content of application user interface 7030 and/or physical ball 7028 from color to grayscale.

Figure 7F:
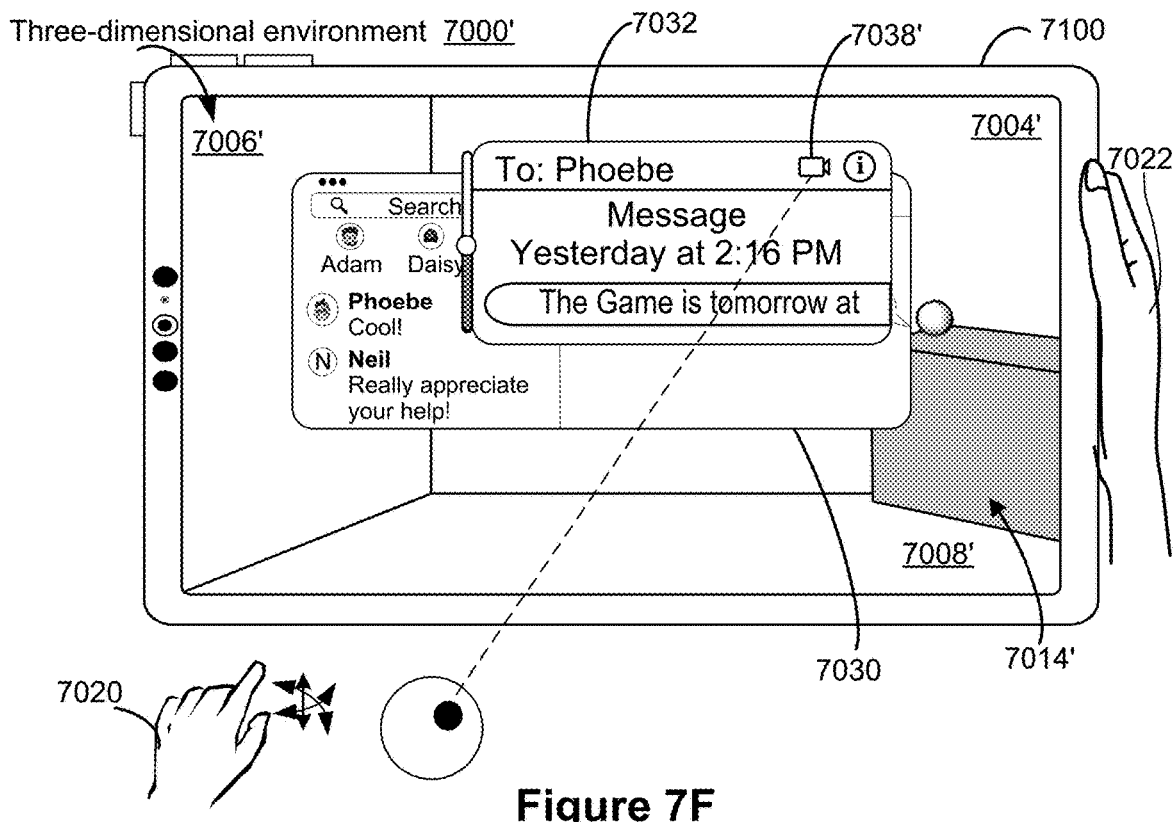

In some embodiments, user 7002 can interact with virtual magnifier 7032. Inputs directed at virtual magnifier 7032 (e.g., directed at the surface of virtual magnifier 7032 as opposed to the underlying content that is being magnified) are interpreted by computer system 101 as if those inputs are received by the underlying content. For example, in FIG. 7F, an input directed at magnified version 7038' of control 7038 for initiating a video call, is forwarded to control 7038 of application user interface 7030. In FIG. 7F, the input directed at magnified version 7038' of control 7038 is an indirect input gesture that includes a gaze directed at or near magnified version 7038' of control 7038 in combination with an air pinch gesture performed with hand 7020 (e.g., an air pinch gesture where the thumb finger is brought towards, or in contact with, another finger of the same hand, such as the index finger). In some embodiments, the input directed at magnified version 7038' of control 7038 for initiating a video call is a direct input gesture, such as an air tap at, or near, the magnified version 7038' of control 7038.

Figure 7G:
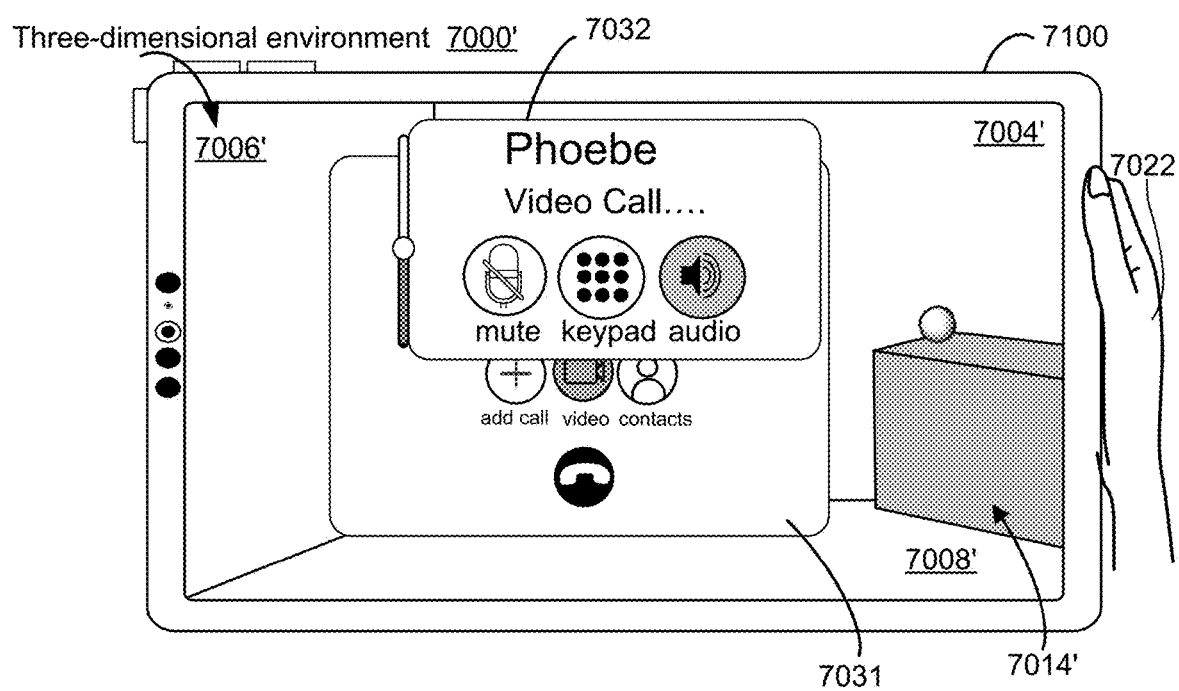

As shown in FIG. 7G, in response to the input directed at magnified version 7038' of control 7038, a video call is initiated. For example, application user interface 7030 of the messaging application is replaced with user interface 7031 for video calls. Also, virtual magnifier 7032 magnifies a portion of user interface 7031 for video calls.

Additional descriptions regarding FIGS. 7A-7G are provided below in reference to method 1100 described with respect to FIG. 11.

FIG. 8A-8L illustrate examples of selecting and interacting with a point in a three-dimensional environment using a ray and a selection cursor that moves along the ray. FIG. 12 is a flow diagram of an exemplary method 1200 for selecting and interacting with a point in a three-dimensional environment using a ray and a selection cursor that moves along the ray. The user interfaces in FIGS. 8A-8L are used to illustrate the processes described below, including the processes in FIG. 12.

FIG. 8A illustrates a view of a three-dimensional environment 8000 that is visible to user 7002 via display generation component 7100 of computer system 101. The three-dimensional environment of FIG. 8A optionally includes representations (or optical views) of objects in a physical environment such as physical environment 7000 (FIG. 7A) (e.g., as captured by one or more cameras of computer system 101), except without physical ball 7028 on top of physical object 7014. For example, in FIG. 8A, three-dimensional environment 8000 includes representation (or optical view) 7014' of physical object 7014, representation (or optical view) 7006' of physical wall 7006, and representation (or optical view) 7008' of physical floor 7008. In addition, three-dimensional environment 8000 includes one or more computer-generated objects, also called virtual objects, such as ball 8002 and speaker 8004 (obscured in the view of environment 8000 that is visible via display generation component 7100 in FIG. 8A, though visible in top view 8010 in FIG. 8A). In some embodiments, one or more portions of the view of three-dimensional environment 8000 that is visible to user 7002 via display generation component 7100 are virtual passthrough portions that include representations of corresponding portions of physical environment 7000 captured via one or more image sensors of computer system 101. In some embodiments, one or more portions of the view of three-dimensional environment 8000 that is visible to user 7002 via display generation component 7100 are optical passthrough portions, in that user 7002 can see one or more portions of physical environment 7000 through one or more transparent or semi-transparent portions of display generation component 7100.

FIG. 8A also shows application user interface 8006 displayed in three-dimensional environment 8000. In some embodiments, application user interface 8006 corresponds to a user interface of a software application executing on computer system 101 (e.g., an email application, a web browser, a messaging application, a maps application, or other software application). Application user interface 8006 includes one or more user interface elements, such as E1, E2, and E3 in the FIG. 8A example.

FIG. 8A shows a ray 8008 extending from a reference point corresponding to user 7002 (e.g., a simulated position 7002' of a viewpoint of user 7002 or of a part of user 7002 such as hand 7020 in three-dimensional environment 8000, or a simulated position 7100' of a viewpoint of display generation component 7100 in three-dimensional environment 8000), as indicated in top view 8010 of three-dimensional environment 8000 in FIG. 8A. As indicated in FIG. 8A, ray 8008 extends into three-dimensional environment 8000 and intersects one or more objects in environment 8000. For example, ray 8008 in FIG. 8A intersects wall 7006'. In addition, in FIG. 8A, ray 8008 is moving horizontally through a plurality of candidate directions (e.g., pivoting about the reference point), as indicated by the dashed arrow.

In some embodiments, the features of FIGS. 8A-8L are enabled while a switch interaction mode is enabled for computer system 101. In some embodiments, the features of FIGS. 8A-8L (e.g., as part of the switch interaction mode) are available while one or more assistive input devices are connected to computer system 101, or while computer system 101 is otherwise in communication with one or more assistive input devices. In some embodiments, the features of FIGS. 8A-8L (e.g., as part of the switch interaction mode) are enabled for computer system 101 automatically in response to an assistive input device being connected to or otherwise brought into communication with computer system 101. In some embodiments, an assistive input device, also called an adaptive switch, is an input device other than a traditional keyboard or pointing device such as a mouse, finger, or stylus, and allows individuals with physical impairments to independently operate the computer system. Examples of assistive input devices include joysticks (e.g., which can assist with navigation around a displayed user interface), buttons (e.g., which can be pressed by a finger or hand, foot, chin, head, or other part of the user, and which may be configured to respond to lighter presses than traditional buttons), and/or mouthpieces (e.g., which can be operated by air (drawn out or blown in), by sound, and/or by biting). In some embodiments, assistive input devices are used to provide inputs to perform selection inputs, activation inputs, or other type of input. In some embodiments, the interaction inputs described herein with reference to FIGS. 8A-8L are received via one or more assistive input devices that are in communication with computer system 101.

FIG. 8B illustrates a transition from FIG. 8A in response to user 7002 performing an interaction input using hand 7020, as indicated by hand 7020 shown with arrows in FIG. 8B. In some embodiments, the interaction input includes a hand gesture (e.g., using hand 7020 and/or hand 7022), a button press, a key press, a voice input, and/or any input using an adaptive input device. In some embodiments, user 7002 must hold their hand (e.g., hand 7020 and/or hand 7022) in a predefined configuration (e.g., ready state) in order for ray 8008 to be displayed and moved through a plurality of candidate directions, and the movement of ray 8008 through the plurality of candidate directions is stopped in response to user 7002 performing the interaction input with the hand that is in the predefined configuration. In response to the interaction input indicated in FIG. 8B, computer system 101 stops the horizontal movement of ray 8008 (e.g., from among the plurality of candidate directions spanning horizontally) and begins moving ray 8008 (e.g., pivoting about the reference point) vertically through another plurality of candidate directions (e.g., spanning vertically), starting from the intermediate direction at which the horizontal movement of ray 8008 was stopped, as indicated by the dashed arrow in FIG. 8B. While ray 8008 extends in the intermediate direction (e.g., at which the horizontal movement of ray 8008 was stopped and from which the vertical movement of ray 8008 begins), as shown in FIG. 8B, ray 8008 intersects wall 7006' and passes above (without intersecting) speaker 8004 and representation 7014' of physical object 7014, as viewed via display generation component 7100 and indicated in top view 8010.

Figure 8D:
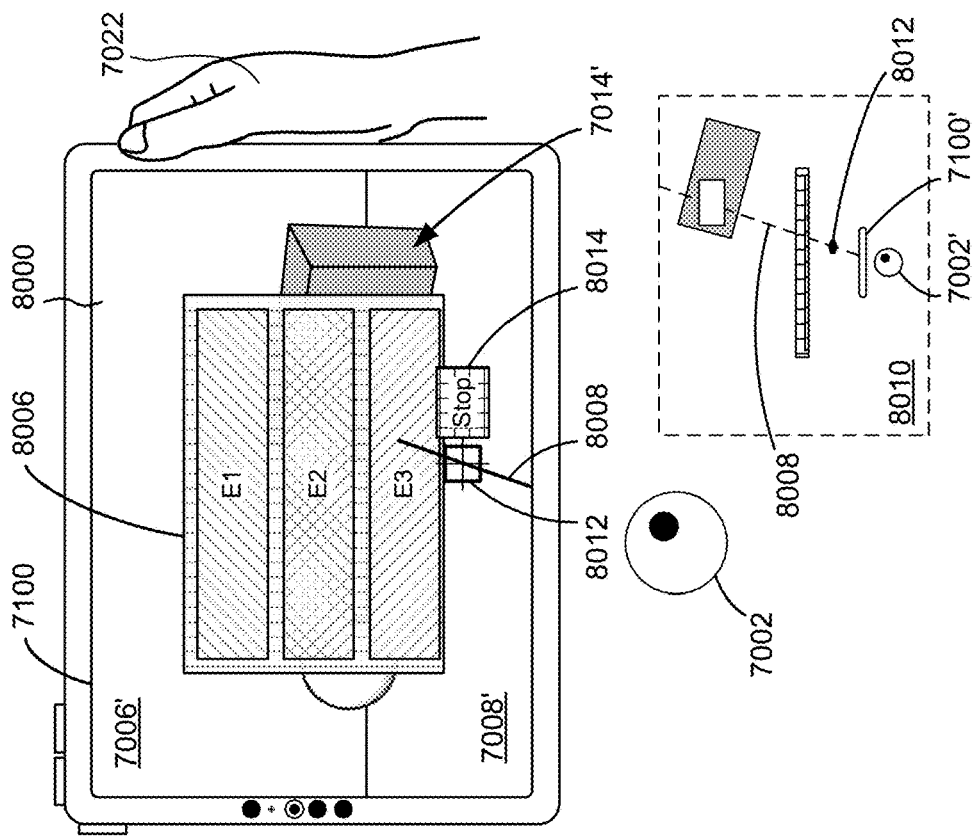
Figure 8C:
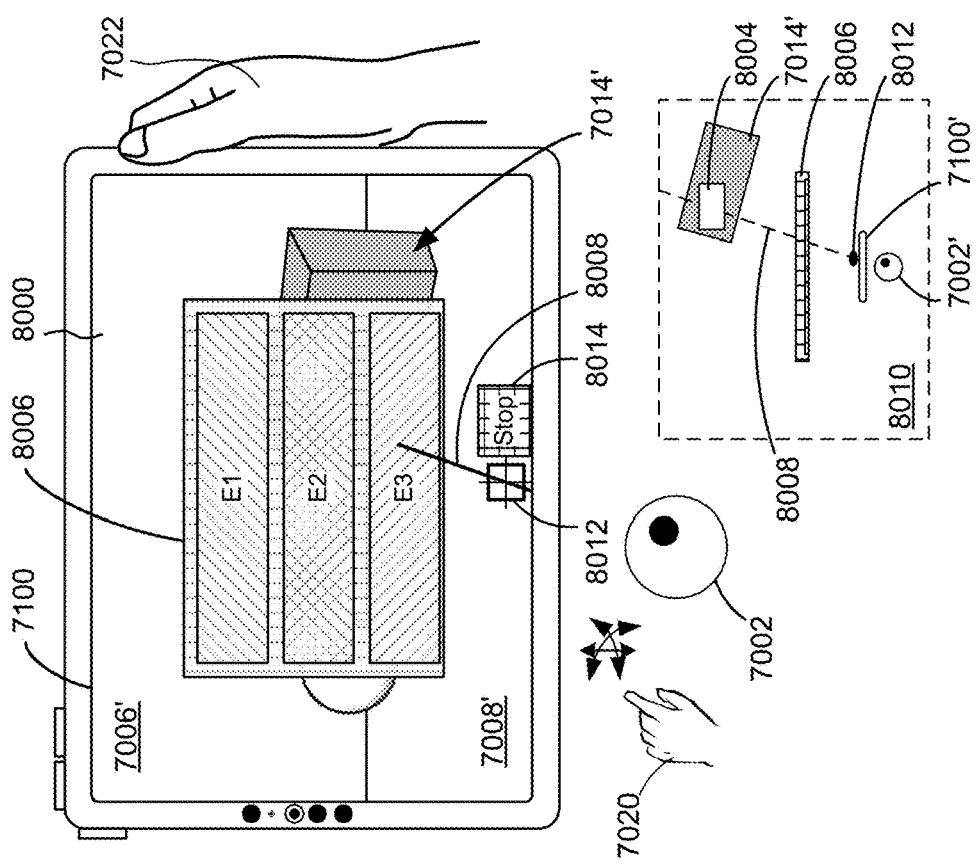

FIG. 8C illustrates a transition from FIG. 8B in response to user 7002 performing an interaction input (e.g., another interaction input, like the one described with reference to FIG. 8B) using hand 7020, as indicated by hand 7020 shown with arrows in FIG. 8C. In response to the interaction input indicated in FIG. 8C, computer system 101 stops the movement of ray 8008 through the plurality of candidate directions spanning vertically when ray 8008 extends in a respective direction, and continues to display ray 8008 extending in the respective direction (also called the selected direction).

FIGS. 8A-8C thus illustrate example embodiments in which the respective direction of ray 8008 is selected from a plurality of candidate directions by moving ray 8008 through a first set of candidate directions (e.g., spanning horizontally, as illustrated in FIG. 8A) and then moving ray 8008 through a second set of candidate directions spanning (e.g., vertically) from an intermediate direction selected from the first set of candidate directions in response to a first interaction input (e.g., as illustrated in FIG. 8B), from which the respective direction of ray 8008 is selected in response to a second interaction input (FIG. 8C). In other example embodiments, the respective direction of ray 8008 is selected from a plurality of candidate directions by moving ray 8008 in a different manner (e.g., pivoting ray 8008 differently about the reference point corresponding to user 7002). In some embodiments, a current candidate direction of ray 8008 is the direction of user 7002's gaze (e.g., the direction from the reference point to a point in three-dimensional environment 8008 corresponding to where user 7002 is currently looking). In some embodiments, computer system 101 sets the current candidate direction of ray 8008 to be the respective direction for ray 8008 in response to detecting a single interaction input for selecting the respective direction of ray 8008 (e.g., an interaction input performed while ray 8008 extends in a respective candidate direction, whether ray 8008 is moving automatically through a plurality of candidate directions or whether user 7002 is gazing at a particular target in environment 8000). In some embodiments, the plurality of candidate directions in environment 8000 are grouped into one two or more sets of candidate directions, and two or more corresponding interaction inputs are required to select the respective direction for ray 8008 (e.g., as described herein with reference to FIGS. 8A-8C).

While ray 8008 extends in the selected direction, as in FIG. 8C, ray 8008 intersects application user interface 8006, and in particular element E3 of application user interface 8006, as well as intersecting speaker 8004, as indicated in top view 8010. FIG. 8C also illustrates that, after the vertical movement of ray 8008 is stopped, and while ray 8008 is displayed as extending in the selected direction, computer system 101 displays cursor 8012 along ray 8008. The current position of cursor 8012 along ray 8008 in environment 8000 is indicated in the view of environment 8000 that is visible via display generation component 7100 and in top view 8010 in FIG. 8C. Cursor 8012 moves along ray 8008, in some embodiments automatically in response to the movement of ray 8008 being stopped, thereby enabling a user such as user 7002 to select an interaction point along ray 8008 in three-dimensional environment 8000. In some embodiments, cursor 8012 moves smoothly along ray 8008. In some embodiments, cursor 8012 moves in discrete steps along ray 8008. In addition, computer system 101 displays stop button 8014, optionally next to cursor 8012. In some embodiments, whenever stop button 8014 is displayed (e.g., regardless of where stop button 8014 is displayed in environment 8000), stop button 8014 has focus (e.g., is visually emphasized, such as by highlighting, outlining, or other visual feedback), to indicate that an interaction input (e.g., as shown in and described herein with reference to FIG. 8E) will activate stop button 8014 and stop the movement of cursor 8012 along ray 8008 (e.g., to select the current position of cursor 8012 along ray 8008 for subsequent interaction).

FIG. 8D illustrates automatic movement of cursor 8012 along ray 8008, in the absence of an interaction input activating stop button 8014 (e.g., after the detection of the interaction input of FIG. 8C, and prior to the detection of the interaction input of FIG. 8E). As indicated in the view of environment 8000 that is visible via display generation component 7100 and as indicated in top view 8010 in FIG. 8D, cursor 8012 has moved along ray 8008 further from simulated position 7002' of user 7002 in environment 8000, and has not yet reached application user interface 8006. In some embodiments, as illustrated in FIG. 8D, stop button 8014 moves with cursor 8012 (e.g., stays next to cursor 8012 as cursor 8012 moves). In some embodiments, stop button 8014 is displayed at a fixed location in environment 8000 while cursor 8012 moves.

FIG. 8E illustrates further automatic movement of cursor 8012 along ray 8008. As indicated in the view of environment 8000 that is visible via display generation component 7100 and as indicated in top view 8010 in FIG. 8E, cursor 8012 has moved along ray 8008 further from simulated position 7002' of user 7002 in environment 8000, and has reached element E3 of application user interface 8006. When cursor 8012 has reached element E3 of application user interface 8006, user 7002 performs an interaction input activating stop button 8014 (e.g., another interaction input, like the ones described with reference to FIGS. 8B-8C). In response to detecting the interaction input, the movement of cursor 8012 along ray 8008 is stopped, and the current position of cursor 8012 in three-dimensional environment 8000 (e.g., on element E3 of application user interface 8006) is selected as the current interaction point.

FIG. 8F (e.g., FIGS. 8F1, 8F2, and 8F3, where a user interface analogous to the user interface described in FIG. 7F1 is shown on HMD 7100a in FIG. 7F2) shows that, in accordance with stopping the movement of cursor 8012, which in this example results the selection of interaction point 8016 on element E3 of application user interface 8006 as the current interaction point, computer system 101 automatically displays one or more, and in this example a plurality of, interaction options available for selected interaction point 8016. In the example of FIGS. 8F, the available options for interacting with interaction point 8016 on element E3 of application user interface 8006 are option 8018, labeled "Tap" (e.g., to perform an operation responsive to a tap input on element E3 at interaction point 8016, such as by activating element E3); option 8020, labeled "Scroll Down" (e.g., to scroll application user interface 8006 downward); and option 8022, labeled "Select" (e.g., to select element E3 for further interaction). In FIG. 8F, "Tap" option 8018 currently has focus and would be activated in response to an interaction input, as indicated by the selection outline displayed around "Tap" option 8018.

Figure 8H:
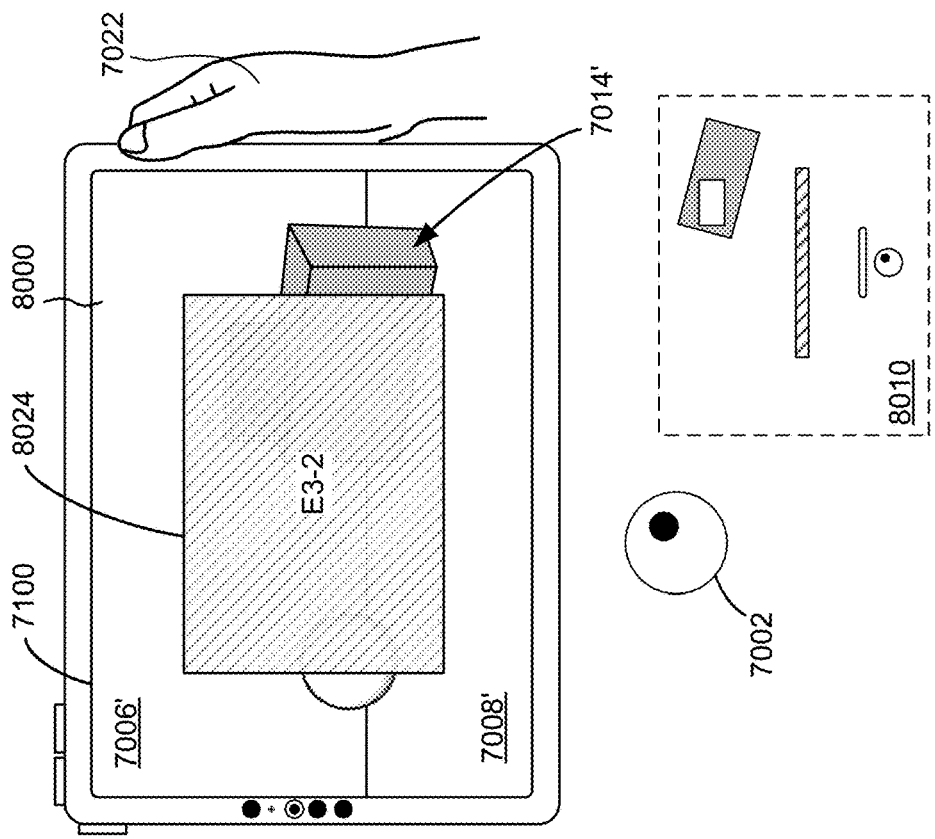
Figure 8G:
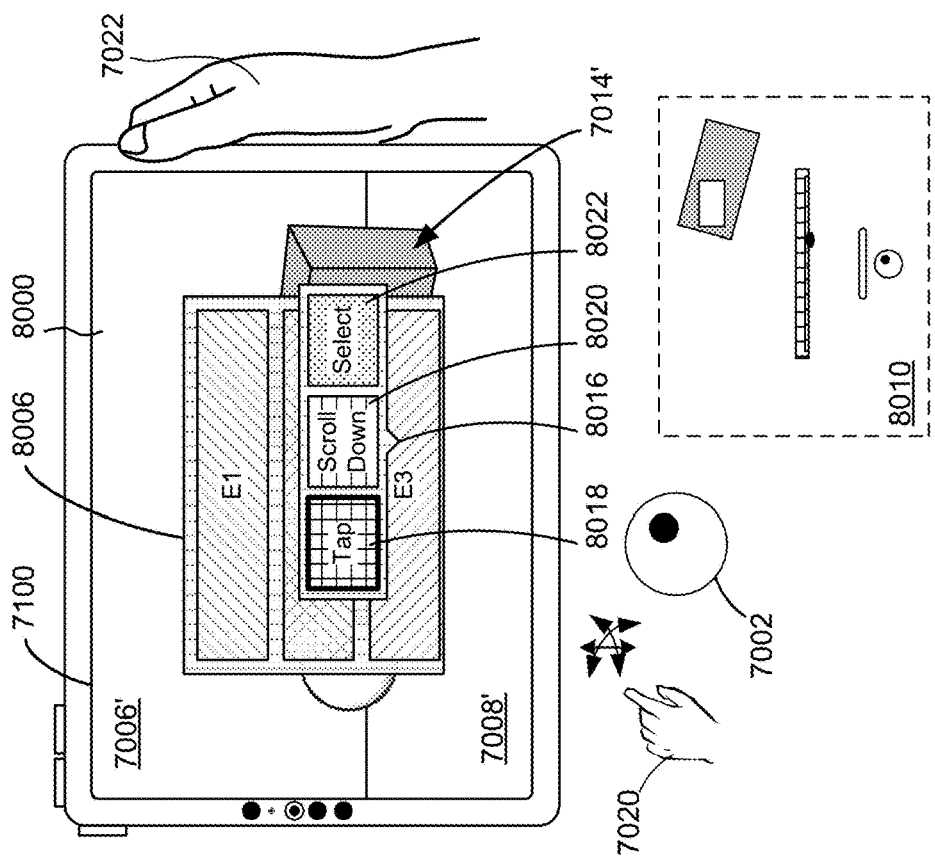

FIG. 8G shows user 7002 performing an interaction input while "Tap" interaction option 8018 is selected (e.g., has focus). In response, computer system 101 performs an operation associated with tapping on interaction point 8016, by replacing display of application user interface 8006 with user interface 8024, labeled "E3-2," corresponding to activation of element E3, as shown in FIG. 8H. For example, elements E1, E2, and E3 in FIG. 8G (as well as FIGS. 8A-8F) represent different items in a list of content items (e.g., e-mails, messaging conversations, audio tracks, videos, or other content), and user interface 8024 displays the respective content item E3-2 (e.g., a specific e-mail, conversation, song, video, or other content item) in FIG. 8H.

Figure 8J:
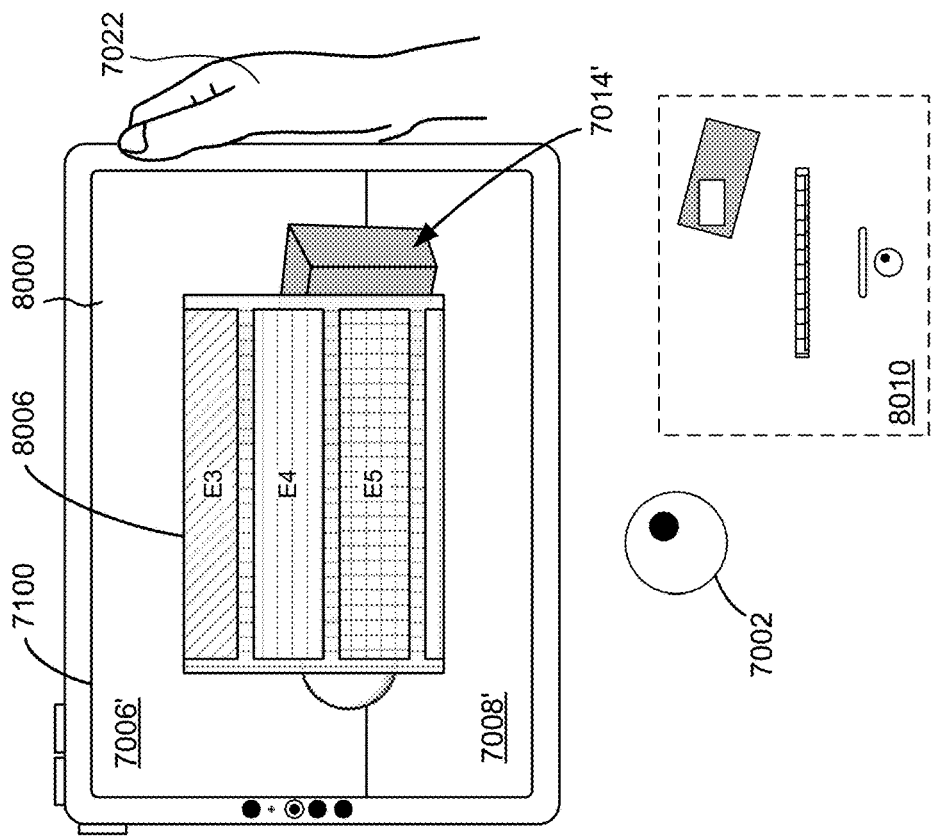
Figure 8I:
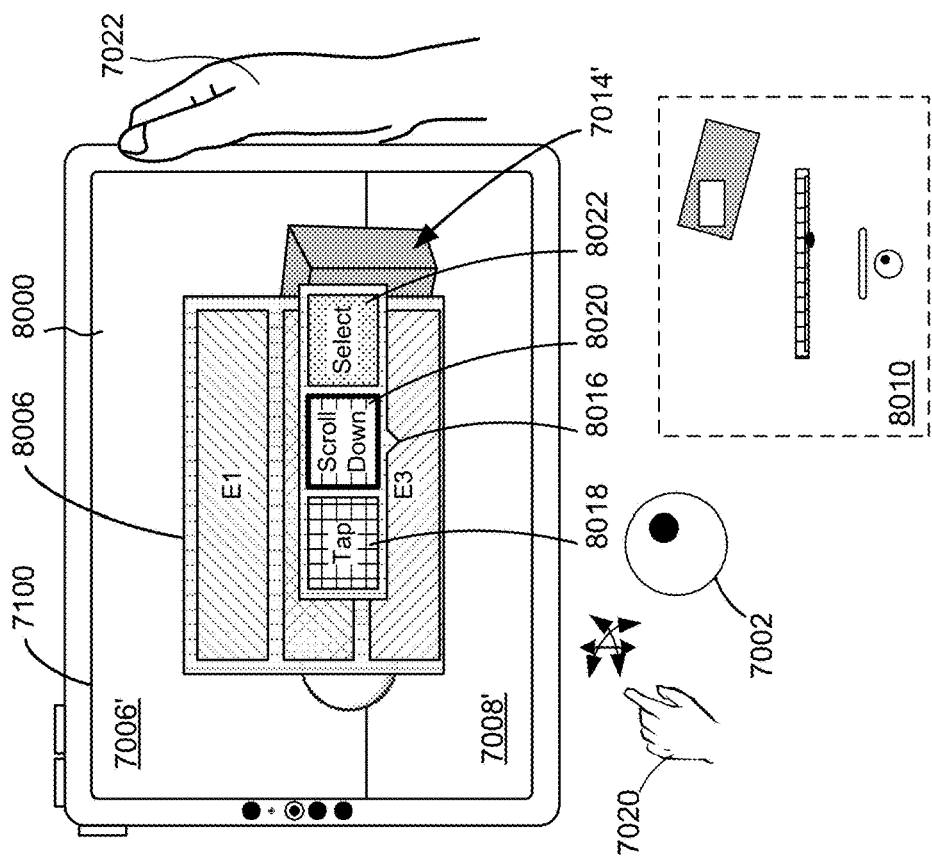

In some embodiments, while the plurality of available interaction options for a selected interaction point is displayed (e.g., in response to an interaction input selecting a respective interaction point and stopping the movement of cursor 8012 along ray 8008), and in the absence of an interaction input selecting a particular interaction option, computer system 101 automatically changes which of the interaction options has focus, cycling through the different interaction options in turn. For example, if the interaction input of FIG. 8G were not performed, focus would move (e.g., after a predetermined amount of time, such as 0.2 seconds, 0.3 seconds, 0.5 seconds, 1 second, 2 seconds, or any other period, which may be a system default or user-selected period) from "Tap" option 8018 to another option such as "Scroll Down" option 8020, as shown in FIG. 8I. In response to user 7002 performing an interaction input while "Scroll Down" option 8020 is selected, as shown in FIG. 8I, an operation associated with "Scroll Down" option 8020 is performed. In particular, as shown in FIG. 8J, the list of content items in application user interface 8006 is scrolled so as to access content items downward of the previously displayed content items, such that elements E1 and E2 are scrolled upward out of view, element E3 is shifted upward, and elements E4, E5, and E6, in part, are scrolled upward into view.

In some embodiments, while the plurality of available interaction options for a selected interaction point is displayed (e.g., in response to an interaction input selecting a respective interaction point and stopping the movement of cursor 8012 along ray 8008), computer system 101 is configured to select different interaction options (e.g., perform different associated operations) in response to different types of user input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input). With respect to the example of FIGS. 8F, optionally, computer system 101 activates "Tap" option 8018 and performs the operation associated with tapping on interaction point 8016 (FIGS. 8G-8H) in response to user 7002 performing a first type of input, whereas computer system 101 activates "Scroll Down" option 8020 and performs the scrolling down operation (FIGS. 8I-8J) in response to user 7002 performing a second type of input that is different from the first type of input (e.g., a tap input versus a pinch input, an input performed with a first number of fingers versus an input performed with a different second number of fingers (such as a single-finger pinch versus a multi-finger pinch as described with reference to method 1300 herein), an input performed with a first number of iterations versus an input performed with a different second number of iterations (such as a single press versus a double press), an input performed via one input device versus an input performed via a different input device (such as an air gesture versus a hardware actuation), or any other manner of differentiating input types). One of ordinary skill in the art will readily appreciate that any number of different types of inputs may be used to select a respective interaction option from the plurality of available interaction options presented for a selected interaction point. For example, a third type of input (e.g., a third type of gesture, an input performed with a third number of fingers or third number of iterations or using a third input device, or other manner of differentiating input types) optionally causes computer system 101 to activate "Select" option 8022 (FIG. 8F) and perform the operation associated with "Select" option 8022. Similarly, with respect to the example of FIG. 8L, described herein, optionally, computer system 101 activates "Tap" option 8028 and performs the operation associated with tapping on interaction point 8026 in response to user 7002 performing a fourth type of input (e.g., the same as the first type of input), whereas computer system 101 activates "Select" option 8030 and performs the operation associated with "Select" option 8030 in response to user 7002 performing a fifth type of input (e.g., the same as the second type of input or the same as the third type of input) that is different from the fourth type of input.

In some embodiments, while cursor 8012 moves along ray 8008, objects in environment 8000 that intersect ray 8008 are visually emphasized or deemphasized based on the current position of cursor 8012 along ray 8008. In FIG. 8C-8E for example, application user interface 8006, optionally due to being the next closest object to the current position of cursor 8012 in environment 8000, is visually prominent (e.g., is displayed in the foreground, with a high opacity and/or brightness, and/or close to the viewpoint of user 7002 (e.g., simulated position 7002' of user 7002 or simulated position 7100' of display generation component 7100)).

In contrast, if the movement of cursor 8012 is not stopped at element E3 of application user interface 8006 (as in FIG. 8F in response to the interaction input of FIG. 8E), cursor 8012 continues moving along ray 8008. For example, if the interaction input of FIG. 8E were not performed, cursor 8012 would continue moving along ray 8008 past application user interface 8006 (e.g., so as to be further from the viewpoint of user 7002 than the point in application user interface 8006 that intersects ray 8008), as shown in FIG. 8K. Accordingly, application user interface 8006 is visually deemphasized in one or more ways (optionally with one or more visual properties maintained). For example, while application user interface 8006 remains in the foreground (e.g., at the same position in environment 8000), application user interface 8006 in FIG. 8K is blurred and/or decreased in opacity (e.g., made more transparent). As a result, speaker 8004, additional portions of ray 8008, and additional portions of representation 7014' of physical object 7014, which are behind application user interface 8006 in environment 8000 and were previously obscured by application user interface 8006 (FIGS. 8C-8E), are more visible in FIG. 8K. In some embodiments, speaker 8004, the additional portions of ray 8008, and the additional portions of representation 7014' of physical object 7014 remain partially obscured by the visually deemphasized application user interface 8006, as shown in FIG. 8K. In some embodiments, stop affordance 8014 retains focus in that stop affordance 8014 is not obscured by application user interface 8006 (e.g., even though stop affordance 8014 is next to cursor 8012 and therefore also behind application user interface 8006 in environment 8000). In some embodiments, stop affordance 8014 is, like cursor 8012, partially obscured by the visually deemphasized application user interface 8006, yet is displayed as having focus in a different way (e.g., using a selection outline and/or highlighting).

In particular, in FIG. 8K, cursor 8012 has moved along ray 8008 past application user interface 8006 and has reached speaker 8004, as indicated in the view of environment 8000 that is visible via display generation component 7100 and as indicated in top view 8010. FIG. 8K also shows user 7002 performing an interaction input using hand 7020, as indicated by hand 7020 shown with arrows, when cursor 8012 has reached speaker 8004. In response to detecting the interaction input, the movement of cursor 8012 along ray 8008 is stopped, and the current position of cursor 8012 in three-dimensional environment 8000 (e.g., on speaker 8004) is selected as the current interaction point.

Figure 8L:
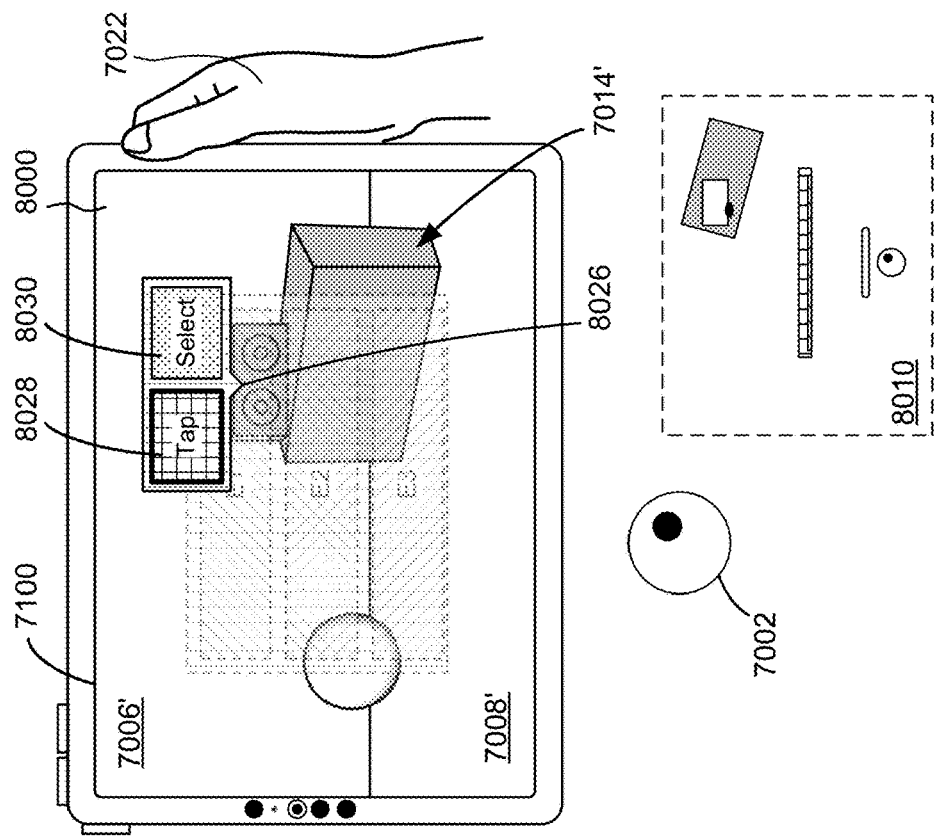
Figure 8K:
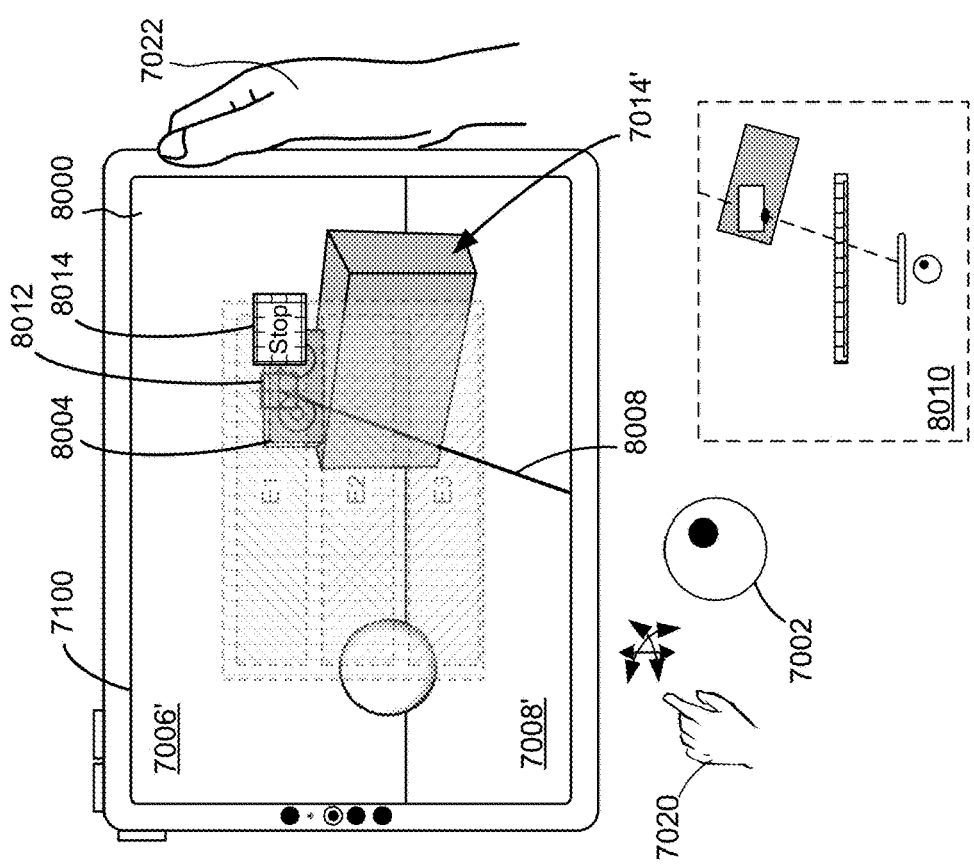

FIG. 8L shows that, in accordance with stopping the movement of cursor 8012 and selecting interaction point 8026 on speaker 8004 as the current interaction point, computer system 101 automatically displays one or more, and in this example a plurality of, interaction options available for selected interaction point 8026. In the example of FIG. 8L, the available options for interacting with interaction point 8026 on speaker 8004 are option 8028, labeled "Tap" (e.g., to perform an operation responsive to a tap input on speaker 8004 at interaction point 8026, such as by activating speaker 8004); and option 8030, labeled "Select" (e.g., to select speaker 8004 for further interaction). In FIG. 8L, "Tap" option 8028 currently has focus and would be activated in response to an interaction input, as indicated by the selection outline displayed around "Tap" option 8028. As described above with reference to FIG. 8I, in some embodiments, computer system 101 gives focus alternately to "Tap" option 8028 and "Select" option 8030, automatically cycling through the different interaction options in turn until one is selected or an input causing a different action is detected. As described above with reference to FIG. 8G, in some embodiments, user 7002 is enabled to perform an interaction input while a respective interaction option is selected to cause computer system 101 to perform an operation associated with the selected interaction option. For example, in response to user 7002 performing an interaction input while "Tap" option 8028 is selected, computer system 101 optionally launches a media playback application and displays a user interface of the media playback application. In another example, in response to user 7002 performing an interaction input while "Select" option 8030 is selected, computer system 101 optionally selects speaker 8004 (e.g., for repositioning, resealing, deletion, or other object manipulation operation).

Additional descriptions regarding FIGS. 8A-8L are provided below in reference to method 1200 described with respect to FIG. 12.

FIGS. 9A-9H illustrate example techniques for switching between interacting with an active application in a three-dimensional environment to performing an operation outside the active application using two hands. FIG. 13 is a flow diagram of an exemplary method 1300 for switching between interacting with an active application in a three-dimensional environment to performing an operation outside the active application using two hands. The user interfaces in FIGS. 9A-9H are used to illustrate the processes described below, including the processes in FIG. 13.

The techniques described herein in relation to FIGS. 9A-9H and method 1300 (e.g., described in FIG. 13), relate to an accessibility mode for people with visual impairments that is sometimes referred to as a "read aloud" mode, in which verbal description of virtual objects (e.g., user interfaces and user interface elements) is provided in response to navigation gestures or other user inputs (e.g., navigation gestures that disambiguate between navigation within a currently active application or navigation to another (e.g., inactive or without input focus) application).

Figure 9A:
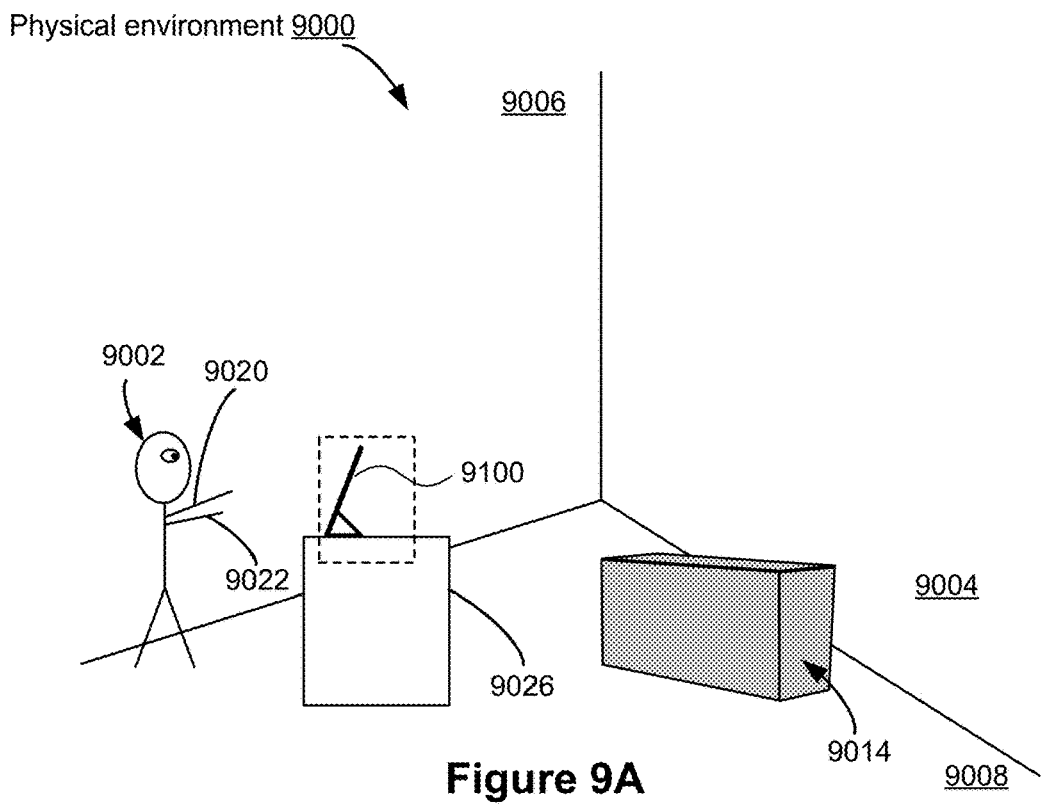

FIG. 9A illustrates physical environment 9000 that is visible to user 9002 via display generation component 9100 of computer system 101. The physical environment includes physical walls 9004, 9006, and floor 9008, and physical object 9014. Display generation component 9100 is placed on top of physical object 9026, leaving hand 9020 and hand 9022 free to perform various air gestures. In some embodiments, display generation component 9100 is attached to user 9002's body (e.g., a head-mounted display). In some embodiments, one or more portions of the view of physical environment 9000 that is visible to user 9002 via display generation component 9100 are virtual passthrough portions that include representations of corresponding portions of physical environment 9000 captured via one or more image sensors of computer system 101. In some embodiments, one or more portions of the view of physical environment 9000 that is visible to user 9002 via display generation component 9100 are optical passthrough portions, in that user 9002 can see one or more portions of physical environment 9000 through one or more transparent or semi-transparent portions of display generation component 9100.

Figure 9B:
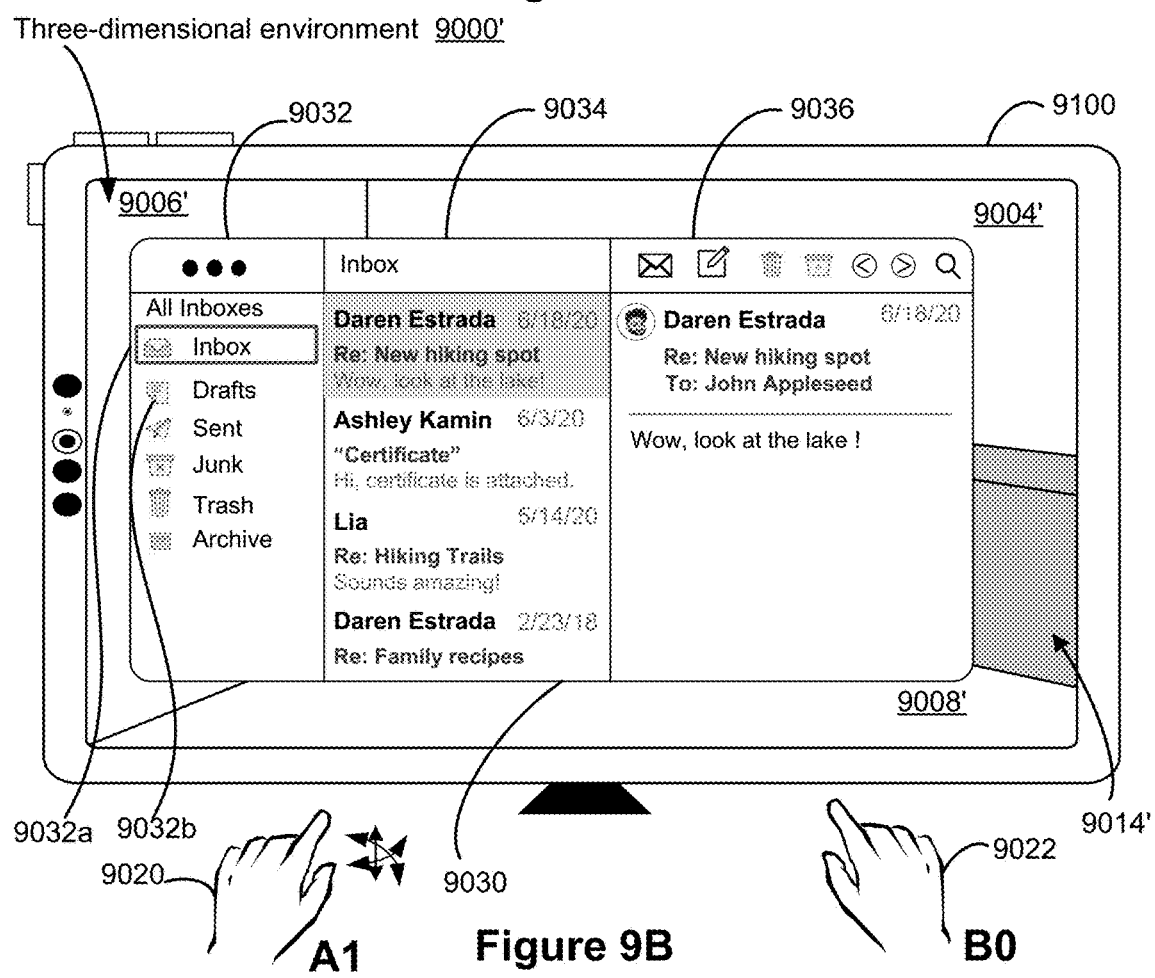

FIG. 9B illustrates a view of a three-dimensional environment 9000' that is visible to user 9002 via display generation component 9100. The view of the three-dimensional environment 9000' includes a representation (or optical view) of portions of the physical environment 9000 as captured by one or more cameras of computer system 101. The view of the three-dimensional environment 9000' includes representation (or optical view) 9004' of a portion of physical wall 9004, representation (or optical view) 9006' of a portion of physical wall 9006, and representation (or optical view) 9008' of a portion of physical floor 9008. Further, the view of the three-dimensional environment 9000' includes representation (or optical view) 9014' of a portion of physical object 9014.

Further, in FIG. 9B, the view of the three-dimensional environment 9000' includes application user interface 9030 of an email application, which is currently open and active (e.g., the attention or gaze of user 9002 is focused on application user interface 9030 of the email application). Application user interface 9030 is virtual content visible to user 9002 via display generation component 9100 (e.g., not part of physical environment 9000). In some embodiments, application user interface 9030 of the email application corresponds to a user interface of a software application executing on computer system 101. Application user interface 9030 is divided into three sections, including a first section 9032 that lists inboxes (or electronic folders that store emails), a second section 9034 that lists emails for a respective folder or inbox selected from the first section 9032, and a third section 9036 for displaying content of a selected email from the second section 9034. For example, the first section 9032 includes inbox 9032a for incoming emails and drafts folder 9032b for draft emails. Further, inbox 9032a for incoming emails is currently active and selected. The second section 9034 displays a list of emails in (e.g., assigned to, stored in, and/or otherwise associated with) inbox 9032a, and the third section 9036 displays content of the first email in the list of emails displayed in the section 9034.

FIG. 9B further illustrates user 9002 performing a first gesture A1 (e.g., an air gesture) with left hand 9020 (shown with arrows in FIG. 9B) while right hand 9022 is in state B0. For example, the first gesture A1 performed with left hand 9020 corresponds to a single-finger air pinch (e.g., pinching an index finger and a thumb finger) and the state B0 corresponds to a ready state. In some embodiments, right hand 9022 is not performing any gesture that is recognized by computer system 101 or right hand 9022 is out of field of view of user 9002.

Figure 9C:
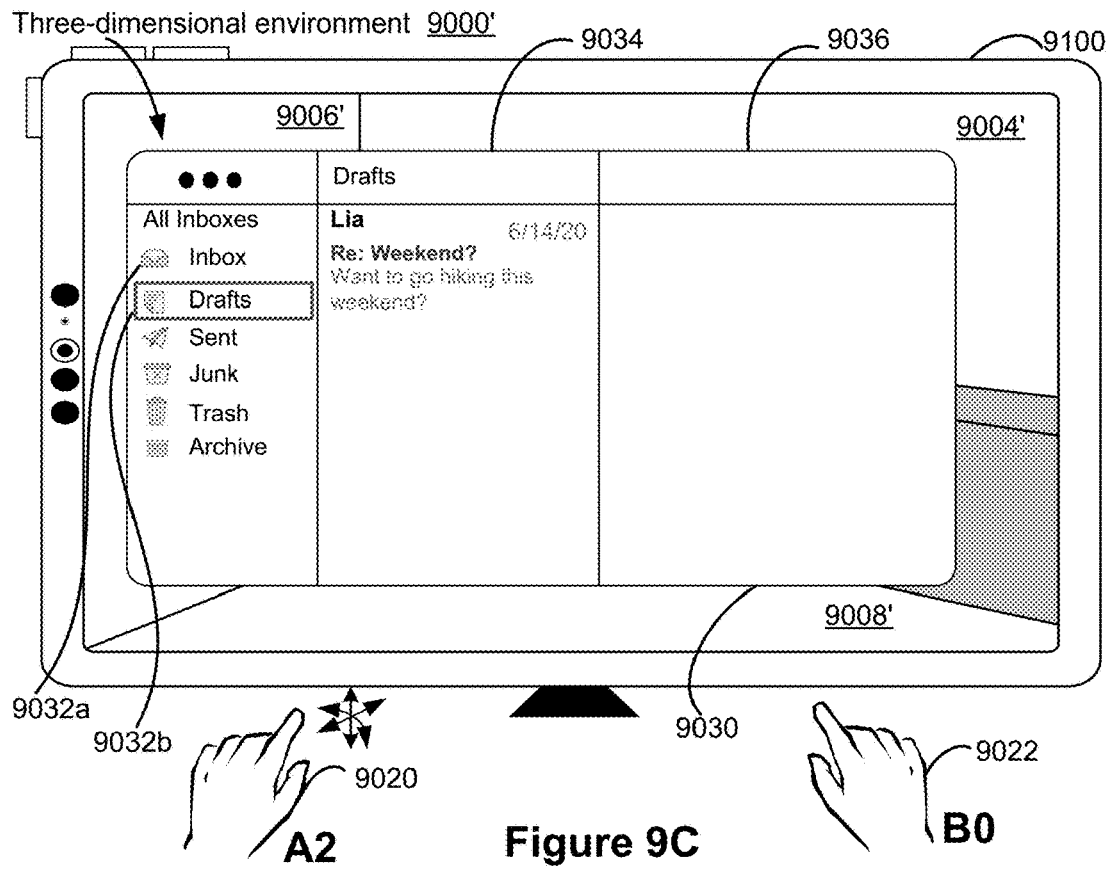

FIG. 9C illustrates a transition from FIG. 9B in response to user 9002 performing a first gesture A1 with left hand 9020 while right hand 9022 is in state B0, as indicated by left hand 9020, shown with arrows, and right hand 9022, shown without arrows, in FIG. 9B. In response to the first gesture A1 performed with left hand 9020 while right hand 9022 is in state B0, a first operation is performed in the email application (e.g., navigating forward between user interface elements). Since the right hand 9022 is not performing a gesture when the first air gesture A1 is performed with the left hand 9020, the first operation is performed within the same email application as opposed to switching to another application or performing other operation outside the mail application (e.g., when right hand 9022 is in state B0, the input/gesture performed with the left hand 9020 is not modified). In particular, as illustrated in FIG. 9C, a focus selector (or indicator) is moved forward (or downward, from the inbox) to the drafts folder 9032b (as indicated by the selection outline displayed around the drafts folder 9032b) from inbox 9032a, where the drafts folder 9032b (the terms box, inbox or mailbox are sometimes used instead of "folder") becomes currently active and/or selected. In response to navigating forward from the inbox 9032a to the drafts folder 9032b, content shown in the second section 9034 is changed. In particular, the second section 9034 lists emails saved in drafts folder 9032b; in this example just one email is saved in the drafts folder 9032b.

In some embodiments, a screen-reader application is enabled on computer system 101. In some embodiments, the screen-reader is a system application that is enabled or disabled by selecting a setting of computer system 101, e.g., via direct or indirect air gesture, a voice command, or use of a controller device. In some embodiments, the screen-reader describes aloud what is visible in the view of the three-dimensional environment 9000', e.g., the screen-reader automatically speaks text that is in focus (e.g., highlighted or otherwise indicated, identified or selected by a focus selector or focus indicator) or describes user interface elements of a currently active application. In some embodiments, bimanual navigation is used to interact with and navigate through application user interfaces and respective user interface elements within the user interfaces that are visible in the view of the three-dimensional environment 9000'. In some embodiments, in response to navigating forward from the inbox 9032a to the drafts folder 9032b, an audio description (e.g., spoken description) of the drafts folder 9032b is generated and output. For example, when a focus indicator moves from one position or user interface element to another position or user interface element in the view of the three-dimensional environment 9000', the screen-reader outputs descriptions of items that are indicated by the focus indicator. In some embodiments, the audio description can inform a visually impaired user what is a currently selected user interface element. In some embodiments, the screen-reader application receives as input a user interface of an application that includes a number of user interface elements, and the screen-reader application interprets the user interface as a hierarchy of user interface elements, which can be navigated. In some embodiments, when the screen-reader application is activated or while the screen-reader is enabled an overlay that provides information/instructions of available gestures is displayed or visible in the view of the three-dimensional environment 9000'.

In some embodiments, if the first gesture A1 performed with left hand 9020 corresponds to a multi-finger air pinch (e.g., pinching an index and middle finger with a thumb finger), the focus selector (or indicator), which is located on the inbox 9032a in FIG. 9B (as indicated by the selection outline displayed around the drafts inbox 9032a), would move forward to another section in the application user interface 9030 of the email application (e.g., the focus selector would move to another hierarchy level (sometimes called a hierarchical level) of the same email application). For example, the focus selector would move to the second section 9034 (for selecting a mail message within a currently selected folder), which is a section adjacent to the first section 9032 (e.g., for selecting a mailbox folder), where the first section 9032 and the second section 9034 are part of the same application hierarchy level (e.g., a top level, or a first level below a root level). In some embodiments, what operation is performed in the email application depends on the type of gesture performed with left hand 9020 and/or location of the focus selector (or location of user's gaze) at the time the gesture is performed.

FIG. 9C further illustrates user 9002 performing a second gesture A2 with left hand 9020 (shown with arrows in FIG. 9C) while right hand 9022 is in state B0. For example, the second gesture A2, which is performed with left hand 9020, corresponds to a single-finger air pinch (e.g., pinching a middle finger and a thumb finger) different from the first gesture A1 (e.g., a multi-finger air gesture) and the state B0 corresponds to a ready state. In some embodiments, right hand 9022 is not performing any gesture that is recognized by computer system 101 or right hand 9022 is out of field of view of user 9002.

Figure 9D:
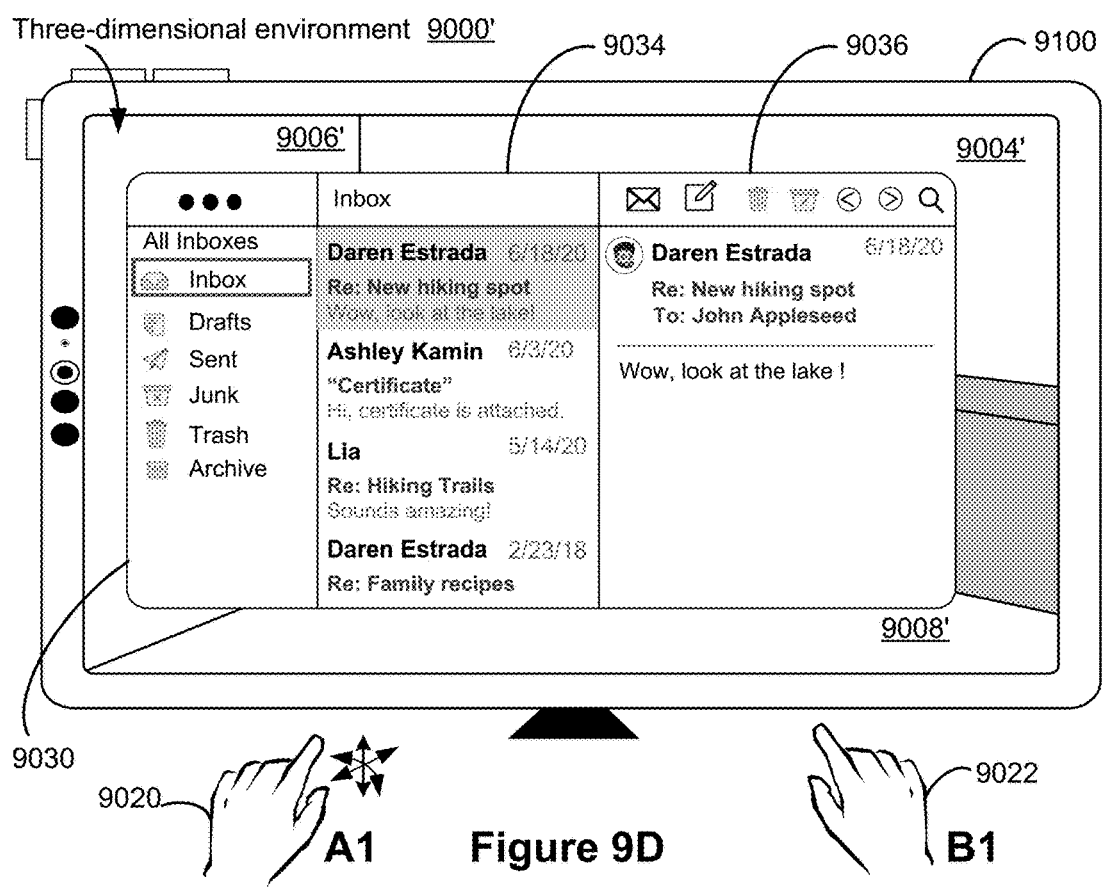

FIG. 9D illustrates a transition from FIG. 9C in response to user 9002 performing the second gesture A2 with left hand 9020 while right hand 9022 is in state B0, as indicated by left hand 9020 shown with arrows and right hand 9022 shown without arrows in FIG. 9C. In response to the second gesture A2 performed with left hand 9020 while right hand 9022 is in state B0, a second operation is performed in the email application (e.g., navigating backward between user interface elements in the first region 9032). Since the right hand 9022 is not performing a gesture when the second air gesture A2 is performed with the left hand 9020, the second operation is performed within the same email application, as opposed to switching to another application or performing another operation outside the email application. In particular, as illustrated in FIG. 9D, a focus selector is moved backward from to the drafts folder 9032b to inbox 9032a (as indicated by the selection outline displayed around the inbox 9032a), and inbox 9032a becomes currently active. In response to navigating backward to the inbox 9032a from the drafts folder 9032b, the content shown in the second section 9034 is changed (e.g., same content as displayed in FIG. 9B is redisplayed). In particular, the second section 9034 lists email messages in inbox 9032a, which in this example includes four emails located in inbox 9032a (e.g., assigned to, or saved in inbox 9032a), and the third section 9036 shows content of an email message listed in the second section 9034 (e.g., the top email message in this example, or in another example, a last selected email message, if any, in the email folder currently selected in the first region 9032).

In some embodiments, if the second gesture A2 performed with left hand 9020 corresponds to a particular multi-finger air pinch (e.g., pinching a ring and a middle finger with a thumb finger), the focus selector (or indicator), which is located on the drafts folder 9032b in FIG. 9C, would move to another section in the application user interface 9030 of the email application (e.g., the focus selector would move to another hierarchy level of the same email application). For example, in response to second gesture A2, the focus selector would move backward to the third section 9036, where the first section 9032 and the third section 9036 are at the same hierarchy level, and where the first section 9032 is first in a sequence of sequence of sections that includes sections 9032, 9034, and 9036, and the third section 9036 is the last section in the sequence. In some embodiments, what operation is performed in the email application depends on the type of gesture performed with left hand 9020 and/or location of the focus selector (or location of user's gaze) at the time the gesture is performed.

FIG. 9D further illustrates user 9002 performing a first gesture A1 with left hand 9020 (shown with arrows in FIG. 9D) while right hand 9022 is in state B1 (shown without arrows). For example, the first gesture A1 corresponds to a single-finger air pinch gesture, where a single-finger air pinch (e.g., pinching an index finger and a thumb finger followed by a release of the pinch) is performed with left hand 9020 while right hand 9022 is maintained in state B1, which corresponds to maintaining a single-finger air pinch gesture (e.g., pinching an index finger and a thumb finger of the right hand 9022 without a release of the pinch). Right hand 9022 while in state B1 acts as a modifier of any air pinch gestures performed with the left hand 9020.

Figure 9E:
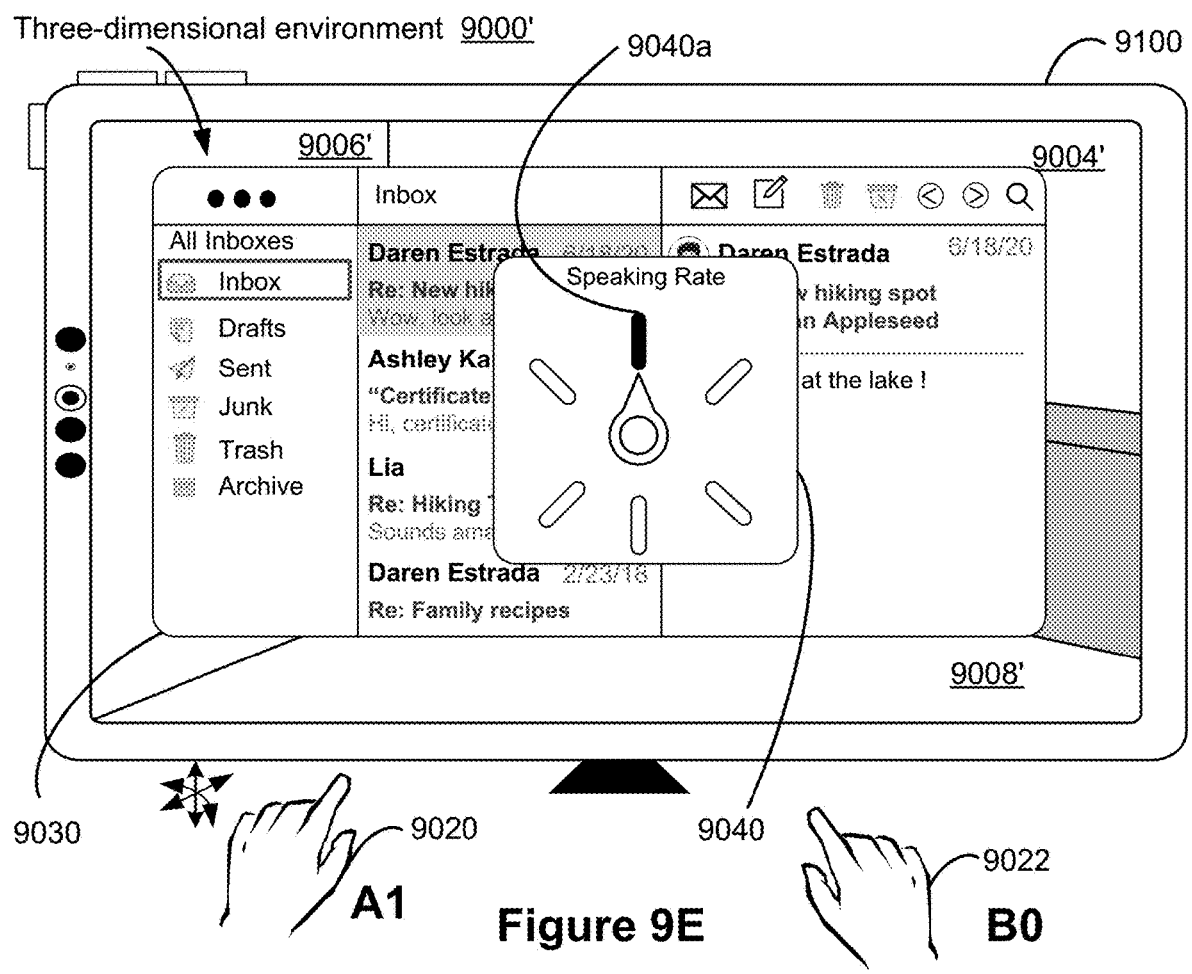

FIG. 9E illustrates a transition from FIG. 9D in response to user 9002 performing the first gesture A1 with left hand 9020 while right hand 9022 is in state B1, as indicated in FIG. 9D. In this example, in response to the first gesture A1 performed with left hand 9020 while right hand 9022 is in state B1, an operation is performed outside the email application. In this example, maintaining the right hand 9022 in state B1 when the first air gesture A1 is performed with the left hand 9020 causes the first air gesture A1 to be construed an instruction, command or request to perform an operation outside the email application, as opposed to performing in the email application, which is the currently active application. In some embodiments, a system operation is performed. For example, as illustrated in FIG. 9E, a screen-reader is invoked and user interface 9040 of the screen-reader is visible in the view of the three-dimensional environment 9000', where the user interface 9040 of the screen-reader overlays user interface 9030 of the email application. In some embodiments, the screen-reader is a system application. In some embodiments, the user interface 9040 of the screen-reader includes a number of settings that, if selected, can be adjusted in response to user inputs (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input). For example, user interface 9040 of the screen-reader indicates that the focus indicator is located at a setting of the screen-reader application related to speaking rate, e.g., speaking rate setting 9040a. User 9002 can perform a subsequent gesture, such as a single-pinch, a multi-pinch, or a pinch-slide air gesture, to change the speaking rate with which the screen-reader application describes user interface elements (e.g., of the email application) displayed in the view of the three-dimensional environment 9000'.

Further, FIG. 9E illustrates user 9002 performing a first gesture A1 with left hand 9020 (shown with arrows in FIG. 9E) while right hand 9022 is in state B0. For example, the first gesture A1 performed with left hand 9020 corresponds to a single-finger air pinch (e.g., pinching an index finger and a thumb finger) and the state B0 corresponds to a ready state. In some embodiments, right hand 9022 is not performing any gesture that is recognized by computer system 101 or right hand 9022 is out of field of view of user 9002. Right hand 9022 while in state B0 does not act as a modifier of any air gestures performed with the left hand 9020, or alternatively, maintaining right hand 9022 in state B0 instructs computer system 101 to construe any detected air gesture performed with left hand 9020 as one of a predefined set or default set or first set of instructions, commands or requests.

FIG. 9F (e.g., FIGS. 9F1, 9F2 and 9F3, where a user interface analogous to the user interface described in FIG. 9F3 is shown on HMD 7100a in FIG. 9F1) illustrates a transition from FIG. 9E in response to user 9002 performing the first gesture A1 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) with left hand 9020 while right hand 9022 is in state B0, as indicated by left hand 9020 shown with arrows and right hand 9022 shown without arrows in FIG. 9E. In response to the first gesture A1 performed with left hand 9020 while right hand 9022 is in state B0, an operation is performed in the screen-reader application (e.g., navigating forward between settings). Since the right hand 9022 is not performing a gesture when the first gesture A1 is performed with the left hand 9020, the operation is performed within the same screen-reader application as opposed to switching to another application or performing other operation outside the screen-reader application. In particular, as illustrated in FIGS. 9F, a focus selector is moved forward from the speaking rate setting 9040a to volume setting 9040b. User 9002 can perform a subsequent gesture, such as a single-pinch, a multi-pinch, or a pinch-slide air gesture, to change the volume of the audio output generated by the screen-reader application that describes user interface elements (e.g., of the email application) displayed in the view of the three-dimensional environment 9000'.

Figure 9G:
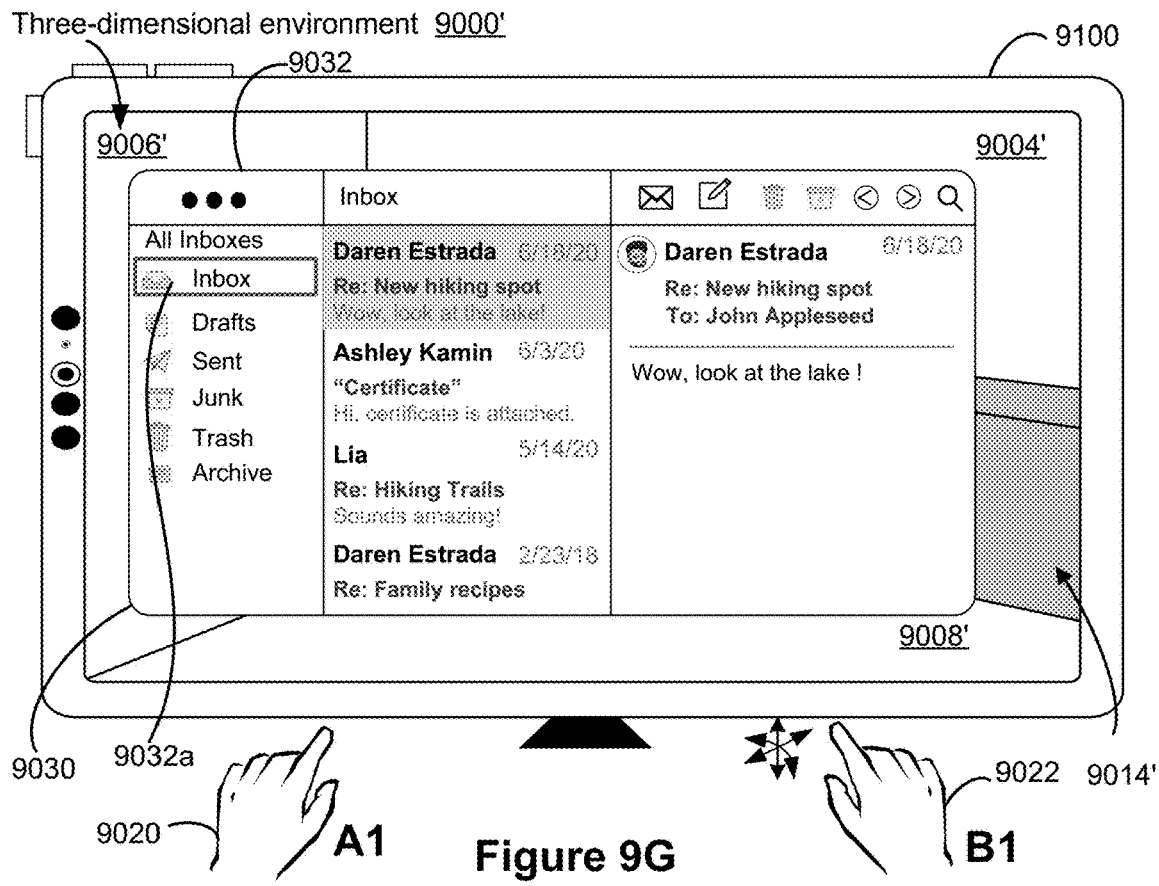

FIG. 9G, the view of the three-dimensional environment 9000' illustrates application user interface 9030 of the email application, which is currently open and active (e.g., the attention or gaze of user 9002 is focused on application user interface 9030 of the email application). The focus selector is located at inbox 9032a for incoming emails in the first section 9032 of application user interface 9030. Further, FIG. 9G illustrates user 9002 performing a first gesture B1 with right hand 9022 (shown with arrows in FIG. 9G) while left hand 9020 is in state A1. For example, the first gesture B1, corresponds to a secondary air pinch gesture, where a single-finger air pinch (e.g., pinching an index finger and a thumb finger followed by a release of the pinch) is performed with right hand 9022 and the state A1 corresponds to maintaining a single-finger air pinch gesture (e.g., pinching an index finger and a thumb finger without release). Left hand 9020 while in state A1 acts as a modifier of any air gestures (e.g., air pinch gestures or other air gestures) performed with the right hand 9022.

Figure 9H:
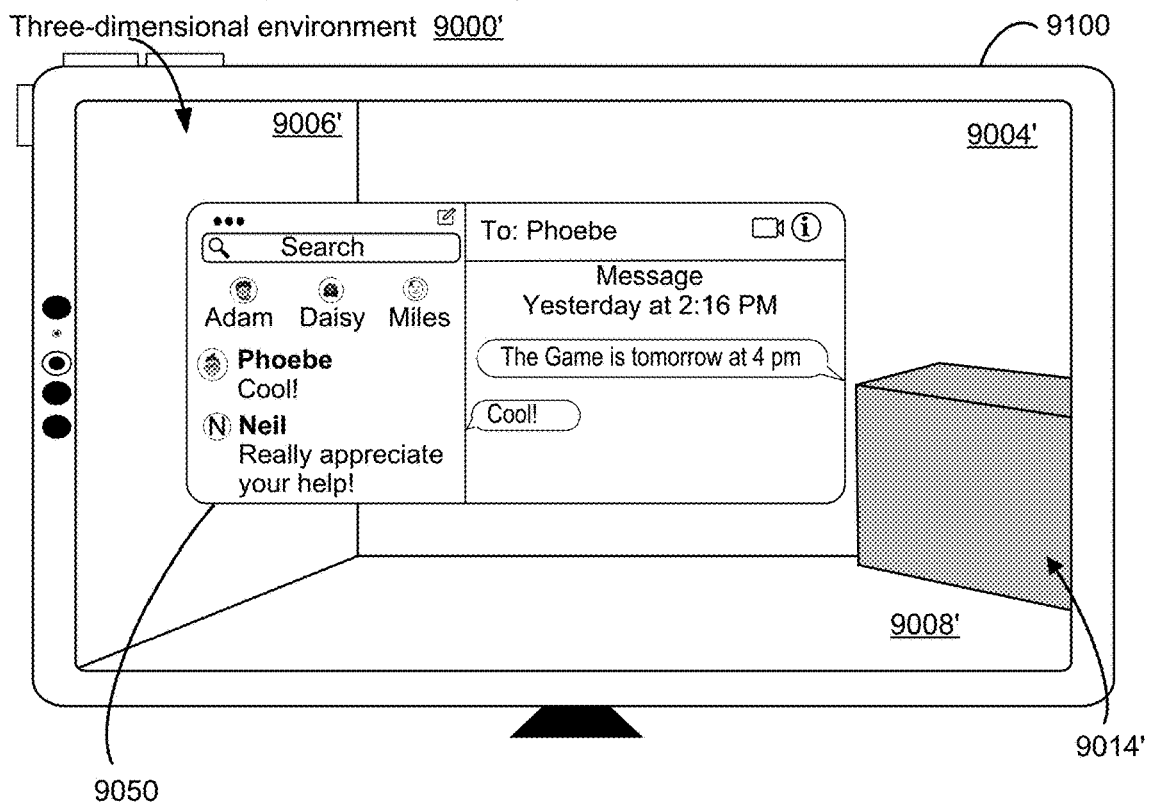

FIG. 9H illustrates a transition from FIG. 9G in response to user 9002 performing the first gesture B1 with right hand 9022 while left hand 9020 is in state A1, as indicated in FIG. 9G. In response to the first gesture 1 performed with right hand 9022 while left hand 9020 is in state A1, an operation is performed outside the email application. In this example, maintaining the left hand 9020 in state A1 (e.g., maintaining a pinch gesture) when the first gesture B1 is performed with the right hand 9022, causes the first gesture B1 to be construed as an instruction, command or request to perform an operation (e.g., a second operation) outside the email application as opposed to in the email application, which is the currently active application. In some embodiments, the operation performed in response to first gesture B1, while the left hand 9020 is maintained in state A1, corresponds to switching to another application (optionally an application that is already launched), e.g., switching to the next open application (e.g., optionally open applications are ordered in a sequence, for example, based on the last time user 9002 interacted with the respective open applications). For example, as illustrated in FIG. 9H, in response to first gesture B1, while the left hand 9020 is maintained in state A1, application user interface 9050 of a messages application replaces application user interface 9030 of the email application in view of the three-dimensional environment 9000'.

In some embodiments, if user 9002 performs a second gesture B2 (different from first gesture B1) with right hand 9022 while left hand 9020 is in state A1, the computer system 101 construes that gesture as an instructions, command or request to switch to another application that is different from the messages application. For example, if the second gesture B2 corresponds to a secondary air pinch gesture different from first gesture B1, such as a single-finger air pinch (e.g., pinching a middle finger and a thumb finger followed by a release of the pinch) performed with right hand 9022 while left hand 9020 maintains a single-finger air pinch gesture (e.g., pinching an index finger and a thumb finger without release), the computer system 101 moves backward (as opposed to forward) in the sequence of open applications. In accordance with this example, in the context of FIG. 9G, detecting a second gesture B2 with right hand 9022 while left hand 9020 is in state A1 causes the computer system 101 to display the user interface of a third application, different from the email application and messages application, in the view of the three-dimensional environment 9000'.

Additional descriptions regarding FIGS. 9A-9H are provided below in reference to method 1300 described with respect to FIG. 13.

FIGS. 10A-10F illustrate example techniques for switching between navigating within one application hierarchy level to navigating between different application hierarchy levels of a user interface visible in a three-dimensional environment. FIG. 14 is a flow diagram of an exemplary method 1100 for switching between navigating within one application hierarchy level to navigating between different application hierarchy levels of a user interface visible in a three-dimensional environment. The user interfaces in FIGS. 10A-10F are used to illustrate the processes described below, including the processes in FIG. 14.

The techniques described herein in relation to FIGS. 10A-10F and method 1400 (e.g., described in FIG. 14), relate to an accessibility mode for people with visual impairments that is sometimes referred to as a "read aloud" mode, in which verbal description of virtual objects (e.g., user interfaces and user interface elements) is provided in response to navigation gestures (e.g., navigation gestures that disambiguate between navigation within one hierarchy level (e.g., of a user interface of an application) and navigation between different hierarchy levels (e.g., of the user interface of the application)).

Figure 10A:
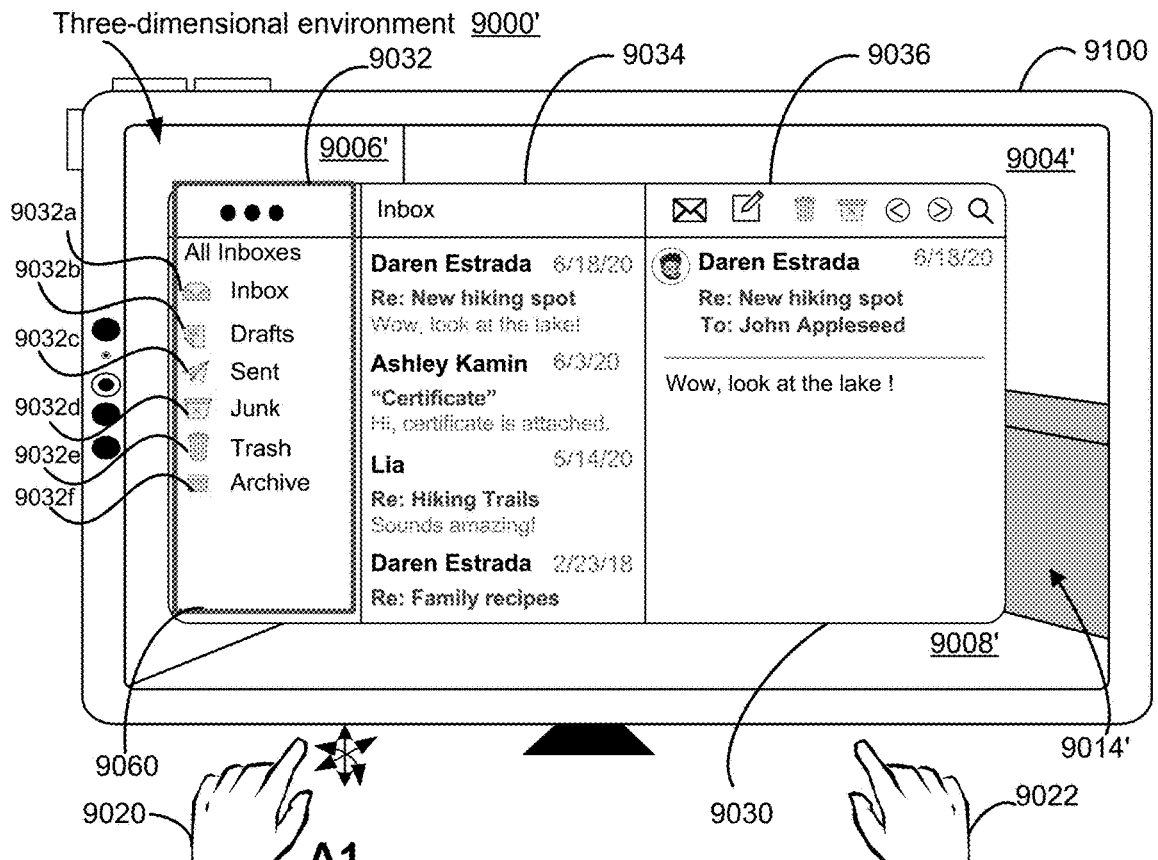

FIG. 10A illustrates a view of a three-dimensional environment 9000' that is visible to user 9002 via display generation component 9100 of computer system 101. The physical environment that is partially displayed in FIG. 10A, in the view of the three-dimensional environment 9000', is the same as the physical environment that is described in relation to FIG. 9A above. As described herein, in some embodiments, one or more portions of the view of physical environment 9000 that is visible to user 9002 via display generation component 9100 are virtual passthrough portions that include representations of corresponding portions of physical environment 9000 captured via one or more image sensors of computer system 101. In some embodiments, one or more portions of the view of physical environment 9000 that is visible to user 9002 via display generation component 9100 are optical passthrough portions, in that user 9002 can see one or more portions of physical environment 9000 through one or more transparent or semi-transparent portions of display generation component 9100. As described above with reference to FIG. 9B, the view of the three-dimensional environment 9000' includes an application user interface 9030 of an email application; the user interface 9030 is divided into three sections, including a first section 9032 that lists inboxes (or electronic folders that store emails), a second section 9034 that lists emails for a respective inbox selected from the first section 9032, and a third section 9036 for displaying content of a selected email from the second section 9034. In some embodiments, the first section 9032, the second section 9034, and the third section 9036 are part of the same application hierarchy, but at different hierarchy levels. In some embodiments, email inbox 9032*a*, drafts folder 9032*b*, sent folder 9032*c*, junk folder 9032*d*, trash folder 9032*e*, and archive folder 9032*f* are part of the same application hierarchy level (e.g., a folders level), which corresponds to the first section 9032.

In FIG. 10A, a focus selector 9060 (sometimes called a focus indicator) is positioned on or located at first section 9032, as indicated by the selection outline displayed around first section 9032 of application user interface 9030. In some embodiments, the screen-reader application is enabled on computer system 101. When screen-reader application is enabled and user interface 9030 is traversed or navigated through, the screen-reader application generates and outputs descriptions of user interface elements through which the focus selector 9060 moves. In some embodiments, the screen-reader application interprets visual layout and user interface elements of application user interface 9030 as a hierarchy of elements that are navigable or traversable.

FIG. 10A further illustrates user 9002 performing a first gesture A1 with left hand 9020 (shown with arrows in FIG. 10A) while right hand 9022 is in state B0. For example, the first gesture A1 performed with left hand 9020 corresponds to a single-finger air pinch (e.g., pinching an index finger and a thumb finger) and the state B0 corresponds to a ready state. In some embodiments, right hand 9022 is not performing any gesture that is recognized by computer system 101 or right hand 9022 is out of field of view of user 9002.

Figure 10B:
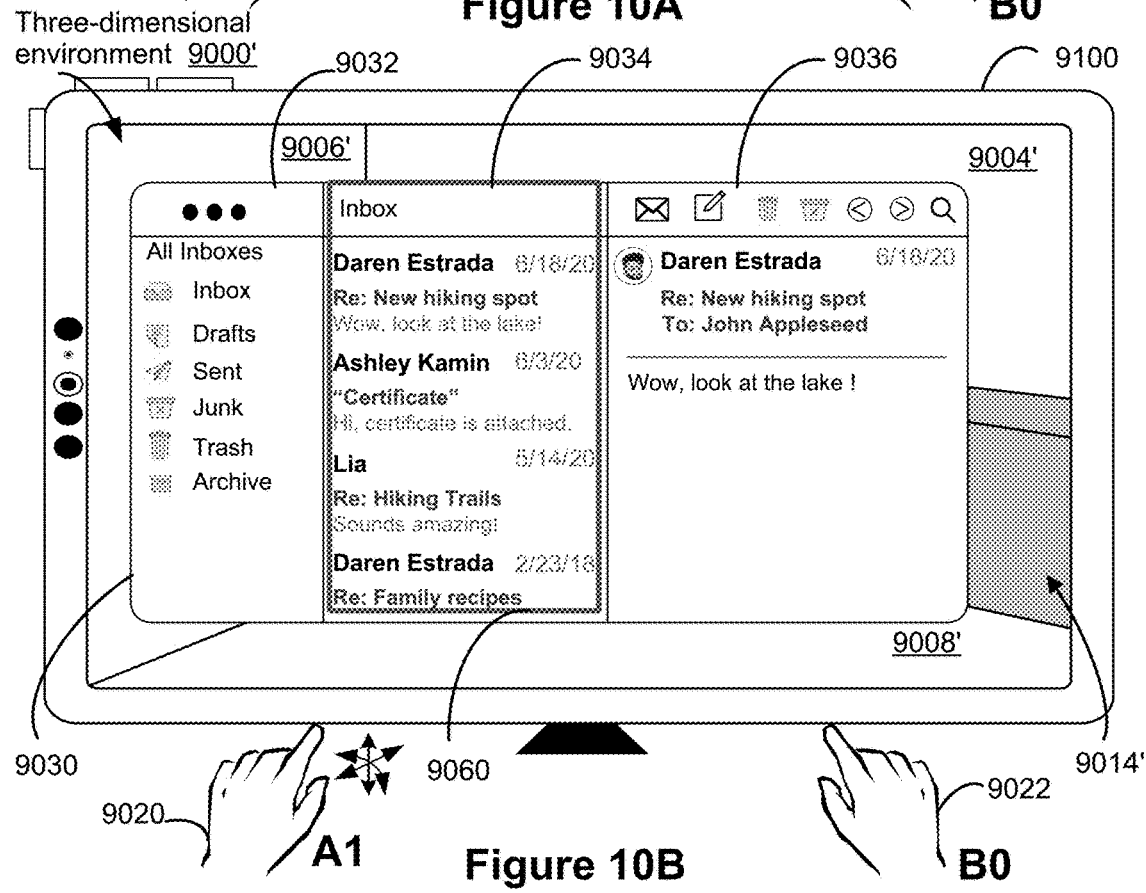

FIG. 10B illustrates a transition from FIG. 10A in response to user 9002 performing a first gesture A1 with left hand 9020 while right hand 9022 is in state B0, as indicated by left hand 9020, shown with arrows, and right hand 9022, shown without arrows, in FIG. 10A. In response to the first gesture A1 performed with left hand 9020 while right hand 9022 is in state B0, the focus selector 9060 is moved forward (e.g., in a first direction) from the first section 9032 (e.g., folder pane) to the second section 9034 (e.g., inbox pane) of application user interface 9030, as indicated by the selection outline displayed around second section 9034. In some embodiments, an audio description (e.g., spoken description) of the second section 9034 (e.g., inbox pane) is generated and output by computer system 101. In some embodiments, the audio description is output from a simulated location in the view of the three-dimensional environment 9000' that corresponds to the section 9034. Since the first gesture A1 is performed with the left hand 9020 as opposed to the right hand 9022, the focus selector 9060 moves forward within the same application hierarchy, where the first section 9032, the second section 9034, and the third section 9036 are part of the same application hierarchy level. In some embodiments, if the gesture performed with left hand 9020 corresponds to a second gesture A2 (e.g., a single-finger air pinch gesture, such as pinching a middle finger and a thumb finger), which is different from first gesture A1, the focus selector 9060 moves backward within the same hierarchy level, e.g., from the first section 9032 to the last section 9036.

In some embodiments, if user 9002 performs an air gesture B1 with right hand 9022 (instead of left hand 9020) while left hand 9020 is in state A0, which corresponds to a ready state (e.g., with no gesture being performed by left hand 9020), or left hand 9020 is out of the field of view of user 9002 (or out of view of one or more cameras of computer system 101), focus selector 9060 is moved one application hierarchy level down from the first section 9032 to inbox 9032*a* (e.g., in a depth-first tree traversal order). In some embodiments, an audio description (e.g., spoken description) of inbox 9032*a* is generated and output by computer system 101 in response to focus selector 9060 moving to (or being moved to) inbox 9032*a*. In some embodiments, the audio description is output from a simulated location in the view of the three-dimensional environment 9000' that corresponds to the inbox 9032*a*. Subsequent air pinch gestures performed with left hand 9020 (e.g., pinching an index finger and a thumb finger) navigate forward and/or backward within user interface elements of first section 9032. For example, focus selector 9060 would be moved forward from email inbox 9032*a* to drafts folder 9032*b*, sent folder 9032*c*, junk folder 9032*d*, trash folder 9032*e*, and archive folder 9032*f*. In some embodiments, gestures with left hand 9020 are used to cycle through user interface elements of the same (e.g., current) hierarchy level.

FIG. 10B further illustrates user 9002 performing the first gesture A1 with left hand 9020 (shown with arrows in FIG. 10B) while right hand 9022 is in state B0. For example, the first gesture A1 performed with left hand 9020 corresponds to a single-finger air pinch (e.g., pinching an index finger and a thumb finger) and the state B0 corresponds to a ready state (e.g., with no gesture being performed by right hand 9022), or right hand 9022 being out of field of view of user 9002 (or out of view of one or more cameras of computer system 101. In other words, as user 9002 performs same gesture as in FIG. 10A, the computer system 101 proceeds to move the focus selector 9060 to the next section at the same application hierarchy level as the current application hierarchy level.

FIG. 10C (e.g., FIGS. 10C1, 10C2 and 10C3, where a user interface analogous to the user interface described in FIG. 10C3 is shown on HMD 7100*a* in FIG. 10C1) illustrates a transition from FIG. 10B in response to user 9002 performing the first gesture A1 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) with left hand 9020 while right hand 9022 is in state B0, as indicated by left hand 9020, shown with arrows, and right hand 9022, shown without arrows, in FIG. 10B. In response to the first gesture A1 performed with left hand 9020 while right hand 9022 is in state B0, the focus selector 9060 is moved forward (e.g., in a first direction) from the second section 9034 (e.g., inbox pane) to the third section 9036 (e.g., message pane), as indicated by the selection outline displayed around the third section 9036. In some embodiments, an audio description (e.g., spoken description) of the third section 9036 (e.g., message pane) is generated and output. In some embodiments, the audio description is output from a simulated location in the view of the three-dimensional environment 9000' that corresponds to the third section 9036. Since the first gesture A1 is performed with the left hand 9020 as opposed to the right hand 9022, the focus selector 9060 moves forward (e.g., in the first direction) within the application hierarchy level that includes the first section 9032, the second section 9034, and the third section 9036. In some embodiments, if the first air gesture performed with left hand 9020 corresponds to a second gesture (e.g., a single-finger air pinch, such as pinching a middle finger and a thumb finger), which is different from the first gesture A1, the focus selector 9060 moves backward (e.g., in a second direction) within the same hierarchy level, e.g., from the second section 9034 back to the first section 9032.

FIG. 10C further illustrates user 9002 performing an air gesture B1 (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) with right hand 9022 (instead of left hand 9020) while left hand 9020 is in state A0, which corresponds to a ready state e.g., with no gesture being performed by left hand 9020, or left hand 9020 is out of field of view of user 9002 (or out of view of one or more cameras of computer system 101).

FIG. 10D illustrates a transition from FIG. 10C in response to user 9002 performing the gesture B1 with right hand 9022 (instead of left hand 9020) while left hand 9020 is in state A0, as indicated by right hand 9022, shown with arrows, and left hand 9020, shown without arrows, in FIG. 10C. In response to the gesture B1 performed with right hand 9022, the focus selector 9060 is moved to a different application hierarchy level, from the third section 9036 to control 1010 for creating a new email (e.g., in a depth-first tree traversal order).

FIG. 10D further illustrates user 9002 performing the first gesture A1 with left hand 9020 (shown with arrows in FIG. 10D) while right hand 9022 is in state B0. For example, the first gesture A1 performed with left hand 9020 corresponds to a single-finger air pinch (e.g., pinching an index finger and a thumb finger) and the state B0 corresponds to a ready state, e.g., with no gesture being performed by right hand 9022, or right hand 9022 being out of field of view of user 9002 (or out of view of one or more cameras of computer system 101. In other words, in FIG. 10D, user 9002 performs a gesture for moving forward (e.g., in the first direction) to next user interface element in the same application hierarchy level as a current application hierarchy level.

Figure 10E:
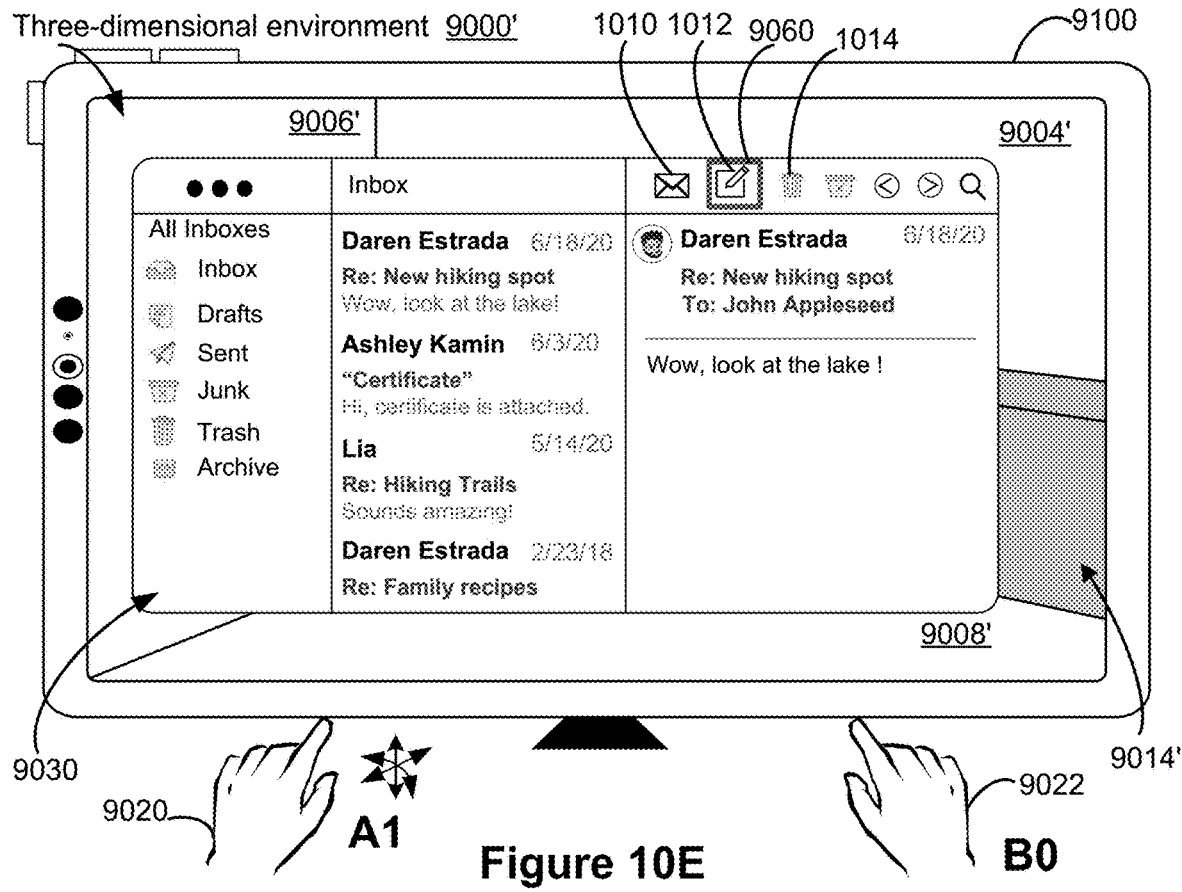

FIG. 10E illustrates a transition from FIG. 10D in response to user 9002 performing the first gesture A1 with left hand 9020 while right hand 9022 is in state B0, as indicated by left hand 9020, shown with arrows, and right hand 9022, shown without arrows, in FIG. 10D. In response to the first gesture A1 performed with left hand 9020 while right hand 9022 is in state B0, the focus selector 9060 is moved forward (e.g., in the first direction) from control 1010 for creating email to control 1012 for editing the currently selected email displayed in the third section 9036, as indicated by the selection outline displayed around the control 1012. In some embodiments, an audio description (e.g., spoken description) of control 1012 is generated and output when control 1012 becomes in focus, as indicated by the movement of (or positioning of) focus selector 9060 to control 1012. In some embodiments, the audio description is output from a simulated location in the view of the three-dimensional environment 9000' that corresponds to control 1012 (e.g., the simulated location is the location of the control 1012 in the view of the three-dimensional environment 9000'). Since the first gesture A1 is performed with the left hand 9020 as opposed to the right hand 9022, the focus selector 9060 moves forward (e.g., in the first direction) within the application hierarchy level that includes control 1010, control 1012, and control 1014. In some embodiments, if the first air gesture performed with left hand 9020 corresponds to a single-finger air pinch A2 (e.g., pinching a middle finger and a thumb finger), which is different from air pinch A1, the focus selector 9060 moves backward (e.g., in the second direction) within the same (e.g., current) hierarchy level, e.g., from the control 1012 back to control 1010.

FIG. 10E further illustrates user 9002 again performing the first gesture A1 with left hand 9020 (shown with arrows in FIG. 10D) while right hand 9022 is in state B0. For example, the first gesture A1 performed with left hand 9020 corresponds to a single-finger air pinch (e.g., pinching an index finger and a thumb finger) and the state B0 corresponds to a ready state, no gesture being performed, or right hand 9022 being out of field of view of user 9002 (or out of view of one or more cameras of computer system 101. In other words, as user 9002 performs the same gesture as in FIG. 10D (or a similar gesture).

Figure 10F:
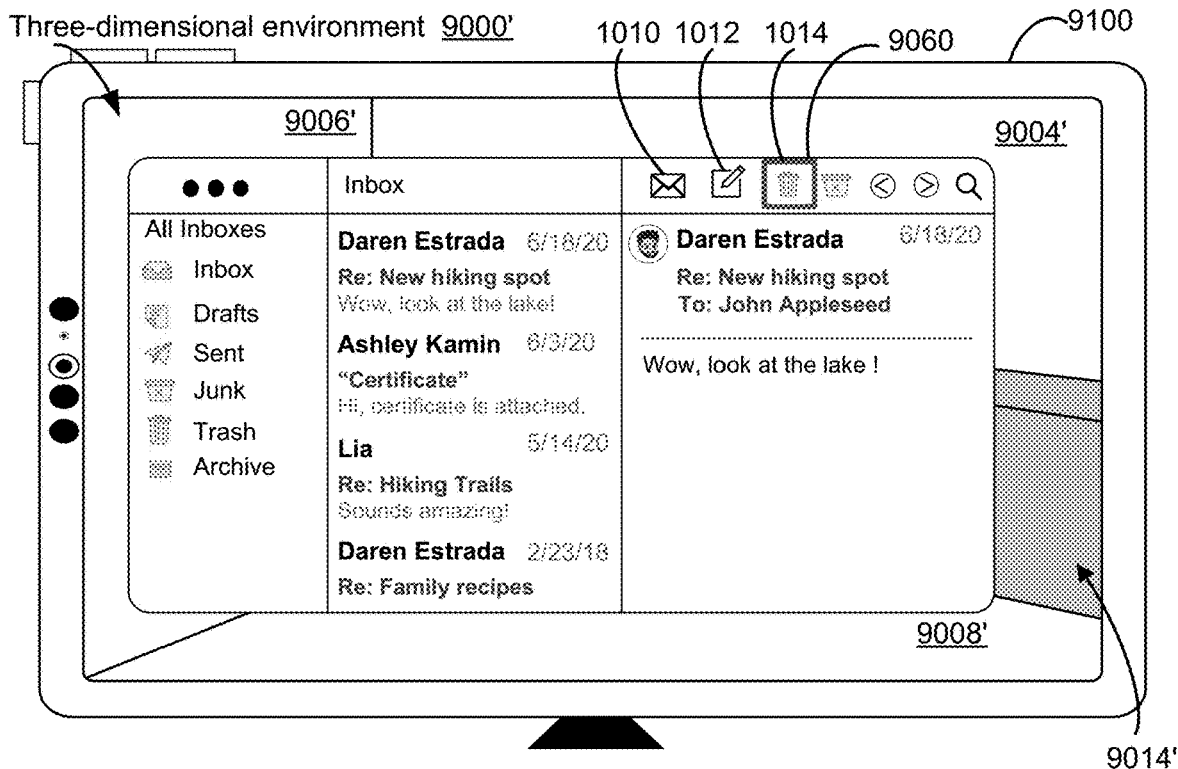

FIG. 10F illustrates a transition from FIG. 10E in response to user 9002 performing the first gesture A1 with left hand 9020 while right hand 9022 is in state B0, as indicated by left hand 9020, shown with arrows, and right hand 9022, shown without arrows, in FIG. 10D. In response to the first gesture A1 performed with left hand 9020 while right hand 9022 is in state B0, the focus selector 9060 is moved forward (e.g., in the first direction) from control 1012 for editing currently selected email to control 1014 for deleting currently selected email, as indicated by the selection outline displayed around the control 1012. In some embodiments, an audio description (e.g., spoken description) of control 1014 is generated and output when control 1014 becomes in focus. In some embodiments, the audio description is output from a simulated location in the view of the three-dimensional environment 9000' that corresponds to control 1014 (e.g., the simulated location is the location of the control 1014 in the view of the three-dimensional environment 9000'). Since the first gesture A1 is performed with the left hand 9020 as opposed to the right hand 9022, the focus selector 9060 moves forward (e.g., in the first direction) within the same (e.g., current) application hierarchy level that includes control 1010, control 1012, and control 1014. In some embodiments, if the first air gesture performed with left hand 9020 corresponds to a single-finger air pinch A2 (e.g., pinching a middle finger and a thumb finger), which is different from air pinch A1 (e.g., a different set of fingers), the focus selector 9060 moves backward (e.g., in the second direction) within the same (e.g., current) hierarchy level as a current application hierarchy level, e.g., from the control 1014 back to control 1012.

Additional descriptions regarding FIGS. 10A-10F are provided below in reference to method 1400 described with respect to FIG. 14.

FIG. 11 is a flow diagram of a method 1100 for magnifying virtual and real content in a three-dimensional environment, in accordance with some embodiments. Method 1100 is performed at a computer system (e.g., computer system 101 in FIG. 1A) including or in communication with a display generation component (e.g., display generation component 120 in FIGS. 1A, 3, and 4), e.g., a heads-up display, a head-mounted display (HMD), a display, a touch-screen, a projector, a tablet, a smartphone, or the like, and one or more input devices (e.g., one or more cameras, controllers, touch-sensitive surfaces, joysticks, buttons, or the like). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

While a view of a three-dimensional environment is visible via the display generation component, wherein the view of the three-dimensional environment includes one or more real objects and virtual content (e.g., as discussed above with reference to FIGS. 7B-7D), the computer system displays (1102), over at least a portion of the view of the three-dimensional environment, a magnifying region (e.g., a magnifying frame, window, or a 2D plane that enlarges, increases the size of or magnifies portions of the view of the three-dimensional environment where a user is focused on, where the focus of the user can be determined in a number of ways, such as at a location of a gaze, a cursor, location where a controller is pointing at, the user's field of view). The magnifying region (e.g., the magnifying region of virtual magnifier 7032 in FIG. 7C) includes a magnified version of a first portion of the three-dimensional environment that includes one or more real objects and virtual content. In some embodiments, the magnifying region magnifies both virtual and real-world content at the same time (e.g., virtual magnifier 7032 in FIG. 7E magnifies a portion of application user interface 7030 and physical ball 7028). In some embodiments, the first portion of the three-dimensional environments includes application content that includes, but is not limited to, one or more user selectable user interface elements that if selected cause the application to perform a respective function, or other application content such as images, text or video, or multimedia content that may or may not be interacted with, but does not necessarily trigger any actions to be performed by the respective application.

The computer system detects (1104) a request to magnify a second portion of the three-dimensional environment (e.g., the request to magnify the second portion corresponds to changing a position of a reference point to which the virtual magnifier 7032 is locked, as described with reference to FIGS. 7C-7E). In response to detecting the request to magnify the second portion of the three-dimensional environment, the computer system displays (1106), in the magnifying region, a magnified version of the second portion of the three-dimensional environment (e.g., second portion of the application user interface 7030 is displayed magnified in the virtual magnifier 7032 in FIG. 7D). For example, the magnified second portion of the three-dimensional environment is displayed in the magnifying region as the computer system continues to display a view of the three-dimensional environment, as shown, for example in FIG. 7D. The second portion of the three-dimensional environment is different from the first portion of the three-dimensional environment (e.g., the magnified first portion of the three-dimensional environment includes a first location in the three-dimensional environment, and the magnified second portion of the three-dimensional environment includes a second location in the three-dimensional environment that is not included in the magnified first portion). In some embodiments, the second portion of the three-dimensional environment includes one or more real objects and virtual content. For example, the second portion of the three-dimensional environment includes one or more real objects (e.g., physical ball 7028 displayed magnified in virtual magnifier 7032 in FIG. 7E) that correspond to portions of the physical environment that are visible via the display generation component (e.g., display generation component 7100 in FIGS. 7E), where the real-world objects are in the field of view of and captured by one or more cameras of the computer system.

In some embodiments, the virtual content and the real content that is visible via the display generation component is locked to the three-dimensional environment, such that as the magnifier is moved (e.g., by moving or changing position of a reference point), the content, virtual or real, remains locked or fixed at its original position in the three-dimensional environment. For example, as virtual magnifier 7032 is moved in the view of the three-dimensional environment 7000' from a first position in FIG. 7C, to a second position in FIG. 7D, and to a third position in FIGS. 7E, application user interface 7030 and physical ball 7028 remain fixed or anchored to their respective positions in the view of the three-dimensional environment 7000' (as illustrated in FIGS. 7C-7E). In some embodiments, the magnified version of content of the three-dimensional environment is displayed while continuing to display a view of the three-dimensional environment and without moving the content in the three-dimensional environment. In some embodiments, representations of the real-world objects are visible (e.g., displayed) via the display generation component (e.g., physical ball 7028 is visible in in the view of the three-dimensional environment 7000' as illustrated in FIG. 7D and a magnified version of physical ball 7028 is displayed in 7E). In some embodiments, the real-world objects themselves are visible via the display generation component (e.g., through a transparent or semi-transparent portion of the display generation component, or via a real-time representation of those objects as captured by one or more cameras). In some embodiments, virtual content is computer generated content that does not correspond to or is not a representation of one or more portions of the physical environment.

Magnifying respective portions of a three-dimensional environment that includes real content and virtual content, including magnifying both the real content and the virtual content in the respective portions, makes it easier to see the real content and the virtual content (especially content that is small and/or distant), thereby reducing the amount of time needed to select a target interaction location and perform an operation in the three-dimensional environment. These and other benefits of method 1100 are particularly important to help users with physical impairments, especially visual impairments, use the device.

In some embodiments, the second portion of the three-dimensional environment includes a first interactive element that is magnified in the magnifying region (e.g., a portion of application user interface 7030 that is magnified in virtual magnifier 7032 includes magnified version 7038' of control 7038 for initiating a video call, as illustrated in FIG. 7D), and the computer system detects a first input directed to the magnifying region. In some embodiments, the input is a touch input, a gaze input, an air gesture, an input via a controller, or any combination of a touch, a gaze input, input via the controller, and/or air gesture that is directed at a location in the view of the three-dimensional environment, and specifically in the magnifying region. In some embodiments, the magnifying region is displayed at a first distance from a viewpoint of a user that is closer than the portion of the three-dimensional environment that is shown as magnified in the magnifying region (e.g., virtual magnifier 7032 is displayed spaced apart from application user interface 7030 as illustrated in top view 7026 in FIGS. 7C-7E). For example, the magnifying region is displayed closer to the viewpoint of the user than the content, and the magnifying region is overlaying at least a portion of the content. In some embodiments, the first interactive element is a control (e.g., control 7038 for video calls, as shown in FIGS. 7B and 7D), menu item, button, link, search, or text field. In some embodiments, the first input directed to the magnifying region corresponds to a request for selection of an element. In some embodiments, the first input that is received corresponds to a scrolling input, optionally without a request for selection of an interactive element. In some embodiments, the first input is a drag input, optionally without selection of an interactive element.

In some embodiments, in response to detecting the first input directed to the magnifying region, in accordance with a determination that the first input is directed to the magnified first interactive element in the magnifying region (e.g., the input is directed at a portion of the magnifying region as opposed to the content that is being magnified), the computer system performs a first operation with respect to the first interactive element that corresponds to (e.g., is responsive to) the first input directed to the magnifying region. For example, the input directed to the magnified first interactive element is conveyed or forwarded to a program or other software associated with the first interactive element, and the input is processed using the program or software associated with the first interactive element. For example, in FIG. 7F, an input directed at magnified version 7038' of control 7038 for initiating a video call, is forwarded to control 7038 of application user interface 7030. In some embodiments, the user is enabled to interact directly with content displayed (e.g., magnified) within the magnifying region. Receiving inputs on the magnified version of content of a three-dimensional environment and conveying the received inputs to the underlying content for performing a respective operation in the three-dimensional environment makes it easier to interact with the content, as the magnified version of the content is easier to see and easier to interact with due to its increased size, thereby reducing the amount of time needed to perform an operation in the three-dimensional environment.

In some embodiments, in response to detecting the first input directed to the magnifying region, while the magnified version of the second portion of the three-dimensional environment is visible in the magnifying region, and in accordance with a determination that the first input directed to the magnifying region is directed to a first location in the magnified virtual content included in the magnified second portion of the three-dimensional environment, wherein the first location in the magnified virtual content does not include an interactive element, the computer system performs a second operation, distinct from the first operation, with respect to the second portion of the three-dimensional environment. For example, if, in FIG. 7F, a scrolling input in is directed at a message portion that is magnified in the virtual magnifier 7032 instead magnified version 7038' of control 7038, then the content of the message that is magnified would be scrolled. In some embodiments, the virtual content that is displayed in the second portion of the three-dimensional environment is scrollable and the input is a scrolling input, wherein the virtual content is scrolled, and a second portion of the virtual content is revealed by scrolling of the virtual content in response to the scrolling input. In some embodiments, the input is a drag input. Performing different operations in response to an input directed to the three-dimensional environment based on whether the input is directed to an interactive element or not causes the device to automatically perform an interaction that is appropriate for the target location of the input.

In some embodiments, the computer system detects a request to apply a filter overlay on the magnifying region. In some embodiments, in response to detecting the request to apply the filter overlay on the magnifying region and in accordance with a determination that the request includes a request to apply the filter overlay on a magnified version of virtual content in the magnifying region, the computer system applies the filter overlay on the magnified version of the virtual content in the magnifying region. For example, filter overlays can be applied to magnified content of application user interface 7030 that is displayed in the virtual magnifier 7032 in FIGS. 7B-7G. In some embodiments, the filter overlay can be applied to both virtual content and real content, just the virtual content, and/or just the real-world content. In some embodiments, applying the filter overlay includes applying different color filters, which can be applied to increase the visibility of particular content items or types of content. In some embodiments, applying the filter overlay includes displaying text in a color that contrasts with the rest of the three-dimensional environment, or at least one or more adjacent portions of the three-dimensional environment. While magnifying a respective portion of a three-dimensional environment that includes real content and virtual content, applying a visual filter overlay to at least the virtual content in the respective portion makes it easier to see the visual content, distinguish between different virtual content objects, and/or distinguish the virtual content from real content, thereby reducing the amount of time needed to select a target interaction location and perform an operation in the three-dimensional environment.

In some embodiments, applying the filter overlay on the magnified version of the virtual content included in the magnifying region includes one or more of: changing one or more colors of the magnified version of the virtual content; inverting one or more colors of the magnified version of the virtual content; and converting the magnified version of the virtual content from color to grayscale. In some embodiments, one or more user interface elements are presented to the user as options for changing the colors of the virtual content. In some embodiments, changing the colors of content helps users with low vision, who are color blind, and/or who have other visual impairments. In some embodiments, changing one or more colors of the magnified version of the virtual content includes recoloring of the virtual content, where virtual objects close to each other are colored with different and/or contrasting colors. In some embodiments, different color filters designed for specific types of visual impairment or colorblindness are applied. For example, the color filters optionally include a Red/Green Filter (e.g., for protanopia), a Green/Red Filter (e.g., for deuteranopia), and a Blue/Yellow Filter (e.g., for tritanopia). In some embodiments, a color filter applies a color hue, such as a reddish/pink hue that can help users with color sensitivity or light sensitivity. In some embodiments, different color filters can be used to match different vision requirements. In some embodiments, for inverting colors, colors of the virtual content are inverted into a preset combination of colors such as yellow and blue, white and blue, grayscale, or other color combinations with two or more colors. In some embodiments, for converting content to grayscale, applying the filter overlay includes changing all colors in a particular region of the display generation component (e.g., the virtual magnifier 7032) into varying shades of gray, white, and black. While magnifying a respective portion of a three-dimensional environment that includes real content and virtual content, applying a color changing filter overlay to at least the virtual content in the respective portion makes it easier to see the virtual content, distinguish between different virtual content objects, and/or distinguish the virtual content from real content (e.g., by avoiding displaying content in a color that a user is blind to, by increasing contrast for a user with impaired contrast sensitivity, and/or by decreasing brightness for a user with light sensitivity), thereby reducing the amount of time needed to select a target interaction location and perform an operation in the three-dimensional environment.

In some embodiments, in response to detecting the request to apply the filter overlay on the magnifying region (e.g., the magnified version of the first portion of the three-dimensional environment) and in accordance with a determination that the request includes a request to apply the filter overlay on a magnified version of a first real object of one or more real objects in the magnifying region, the computer system applies the filter overlay on the magnified version of the first real object of the one or more real objects included in the magnifying region. For example, filter overlays can be applied to the magnified version of physical ball 7028 that is displayed in the virtual magnifier 7032 in FIG. 7E. In some embodiments, the filter overlay is applied to both virtual content and real content, only the virtual content, or only the real-world content. While magnifying a respective portion of a three-dimensional environment that includes real content and virtual content, applying a visual filter overlay to the real content (e.g., in addition to the virtual content) in the respective portion makes it easier to see the real content, distinguish between different real content objects, and/or distinguish the real content from virtual content, thereby reducing the amount of time needed to select a target interaction location and perform an operation in the three-dimensional environment.

In some embodiments in which a filter overlay on the magnified version of the first real object, applying the filter overlay further includes applying the filter overlay on the magnified version of a second real object of the one or more real objects included in the magnifying region, and applying the filter overlay includes one or more of: changing one or more colors of the magnified version of the first real object and/or the second real object; inverting one or more colors of the magnified version of the first real object and/or the second real object; and displaying the magnified version of the first real object and/or the second real object in grayscale. For example, filter overlays can be applied to the magnified version of the representation 7028' of physical ball 7028 and to the magnified version of the representation 7014' of physical object 7014 that is displayed in the virtual magnifier 7032 (FIG. 7E). In some embodiments, the computer system changes one or more colors of the magnified version of the first real object and of the second real object in relation to one another, such as by changing one object to white and another one to yellow or blue, or other contrasting color combinations. For example, the magnified version of physical ball 7028 can be changed to one color, and the representation 7014' of physical object 7014 can be changed to another contrasting color (FIG. 7E). In some embodiments, the brightness of the colors of real objects is increased. In some embodiments, the edges of real-world objects are enhanced (e.g., sharpened and/or displayed with an outline). In some embodiments, contrast between the colors of one or more objects is increased. In some embodiments, colors of the first and second real world objects are inverted into a preset combination of colors such as yellow and blue, white and blue, grayscale, or other color combinations with two or more colors. While magnifying a respective portion of a three-dimensional environment that includes real content and virtual content, applying a color changing filter overlay to the real content (e.g., in addition to the virtual content) in the respective portion makes it easier to see the real content, distinguish between different real content objects, and/or distinguish the real content from virtual content (e.g., by overlaying, with a color that the user can see, content having (e.g., that would otherwise be displayed with) a color that a user is blind to, by increasing contrast for a user with impaired contrast sensitivity, and/or by decreasing brightness for a user with light and/or color sensitivity), thereby reducing the amount of time needed to select a target interaction location and perform an operation in the three-dimensional environment.

In some embodiments, the magnifying region is displayed at a first distance from a viewpoint of a user that is closer to the user than the portion of the three-dimensional environment that is shown as magnified in the magnifying region. In some embodiments, the magnifier region is spaced apart in the z-direction from the content visible in the three-dimensional environment that is being magnified. For example, virtual magnifier 7032 is displayed spaced apart from application user interface 7030 as illustrated in top view 7026 in FIGS. 7C-7E. Displaying a magnified version of content of a three-dimensional environment closer to the viewpoint of the user than the underlying content makes it easier to see the magnified content and provides visual feedback indicating to the user that the magnified version is distinct from the underlying content itself, thereby reducing the amount of time needed to select a target interaction location and perform an operation in the three-dimensional environment.

In some embodiments, the magnifying region includes a control for adjusting a magnification level of the magnifying region. In some embodiments, the control is a slide bar (e.g., slider 7034 in FIG. 7C). In some embodiments, the control is displayed within or near the magnification region. In some embodiments, adjusting the magnification level includes increasing or decreasing the zoom level. In some embodiments, a user input that adjusts the magnification level includes a hand gesture, a gaze, or a hand gesture in combination with a gaze. In some embodiments, a zoom level, or a magnifying scale of the magnifying region can be changed in response to a voice command, or in response to an air gesture that can be direct or indirect (e.g., without direct interaction with a user interface element). Displaying a control for adjusting the magnification level of a magnified version of content of a three-dimensional environment reduces the number and extent of inputs needed to change the magnification level to a desired level.

In some embodiments, the magnifying region has a first spatial relationship relative to a reference point that corresponds to (e.g., indicates) a first location in the three-dimensional environment. In some embodiments, the request to magnify the second portion of the three-dimensional environment includes detecting movement of the reference point to correspond to (e.g., to indicate) a second location in the three-dimensional environment. In some embodiments, in response to detecting the movement of the reference point, the computer system changes position of the magnifying region in accordance with the movement of the reference point and displays a magnified version of content (e.g., corresponding to the moved reference point) in the magnifying region without moving the one or more real objects and the virtual content in the three-dimensional environment. For example, as virtual magnifier 7032 is moved in the view of the three-dimensional environment 7000' from a first position in FIG. 7C, to a second position in FIG. 7D, and to a third position in FIGS. 7E, application user interface 7030 and physical ball 7028 remain fixed or anchored to their respective positions in the view of the three-dimensional environment 7000' (as illustrated in FIGS. 7C-7E). In some embodiments, the magnifying region is locked to a reference point, such as a viewpoint of a user or, alternatively, the orientation of a user's head (or head-mounted device, in embodiments where the computer system is a head-mounted device), a wrist, a hand (e.g., hand 7020 in FIGS. 7C-7E), a finger, a controller, or other reference point. In some embodiments, the magnifying region is reference point-locked when a computer system displays the magnifying region at the same location and/or position indicated by the reference-point, or with the same spatial relationship relative to the reference point, even as the reference-point shifts (e.g., changes) relative to the three-dimensional environment and/or relative to the user's viewpoint. In other words, the location and/or position at which the reference point-locked magnifying region is displayed in the viewpoint of the user is independent of the user's position and/or orientation in the physical environment. Magnifying a respective portion of a three-dimensional environment that corresponds to a particular reference point in the three-dimensional environment, including changing which portion of the three-dimensional environment is magnified as the location of the reference point changes (e.g., in response to user input) makes it easier to specify which content in the three-dimensional environment will be magnified without displaying additional controls.

In some embodiments, the reference point is a viewpoint of a user (e.g., viewpoint of user 7002 in FIG. 7A). In some embodiments, the magnifying region is viewpoint-locked when a computer system displays the magnifying region at the same location and/or position in the viewpoint of the user, even as the viewpoint of the user shifts (e.g., changes). In some embodiments in which the computer system is a head-mounted device, the viewpoint of the user is locked to the forward-facing direction of the user's head (e.g., the viewpoint of the user is at least a portion of the field-of-view of the user when the user is looking straight ahead); thus, the viewpoint of the user remains fixed even as the user's gaze is shifted without moving the user's head. Changing which portion of the three-dimensional environment is magnified as a reference point that is the viewpoint of the user is changed provides the user with control over which content in the three-dimensional environment will be magnified without displaying additional controls and reduces motion sickness by correlating what is displayed and magnified in the three-dimensional environment with the user's perspective.

In some embodiments, the reference point is a hand of a user or a wrist of the user (e.g., left hand 7020 or right hand 7022 in FIG. 7A). In some embodiments, the magnifying region can be locked to a moving portion of the user's body (e.g., a representation of portion of the user's body that moves independently of a viewpoint of the user, such as a user's hand, wrist, arm, or foot) so that the magnifying region is moved as a portion of the user's body moves to maintain a fixed relationship between the magnifying region and the portion of the user's body. For example, if virtual magnifier 7032 is locked to left hand 7020, then, as left hand 7020 moves in a rightward direction, the virtual magnifier 7032 moves in a rightward direction correspondingly as illustrated in FIGS. 7C-7E. Changing which portion of the three-dimensional environment is magnified as a reference point that is a part of the user's body (e.g., a hand or wrist) is changed provides the user with control, that can be as precise as the user's motor skills, over which content in the three-dimensional environment will be magnified without displaying additional controls. In some embodiments, low pass filtering is applied to the position of the portion of the user's body that is being used as a reference point, so as to smooth movement of the virtual magnifier 7032 and avoid or reduce movement of the virtual magnifier 7032 due to (e.g., in response to) inadvertent movements of the portion of the user's body that is being used as a reference point.

In some embodiments, the computer system detects a request to change a position of the magnifying region in relation to the reference point. In some embodiments, in response to detecting the request to change a position of the magnifying region in relation to the reference point, the computer system changes from the first spatial relationship of the magnifying region to the reference point to a second spatial relationship of the magnifying region to the reference point. Enabling the reference point to be moved relative to the magnified version of the content in the three-dimensional environment (e.g., in response to a predefined user gesture, such as maintaining one hand in a predefined state, for resetting the relative positions of the reference point and magnifying region, while moving the other hand to a new position, and then releasing the one hand from the predefined state), without changing which content is magnified, provides the user with flexibility and improved control over where and how the magnified version of content is displayed. In some embodiments, such improved control includes the ability to move the magnified version further away if the magnified version obscures the reference point, or closer to reduce how much the user needs to shift focus between the reference point and the magnified version, thereby reducing an amount of time needed to perform a particular operation on the device.

In some embodiments, aspects/operations of methods 1200, 1300, 1400, 1800, 1900, 2000, 2300, and 2400 may be interchanged, substituted, and/or added between these methods. For example, the method of magnifying virtual and real content in a three-dimensional environment as described in method 1100 is optionally used to assist visually impaired users with interacting with content in a mixed reality three-dimensional environment for methods 1200, 1300, 1400, 1800, 1900, 2000, 2300, and/or 2400. For brevity, these details are not repeated here.

FIG. 12 is a flow diagram of a method 1200 for selecting and interacting with a point in a three-dimensional environment using a ray and a selection cursor that moves along the ray, in accordance with some embodiments. In some embodiments, method 1200 is performed at a computer system (e.g., computer system 101 in FIG. 1A) including a display generation component (e.g., display generation component 120 in FIGS. 1A, 3, and 4) (e.g., a hardware element, comprising one or more display devices, such as a display, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

While a view of a three-dimensional environment is visible via the display generation component, the computer system receives (1202) one or more first user inputs (e.g., via a first input device, such as a first press of a button or switch, or a first voice input received via one or more microphones of the computer system) from a user corresponding to selection of a respective direction in the three-dimensional environment relative to a reference point associated with the user (e.g., toward one or more objects in the three-dimensional environment). In some embodiments, the reference point is a location of the viewpoint of the user, a location of an input device controlled by the user, a location of a portion of the user's body such as the user's eye(s), face, head, hand, finger, or fingertip, a location of an input such as of a touch on a touch-sensitive surface, or similar user-determined or user-controlled reference point). For example, as described herein with reference to FIGS. 8A-8C, one or more interaction inputs are performed such that ray 8008 extends in the direction shown in FIG. 8C (e.g., the one or more interaction inputs described in FIGS. 8A-8C stop the movement of ray 8008 when ray 8008 extends in the direction shown in FIG. 8C).

The computer system displays (1204), via the display generation component, a ray in the three-dimensional environment (e.g., automatically displaying the ray in response to ceasing to receive the one or more first user inputs selecting the respective direction or, alternatively, in response to receiving the one or more first user inputs) extending in the respective direction away from the reference point in the three-dimensional environment (e.g., extending toward the one or more objects in the three-dimensional environment). For example, in FIG. 8C, ray 8008 extends in environment 8000 away from a simulated position of user 7002. In some embodiments, the respective direction is specified using a three-dimensional coordinate system. For example, the respective direction has azimuth (or azimuthal angle) and altitude (or polar angle) coordinates relative to the reference point (e.g., the reference point being the origin of the spherical coordinate system), and the ray extends distally from the reference point (e.g., the viewpoint of the user) through the azimuth and altitude coordinates. In another example, the ray includes x-, y-, and/or z-component vectors specified relative to the reference point (e.g., the reference point being the origin of the Cartesian xyz-coordinate system).

While displaying the ray, the computer system displays (1206) a selection cursor moving along the ray independently of user input (e.g., the selection cursor moves along the ray automatically, without requiring user input to initiate or progress the movement of the selection cursor). In some embodiments, the movement of the selection cursor along the ray changes the distance between the selection cursor and the reference point associated with the user (e.g., the selection cursor moves further from or closer to the reference point gradually). In some embodiments, the movement of the selection cursor along the ray occurs while not detecting user input (e.g., of the type used to select the respective direction and/or stop the movement of the selection cursor), for example after detecting the one or more first user inputs corresponding to selection of the respective direction and before detecting the next user input. For example, as described herein with reference to FIGS. 8C-8E and 8K, cursor 8012 moves along ray 8008 independently of user input by user 7002.

When the selection cursor is at a respective position along the ray, the computer system receives (1208) one or more second user inputs (e.g., via the same first input device, such as a second press of the button or switch, or second voice input) corresponding to a request to stop the movement of the selection cursor along the ray. For example, as described herein with reference to FIGS. 8E and 8K, an interaction input by user 7002 corresponds to a request to stop the movement of cursor 8012 along ray 8008.

In response to receiving the one or more second user inputs corresponding to a request to stop the movement of the selection cursor (also herein collectively called a stop movement input), the computer system sets (1210) a target location for a next user interaction (e.g., a next input following the one or more second user inputs to stop the movement of the selection cursor) to a location in the three-dimensional environment that corresponds to the respective position of the selection cursor along the ray. In some embodiments, the target location for the next user interaction is set to the respective position of the selection cursor along the ray. In some embodiments, the target location for the next user interaction is set to a location near the respective position of the selection cursor along the ray, for example corresponding to one or more nearby objects in the three-dimensional environment (e.g., a location on a closest interactive object to the respective position of the selection cursor when the stop movement input is received). For example, in response to the interaction input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) of FIG. 8E, a target location corresponding to element E3 of application user interface 8006 (shown in FIG. 8F as interaction point 8016) is selected for the next user interaction. In another example, in response to the interaction input of FIG. 8K, a target location corresponding to speaker 8004 (shown in FIG. 8F as interaction point 8026) is selected for the next user interaction.

While displaying a ray extending from a reference point toward content in a three-dimensional environment, displaying a selection cursor that automatically moves along the ray independently of user input until user input is received to stop the movement of the selection cursor along the ray and set a corresponding target location for further user interaction reduces the number and extent of inputs needed to select a target location in three-dimensional space for user interaction. These and other benefits of method 1200 are particularly important to help users with physical impairments, especially motor impairments, use the device.

In some embodiments, the computer system displays the ray extending in the respective direction away from the reference point in the three-dimensional environment after ceasing to receive the one or more first user inputs selecting the respective direction (e.g., automatically, in response to ceasing to receive the one or more first user inputs selecting the respective direction). In some embodiments, after ceasing to receive the one or more first user inputs, the computer system continues to display the ray extending in the respective direction at least until a next user input interacting with the ray is received. For example, as described herein with reference to FIGS. 8D and 8K, cursor 8012 moves along ray 8008 after computer system 101 has ceased to detect the interaction input of FIG. 8C that selects the respective direction in which ray 8008 extends in FIGS. 8C-8E and 8K. Displaying the ray extending in a respective direction after ceasing to receive user input selecting the respective direction reduces the number and extent of inputs needed to select the ray direction, which is particularly important to help users with motor impairments use the device.

In some embodiments, while displaying the selection cursor moving along the ray independently of user input, the computer system displays a stop affordance that is activatable to stop the movement of the selection cursor along the ray, wherein the one or more second user inputs corresponding to the request to stop the movement of the selection cursor along the ray include an activation of the stop affordance. For example, as described herein with reference to FIGS. 8C-8E and 8K, stop affordance 8014 is displayed as cursor 8012 moves along ray 8008, and is activatable to stop the movement of cursor 8012 along ray 8008. Displaying a selectable stop affordance to stop the movement of the selection cursor along the ray provides visual feedback indicating how the movement of the selection cursor can be stopped in response to user input, and reduces the number of inputs needed to do so.

In some embodiments, prior to receiving the one or more first user inputs corresponding to selection of the respective direction, the computer system displays, via the display generation component, a direction indication in the three-dimensional environment extending away from the reference point in the three-dimensional environment and moving through a plurality of candidate directions including the respective direction (e.g., the direction indication moves to point in different directions in the three-dimensional environment over time, such as by sequentially scanning different portions of the three-dimensional environment. In some embodiments, two or more of the candidate directions, or all of the candidate directions, correspond to virtual content in the three-dimensional environment (e.g., different virtual content elements). In some embodiments, the virtual content or virtual content elements are displayed via the display generation component, but are not necessarily concurrently displayed, for example, depending on locations of the virtual content in the 3D environment and what portion(s) of the 3D environment are displayed within the view of the 3D environment at any one time). In some embodiments, the one or more first user inputs correspond to a selection input while the direction indication indicates the respective direction as a candidate direction. In some embodiments, the computer system displays, via the display generation component, the direction indication extending away from the reference point in the three-dimensional environment and moving through a plurality of candidate directions. Accordingly, as the direction indication moves through the plurality of candidate directions, the candidate direction currently being indicated by the direction indication when the one or more first inputs are received is selected as the respective direction for the ray. For example, in accordance with a determination that the one or more first user inputs corresponding to selection of the respective direction are received when the direction indication indicates a first direction of the plurality of candidate directions, the respective direction is the first direction; whereas, in accordance with a determination that the one or more first user inputs corresponding to selection of the respective direction are received when the direction indication indicates a second direction of the plurality of candidate directions, the respective direction is the second direction. For example, as described herein with reference to FIGS. 8A-8C, computer system 101 outputs a direction indication (e.g., ray 8008 or in some embodiments another form of indication) moving first horizontally and then vertically through a plurality of candidate directions, and, in response to user 7002 performing the interaction input of FIG. 8C, the movement of ray 8008 is stopped when ray 8008 extends in the direction shown in FIGS. 8C-8E and 8K. Automatically moving a direction indication through a plurality of candidate directions, and displaying the ray extending in the respective direction in response to user input occurring when (or in response to user input to stop the movement of the direction indication when) the direction indication indicates the respective direction reduces the number and extent of inputs needed to select the ray direction.

In some embodiments, the movement of the selection cursor along the ray begins (e.g., automatically) in response to receiving the one or more first user inputs corresponding to selection of the respective direction (e.g., the selection cursor is displayed and begins moving directly in response to receiving the one or more inputs corresponding to selection of the respective direction and/or without receiving additional input of the type used to select the respective direction (e.g., without receiving any additional input) once the one or more first user inputs selecting the ray direction are received). For example, as described herein with reference to FIG. 8C, cursor 8012 optionally begins moving automatically along ray 8008 in response to computer system 101 detecting the interaction input of FIG. 8C that stops the movement of ray 8008 and maintains ray 8008 extending in the direction shown in FIGS. 8C-8E and 8K. Automatically beginning to move the selection cursor along the ray in response to receiving user input selecting the respective direction in which the ray will extend reduces the number and extent of inputs needed to select a target location along the ray for user interaction.

In some embodiments, the direction indication extends away from the reference point while moving through the plurality of candidate directions (e.g., the direction indication is anchored at the reference point, and rotates about the reference point as the direction indication moves around in the three-dimensional environment. For example, as described herein with reference to FIGS. 8A-8C, ray 8008 optionally extends from a particular reference point in environment 8000, such as simulated position 7002' corresponding to user 7002 or simulated position 7100' of display generation component 7100, as ray 8008 moves through a plurality of candidate directions. When moving the direction indication through the plurality of candidate directions to select the respective direction for the ray, pivoting the direction indication around the same reference point from which the ray will extend causes the device to automatically provide a preview of how the ray will appear, thereby reducing the amount of time needed to select a ray direction.

In some embodiments, displaying the selection cursor moving along the ray independently of user input includes displaying the selection cursor moving through a plurality of intermediate locations (e.g., continuously moving) along the ray independently of user input. For example, as described herein with reference to FIG. 8C, the movement of cursor 8012 along ray 8008 is continual (e.g., continues to progress, whether smoothly and continuously or whether discretely). In some embodiments, the selection cursor progresses along the ray in discrete jumps and/or at regular intervals. In some embodiments, the selection cursor moves smoothly along the ray. In some embodiments, the selection cursor is displayed at a series of positions along the ray over time so as to appear to a user to be traveling continuously (e.g., moving smoothly) along the ray (e.g., taking into account user interface update intervals and refresh rate of the display generation component (e.g., 10 frames per second, 20 frames per second, 30 frames per second, or higher)). In some embodiments, the selection cursor is displayed at a series of positions along the ray over time so as to appear to a user to be traveling continuously (e.g., moving smoothly) along the ray (e.g., taking into account user interface update intervals and refresh rate of the display generation component and computer system). Thus, "smooth" movement of the selection cursor is a characteristic of the movement of the selection cursor from the perspective of the user, as the display generation component will generally have a finite update rate, and thus the selection cursor moves only the ray discretely to a series of intermediate locations as the displayed representation of the three dimensional environment is updated at the update rate. Moving the selection cursor (e.g., continually or continuously) along the ray reduces the number and extent of inputs needed to select a target location for user interaction from among different locations along the ray.

In some embodiments, in response to receiving the one or more second user inputs corresponding to the request to stop the movement of the selection cursor along the ray, the computer system displays one or more user interface elements representing one or more options for interacting with the target location (e.g., automatically without further user input beyond the one or more second user inputs corresponding to the request to stop the movement of the selection cursor, in combination with stopping the movement of the selection cursor). In some embodiments, a respective user interface element of the one or more user interface elements is activatable to perform a respective operation associated with the target location (e.g., a first user interface element is activatable to perform a first operation associated with the target location, and a second user interface element is activatable to perform a second operation associated with the target location). In some embodiments, each of the one or more user interface elements represents a different option for interacting with the target location, and accordingly each is activatable to perform a different respective operation associated with the target location. For example, as described herein with reference to FIGS. 8F, computer system 101 displays interaction options 8018, 8020, and 8022 in response to detecting the interaction input (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) of FIG. 8E for stopping the movement of cursor 8012 along ray 8008. In another example, as described herein with reference to FIG. 8L, computer system 101 displays interaction options 8028 and 8030 in response to detecting the interaction input of FIG. 8K for stopping the movement of cursor 8012 along ray 8008. Automatically displaying one or more options for interacting with a target location selected from along the ray for interaction reduces the number and extent of inputs needed to interact with a target location in three-dimensional space.

In some embodiments, while displaying the ray, the computer system displays an interaction menu moving along the ray with the selection cursor. In some embodiments, movement of the interaction menu (e.g., occurring in combination with the movement of the selection cursor) changes the distance between the interaction menu and the reference point associated with the user (e.g., the interaction menu moves further from or closer to the reference point gradually). In some embodiments, the movement of the interaction menu along the ray occurs while not detecting user input (e.g., of the type used to select the respective direction and/or stop the movement of the selection cursor). In some embodiments, the interaction menu presents interaction options available for the ray and/or for the selection cursor moving along the ray (e.g., the interaction menu includes the stop affordance). For example, as described herein with reference to FIGS. 8C-8E and 8K, stop affordance 8014, which offers an interaction option for cursor 8012 as cursor 8012 moves along ray 8008, moves with cursor 8012. In some embodiments, the interaction menu dynamically changes, as the selection cursor moves along the ray, to present interaction options available for the current location of the selection cursor in the three-dimensional environment. For example, the interaction menu of FIG. 8F is optionally displayed when cursor 8012 is at or near interaction point 8016 (e.g., even in the absence of an interaction input to stop the movement of cursor 8012 at interaction point 8016) and changed to the interaction menu of FIG. 8L when cursor 8012 has reached or neared interaction point 8026 (e.g., even in the absence of an interaction input to stop the movement of cursor 8012 at interaction point 8026). Moving and/or updating a menu of one or more interaction options along with moving the selection cursor indicates where in the three-dimensional environment the selection cursor is currently positioned, thereby providing feedback about a state of the device.

In some embodiments, after receiving the one or more second user inputs, and while the target location for the next user interaction is set to the location in the three-dimensional environment that corresponds to the respective position of the selection cursor along the ray, the computer system receives an interaction input (e.g., a set of one or more inputs, optionally including one or more inputs via the same first input device, such as an additional press of the button or switch, or additional voice input). In some embodiments, in response to receiving the interaction input, the computer system performs in the three-dimensional environment a respective operation associated with the target location. In some embodiments, the respective operation is performed at and/or directed to the target location. For example, the interaction input of FIG. 8G, detected while interaction point 8016 is the target location selected for the next user interaction, and detected while "Tap" interaction option 8018 for interaction point 8016 is selected, causes performance of an operation associated with tapping on interaction point 8016, as shown in FIG. 8H. In another example, the interaction input of FIG. 8I, detected while "Scroll Down" option 8020 is selected for interaction point 8016, scrolls application user interface 8006 downward, as shown in FIG. 8J. In yet another example, an interaction input performed in the scenario of FIG. 8L, while interaction point 8026 is the target location selected for the next user interface and while "Tap" interaction option 8028 for interaction point 8026 is selected, would cause performance of an operation associated with tapping on interaction point 8026. Performing an operation interacting with a target location in the three-dimensional environment in response to user inputs selecting a respective direction from a plurality of candidate ray directions and a location along the ray reduces the number and extent of inputs needed to select and interact with a respective point in the three-dimensional environment.

In some embodiments, in accordance with a determination that the target location for the next user interaction is set to a first location in the three-dimensional environment, the respective operation is a first operation that is associated with the first location; and, in accordance with a determination that the target location for the next user interaction is set to a second location in the three-dimensional environment, wherein the second location is different from the first location, and the respective operation is a second operation that is associated with the second location. For example, while the target location for the next user interaction is set to interaction point 8016, as in FIGS. 8F-8G and 8I, the operation performed in response to a subsequent interaction input is an operation that is associated with interaction point 8016, whereas, while the target location for the next user interaction is set to interaction point 8026, as in FIG. 8L, the operation performed in response to a subsequent interaction input is an operation that is associated with interaction point 8026. In some embodiments, the first location is associated with a first set of one or more operations (e.g., a set of operations associated respectively with interaction options 8018, 8020, and 8022 (FIGS. 8F-8G and 8I)), and the respective operation is an operation selected from the first set of operations. In some embodiments, the second location is associated with a second set of one or more operations (e.g., a set of operations associated respectively with interaction options 8028 and 8030 (FIG. 8L)), the operations in the second set being different from the operations in the first set, and the respective operation is an operation selected from the second set of operations. In some embodiments, the interaction input is received while displaying a set of one or more user interface elements representing the available options for interacting with the target location (e.g., representing each of the first set of operations or each of the second set of operations). In some embodiments, the interaction input is received while a respective element in the set of user interface elements has focus (e.g., is selected, such as by highlighting, brightening, outlining, or otherwise visually emphasizing and/or distinguishing the respective element), and the respective operation that is performed is the operation represented by the respective element that has focus when the interaction input is received. In some embodiments, the computer system automatically changes which element has focus, giving focus to each element in the set of user interface elements in turn. Performing different operations for different target locations in the three-dimensional environment in response to user inputs selecting a respective direction from a plurality of candidate ray directions and a location along the ray enables selection and interaction with different points in the three-dimensional environment without displaying additional controls.

In some embodiments, in accordance with a determination that the interaction input is a first type of interaction input, the respective operation is a first operation associated with the target location; and, in accordance with a determination that the interaction input is a second type of interaction input that is different from the first type of interaction input, the respective operation is a second operation that is associated with the target location, and that is different from the first operation. In some embodiments, the type of interaction input received determines the type of operation performed with respect to the target location. For example, if the interaction input is a pinch or an air pinch, a first operation is performed with respect to the target location, whereas if the interaction input is a tap or an air tap, a second operation is performed with respect to the target location; optionally, if the interaction input is a pinch and drag or an air pinch and drag (also called herein an air pinch-slide), a third operation is performed with respect to the target location. In some embodiments, the type of interaction received determines which of multiple displayed user interface elements, representing different options for interacting with the target location, is selected (e.g., the first type of interaction input selects a first element of the multiple user interface elements, which results in performance of an operation represented by the first element, and the second type of interaction input selects a second element of the multiple user interface elements, which results in performance of an operation represented by the second element). Enabling a user to provide different types of inputs to cause performance of different operations for a currently selected target location is described in more detail herein with reference to FIGS. 8F-8J and 8L. Performing different operations for a target location in the three-dimensional environment in response to different types of user inputs enables different interactions with a respective point in the three-dimensional environment to be performed without displaying additional controls.

In some embodiments, the method is performed while a switch interaction mode of the computer system is enabled. In some embodiments, inputs (e.g., the one or more first user inputs, the one or more second user inputs, and/or the interaction input) are received via an assistive input device (e.g., a switch, microphone, camera, and/or other assistive input technology). In some embodiments, an assistive input device, also called an adaptive switch, is an input device other than a traditional keyboard or pointing device such as a mouse, finger, or stylus, and allows individuals with physical impairments to independently operate the computer system. Examples of assistive input devices include joysticks (e.g., which can assist with navigation around a displayed user interface), buttons (e.g., which can be pressed by a finger or hand, foot, chin, head, or other part of the user, and which may be configured to respond to lighter presses than traditional buttons), and/or mouthpieces (e.g., which can be operated by air (drawn out or blown in), by sound, and/or by biting). In some embodiments, assistive input devices are used to provide inputs to perform selection inputs, activation inputs, or other type of input. In some embodiments, the assistive input device is an external device that is not integrated with the computer system. In some embodiments, the computer system detects communication being established between the computer system and the assistive input device (e.g., detecting the assistive input device being connected to or otherwise brought into communication with the computer system). In some embodiments, communication between the computer system and the assistive input device is established via a wired (e.g., plugged in to a connector port on the computer system) or wireless connection (e.g., Bluetooth, Wi-Fi, RF, or other wireless protocol). In some embodiments, the switch interaction mode of the computer system is enabled (e.g., automatically) in response to detecting the communication being established between the computer system and the assistive input device. For example, as described herein, the features of FIGS. 8A-8L are optionally enabled while a switch interaction mode is enabled for computer system 101; the switch interaction mode is optionally enabled automatically in response to establishing communication between an assistive input device and computer system 101; and the interaction inputs of FIGS. 8A-8L are optionally received via the assistive input device. Enabling a switch interaction mode of the computer system, in which a target location in the three-dimensional environment is selected for interaction using ray and point scanning, upon detecting that an assistive input device is connected to the computer system, causes the device to automatically become configured to receive assistive and adaptive input when likely needed.

In some embodiments, aspects/operations of methods 1100, 1300, 1400, 1800, 1900, 2000, 2300, and 2400 may be interchanged, substituted, and/or added between these methods. For example, the method of selecting a target location and/or operation to be performed for a user interaction as described in method 1200 is optionally used to select interaction locations and/or operations to be performed for methods 1100, 1300, 1400, 1800, 1900, 2000, 2300, and/or 2400. For brevity, these details are not repeated here.

FIG. 13 is a flow diagram of a method 1300 of switching between interacting with an active application in a three-dimensional environment to performing an operation outside the active application, in accordance with some embodiments.

The techniques described herein in relation to method 1300 and FIG. 13 relate to an accessibility mode for people with visual impairments that is sometimes referred to as a "read aloud" mode, in which verbal description of virtual objects (e.g., user interfaces and user interface elements) is provided in response to navigation gestures (e.g., navigation gestures that disambiguate between navigation within a currently active application (e.g., application that has input focus) or navigation to another application (e.g., application that is inactive or without input focus)).

Method 1300 is performed at a computer system (e.g., computer system 101 in FIG. 1A) including or in communication with a display generation component (e.g., display generation component 120 in FIGS. 1A, 3, and 4), e.g., a heads-up display, a head-mounted display (HMD), a display, a touchscreen, a projector, a tablet, a smartphone, or the like, and one or more input devices (e.g., one or more cameras, controllers, touch-sensitive surfaces, joysticks, buttons, or the like). In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

While a view of a three-dimensional environment is visible via the display generation component, the computer system displays (1302), overlaid on the view of the three-dimensional environment, a user interface of a first application associated with the computer system (e.g., a messages application, an email application, a browser application, a camera application, a photos application, an entertainment or media application, such as a game application, video, television application, word processing application, and/or other application that is installed and can be accessed on the computer system). For example, application user interface 9030 of the email application is displayed overlaying the view of the three-dimensional environment 9000' (FIGS. 9B-9G).

In some embodiments, the user interface of the first application has a predetermined (e.g., preconfigured) hierarchical structure of user interface elements that comprise the user interface. For example, a window has toolbars, toolbars have buttons and/or dropdown menus, menus have sub-menus, and other user selectable elements; a web site has pages, and pages have headers, text paragraphs, forms, links, and other static and/or dynamic elements. In some embodiments, the structure can be represented with directed graphs that include nodes and edges that represent objects and abstract spatial relationships, and optionally object properties of virtual world content.

While displaying the user interface of the first application overlaid on the view of the three-dimensional environment (e.g., while the first application is active and in focus), the computer system detects (1304) a gesture performed with a first hand, wherein the gesture meets first gesture criteria. For example, the first air gesture A1 performed with left hand 9020 is detected in FIG. 9B. In some embodiments, the gesture is an indirect air gesture without a contact or direct interaction with a user interface element. For example, the air gesture is performed mid-air without a user touching a virtual user interface element (e.g., where a user touching a virtual user interface element comprises touching a location in physical space that corresponds to a location of the virtual user interface element in the three-dimensional environment) or a hardware control.

In some embodiments, the gesture is a "single-finger air pinch," a "multi-finger air pinch" gesture, an "air pinch-slide" gesture, or a secondary pinch gesture that are described above. Table 1 herein provides descriptions of available gestures that are mapped to corresponding commands, in accordance with some embodiments. Gestures for which no command is specified in Table 1 are gestures that, in this example, have not yet been mapped to a specific command

TABLE 1

| Gesture | Gesture description | Command |
| --- | --- | --- |
| "right index pinch" | A single-finger air pinch between an index finger and a thumb finger on the right hand | Move focus selector forward to a next user interface element (e.g., in a sequence of user interface elements) |
| "right middle pinch" | A single-finger air pinch between a middle finger and a thumb finger on the right hand | Move focus selector backward to a previous user interface element (e.g., in a sequence of user interface elements) |
| "right ring pinch" | A single-finger air pinch between a ring finger and a thumb finger on the right hand | Enable/Disable speech of a screen-reader application (e.g., toggle speech) |
| "left index pinch" | A single-finger air pinch between an index finger and a thumb finger on the left hand | Move focus selector forward to a next type of user interface element that can be navigated (e.g., next rotor option) |
| "left middle pinch" | A single-finger air pinch between a middle finger and a thumb finger on the left hand | Move focus selector backward to a previous type of user interface element that can be navigated (e.g., previous rotor option) |
| "left ring pinch" | A single-finger air pinch between a ring finger and a thumb finger on the left hand | Provide summary description of a respective user interface element |
| "right index middle pinch" | A multi-finger air pinch between an index finger and a middle finger, and a thumb finger on the right hand | Activate a primary option associated with a user interface element that is in focus |
| "right middle ring pinch" | A multi-finger air pinch between a middle finger and a ring finger, and a thumb finger on the right hand | Activate a secondary option associated with a user interface element that is in focus |
| "left index middle pinch" | A multi-finger air pinch between an index finger and a middle finger, and a thumb finger on the left hand | Move focus selector forward to a next element of a selected type of user interface elements (e.g., next item for a selected rotor option) |
| "left middle ring pinch" | A multi-finger air pinch between a middle finger and a ring finger, and a thumb finger on the left hand | Move focus selector backward to a previous element of a selected type of user interface elements (e.g., previous item for a selected rotor option) |
| "right index secondary pinch" | A secondary air pinch, where an air pinch between an index finger and a thumb finger on the right hand is performed (e.g., a pinch followed by a release) while an air pinch is maintained on the left hand (e.g., a pinch between an index finger and a thumb finger is maintained) | Switch focus to a next application (e.g., in a sequence of open applications) |
| "right middle secondary pinch" | A secondary air pinch, where an air pinch between a middle finger and a thumb finger on the right hand is performed (e.g., a pinch followed by a release) while an air pinch is maintained on the left hand (e.g., a pinch between an index finger and a thumb finger is maintained) | Switch focus to a previous application (e.g., in a sequence of open applications) |
| "right ring secondary pinch" | A secondary air pinch, where an air pinch between a ring finger and a thumb finger on the right hand is performed (e.g., a pinch followed by a release) while an air pinch is maintained on the left hand (e.g., a pinch between an index finger and a thumb finger is maintained) | Mute/Unmute |

TABLE 1-continued

| Gesture | Gesture description | Command |
|---|---|---|
| "left index secondary pinch" | A secondary air pinch, where an air pinch between an index finger and a thumb finger on the left hand is performed (e.g., a pinch followed by a release) while an air pinch is maintained on the right hand (e.g., a pinch between an index finger and a thumb finger is maintained) | Display a list of type of items/user interface elements that are available for navigation on a user interface |
| "left middle secondary pinch" | A secondary air pinch, where an air pinch between a middle finger and a thumb finger on the left hand is performed (e.g., a pinch followed by a release) while an air pinch is maintained on the right hand (e.g., a pinch between an index finger and a thumb finger is maintained) | Enable/Disable a function that hides a screen (or hides view of the three-dimensional environment) (e.g., toggle screen curtain) |
| "left ring secondary pinch" | A secondary air pinch, where an air pinch between a ring finger and a thumb finger on the left hand is performed (e.g., a pinch followed by a release) while an air pinch is maintained on the right hand (e.g., a pinch between an index finger and a thumb finger is maintained) | Launch a people detection function that provides sound, speech, or haptic feedback when people that are nearby are detected |
| "right index middle secondary pinch" | A secondary air pinch, where a multi-finger air pinch between an index and a middle finger and a thumb finger on the right hand is performed (e.g., a pinch followed by a release) while an air pinch is maintained on the left hand (e.g., a pinch between an index finger and a thumb finger is maintained | Perform a long press (e.g., to perform extra available functionality) |
| "right middle ring secondary pinch" | A secondary air pinch, where a multi-finger air pinch between a middle finger and a ring finger and a thumb finger on the right hand is performed (e.g., a pinch followed by a release) while an air pinch is maintained on the left hand (e.g., a pinch between an index finger and a thumb finger is maintained | Depending on active application perform one or more primary functions associated with the active application (e.g., answer/decline phone calls in the phone application; play/pause audio in a music application or video in a video application) |
| "left index middle secondary pinch" | A secondary air pinch, where a multi-finger air pinch between an index and a middle finger and a thumb finger on the left hand is performed (e.g., a pinch followed by a release) while an air pinch is maintained on the right hand (e.g., a pinch between an index finger and a thumb finger is maintained | Create a custom label for a user interface element (e.g., the custom label recognized and described by a screen-reader application) |
| "left middle ring secondary pinch" | A secondary air pinch, where a multi-finger air pinch between a middle finger and a ring finger and a thumb finger on the left hand is performed (e.g., a pinch followed by a release) while an air pinch is maintained on the right hand (e.g., a pinch between an index finger and a thumb finger is maintained | Launch a help menu |
| "right index pinch swipe up" | A pinch-slide gesture, where a pinch is performed between an index and a thumb finger of the right hand followed by movement of the right hand up while maintaining the pinch | Scroll Down |
| "right index pinch swipe down" | A pinch-slide gesture, where a pinch is performed between an index and a thumb finger of the right hand followed by movement of the right hand down while maintaining the pinch | Scroll Up |
| "right index pinch swipe left" | A pinch-slide gesture, where a pinch is performed between an index and a thumb finger of the | Scroll Left |

TABLE 1-continued

| Gesture | Gesture description | Command |
|---|---|---|
| | right hand followed by movement of the right hand left while maintaining the pinch | |
| "right index pinch swipe right" | A pinch-slide gesture, where a pinch is performed between an index and a thumb finger of the right hand followed by movement of the right hand right while maintaining the pinch | Scroll Right |
| "right middle pinch swipe up" | A pinch-slide gesture, where a pinch is performed between a middle and a thumb finger of the right hand followed by movement of the right hand up while maintaining the pinch | |
| "right middle pinch swipe down" | A pinch-slide gesture, where a pinch is performed between a middle and a thumb finger of the right hand followed by movement of the right hand down while maintaining the pinch | |
| "right middle pinch swipe left" | A pinch-slide gesture, where a pinch is performed between a middle and a thumb finger of the right hand followed by movement of the right hand left while maintaining the pinch | |
| "right middle pinch swipe right" | A pinch-slide gesture, where a pinch is performed between a middle and a thumb finger of the right hand followed by movement of the right hand right while maintaining the pinch | |
| "right ring pinch swipe up" | A pinch-slide gesture, where a pinch is performed between a ring and a thumb finger of the right hand followed by movement of the right hand up while maintaining the pinch | |
| "right ring pinch swipe down" | A pinch-slide gesture, where a pinch is performed between a ring and a thumb finger of the right hand followed by movement of the right hand down while maintaining the pinch | |
| "right ring pinch swipe left" | A pinch-slide gesture, where a pinch is performed between a ring and a thumb finger of the right hand followed by movement of the right hand left while maintaining the pinch | |
| "right ring pinch swipe right" | A pinch-slide gesture, where a pinch is performed between a ring and a thumb finger of the right hand followed by movement of the right hand right while maintaining the pinch | |
| "right index middle pinch swipe up" | A pinch-slide gesture, where a multi-finger pinch is performed between an index and a middle finger and a thumb finger of the right hand followed by movement of the right hand up while maintaining the pinch | |
| "right index middle pinch swipe down" | A pinch-slide gesture, where a multi-finger pinch is performed between an index and a middle finger and a thumb finger of the right hand followed by movement of the right hand down while maintaining the pinch | Read All (e.g., read a page from a cursor to bottom) |
| "right index middle pinch swipe left" | A pinch-slide gesture, where a multi-finger pinch is performed between an index and a middle finger and a thumb finger of the right hand followed by movement of the right hand left while maintaining the pinch | Escape |

TABLE 1-continued

| Gesture | Gesture description | Command |
|---|---|---|
| "right index middle pinch swipe right" | A pinch-slide gesture, where a multi-finger pinch is performed between an index and a middle finger and a thumb finger of the right hand followed by movement of the right hand right while maintaining the pinch | |
| "right middle ring pinch swipe up" | A pinch-slide gesture, where a multi-finger pinch is performed between a middle and a ring finger and a thumb finger of the right hand followed by movement of the right hand up while maintaining the pinch | |
| "right middle ring pinch swipe down" | A pinch-slide gesture, where a multi-finger pinch is performed between a middle and a ring finger and a thumb finger of the right hand followed by movement of the right hand down while maintaining the pinch | Read From Top (e.g., read a page from top to bottom) |
| "right middle ring pinch swipe left" | A pinch-slide gesture, where a multi-finger pinch is performed between a middle and a ring finger and a thumb finger of the right hand followed by movement of the right hand left while maintaining the pinch | |
| "right middle ring pinch swipe right" | A pinch-slide gesture, where a multi-finger pinch is performed between a middle and a ring finger and a thumb finger of the right hand followed by movement of the right hand right while maintaining the pinch | |
| "left index pinch swipe up" | A pinch-slide gesture, where a pinch is performed between an index and a thumb finger of the right hand followed by movement of the left hand up while maintaining the pinch | Copy Speech to Clipboard |
| "left index pinch swipe down" | A pinch-slide gesture, where a pinch is performed between an index and a thumb finger of the right hand followed by movement of the left hand down while maintaining the pinch | |
| "left index pinch swipe left" | A pinch-slide gesture, where a pinch is performed between an index and a thumb finger of the right hand followed by movement of the left hand left while maintaining the pinch | Move cursor out of a group of items |
| "left index pinch swipe right" | A pinch-slide gesture, where a pinch is performed between an index and a thumb finger of the right hand followed by movement of the left hand right while maintaining the pinch | Move cursor into a group of items |
| "left middle pinch swipe up" | A pinch-slide gesture, where a pinch is performed between a middle and a thumb finger of the left hand followed by movement of the right hand up while maintaining the pinch | |
| "left middle pinch swipe down" | A pinch-slide gesture, where a pinch is performed between a middle and a thumb finger of the left hand followed by movement of the right hand down while maintaining the pinch | |
| "left middle pinch swipe left" | A pinch-slide gesture, where a pinch is performed between a middle and a thumb finger of the left hand followed by movement of the right hand left while maintaining the pinch | |

TABLE 1-continued

| Gesture | Gesture description | Command |
|---|---|---|
| "left middle pinch swipe right" | A pinch-slide gesture, where a pinch is performed between a middle and a thumb finger of the left hand followed by movement of the right hand right while maintaining the pinch | |
| "left ring pinch swipe up" | A pinch-slide gesture, where a pinch is performed between a ring and a thumb finger of the left hand followed by movement of the right hand up while maintaining the pinch | |
| "left ring pinch swipe down" | A pinch-slide gesture, where a pinch is performed between a ring and a thumb finger of the left hand followed by movement of the right hand down while maintaining the pinch | |
| "left ring pinch swipe left" | A pinch-slide gesture, where a pinch is performed between a ring and a thumb finger of the left hand followed by movement of the right hand left while maintaining the pinch | |
| "left ring pinch swipe right" | A pinch-slide gesture, where a pinch is performed between a ring and a thumb finger of the left hand followed by movement of the right hand right while maintaining the pinch | |
| "left index middle pinch swipe up" | A pinch-slide gesture, where a multi-finger pinch is performed between an index and a middle finger and a thumb finger of the left hand followed by movement of the right hand up while maintaining the pinch | Copy |
| "left index middle pinch swipe down" | A pinch-slide gesture, where a multi-finger pinch is performed between an index and a middle finger and a thumb finger of the left hand followed by movement of the right hand down while maintaining the pinch | Paste |
| "left index middle pinch swipe left" | A pinch-slide gesture, where a multi-finger pinch is performed between an index and a middle finger and a thumb finger of the left hand followed by movement of the right hand left while maintaining the pinch | Undo |
| "left index middle pinch swipe right" | A pinch-slide gesture, where a multi-finger pinch is performed between an index and a middle finger and a thumb finger of the left hand followed by movement of the right hand right while maintaining the pinch | Redo |
| "left middle ring pinch swipe up" | A pinch-slide gesture, where a multi-finger pinch is performed between a middle and a ring finger and a thumb finger of the left hand followed by movement of the right hand up while maintaining the pinch | |
| "left middle ring pinch swipe down" | A pinch-slide gesture, where a multi-finger pinch is performed between a middle and a ring finger and a thumb finger of the left hand followed by movement of the right hand down while maintaining the pinch | |
| "left middle ring pinch swipe left" | A pinch-slide gesture, where a multi-finger pinch is performed between a middle and a ring finger and a thumb finger of the left hand | |

TABLE 1-continued

| Gesture | Gesture description | Command |
|---|---|---|
| | followed by movement of the right hand left while maintaining the pinch | |
| "left middle ring pinch swipe right" | A pinch-slide gesture, where a multi-finger pinch is performed between a middle and a ring finger and a thumb finger of the left hand followed by movement of the right hand right while maintaining the pinch | |

In response to detecting the gesture that meets the first gesture criteria (1306): in accordance with a determination that a second hand that is different from the first hand has a first configuration (e.g., while the first hand performs a "single-air pinch" or a "multi-air pinch" gesture, the second hand (e.g., opposite hand of the user), is not performing any gestures, but is maintained in the first configuration, or alternatively is held at a position that is out of view of the cameras of the computer system), the computer system performs (1308) a first operation in the first application. For example, in response to detecting the first air gesture A1 (e.g., "right index pinch") performed with left hand 9020 while right hand 9022 is not performing a gesture in FIG. 9B, the focus selector is moved forward to a next user interface element (e.g., the focus selector is moved forward from inbox 9032*a* to drafts 9032*b*). In some embodiments, the second hand may be outside the field of view of the camera(s) that capture the gesture performed with the first hand (e.g., the first configuration corresponds to the second hand being lowered near the side of the body). In some embodiments, even if the second hand is within the field of view of the camera(s), the second hand is in a hover or ready state without performing any air pinch or other gesture. In other words, in the embodiments in which the second hand is not engaged, the gestures performed with the first hand are interpreted as a single-air pinch gesture.

In some embodiments, the first operation performed in the first application includes navigating between user interface elements, including navigating or moving a focus selector forward or backward, left or right, up or down, and/or in or out (e.g., in the z-direction) between adjacent elements of the same hierarchy level or different hierarchy levels (e.g., navigating or switching between different elements in the hierarchy of user interface elements such as navigating between different headers, navigating between different tabs, navigating between sub-menu items that belong to the same menu item, navigating between different messages in a message application, navigating between different sub-folders that belong to the same folder, navigating between different emails within an inbox, navigating between sentences or lines within a static text, navigating between visual containers, navigating between links, navigating between different windows, and/or other navigation between user interface elements); selecting (e.g., as indicated in Table 1, activating a primary option or function of) a user interface element that is currently in focus or that is located at the cursor's position (e.g., in response to "right index middle pinch gesture"); or scrolling up or down, or left or right (e.g., as indicated in Table 1, in response to "right index pinch swipe up," "right index pinch swipe down," "right index pinch swipe left," and "right index pinch swipe right"). In some embodiments, the direction and/or magnitude of the operation is based on the direction and/or magnitude of the movement of the gesture-performing hand. For example, in the case of air pinch-slide gestures, the direction and/or magnitude of a scroll operation is based on the direction and/or magnitude of the movement of the same hand that performs the air pinch portion of the air pinch-slide gesture (e.g., an air pinch-upward slide, such as a right index pinch swipe up in Table 1, drags the user interface upward so as to scroll downward through content).

In response to detecting the gesture that meets the first gesture criteria (1306): in accordance with a determination that the second hand has a second configuration that is different from the first configuration, the computer system performs (1310) a second operation outside (e.g., independent of) the first application. For example, in response to detecting the first gesture A1 with left hand 9020 while right hand 9022 is in state B1 in FIG. 9D (e.g., in response to detecting a secondary air pinch gesture), the screen-reader application is invoked and user interface 9040 of the screen-reader is visible in the view of the three-dimensional environment 9000' (illustrated in FIG. 9E).

In some embodiments, the gesture that meets the first gesture criteria corresponds to a secondary air pinch gesture. For example, the first hand performing a "single-air pinch" or a "multi-air pinch" gesture, while the second hand (e.g., the opposite hand) maintains a static configuration (e.g., closed fist, hand open, hand closed but with one or more (but less than all) fingers unfolded, thumb and one or more opposing fingers touching, and/or other configuration of the hand, such as maintaining a single-air pinch or multi-air pinch gesture). For example, the secondary air pinch gesture, which corresponds to a single-air pinch or a multi-air pinch gesture, is performed using one hand while holding down an index-finger air pinch on the opposite hand. In some embodiments, while an index-finger air pinch of one hand is held down, all air pinches on the opposite hand are mapped to a secondary air pinch.

In some embodiments, the second operation is performed in the computer system (e.g. computer system 101) or in a second computer system that is in communication with the computer system. In some embodiments, the operation performed outside the first application corresponds to an operation performed in a screen reader application or program or other software that narrates or announces what is displayed at the location of a cursor or what is the content or user interface element that is currently in focus. For example, in response to detecting a "left index pinch" gesture, the focus selector is moved forward to a next type of setting in the screen-reader application that can be modified (illustrated in FIGS. 9E-9F). Optionally, the operations performed in the screen reader application include, but are not limited to, increasing or decreasing a speaking rate of the automatic audio that announces or describes the content in the user interface that is in focus (e.g., announces or describes a particular menu item, a heading, textual content, an image, and/or other type of content that may be in focus), increasing or decreasing the volume of the audio that is generated by the screen reader application, changing a voice used by the screen reader application (e.g., changing the gender of the voice, or from one type of voice to another type of voice of the same gender), turning on or off the screen reader application, pausing or muting the screen reader application, changing the language used by the screen reader application (e.g., from English to Spanish), activating a help menu of the screen reader application, accessing and/or changing navigation options of the screen-reader application, and/or other operations of the screen-reader application.

In some embodiments, the operation performed outside the first application is an operation for switching from the first application to another application that may be currently active or recently open (e.g., an application that is already launched and running or was recently open but is not in focus). For example, in response to user 9002 performing the first air gesture B1 with right hand 9022 while left hand 9020 is in state A1 (in FIG. 9G), application user interface 9050 of a messages application replaces application user interface 9030 of the email application in view of the three-dimensional environment 9000' (FIG. 9H). In some embodiments, the operation performed outside the first application is an operation that is performed in a second application that is different from the first application (e.g., a function within a second application is directly invoked with or without bringing the second application into focus). In some embodiments, the operation performed outside the first application is a system operation (e.g., an operation related to the system as a whole, such as turning the power off, updating the operating system or a particular application on the system, and/or other system operation). In some embodiments, the second operation includes searching for applications that are available to the computer system, accessing or changing settings of the computer system, installing, deleting, or updating an application or a plurality of applications on the computer system.

Where an operation is performed in response to a particular air gesture by a first hand, changing the location where the operation is performed (and accordingly which operation is performed, in some embodiments) based on the configuration of a different second hand enables a greater number of interactions with the computer system without requiring more extensive gestures and without displaying additional controls. These and other benefits of method 1300 are particularly important to help users with physical impairments, especially vision and/or motor impairments, use the device.

In some embodiments, the first operation in the first application includes: moving (a displayed or visual indication of) a focus indicator from a first element of a plurality of elements displayed in the user interface of the first application to a second element of the plurality of elements displayed in the user interface of the first application, and, in response to moving the focus indicator to the second element, an audio description of the second user interface element is generated. In some embodiments, the computer system outputs a description of the user element in the form of speech. For example, when user 9002 navigates from inbox 9032*a* to drafts folder 9032*b* in the email application (FIG. 9B), the computer system 101 generates and outputs an audio description of drafts folder 9032*b*. In some embodiments, the computer system may provide a description of the type of element, its name, and/or place in a sequence and/or hierarchy. Using an air gesture and/or hand configuration input to move a focus selector between elements in a displayed user interface, and correspondingly outputting an audio description of the element that currently has focus, enables contactless interaction with the computer system and provides feedback about a state of the device, thereby helping users with physical impairments, especially vision and/or motor impairments, use the device.

In some embodiments, the second operation outside the first application is a system operation. In some embodiments, the operation performed outside the first application is a system operation (e.g., an operation related to the system, such as turning the power off, updating the operating system or an application on the system, changing the volume, muting the audio, and/or other system operation, sometimes called an operating system operation). Performing a system operation outside of a displayed application user interface in response an air gesture and/or hand configuration input enables different interactions with the computer system without displaying additional controls.

In some embodiments, the second operation outside the first application is an operation in a second application. In some embodiments, the operation performed outside the first application is an operation that is performed in a second application that is different from the first application. For example, in response to detecting a "left index pinch" gesture, the focus selector is moved forward to a next type of setting in the screen-reader application, the next type of setting have a setting or value that can be modified (illustrated in FIGS. 9E-9F). In some embodiments, the function within the second application is directly invoked with or without bringing the second application into focus. In some embodiments, the second application is a screen-reader application. Optionally, the operations performed in the screen reader application include, but are not limited to, increasing or decreasing a speaking rate of the automatic audio that announces or describes the content in the user interface that is in focus (e.g., announces or describes a particular menu item, a heading, textual content, an image, and/or other type of content that is in focus), increasing or decreasing the volume of the audio that is generated by the screen reader application, changing a voice used by the screen reader application (e.g., changing the gender of the voice, or from one type of voice to another type of voice of the same gender), turning on or off the screen reader application, pausing or muting the screen reader application, changing the language used by the screen reader application (e.g., from English to Spanish), activating a help menu of the screen reader application, accessing and/or changing navigation options of the screen-reader application, and/or other operation of the screen-reader application. In response to an air gesture and/or hand configuration input, performing an operation in a second application that is different from a first application, even though a user interface of the first application is displayed while the air gesture and/or hand configuration input is detected, enables different interactions with the computer system without displaying additional controls.

In some embodiments, the first operation in the first application is selected based on a type of the gesture performed with the first hand. In some embodiments, the operation depends on whether the gesture is a single-finger air pinch gesture, a multi-finger air pinch, an air pinch-slide gesture, or a secondary air pinch gesture. For example, as illustrated in Table 1 above, a "right index pinch" corresponds to instructions to move a cursor to a next element in a sequence of user interface elements that are navigable; a "right middle pinch" corresponds to instructions to move a cursor to a previous element in the sequence; a "right ring pinch" corresponds to instructions to switch or toggle a speech function between an "on" state and an "off" state (e.g., "toggle speech") (e.g., turning on or off speech of a screen-reader application); a "left index pinch" corresponds to instructions to switch to a next rotor option in a sequence or list of rotor options; and a "left middle pinch" corresponds to instructions to switch to a previous rotor option (e.g., a type of navigable element), where a rotor option once selected allows a user to activate a search within a page or screen for instances of user interface elements that correspond to the selected rotor option. For example, a rotor option that corresponds to links, when selected, allows a user to move from link to link within a currently displayed page, window, document, user interface, or other screens. In some embodiments, a user can use a multi-finger air pinch to move through multiple instances of user interface elements that correspond to the selected rotor option. For example, using a "left index middle pinch," the user can move to the next link in a sequence of links, and using "left middle ring pinch," the user can move to previous link in the sequence of links. In another example, a rotor option that corresponds to buttons, when selected, allows a user to move from one button to the next within a currently displayed page, window, document, user interface, or other screen or display region. Further, a "left ring pinch" corresponds to instructions that cause the computer system to output audio providing a summary description of a currently active element. Further, an air pinch-slide gesture corresponds to a scrolling operation. For example, a "right index pinch swipe up" gesture corresponds to scrolling down; a "right index pinch swipe down" gesture corresponds to scrolling up; a "right index pinch swipe left" gesture corresponds to scrolling left; and a "right index pinch swipe right" gesture corresponds to scrolling right. In some embodiments, different hand configurations (e.g., closed fist, hand open, hand closed but with one or more (but less than all) fingers unfolded, thumb and one or more opposing fingers touching, and/or other configuration of the hand) can be mapped to different operations. Performing different operations associated with a particular target of an input in response to different types of user inputs enables a greater number of different interactions with the computer system without displaying additional controls.

It is to be understood that the gesture examples in Table 1 and in described above are examples. In some embodiments one or more of the listed gestures are optionally mapped to different commands or operations than the ones shown in Table 1 and/or described herein, and further one or more the commands or operations shown in Table 1 and/or described herein are optionally performed in response to different gestures than the ones shown in Table 1 and/or described herein.

In some embodiments, the first operation in the first application is selected based on a location to which the gesture performed with the first hand was directed (e.g., to a location to which the user's attention was directed and/or a location of a focus selector displayed in the user interface of the first application). For example, if the gesture performed with the first hand is directed to a first location, an operation associated with the first location is performed, whereas if the gesture performed with the first hand is directed to a different second location, an operation associated with the second location is performed (which in some embodiments or circumstances is a different operation than the operation associated with first location). For example, if focus selector 9060 (sometimes called a focus indicator) is located at control 1010 when a "right index middle pinch" is detected in FIG. 10F, then a new email is created, and if the focus selector 9060 is located at control 1014 when a "right index middle pinch," then currently selected email that is displayed in the third section 9036 is deleted. Performing different operations in response to an input directed to the three-dimensional environment based on the location to which at least part of the input is directed causes the device to automatically perform an interaction that is appropriate for the target of the input.

In some embodiments, in response to detecting the gesture performed with the first hand: in accordance with a determination that a thumb finger of the first hand touches a first finger of the first hand, the computer system moves a focus indicator forward in a sequence (e.g., a sequence of entities, examples of which are a sequence of objects in an application user interface, or a sequence of applications open or recently open on the computer system); and, in accordance with a determination that the thumb finger of the first hand touches a second finger of the first hand, the computer system moves the focus indicator backward in the sequence. In some embodiments, a cursor can be moved forward or backward in a sequence of elements, objects, applications, and/or other virtual content by touching a thumb finger of the first hand to a different finger of the first hand. For example, a "right index pinch" corresponds to instructions to move a cursor to a next element in a sequence of user interface elements that are navigable, e.g., in response to detecting "right index pinch" in FIG. 9B, the focus indicator moves forward from inbox 9032a to drafts folder 9032b, as illustrated in FIGS. 9B-9C. And, a "right middle pinch" corresponds to instructions to move a cursor to a previous element in the sequence, e.g., in response to detecting "right middle pinch" in FIG. 9C, the focus indicator moves backward from drafts folder 9032b to inbox 9032a, as illustrated in FIGS. 9C-9D. In some embodiments, depending on whether the air pinches are modified by the second hand (e.g., in the case of secondary air pinches where one hand holds an air pinch while the other is used to navigate back and forth by air pinching and releasing multiple times with different fingers), the navigation can be between different applications (e.g., in a sequence of opened and running applications and/or recently open applications). For example, a "right index secondary pinch" can be used to switch from the currently displayed application to a next application in a sequence of applications, and a "right middle secondary pinch" can be used to switch from the currently displayed application to a previous application in the sequence of applications. In some embodiments, without using the second hand to perform secondary air pinches, single hand air pinches (or primary air pinches that are not modified by the second hand) perform navigation within the currently active application. Navigating forward or backward in a sequence in response to inputs that include a thumb being brought into contact with different opposing fingers enables different operations to be performed more quickly without requiring more extensive gestures and without displaying additional controls.

In some embodiments, in response to detecting the gesture performed with the first hand: in accordance with a determination that the second hand has the first configuration, the computer system navigates between objects in a sequence of objects in the first application (e.g., such as by displaying and/or giving focus to successive objects by moving forward or backward through the sequence of objects in a user interface of the first application). For example, the cursor or focus indicator is moved by an element (e.g., to a next element or previous element) in the sequence of elements included on the screen of the first application, such as headings, links, words, and/or other elements or objects. In some embodiments, in response to moving the focus selector to a next element in the sequence, the computer system outputs a description of the user element in the form of speech. For example, when user 9002 navigates from inbox 9032*a* to drafts folder 9032*b* in the email application (FIG. 9B), the computer system 101 generates and outputs audio description of drafts folder 9032*b*. In some embodiments, the computer system may provide description of the type of element, its name, and/or place in a sequence and/or hierarchy. In some embodiments, moving the cursor does not necessarily activate the element, and the user can use a different gesture to activate the element if an activation command is associated with the element (e.g., for activatable controls, menus, and other objects). For example, a "right index middle pinch" gesture can be used to activate an element or control that is currently indicated by the focus selector. Navigating between different objects in a sequence of objects in an application user interface in response to inputs that include a particular hand gesture enables different operations to be performed more quickly without requiring more extensive gestures and without displaying additional controls.

In some embodiments, in response to detecting the gesture performed with the first hand: in accordance with a determination that the second hand has the second configuration, the computer system switches to a different application in a sequence of applications (e.g., displaying and/or giving focus to successive applications by moving forward or backward through the sequence of recently open applications). For example, the computer switching from the currently active application to another active or recently open application in a sequence of applications (e.g., the sequence can be formed by the order in which the applications were launched, the order in which the applications have been most recently opened or selected to be active, or other order based on time or other considerations, such as alphabetical order). For example, in response to a "right index secondary pinch" performed by user 9002 in FIG. 9G, the computer system 101 switches from application user interface 9030 of the email application to application user interface 9050 of the messages application (FIG. 9H). In another example, in response to a "right middle secondary pinch" performed by user 9002 in FIG. 9H, the computer system 101 switches from application user interface 9050 of the messages application backward to application user interface 9030 of the email application. In some embodiments, when the air pinches are modified by the second hand (e.g., in the case of secondary air pinches where one hand holds an air pinch while the other is used to navigate back and forth by air pinching and releasing multiple times), the navigation is between different applications (e.g., opened and running applications and/or recently open applications). Navigating between different applications in a sequence of applications in response to inputs that include a particular hand gesture enables different operations to be performed more quickly without requiring more extensive gestures and without displaying additional controls.

In some embodiments, the computer system outputs (e.g., such as by displaying, overlaid on the view of the three-dimensional environment, or by providing as an audio output) an instruction indicating a respective gesture and a respective operation that the computer system is configured to perform in response to the respective gesture. In some embodiments, one or more such instructions are displayed. In some embodiments, one or more such instructions are displayed on or near the user's hand(s) (e.g., user's hands 9020 and 9022) or in the three-dimensional environment (e.g., floating in space) in the user's field of view. For example, an overlay with gesture instructions can be displayed in the view of three-dimensional environment 9000' (FIGS. 9B-9H). Providing instructions on what operations can be performed using what gestures helps the user understand how to use the computer system, thereby reducing an amount of time needed to perform a particular operation on the device.

In some embodiments, aspects/operations of methods 1100, 1200, 1400, 1800, 1900, 2000, 2300, and 2400 may be interchanged, substituted, and/or added between these methods. For example, the method of switching between interacting with an active application in a three-dimensional environment to performing an operation outside the active application as described in method 1300 is optionally used to navigate between different applications for methods 1100, 1200, 1400, 1800, 1900, 2000, 2300, and/or 2400. For brevity, these details are not repeated here.

FIG. 14 is a flow diagram of a method 1400 of navigating within one application hierarchy level or between different application hierarchy levels in a three-dimensional environment, in accordance with some embodiments.

The techniques described herein in relation to method 1400 and FIG. 14 relate to an accessibility mode for people with visual impairments that is sometimes referred to as a "read aloud" mode, in which verbal description of virtual objects (e.g., user interfaces and user interface elements) is provided in response to navigation gestures (e.g., navigation gestures that disambiguate between navigation within one hierarchy level (e.g., of a user interface of an application) and navigation between different hierarchy levels (e.g., of the user interface of the application)).

Method 1400 is performed at a computer system (e.g., computer system 101 in FIG. 1A) including or in communication with a display generation component (e.g., display generation component 120 in FIGS. 1A, 3, and 4), e.g., a heads-up display, a head-mounted display (HMD), a display, a touchscreen, a projector, a tablet, a smartphone, or the like, and one or more input devices (e.g., one or more cameras, controllers, touch-sensitive surfaces, joysticks, buttons, or the like). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

While a view of a three-dimensional environment is visible via the display generation component, the computer system displays (1402), overlaid on the view of the three-dimensional environment, a user interface of a first application, including displaying in the user interface a plurality of elements. Examples of the first application include, but are not limited to, a messages application, an email application, a browser application, a camera application, a photos application, a word processing application, a reading application, an entertainment, or media application, such as a game application, video, TV application, or other application. Elements that are displayed or visible in the user interface of the first application include, but are not limited to, user selectable elements that trigger a respective action or operation, e.g., affordances that provide a mechanism for interacting with the computer system, including the first application, other elements that include content but cannot be interacted with (e.g., as text, images, videos), or other content that can be interacted with (e.g., can be enlarged or opened in different windows or frames) but do not trigger an action or operation to be performed in the computer system or the first application. In some embodiments, the first application is associated with the computer system (e.g., the first application is installed on or accessible from the computer system 101 in FIG. 1A).

The user interface of the first application is associated with a plurality of hierarchy levels. A first hierarchy level corresponds to a first grouping of one or more elements of the plurality of elements in the user interface of the first application, and a second hierarchy level corresponds to a second grouping of one or more elements of the plurality of elements in the user interface of the first application. For example, the first section 9032, the second section 9034, and the third section 9036 of the email application in FIG. 10A-10F belong to the same hierarchy level (e.g., a first hierarchy level of application user interface 9030, optionally below the top level that corresponds to the application user interface 9030 itself). Further, email inbox 9032a, drafts folder 9032b, sent folder 9032c, junk folder 9032d, trash folder 9032e, and archive folder 9032f are user selectable elements in another application hierarchy level (e.g., a second hierarchy level, which is one level down from the first hierarchy level (FIG. 10A). Further, user selectable controls 1010, 1012, and 1014 are in, or part of, are also part of an application hierarchy level (e.g., the second hierarchy level, one level down from third section 9036, which is an element in the first hierarchy level) (FIG. 10E).

In some embodiments, the user interface of the first application has a predetermined (e.g., designed or architected) hierarchical structure or organization of user interface elements that comprise the user interface. In some embodiments, the user interface of the first application corresponds to a screen or a page that is organized in a hierarchy of elements, where the elements are visible in the three-dimensional environment, but the hierarchy (or a corresponding data structure (e.g., a tree) itself is not visible. For example, a window has toolbars, toolbars have buttons, dropdown menus, and other user selectable elements; a web site has pages, and pages have headers, text, paragraphs, forms, links, and other static and dynamic elements. In some embodiments, when a screen-reader application is enabled, the screen-reader application traverses the hierarchy of the user interface elements in the user interface of the first application in response to user inputs (e.g., in response to bimanual navigation and/or inputs described in Table 1 above).

In some embodiments, a respective element in a first respective hierarchy level (of user interface elements in the user interface of the first application) is a parent, grandparent, or ancestor to one or more elements in a second respective hierarchy level (e.g., the first hierarchy level is higher in the hierarchy than the second hierarchy level, or alternatively the second hierarchy level is higher in the hierarchy than the first hierarchy level). In some embodiments, the elements (of the user interface) that are visible can be parsed by a screen-reader application and their associated description can be announced or vocalized by the screen-reader application. In some embodiments, the top-level hierarchy level corresponds to the whole page, screen, or user interface; a first hierarchy level (e.g., one level below the top-level hierarchy) includes different panels, windows, toolbars, side bars, and frames within the respective user interface, screen, or page; and the second hierarchy level includes different elements within each corresponding element of the first hierarchy (e.g., elements within a respective panel, elements within a respective window, elements within a respective toolbar, elements within a respective sidebar, or other user interface elements).

In some embodiments, the first hierarchy level includes categories of elements, where the categories or grouping of elements are also hierarchical. For example, the first hierarchy level includes a grouping of tables, a grouping of lists, a grouping of containers, a grouping of headings, a grouping of landmarks (e.g., such as banners), a grouping of links, a grouping of tables, a grouping of lists, a grouping of buttons, a grouping of form controls, a grouping of text fields, a grouping of search fields, a grouping of images, a grouping of lines in text, a grouping of words in text, a grouping of characters, a grouping of paragraphs, a grouping of links, a groping of visited links, a grouping of links that have not been visited, a grouping of in-page links, and other groupings of different types of elements. In some such embodiments, the second hierarchy level includes the elements that belong to each category or grouping of elements, e.g., respective containers that belong to the grouping of containers, respective lists that belong to the grouping of lists, respective buttons that belong to the grouping of buttons, respective headings that belong to the grouping of headings, etc. In some embodiments, a user can create custom groupings of elements. In some embodiments, the predetermined hierarchical structure corresponds to directed graphs that include nodes and edges that represent objects and abstract spatial relationships, and optionally object properties of virtual world content. For example, virtual buildings have rooms, rooms have windows and doors, and doors lead from one room to another. In some embodiments, elements that are visible in the user interface can also have associated properties and/or status, e.g., a status associated with a link indicates whether the link has previously been opened in the current session, virtual objects can be described as purely decorative or objects that can be interacted with or have some operational value.

While a focus indicator identifies a first element of the plurality of elements displayed in the user interface (e.g., a focus selector is directed at an element in the first application while the first application is active and in focus), the computer system detects (1404) a gesture (e.g., an air gesture or a contact-free gesture, such as an indirect air gesture without contact with objects and/or elements, including virtual objects and/or elements, displayed overlaid in the three-dimensional environment). In some embodiments, the gesture corresponds to a single-finger air gesture, a multi-finger air gesture, a secondary gesture, or a pinch-slide gesture, including gestures described in Table 1 above with reference to method 1300. Optionally, the first element is associated with the first hierarchy level of the plurality of hierarchy levels. In some embodiments, elements that belong to or are associated with a respective hierarchy level may be ordered in a sequence, such that the elements are parsed and navigated one by one in the sequence. For example, email inbox 9032a, drafts folder 9032b, sent folder 9032c, junk folder 9032d, trash folder 9032e, and archive folder 9032f are ordered in a sequence, where email inbox 9032a is a first element in the sequence and archive folder 9032f is last in the sequence (FIG. 10A). In some embodiments, the sequence is not necessarily visually illustrated (e.g., outside of when a user is navigating through successive elements in the sequence).

In response to detecting the gesture (1406): in accordance with a determination that the gesture is performed with a first hand, the computer system moves (1408) the focus indicator from the first element to a second element of the plurality of elements (e.g., gestures performed with a respective hand of the two hands are used to perform navigation and/or selection within a single hierarchy level, or alternatively, gestures with that hand perform navigation among the elements without respect to hierarchy levels—e.g., sequential reading of an entire document, for example in accordance with a depth-first tree traversal order, sometimes called tree ordered traversal). For example, in response to air gesture A1 performed (e.g., performed twice, or more than once) with left hand 9020 in FIGS. 10A-10B, the focus selector 9060 moves from first section 9032 to second section 9034, and then from the second section 9034 to the third section 9036 (FIGS. 10A-10C). In some embodiments, the navigation performed in response to a sequence of such gestures includes moving the focus selector from a current element to a previous element or to a next element in a sequence of elements such as navigating back and forth, up and down, and/or in and out (e.g., in a z direction). For example, if the first hierarchy level corresponds to different conversations (e.g., with different contacts or groups of contacts), then gestures performed with the first hand move the focus indicator from one conversation to another conversation. In another example, if the first hierarchy level corresponds to different groupings of elements, such as a grouping of containers, a grouping of headings, a grouping of words, a grouping of links, then gestures performed with the first hand move the focus indicator from one heading to another within a selected hierarchy of headings, from one word to another within a selected hierarchy of words, from one link to another a selected hierarchy of links, etc.

In response to detecting the gesture (1406): in accordance with a determination that the gesture is performed with a second hand different from the first hand, the computer system moves (1410) the focus indicator from the first element of the first hierarchy level to a respective element of the second hierarchy level of the plurality of hierarchy levels. For example, in response to air gesture B1 performed with right hand 9022 (as opposed to left hand 9020) in FIGS. 10C-10D, the focus selector 9060 moves from the third section 9036 (FIG. 10C), which belongs to the first hierarchy level, to control 1010, which belongs to the second hierarchy level (FIG. 10D). In the example above, where the first hierarchy level corresponds to different conversations, the second hierarchy level corresponds to different user interface elements within a respective conversation (selected from the first hierarchy level). In some embodiments, the first hand is used to traverse or navigate elements within a single hierarchy level, such as navigating between different words that belong to a respective grouping of words, while the second hand is used to navigate from a particular word that is in focus to navigating letters within a word, or to navigating another grouping of elements.

In some embodiments, the computer system provides different modes of navigating or traversing through the organization of a page or a screen. In some embodiments, a first mode of navigation can be performed linearly or sequentially, e.g., progressing from one navigable (or traversable) element to another irrespective of hierarchy or organizational structure to which the navigable elements belong. For example, when navigating sequentially, the navigation progresses (e.g., in response to multiple instances of the same gesture) to navigable elements that belong to a different hierarchy level (or organizational structure) if navigable elements of a current hierarchy level (or organizational structure) are exhausted (e.g., as opposed to continue to cycle through the navigable elements of the same hierarchy level). In some embodiments, navigation can be performed non-linearly. For example, a second mode of navigating through a page or a screen is to select a type of navigable element from a number of types and to cycle through all the elements for the selected type. For example, if a type of navigable element that is selected is a container, navigation can progress from one container to the next (optionally sequentially) that are displayed on the screen/page. Optionally, in the second mode of navigating, if the last navigable element in a sequence of navigable elements of the same type is traversed, navigation progresses to the first navigable element in the sequence of navigable elements (e.g., wrapping around from a last element to a first element, or vice versa). In some embodiments, navigating in the first mode is performed with one hand, and navigating in the second mode is performed with the opposite hand. In some embodiments, navigating between types of navigable elements is performed with a first set of fingers (e.g., "left index pinch" or "left middle pinch" as described in Table 1 above) and navigating back and forth within elements of a selected type is performed with a second set of fingers (e.g., "left index middle pinch" or "left middle ring pinch" as described in Table 1 above). In some embodiments, navigating in the first mode or the second mode is performed with air pinch gestures in accordance with gestures described in Table 1 above with reference to method 1300. Where a user interface of an application is organized in hierarchical levels (or other organizational structures), performing a first mode of navigation through the user interface (e.g., between different hierarchical levels) with a first hand (e.g., in response to a particular air gesture) and a second mode of navigation through the user interface (e.g., within a single hierarchical level) with a second hand (e.g., in response to a particular air gesture) enables a greater number of interactions and more ways for interaction with the computer system (e.g., contactless interaction for visually impaired users) without requiring more extensive gestures and without displaying additional controls. These and other benefits of method 1400 are particularly important to help users with physical impairments, especially vision and/or motor impairments, use the device.

In some embodiments, in response to detecting the gesture, in accordance with a determination that the gesture is performed with the first hand, the computer system moves the focus indicator from the first element to the second element in the first grouping of one or more elements in the first hierarchy level. For example, in response to "left index middle pinch" or "left middle ring pinch," the focus selector moves forward to a next element or backward to a previous element of a selected type of user interface elements (see Table 1 above). Navigating between elements in a single hierarchy level of a user interface with multiple hierarchies depending on the hand that is used to perform an air gesture that causes the navigation, enables different interactions with the computer system (e.g., contactless interaction for visually impaired users) without displaying additional controls.

In some embodiments, in response to detecting the gesture, in accordance with a determination that the gesture is performed with the first hand, the computer system moves the focus indicator sequentially between elements in a sequence of elements of the plurality of elements. (e.g., sequential reading of a document, for example in accordance with a depth-first tree traversal order, sometimes called tree ordered traversal). For example, in response to a "right index pinch" or a "right middle pinch," the focus selector moves forward or backward in a sequence of elements (see Table 1 above). Navigating sequentially between navigable elements of a user interface in a depth first or tree ordered traversal, e.g., irrespective of any structural or hierarchical organization of the user interface, enables different interaction with the computer system (e.g., contactless interaction for visually impaired users) without displaying additional controls.

In some embodiments, in response to detecting the gesture performed with the first hand: in accordance with a determination that the gesture is performed with a first set of fingers, the computer system performs a first operation of the first application; and, in accordance with a determination that the gesture is performed with a second set of fingers, the computer system performs a second operation of the first application. In some embodiments, a "right index pinch" corresponds to a command to move the focus selector to the next element in the sequence (e.g., moving forward in the sequence), and a "right middle pinch" corresponds to a command to move the focus selector the previous element in the sequence (e.g., moving backward in the sequence), as illustrated in Table 1 above. Alternatively, one of the operations is a navigation operation while the other operation is an activation operation (e.g., activation operation can be performed in response to "right index middle pinch" or "right middle ring pinch," as described in Table 1 above). Performing a first operation or a second operation in the same application depending on which fingers are used in an air gesture, enables different interaction with the computer system (e.g., contactless interaction for visually impaired users) without displaying additional controls.

In some embodiments, in accordance with a determination that the gesture is a single-finger air pinch gesture performed with a thumb finger of the first hand and an index finger or a ring finger of the first hand (e.g., a first set of fingers), the computer system navigates in a first direction in the sequence of elements (e.g., as part of performing the first operation). For example, in FIG. 10A (or FIG. 9B), if inbox 9032*a* is in focus, a "right index pinch" gesture performed with right hand 9022 can move focus selector 9060 from inbox 9032*a* to drafts folder 9032*b* (e.g., from top to bottom). Navigating in a first direction (e.g., from left to right, or from top to bottom) in a sequence of navigable elements of a user interface with multiple hierarchical levels when a thumb finger and an index finger of the first hand are used in air pinch gesture in response to which the navigation is performed, enables different interaction with the computer system (e.g., contactless interaction for visually impaired users) without displaying additional controls.

In some embodiments, in accordance with a determination that the gesture is a single-finger air pinch gesture performed with a thumb finger of the first hand and a middle finger of the first hand (e.g., a second set of fingers), the computer system navigates in a second direction in the sequence of elements (e.g., as part of performing the second operation), wherein the second direction is opposite of the first direction. For example, in FIG. 10A (or FIG. 9C), if drafts folder 9032*b* is in focus, a "right middle pinch" performed with right hand 9022 can move the focus selector 9060 backward from drafts folder 9032*b* to inbox 9032*a* (from bottom to top). Navigating in a second direction (e.g., from right to left, or from bottom to top) in a sequence of navigable elements of a user interface with multiple hierarchy levels when a thumb finger and a middle finger of the first hand are used in air pinch gesture in response to which the navigation is performed, enables different interaction with the computer system (e.g., contactless interaction for visually impaired users) without displaying additional controls. More generally, navigating backwards or forward in a sequence of navigable elements in a first hierarchy level of a user interface with multiple hierarchy levels depending on which fingers are used in a single finger air pinch gesture in response to which the navigation is performed, enables different interaction with the computer system (e.g., contactless interaction for visually impaired users) without displaying additional controls.

In some embodiments, in accordance with a determination that the gesture is a multi-finger air pinch gesture performed with a thumb finger of the first hand and an index and middle finger of the first hand (e.g., or more generally, a thumb finger of the first hand and predefined set of one or more, or two or more, other fingers of the first hand), the computer system activates a respective element that is currently indicated by the focus indicator. For example, in FIG. 10D while the focus selector 9060 is located at control 1010, in response to detecting "right index middle pinch" gesture performed with right hand 9022, control 1010 is activated and a window for creating a new email is displayed in the view of the three-dimensional environment 9000'. Activating a respective element that currently has focus (e.g., performing a function associated with the element), enables different interaction with the computer system (e.g., contactless interaction for visually impaired users) without displaying additional controls.

In some embodiments, moving the focus indicator between elements includes moving the focus indicator to a respective user interface element and generating an audio description of the respective interface element. In some embodiments, the computer system generates audio speech when the user navigates from one element to another to aid a visually impaired person. For example, when user 9002 navigates between the first section 9032 to the second section 9034 in FIGS. 10A-10B and in response the focus selector 9060 moves to the second section 9034 from the first section 9032, audio description for the second section 9034 is generated and output (e.g., stating that second section 9034 is a second pane of the email application that is an inbox pane). In another example, when the focus selector 9060 moves to the third section 9036 from the second section 9034, audio description for the third section 9036 is generated and output (e.g., stating that third section 9036 is a third pane of the email application that is a message or content pane). Using an air gesture and/or hand configuration input to move a focus selector between elements in a displayed user interface, and correspondingly outputting an audio description of the element that currently has focus, enables contactless interaction with the computer system and provides feedback about a state of the device, thereby helping users with physical impairments, especially vision and/or motor impairments, use the device.

In some embodiments, in response to detecting the gesture, the computer system generates voice over audio corresponding to a respective user interface element of the plurality of elements to which the focus selector is moved. Using an air gesture and/or hand configuration input to move a focus selector between elements in a displayed user interface, and correspondingly outputting an audio description of the element that currently has focus, enables contactless interaction with the computer system and provides feedback about a state of the device, thereby helping users with physical impairments, especially vision and/or motor impairments, use the device.

In some embodiments, the computer system outputs the audio description (e.g., voice over audio) of the respective user interface element from a simulated location in the three-dimensional environment corresponding to the respective user interface element of the first application. For example, if focus selector 9060 is moved to drafts folder 9032b in first section 9032 that is on the left in FIG. 10A, the audio description would come from a simulated location corresponding to the left side of the user interface 9030, and if the focus selector 9060 is moved to control 1012 in the third section 9036 that is on the right in FIG. 10E, the audio description would come from a simulated location corresponding to the location of control 1012 in the user interface 9030. In some embodiments, the audio for an operation performed in one application is output from one direction and the audio for an operation performed in a second application is output from a second direction. Using an air gesture and/or hand configuration input to move a focus selector between elements in a displayed user interface, and correspondingly outputting an audio description of the element that currently has focus from a simulated location in the three-dimensional environment, enables contactless interaction with the computer system and provides feedback about a state of the device, thereby helping users with physical impairments, especially vision and/or motor impairments, use the device.

In some embodiments, aspects/operations of methods 1100, 1200, 1300, 1800, 1900, 2000, 2300, and 2400 may be interchanged, substituted, and/or added between these methods. For example, the method of navigating within one application hierarchy level or between different application hierarchy levels in a three-dimensional environment as described in method 1400 is optionally used to navigate hierarchies of application user interfaces for methods 1100, 1200, 1300, 1800, 1900, 2000, 2300, and/or 2400. For brevity, these details are not repeated here.

FIGS. 15A-15J illustrate examples of restricting various types of changes from occurring in a mixed reality three-dimensional environment when a guided access mode of operation is active, in accordance with some embodiments. FIG. 18 is a flow diagram of a method 1800 for restricting various types of changes from occurring in a mixed reality three-dimensional environment when a guided access mode of operation is active. The user interfaces in FIGS. 15B-15J are used to illustrate the processes described below, including the processes in FIG. 18.

Figure 15A:
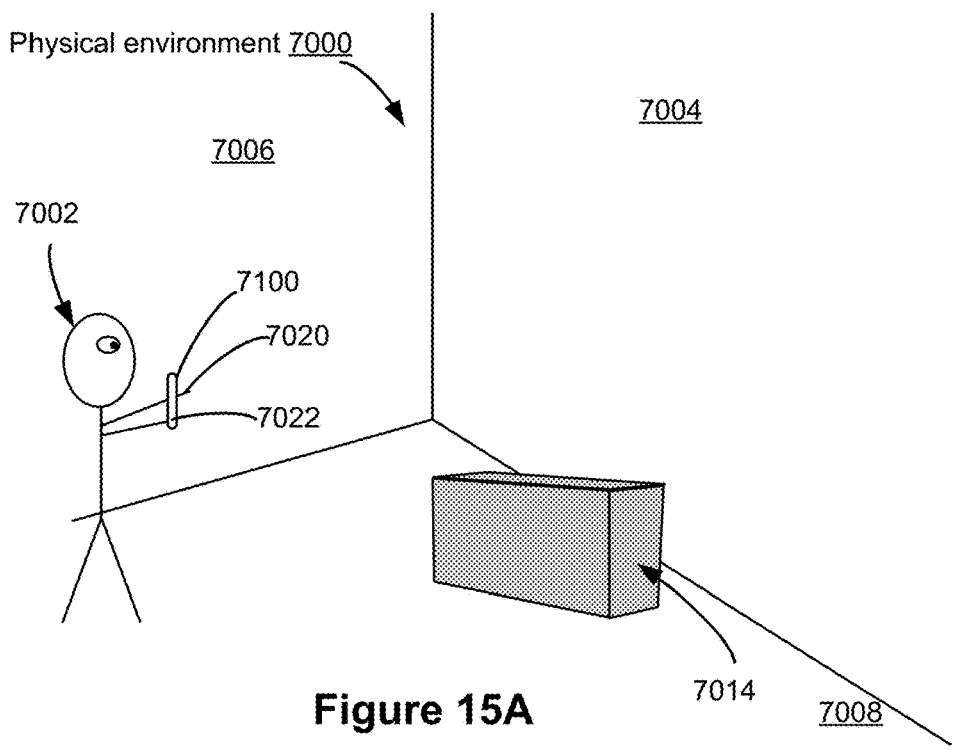

FIG. 15A illustrates physical environment 7000 that is visible to user 7002 via display generation component 7100 of computer system 101. The physical environment includes physical walls 7004 and 7006 and floor 7008. The physical environment 7000 also includes physical object 7014. User 7002 is holding display generation component 7100 with the user's hand 7020 or hand 7022, or both. Optionally, display generation component 7100 can be placed on a surface or attached to user 7002's body (e.g., a head-mounted display), leaving the user's hand 7020 and hand 7022 free to perform various air gestures. In some embodiments, one or more portions of the view of physical environment 7000 that is visible to user 7002 via display generation component 7100 are digital passthrough portions that include representations of corresponding portions of physical environment 7000 captured via one or more image sensors of computer system 101. In some embodiments, one or more portions of the view of physical environment 7000 that is visible to user 7002 via display generation component 7100 are optical passthrough portions, in that user 7002 can see one or more portions of physical environment 7000 through one or more transparent or semi-transparent portions of display generation component 7100.

Figure 15B:
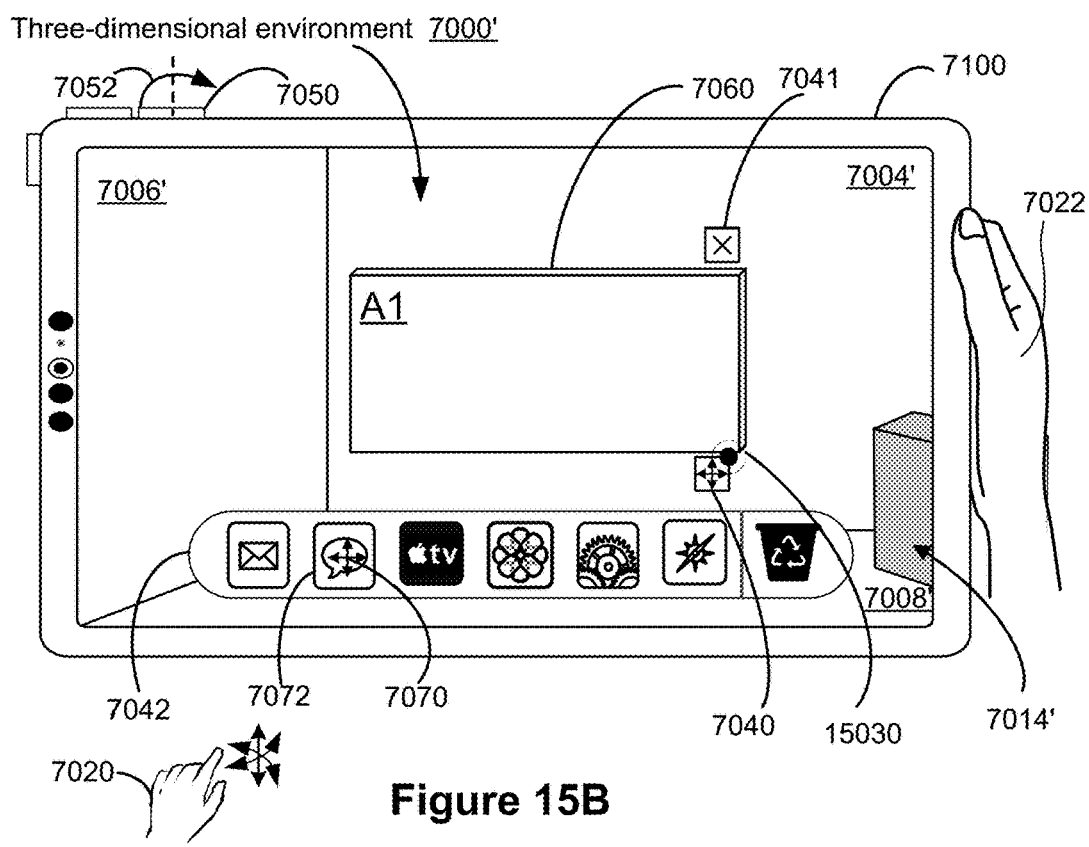

FIG. 15B illustrates a view of a three-dimensional environment 7000' that is visible to user 7002 via display generation component 7100. Display generation component 7100 is held by user 7002 with hand 7022. The view of the three-dimensional environment 7000' includes a representation (or optical view) of portions of the physical environment 7000 as captured by one or more cameras of computer system 101 (or, in some embodiments, an optical passthrough view through one or more transparent or semi-transparent portions of display generation component 7100). The view of the three-dimensional environment 7000' includes representation (or optical view) 7004' of a portion of physical wall 7004, representation (or optical view) 7006' of a portion of physical wall 7006, and representation (or optical view) 7008' of a portion of physical floor 7008. Further, the view of the three-dimensional environment 7000' includes representation (or optical view) 7014' of a portion of physical object 7014.

Further, the view of the three-dimensional environment 7000' includes application user interface 7060 of a first application "A1" (e.g., an email application, a web browsing application, a photos application, and/or other software application). In some embodiments. application user interface 7060 is virtual content or computer-generated content that is visible in the view of the three-dimensional environment 7000'. Application user interface 7060 corresponds to a user interface of a software application executing on computer system 101. In some embodiments, the first application "A1" is a currently active application and application user interface 7060 is a currently active user interface. Application user interface 7060 includes control 7040 for activating a full-screen mode and control 7041 for closing application user interface 7060. In some embodiments, controls 7040 and 7041 are separated from application user interface 7060, but in some other embodiments controls 7040 and 7041 are integrated in or included in application user interface 7060. The full-screen mode corresponds to a mode in which a respective application user interface takes up substantially all of the view of three-dimensional environment 7000'. The view of the three-dimensional environment 7000' includes user interface 7042 for launching applications and/or switching between running applications. For example, user interface 7042 includes a number of application launch icons, including icon 7072 for launching a messages application.

FIG. 15B further illustrates different inputs detected by computer system 101 that would request various changes to occur in the view of the three-dimensional environment, including activating a full-screen mode for an application, launching a different application, changing an immersion level, or moving an application user interface in the view of the three-dimensional environment, as explained below.

In some embodiments, a first input is an input by the user's hand 7020 (e.g., with an air gesture, touch gesture, or other hand input) directed to control 7040 for activating the full-screen mode performed while control 7040 has input focus (e.g., while control 7040 has been selected by a concurrently and/or previously detected gaze input, selected by a concurrently or previously detected pointer input, and/or selected by a concurrently and/or previously detected gesture input). For example, an air pinch gesture is performed with hand 7020 (illustrated with arrows near hand 7020) while user's gaze 15030 is directed at the position of control 7040. In response to detecting the air pinch gesture while user's gaze 15030 is directed at control 7040, the computer system 101 receives a request to activate the full-screen mode for the first application "A1."

Figure 15C:
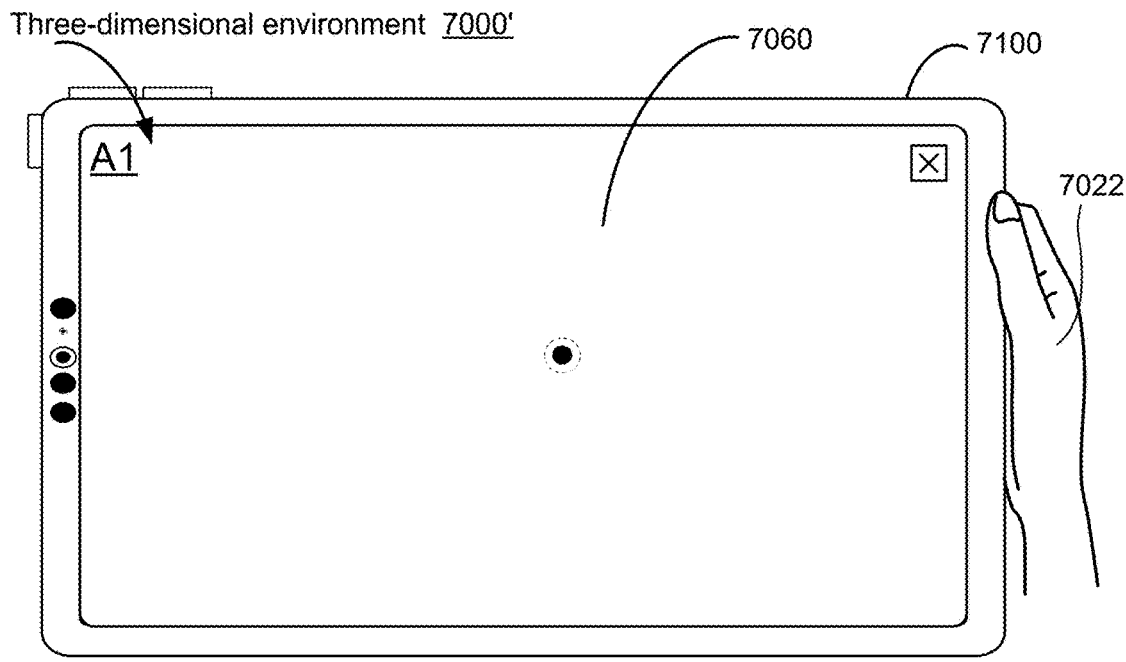
Figure 15D:
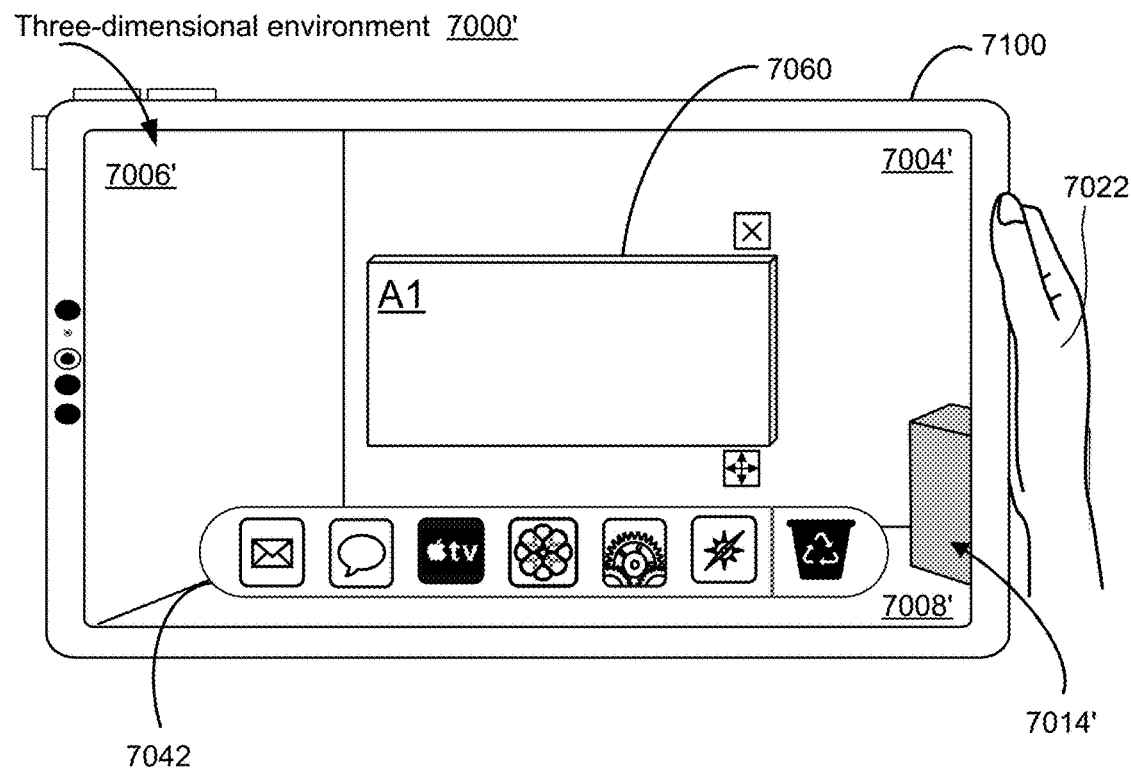

FIGS. 15C and 15D show two different responses (e.g., a response and a lack of response) to the request to activate the full-screen mode detected in Figure B depending on whether a guided access mode of operation is active or inactive, in accordance with some embodiments.

FIG. 15C shows that the computer system 101 responds to the request to activate the full-screen mode for the first application "A1" received in FIG. 15B when a guided access mode of operation is inactive or when the computer system 101 is in a normal mode of operation. For example, in FIG. 15C, the application user interface 7060 is displayed in full-screen mode substantially occupying the entirety of the view of the three-dimensional environment 7000,' where other virtual and/or real-world content is no longer visible. Accordingly, when the guided access mode of operation is inactive, changes in the view of the three-dimensional environment 7000', such as activating the full-screen mode, are allowed, as opposed to being restricted or prevented.

FIG. 15D shows the computer system 101's lack of response to the request to activate the full-screen mode for the first application "A1" when the guided access mode of operation is active. When the guided access mode of operation is active for the computer system, access to the full-screen mode for currently active or other running applications is restricted, and the portion of the view of the three-dimensional environment 7000' occupied by the application user interface 7060 is maintained as in FIG. 15B. Further, representations 7004', 7006', 7008' (or optical views) of walls 7004 and 7006, and floor 7008; representation 7014' (or optical view) of physical object 7014, and user interface 7042 remain visible in the three-dimensional environment 7000'. Accordingly, when the guided access mode of operation is active, the view of the three-dimensional environment 7000' remains unchanged in response to the request to active full-screen mode for the application user interface 7060, while optionally allowing the user to provide inputs that make or cause changes related to content displayed in the application user interface 7060, such as changes in content in response to user inputs interacting with functionality provided in the application user interface 7060 (e.g., viewing content, playing media content, scrolling, selecting links, or other user interface elements within the application user interface 7060).

FIG. 15B further illustrates a second input directed at dial 7050 that is rotatable (e.g., as indicated by arrow 7052). The second input directed at dial 7050 corresponds to a request to increase an immersion level of the view of the three-dimensional environment 7000.' In some embodiments, the request to increase the immersion level includes a request to increase a proportion of the view of the three-dimensional environment 7000' that is occupied (e.g., taken up or used up) by the virtual content (e.g., application user interface 7060 and user interface 7042) relative to content from the physical environment (e.g., representations or optical views 7004', 7006', 7008' of walls 7004, 7006, and floor 7008; and representation 7014' or optical view of physical object 7014). Further, the request to increase the immersion level includes a request to decrease or reduce visibility or prominence of the representation (or optical view) of the external physical environment (e.g., by dimming, fading blurring, or reducing an amount of the representation/view of the real world that is displayed or visible). In some embodiments or circumstances, the user provides a sequence of two or more predefined inputs to cause the computer system to successively increase the level of immersion of a computer-generated experience provided by the computer system, and in response to each consecutive input of the sequence of two or more user inputs that increase the immersion level, a different class of physical elements are removed from view of the three-dimensional environment 7000' and, optionally, replaced by newly displayed virtual elements or expanded representations of existing prior virtual elements (e.g., virtual elements displayed while any of the aforementioned user inputs are detected). In some embodiments, in response to each consecutive input of the sequence of two or more user inputs that increase the immersion level, content in the view of the three-dimensional environment 7000' that is a representation or an optical view of the physical world is gradually dimmed or faded out, thereby increasing the prominence of the application user interface 7060 and user interface 7042.

FIGS. 15E and 15F show two different responses (e.g., a response and a lack of response) to the request to increase the immersion level detected in Figure B depending on whether the guided access mode of operation is active or inactive, in accordance with some embodiments.

FIG. 15E (e.g., FIGS. 15E1 and 15E2, where a user interface analogous to the user interface described in FIG. 15E2 is shown on HMD 7100a in FIG. 15E1) shows that the computer system 101 responds to the request to increase the immersion level received in FIG. 15B when a guided access mode of operation is inactive or when the computer system 101 is in a normal mode of operation. For example, in FIGS. 15E, portions from the physical environment that are visible in the view of three-dimensional environment 7000', including representations or optical views 7004', 7006', 7008' of walls 7004, 7006, and floor 7008 and representation 7014' or optical view of physical object 7014, and optionally a representation of the user's hand 7020', are dimmed while the prominence of application user interface 7060 and user interface 7042 relative to the dimmed optical view or presentation of physical environment is increased. Accordingly, when the guided access mode of operation is inactive, changes in the view of the three-dimensional environment 7000', such as adjusting the immersion level, are allowed as opposed to restricted.

FIG. 15F (e.g., FIGS. 15F1 and 15F2, where a user interface analogous to the user interface described in FIG. 15F2 is shown on HMD 7100a in FIG. 15F1) illustrates the computer system 101's lack of response to the request to increase the immersion level when the guided access mode of operation is active. When the guided access mode of operation is active, changes to the immersion are restricted, and the prominence of the virtual content, including application user interface 7060 and user interface 7042, relative to the representation or optical view of the physical environment (including representations or optical views 7004', 7006', 7008' of walls 7004, 7006, and floor 7008 and representation 7014' or optical view of physical object 7014) is maintained or remains the same as it was immediately prior to detecting the request to increase the immersion level. Accordingly, when the guided access mode of operation is active, the view of the three-dimensional environment 7000' remains unchanged in response to the request to change the immersion level (while optionally allowing changes related to content displayed in the application user interface 7060, such as changes caused by user interactions with the content of the application user interface 7060).

Further, in FIG. 15B, a third input directed at the application user interface 7060 is detected, in accordance with some embodiments. In some embodiments, the third input directed at application user interface 7060 is a direct input performed by hand 7020 (e.g., the user's hand) (e.g., an air gesture, touch gesture, or other hand input), where a gesture is performed at a location in the physical environment that corresponds to the region of the application user interface 7060. For example, hand 7020 reaches to the location in the physical environment that corresponds to the region of the application user interface 7060, "grabs" application user interface 7060 (e.g., a respective window of the first application) and moves the application user interface 7060 to a different location in the view of the three-dimensional environment 7000' by moving hand 7020 to a location in the physical environment that is different from the location in the physical environment that corresponded to the location of the application user interface 7060 at the beginning of the gesture.

In some embodiments, the third input is indirect input that is directed to application user interface 7060, where a hand gesture (e.g., an air gesture, touch gesture, or other hand input) is performed by hand 7020 (e.g., optionally, at a location in the physical environment that is independent of the region of the application user interface 7060 in the three-dimensional environment) while application user interface 7060 has input focus (e.g., while the application user interface 7060 has been selected by a concurrently and/or previously detected gaze input, selected by a concurrently or previously detected pointer input, and/or selected by a concurrently and/or previously detected gesture input). For example, while user 7002's gaze is directed at a location in the physical environment that corresponds to the region of the three-dimensional environment 7000' occupied by the application user interface 7060, an air pinch and drag gesture is detected that moves the application user interface 7060 to a different location in the view of the three-dimensional environment 7000', where the gesture includes moving hand 7020 to a location in the physical environment different from its initial location at the beginning of the gesture.

Figure 15G:
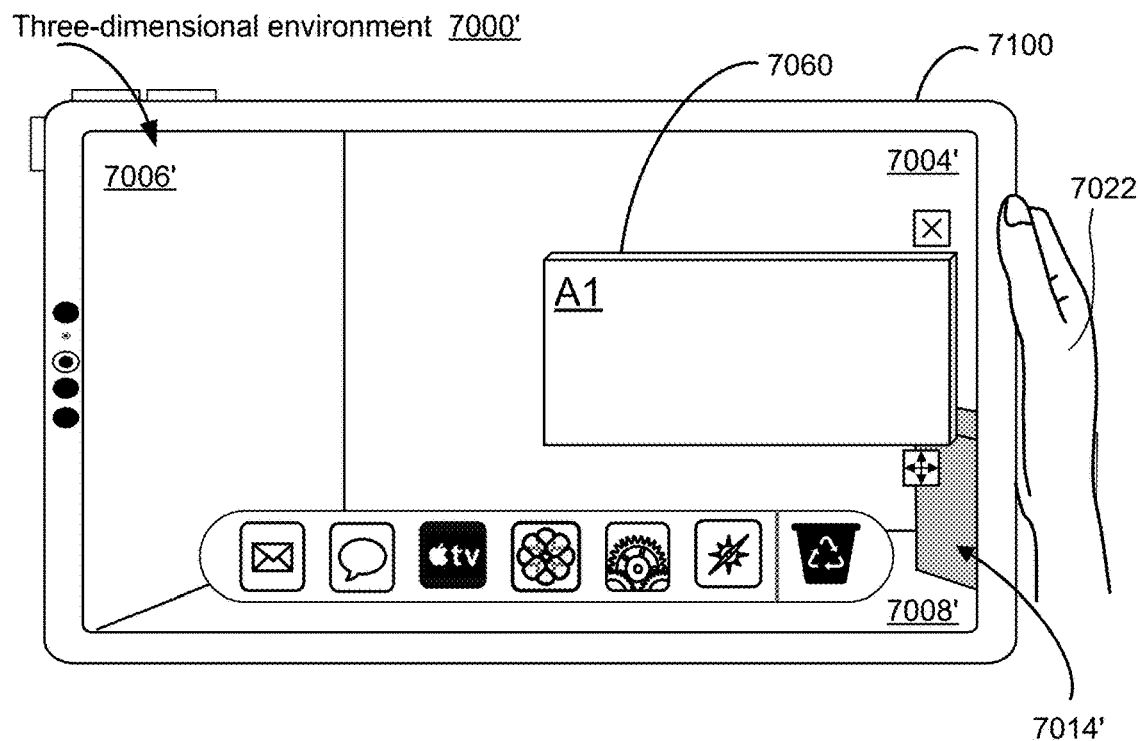
Figure 15H:
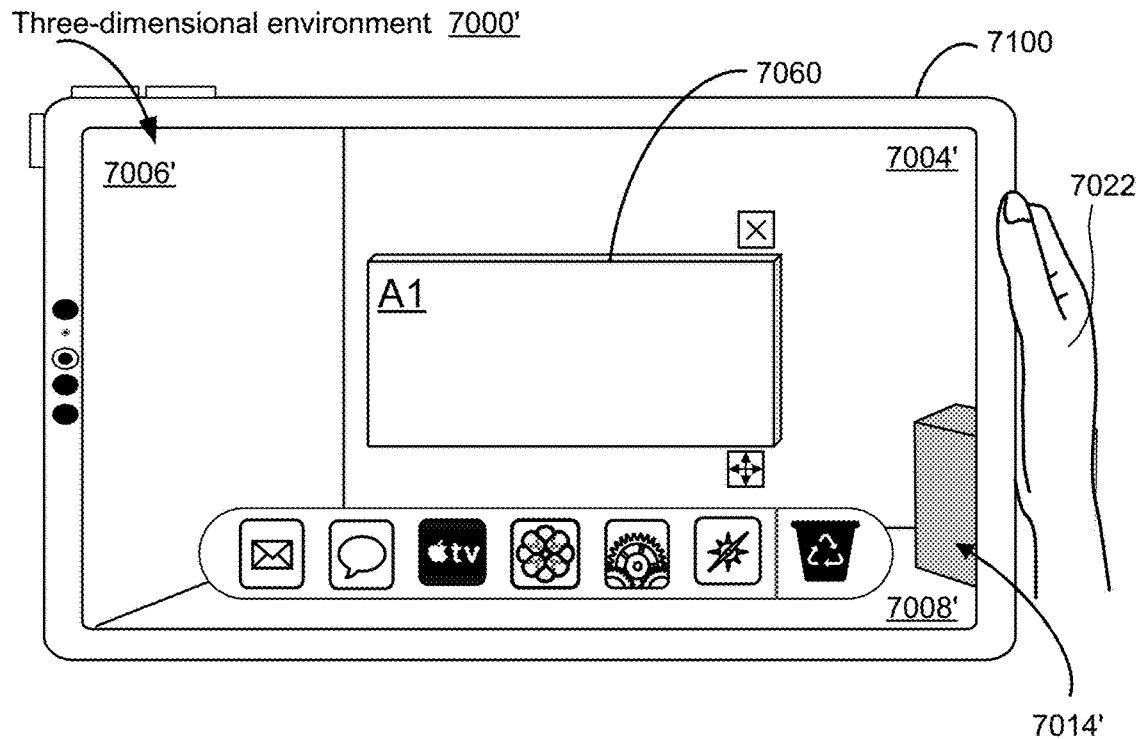

FIGS. 15G and 15H show two different responses (e.g., a response and a lack of response) to the request to move the application user interface 7060 detected in Figure B depending on whether the guided access mode of operation is active or inactive, in accordance with some embodiments.

FIG. 15G shows that the computer system 101 responds to the request to move the application user interface 7060 when the guided access mode of operation is inactive or when the computer system 101 is in a normal mode of operation. For example, the application user interface 7060 is moved from a first location in the view of the three-dimensional environment 7000', illustrated in FIG. 15B, to a second location in the view of the three-dimensional environment 7000', illustrated in FIG. 15G. At the second location, the application user interface partially occludes representation 7014' (or optical view) of physical object 7014. Accordingly, when the guided access mode of operation is inactive, changes in the view of the three-dimensional environment 7000', such as changing a position of an application user interface in the view of the three-dimensional environment 7000', are allowed, as opposed to being restricted or prevented.

FIG. 15H shows the computer system 101's lack of response to the request to move the application user interface 7060 when the guided access mode of operation is active. When the guided access mode of operation is active, movement of application user interface 7060 (and/or other windows or virtual objects that are visible in the view of three-dimensional environment 7000') is restricted, and respective location of the application user interface 7060 in the view of three-dimensional environment 7000' is maintained and remains unchanged from its location, shown in FIG. 15B, immediately prior to the request. Accordingly, when the guided access mode of operation is active, the view of the three-dimensional environment 7000' remains unchanged in response to the request to change the location of the application user interface 7060, while optionally allowing changes related to content displayed in the application user interface 7060, such as changes in content in response to user inputs interacting with functionality provided in the application user interface 7060 (e.g., viewing content, playing media content, scrolling, selecting links, or other user interface elements within the application user interface 7060).

Further, in FIG. 15B, a fourth input directed at icon 7072 for launching the messages application. In some embodiments, the fourth input is an input performed by hand 7020 (e.g., an air gesture, touch gesture, or other hand input) directed to icon 7072 for launching the messages application performed while icon 7072 has input focus (e.g., while icon 7072 has been selected by a concurrent or previously detected gaze input, selected by a concurrent or previously detected pointer input, or selected by a concurrent or previously detected gesture input). For example, an air pinch gesture is performed with hand 7020 (illustrated with arrows near hand 7020) while user's gaze or focus selector object 7070 is directed at the position of control 7040. In response to detecting the air pinch gesture while icon 7072 has input focus, the computer system 101 receives a request to launch the messages application "M1," which is different from the first application "A1."

Figure 15I:
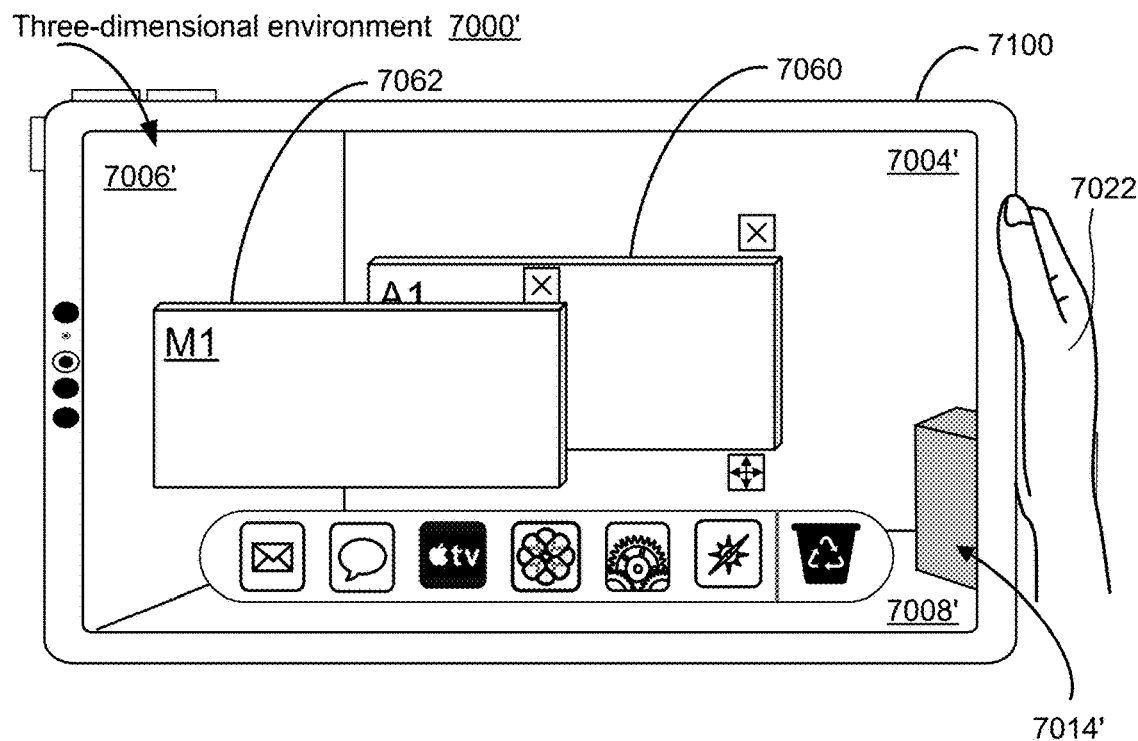
Figure 15J:
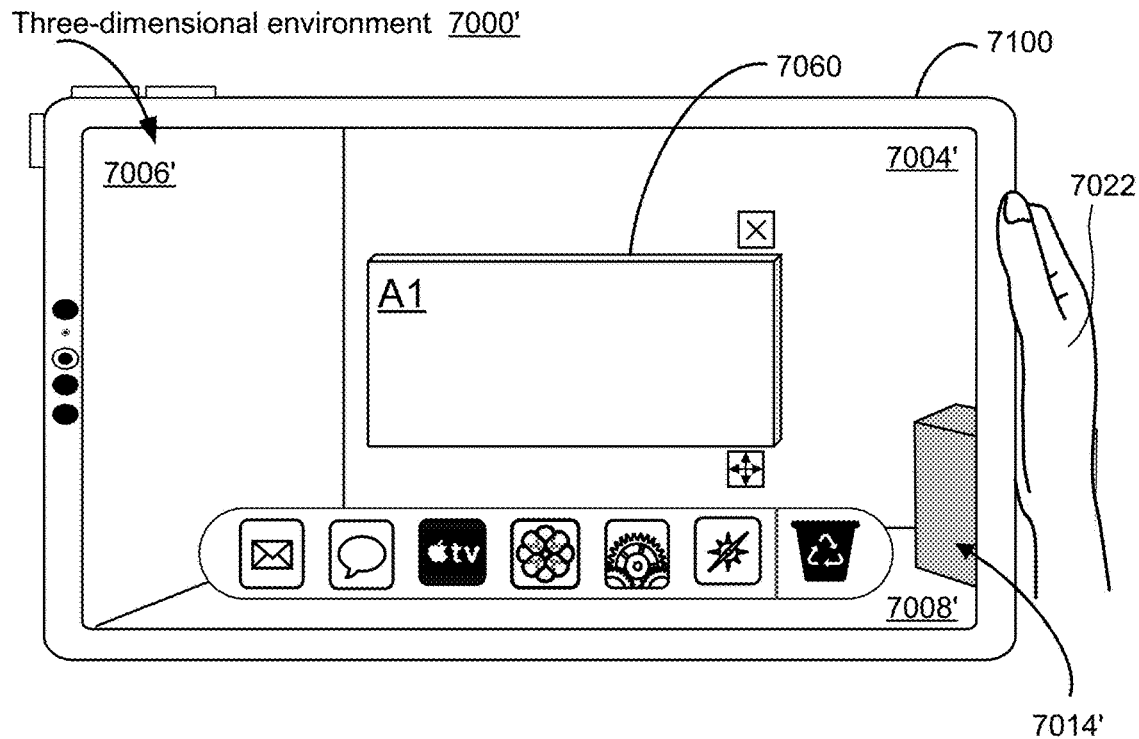

FIGS. 15I and 15J show two different responses (e.g., a response and a lack of response) to the request to launch the messages application "M1" detected in Figure B depending on whether the guided access mode of operation is active or inactive, in accordance with some embodiments.

FIG. 15I shows that the computer system 101 responds to the request the request to launch the messages application "M1" when the guided access mode of operation is inactive or when the computer system 101 is in a normal mode of operation. For example, application user interface 7062 of the messages application is displayed in the view of the three-dimensional environment 7000', optionally becoming the currently active application and overlaying the application user interface 7060 of the first application. Accordingly, when the guided access mode of operation is inactive, changes in the view of the three-dimensional environment 7000', such as launching applications or opening additional applications in the view of the three-dimensional environment 7000', are allowed as opposed to being restricted or prevented.

FIG. 15J shows the computer system 101's lack of response to the request to launch the messages application "M1" when the guided access mode of operation is active. When the guided access mode of operation is active, launching and/or opening of additional applications different from the first application is restricted, and the computer system 101 forgoes launching messages application "M1" and displaying application user interface 7062. Accordingly, when the guided access mode of operation is active, the view of the three-dimensional environment 7000' remains unchanged in response to the request to launch the messages application "M1," while optionally allowing changes related to content displayed in the application user interface 7060, such as changes in content in response to user inputs interacting with functionality provided in the application user interface 7060 (e.g., viewing content, playing media content, scrolling, selecting links, or other user interface elements within the application user interface 7060).

In some embodiments, the computer system 101 enters the guided access mode in response to a user input, e.g., when a setting in a settings user interface is turned on. In some embodiments, user 7002 is provided with an option to activate the guided access mode in a calibration process (e.g., a process during which the computer system 101 requests various inputs and actions from the user to determine physical characteristics, such as gaze, body size and proportions, voice and/or other physical characteristics that are needed for interaction with computer system 101. In some embodiments, user 7002 is provided with an option to activate the guided access mode when the user 7002 mounts a head-mounted display and/or otherwise launches the mixed-reality experience. In some embodiments, while activating the guided access mode (e.g., as a part of an activation process), user 7002 is provided with various controls or options. In some embodiments, when activating the guided access mode of operation, one or more controls for disabling various inputs is provided to user 7002. For example, user 7002 can configure how inputs are handled by the computer system 101 while the computer system 101 is in the guided mode of operation, for example specifying which inputs computer system 101 responds to when in the guided access mode of operation. For example, input handling while in the guided mode of operation can be specified for particular types of inputs (e.g., gaze, or hand gesture inputs) or inputs directed to particular locations in or regions of the three-dimensional environment (e.g., deactivating inputs directed to a background environment while allowing inputs in a foreground environment).

In some embodiments, when activating the guided access mode of operation, one or more controls for setting the duration of the guided access mode are provided or displayed. For example, user 7002 can control the time, duration, or period during which the guided access mode is active, where after the respective time, duration, or period has passed, the computer system 101 automatically disables the guided access mode. In some embodiments, when activating the guided access mode of operation, the computer system provides one or more controls for enabling/disabling one or more applications installed or otherwise available on computer system 101, where user 7002 can use the one or more controls to configure which operations can be launched and/or interacted with while the guided access mode of operation is active. For example, user 7002 can use the one or more controls to disable/enable a group of applications, such as nonactive or background applications, or a specific type of applications, such as applications related to entertainment, or other specific applications (e.g., individually selected applications). In some embodiments, when activating the guided access mode of operation, a control (e.g., a slider) for adjusting the immersion level of the computer system is displayed.

Additional descriptions regarding FIGS. 15A-15J are provided below in reference to method 1800 described with respect to FIG. 18.

FIGS. 16A-16E illustrate examples of localization and visualization of sound in a mixed-reality three-dimensional environment, in accordance with some embodiments. FIG. 19 is a flow diagram of a method 1900 for localization and visualization of sound in a mixed-reality three-dimensional environment. The user interfaces in FIGS. 16A-16E are used to illustrate the processes described below, including the processes in FIG. 19.

As shown in the examples in FIGS. 16A-16E, content that is visible via a display generation component 7100 of computer system 101 is displayed on a touch screen held by user 7002. In some embodiments, display generation component 7100 of computer system 101 is a head-mounted display worn on user 7002's head (e.g., what is shown in FIGS. 16B-16E as being visible via display generation component 7100 of computer system 101 corresponds to user 7002's field of view when wearing a head-mounted display).

Figure 16A:
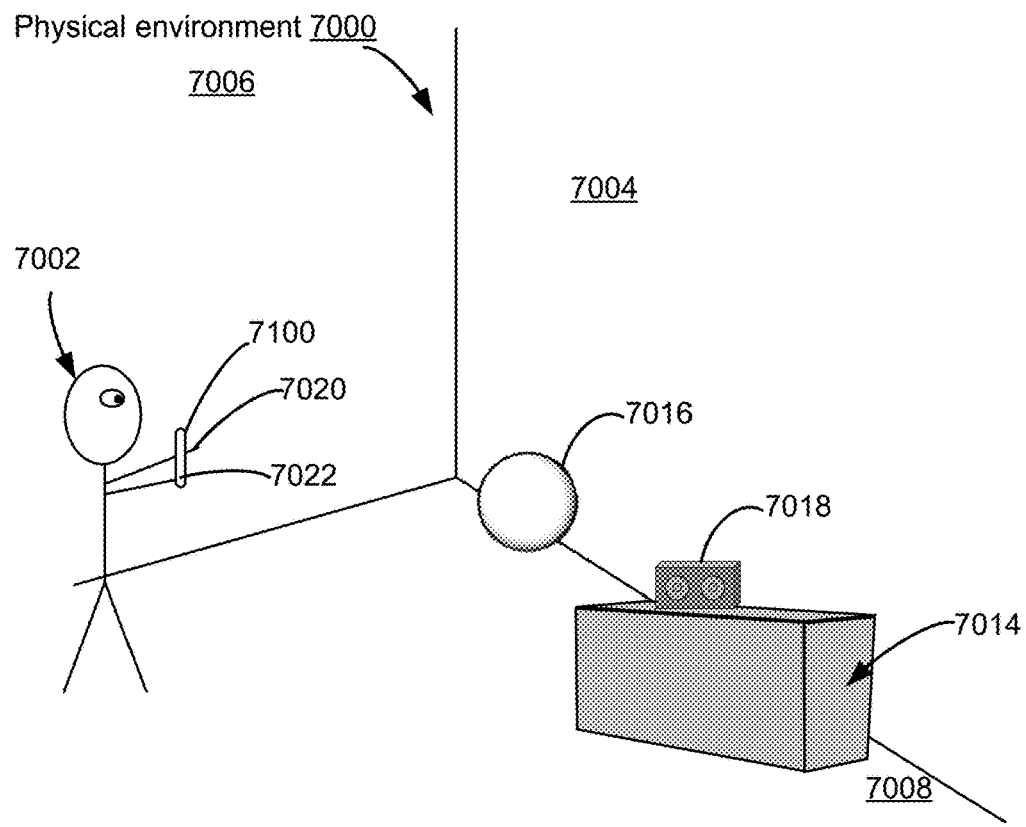

FIG. 16A illustrates the same physical environment 7000 that is visible to user 7002 via display generation component 7100 of computer system 101 as illustrated in FIG. 15A, except that the physical environment 7000 in FIG. 16A further includes a physical ball 7016 and a speaker device 7018 (e.g., a radio, a smart assistant device, and/or other sound or acoustic device).

Figure 16B:
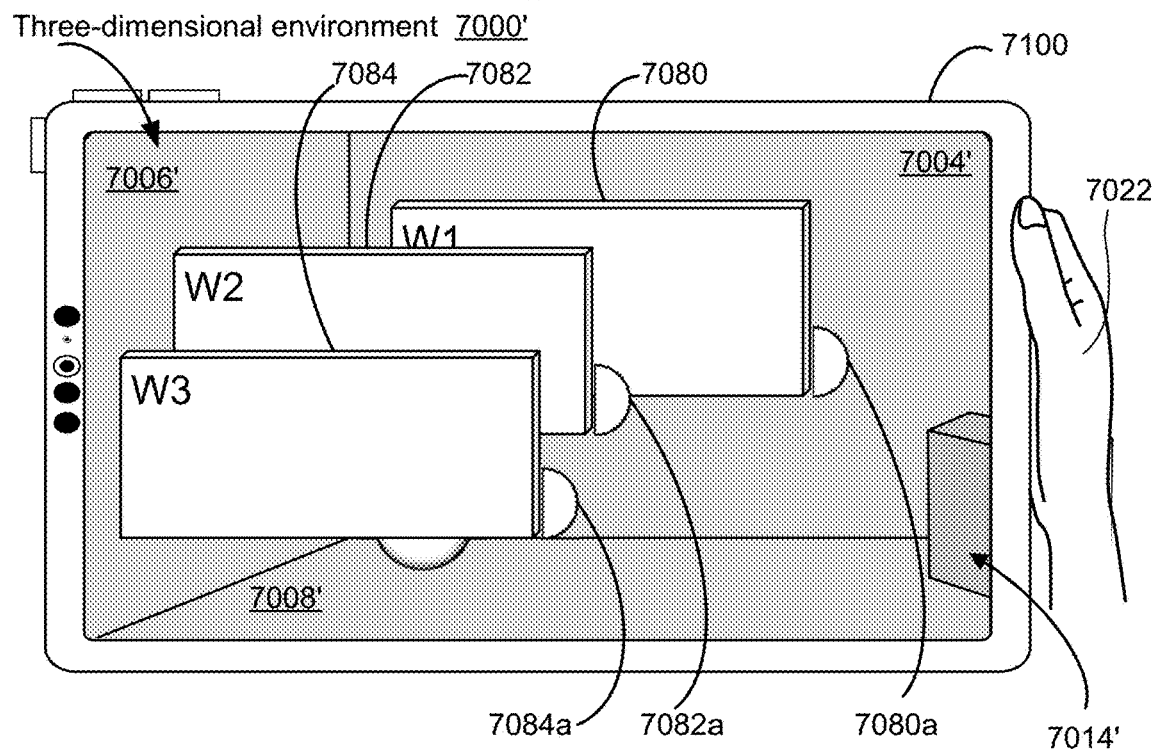

FIG. 16B illustrates a view of a three-dimensional environment 7000' that is visible to user 7002 via display generation component 7100. Display generation component 7100 is held by user 7002 with hand 7022. The view of the three-dimensional environment 7000' includes a representation (or optical view) of portions of the physical environment 7000 as captured by one or more cameras of computer system 101 (or, in some embodiments, an optical pass-through view through one or more transparent or semi-transparent portions of display generation component 7100). The view of the three-dimensional environment 7000' includes representation (or optical view) 7004' of a portion of physical wall 7004, representation (or optical view) 7006' of a portion of physical wall 7006, and representation (or optical view) 7008' of a portion of physical floor 7008. Further, the view of the three-dimensional environment 7000' includes representation (or optical view) 7014' of a portion of physical object 7014, includes representation (or optical view) 7016' of physical ball 7016, and includes representation (or optical view) 7018' of a portion of speaker device 7018.

Further, FIG. 16B includes three open windows that correspond to application user interfaces of the same or different software applications executing on computer system 101. For example, window "W1" 7080, window "W2" 7082, and window "W3" 7084 are virtual or computer-generated content that is visible in the view of the three-dimensional environment 7000'. Each window is associated with an affordance that is used to move the respective window in the view of the three-dimensional environment 7000'. For example, window "W1" 7080 is associated with grabber affordance 7080a, window "W2" 7082 is associated with grabber affordance 7082a, and window "W3" 7084 is associated with grabber affordance 7084a.

In some embodiments or in some circumstances, a sound occurs in the view of the three-dimensional environment 7000' and a source of the sound is window "W3" 7084.

Figure 16C:
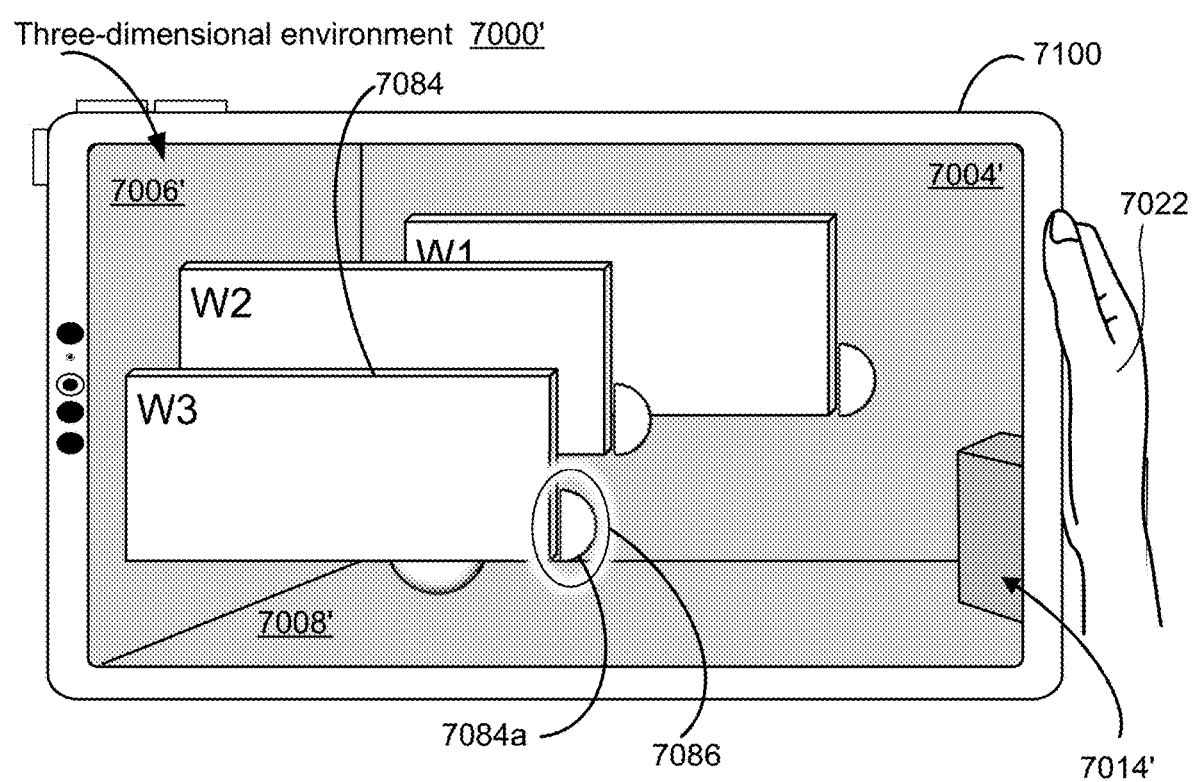

FIG. 16C illustrates a change in the view of the three-dimensional environment 7000' in response to the occurrence of the sound. In particular, in response to the occurrence of the sound, a first visual effect 7086 is displayed, applied or otherwise becomes visible in the view of the three-dimensional environment 7000'. In the example in FIG. 16C, the first visual effect 7086 encircles the grabber affordance 7084a associated with window "W3" 7084 to indicate that the sound source is within the view of the three-dimensional environment 7000' and that the source of the sound is window "W3" 7084. In some embodiments, if the sound source was window "W2" 7082 or window "W1" 7080, the same first visual effect would be applied to grabber affordance 7082a or 7080a, respectively. In other words, the location of the first visual effect would change to indicate the location of the sound source, thereby providing to the user a visual indication of the location of the sound source. In some embodiments, visual properties of the first visual effect 7086 (e.g., color, brightness, shape, color scale, shape, size or other visual properties) are such that the first visual effect 7086 is recognizable and distinguishable in the view of the three-dimensional environment 7000'. In some embodiments, visual properties of the first visual effect 7086 can dynamically change and adapt based on visual properties of the three-dimensional environment 7000', including immersion level.

In some embodiments or in some circumstances, a second sound occurs that is outside a current field of view and, thus, outside the view of the three-dimensional environment 7000'. In some embodiments or in some circumstances, a source of the second sound is in the physical environment 7000, and, in particular, the source of the second sound is speaker device 7018. As illustrated in FIG. 16C, speaker device 7018 is outside the current field of view and, thus, not visible in the view of the three-dimensional environment 7000'.

FIG. 16D (e.g., FIGS. 16D1, 16D2 and 16D3, where a user interface analogous to the user interface described in FIG. 16D3 is shown on HMD 7100a in FIG. 16D1) illustrates a change in the view of the three-dimensional environment 7000' in response to the occurrence of the second sound. In particular, in response to the occurrence of the second sound, a second visual effect 7088 is displayed, applied or otherwise becomes visible in the view of the three-dimensional environment 7000'. In the example shown in FIG. 16D, the second visual effect 7088 includes (e.g., and has the shape of) arrows indicating direction and location of the source of the second sound outside the field of view. In FIG. 16D, the second visual effect 7088 indicates that a location of the second sound is to the right of the current view of the three-dimensional environment 7000'. The second visual effect 7088 has a different shape than the first visual effect 7086 to indicate that the source of the second sound is not within the current field of view. In some embodiments, the first sound continues to occur and, accordingly, the first visual effect 7086 is maintained at the grabber affordance 7084a of window "W3" 7084. In some embodiments, the first visual effect 7086 is maintained while the sound continues to occur (e.g., media content such as a music or view on continues to generate audio). In some embodiments, the first visual effect 7086 begins to fade out after a predetermined amount of time passes (e.g., 5, 10, 15, 20 seconds). In some embodiments, the first visual effect 7086 fades out after the predetermined amount passes to maintain the view three-dimensional environment 7000' uncluttered while allowing user 7002 sufficient time to locate the first sound.

Figure 16E:
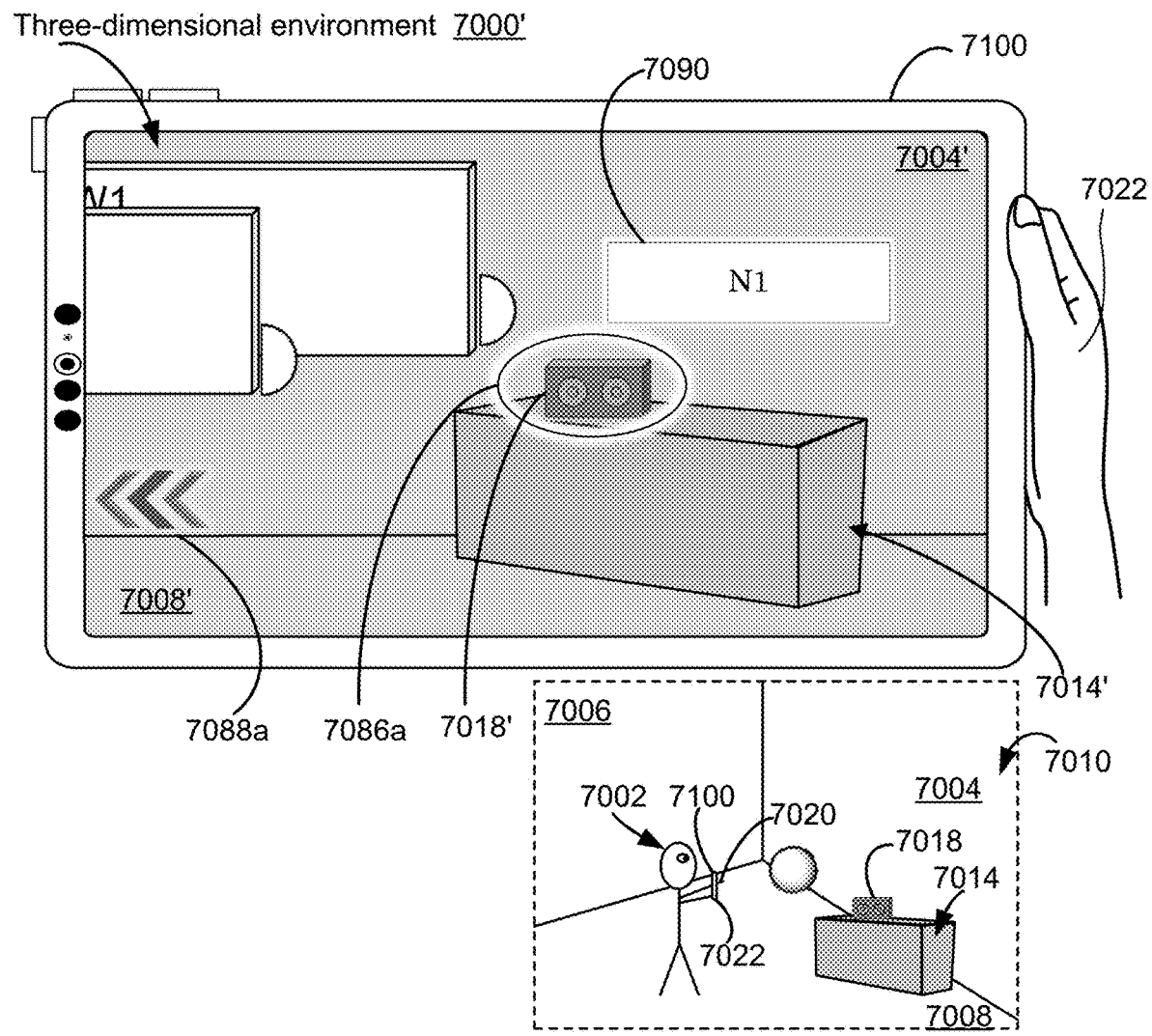

FIG. 16E shows a transition from FIG. 16D in response to detecting a shift in a viewpoint of the user 7002 (e.g., as the user moves a touchscreen device or turns their head while wearing a head-mounted display), thereby displaying (or causing to become visible) different portions of the three-dimensional environment (e.g., physical and virtual). The change in location and viewpoint of user 7002 is illustrated in mini view 7010, which shows that the user has moved closer to physical object 7014 and speaker device 7018. Further, in the example shown in FIG. 16E, the viewpoint of the user 7002 has shifted in a rightward direction such that representation or optical view 7018' of speaker device 7018 is visible in the view of three-dimensional environment 7000', e.g., speaker device 7018 is within the field of view of user 7002 and/or one or more cameras of the computer system 101. Since speaker device 7018 is the source of the second sound and is now within the current field of view of user 7002, a visual effect 7086a is applied (e.g., encircling the representation or optical view 7018' of speaker device 7018) and the second visual effect 7088 is removed from the view of the three-dimensional environment 7000'. The visual effect 7086a is the same as (e.g., generated using the same visual transformation), or visually similar to, the first visual effect 7086, but applied to a different object within the view of the three-dimensional environment 7000'. Further, the first visual effect 7086 is no longer applied to grabber affordance 7084a of window "W3" 7084 because the grabber affordance 7084a is outside the current field of view. In some embodiments, an alert "N1" 7090 is displayed in the view of three-dimensional environment 7000'. Alert "N1" 7090 indicates a type of audio that corresponds to the second sound (e.g., a name of the song or a classification of the audio).

In some embodiments or in some circumstances, the first sound continues to occur from window "W3" 7084 after location of window "W3" 7084 relative to the viewpoint of the user 7002 has changed such that window "W3" 7084 is outside of the field of view and no longer visible in the view of three-dimensional environment 7000'. In response to detecting that the first sound is occurring, and that the location of the first sound is outside the field of view, a visual effect 7088a is applied, displayed, or otherwise made visible. The visual effect 7088a is the same visual effect (e.g., generated using the same visual transformation) as the second visual effect 7088 but has changed location and direction to indicate the change of location of the sound relative to user 7002's viewpoint. For example, in FIG. 16E, the visual effect 7088a indicates that a location of the second sound is to the left.

In some embodiments, visual effects 7086 and 7086a fade out after a predetermined amount of time passes, even if respective sound continues to occur and the location of the respective sound remains in the current field of view. In some embodiments, visual effects 7088 and 7088a are maintained while the respective sound continues to occur, and location of the respective sound is outside the field of view.

Additional descriptions regarding FIGS. 16A-16E are provided below in reference to method 1900 described with respect to FIG. 19.

Additional descriptions regarding FIGS. 16A-16E are provided below in reference to method 1900 described with respect to FIG. 19.

FIGS. 17A-17I illustrate examples of detecting textual content in a mixed-reality three-dimensional environment and generating a respective audio representation of the detected textual content, in accordance with some embodiments. FIG. 20 is a flow diagram of a method 2000 for generating an audio representation of at least a portion of the textual content of an object in a mixed reality three-dimensional environment. The user interfaces in FIGS. 17A-17I are used to illustrate the processes described below, including the processes in FIG. 20.

Figure 17A:
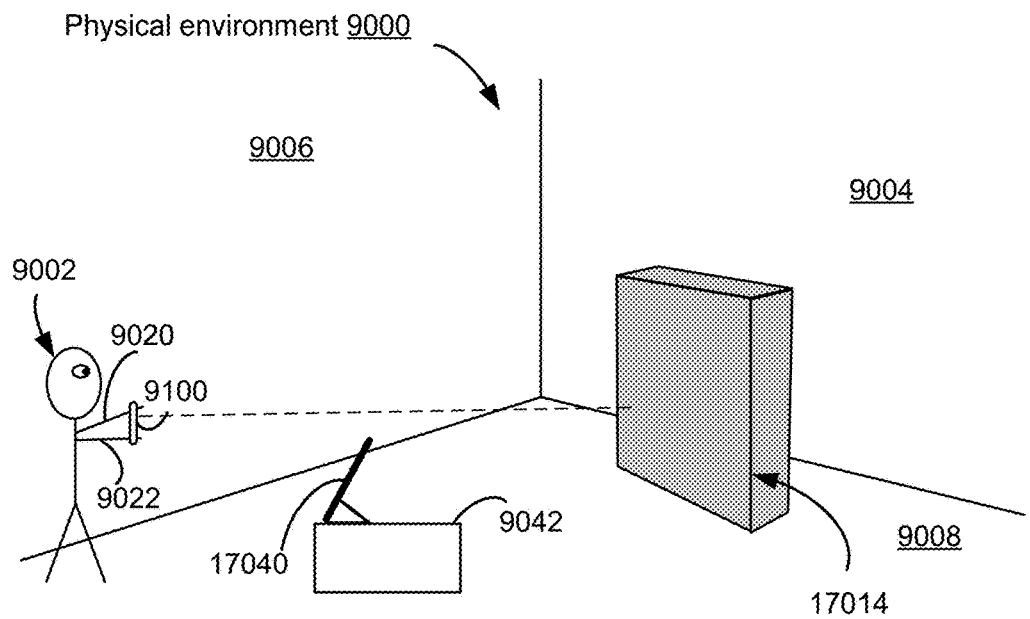

FIG. 17A illustrates a physical environment 9000 that is visible to user 9002 via display generation component 9100 of computer system 101. The physical environment includes physical walls 9004, 9006, and floor 9008. The physical environment 9000 also includes physical object 17014, physical table 9042, and physical book 17040, where physical book 17040 is placed on table 9042 in front of physical object 17014. As shown in the examples in FIGS. 17A-17I, content that is visible via a display generation component 9100 of computer system 101 is displayed on a touch screen held by user 9002 (e.g., user 9002 is holding display generation component 9100 with hand 9020 or hand 9022, or both). The dotted line in FIG. 17A illustrates that user 9002's viewpoint is based on a field of view of the one or more cameras of display generation component 9100 that is being held by user 9002. In some embodiments, display generation component 9100 of computer system 101 is a head-mounted display worn on user 9002's head (e.g., what is shown in FIGS. 17B-17I as being visible via display generation component 9100 of computer system 101 corresponds to user 9002's field of view when wearing a head-mounted display).

In some embodiments, one or more portions of the view of physical environment 9000 that is visible to user 9002 via display generation component 9100 are digital passthrough portions that include representations of corresponding portions of physical environment 9000 captured via one or more image sensors of computer system 101. In some embodiments, one or more portions of the view of physical environment 9000 that is visible to user 9002 via display generation component 9100 are optical passthrough portions, in that user 9002 can see one or more portions of physical environment 9000 through one or more transparent or semi-transparent portions of display generation component 9100.

Figure 17B:
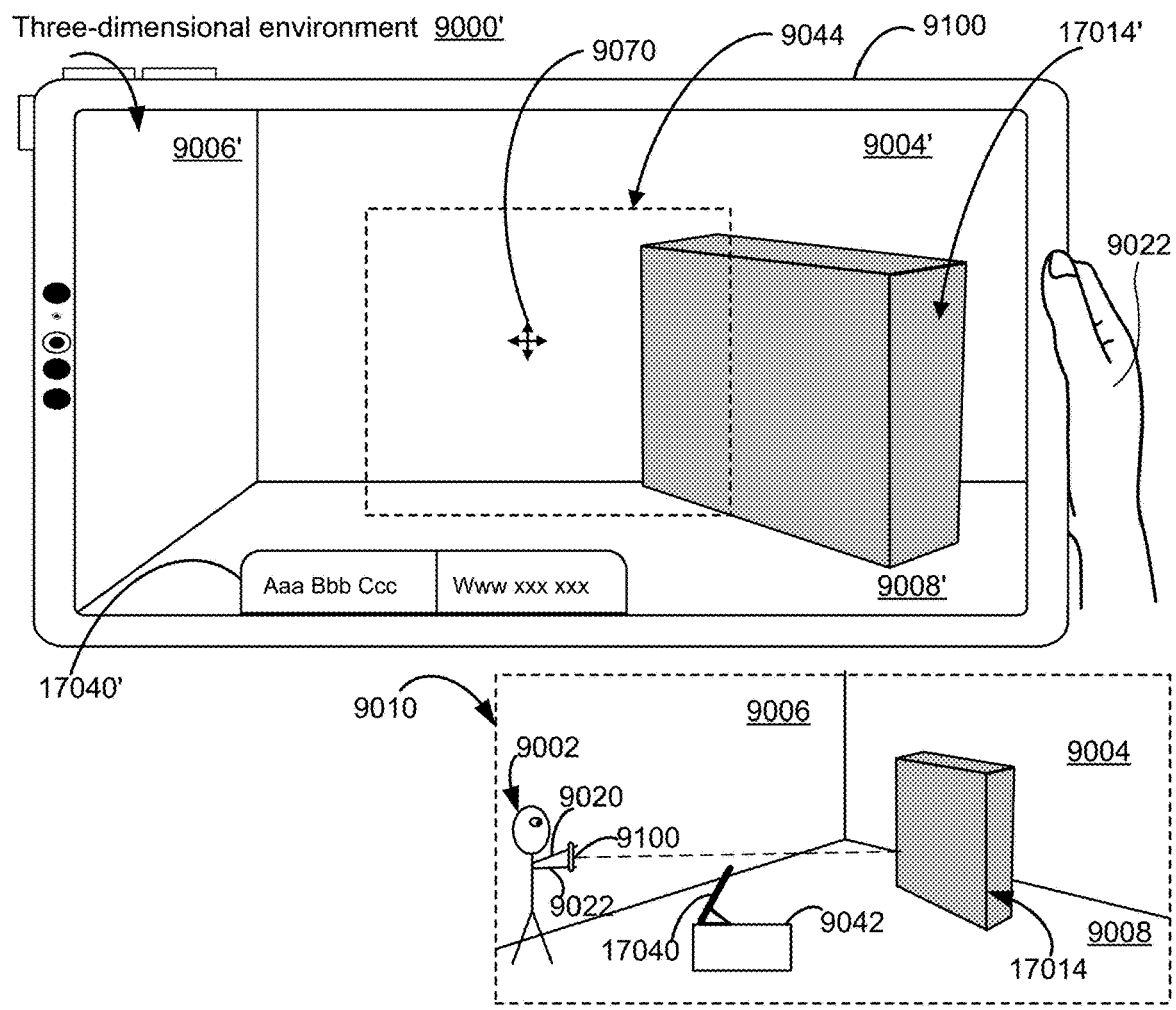

FIG. 17B illustrates a view of a three-dimensional environment 9000' that is visible to user 9002 via display generation component 9100. Display generation component 9100 is held by user 9002 with hand 9022. The view of the three-dimensional environment 9000' includes a representation (or optical view) of portions of the physical environment 9000 as captured by one or more cameras of computer system 101 (or, in some embodiments, an optical passthrough view through one or more transparent or semi-transparent portions of display generation component 9100). The view of the three-dimensional environment 9000' includes representation (or optical view) 9004' of a portion of physical wall 9004, representation (or optical view) 9006' of a portion of physical wall 9006, and representation (or optical view) 9008' of a portion of physical floor 9008. Further, the view of the three-dimensional environment 9000' includes representation (or optical view) 17014' of a portion of physical object 17014 and representation (or optical view) 17040' of a portion of physical book 17040.

The view of the three-dimensional environment 9000' in FIG. 17B shows the user 9002's viewpoint (or in some embodiments, a viewpoint of one or more cameras of display generation component 9100 or a head-mounted display), where the representation (or optical view) 17040' of the portion of physical book 17040 is visible but outside focal region 9044, e.g., the representation (or optical view) 17040' of the portion of physical book 17040 is visible in a peripheral region of a field of view of one or more cameras of display generation component 9100. In some embodiments, where display generation component 9100 of computer system 101 is a head-mounted display, the representation (or optical view) 17040' of the portion of physical book 17040 would be displayed in a peripheral region of a field of view of the user's eyes while looking at the three-dimensional environment via the display generation component. The dotted line in mini view 9010 in FIG. 17B illustrates that user 9002's viewpoint that is based on the field of view of the one or more cameras of the handheld display generation component 9100 is directed towards box 17014.

Focal region 9044 corresponds to a central area in the view of the three-dimensional environment 9000' that determines (at least approximately) what content is in user 9002's focus (e.g., what virtual/physical content is placed in front of user 9002 as opposed to in the periphery). Further, a focus selector object 9070 indicates the position of user 9002's attention and focus, e.g., as determined by user 9002's gaze, or as determined by a portion of user 9002's body, other than the user's eyes or gaze, that is used to position the focus selector object 9070, or as determined by an input device (e.g., a pointer control or controller device).

FIG. 17C show a transition from FIG. 17B in response to detecting a change of position of user 9002 (and display generation component 9100, respectively) in the physical environment 9000, as illustrated in mini view 9010. For example, user 9002 has moved closer to physical book 17040, and has positioned the display generation component 9100 (and a respective one or more cameras of display generation component 9100) in front of physical book 17040. The view of the three-dimensional environment 9000' is changed accordingly and representation (or optical view) 17040' of a portion of physical book 17040 is displayed in the focal region 9044. For example, a representation (or optical view) of a left page of physical book 17040 is completely within focal region 9044 and user 9002's focus is directed on the left page of representation 17040' of physical book 17040 as indicated by focus selector object 9070. The dotted line in mini view 9010 in FIG. 17C illustrates that a viewpoint of user 9002 has changed (e.g., relative to FIG. 17B) based on the changed position (and/or orientation) of the handheld display generation component 9100 towards the physical book 17040.

Figure 17E:
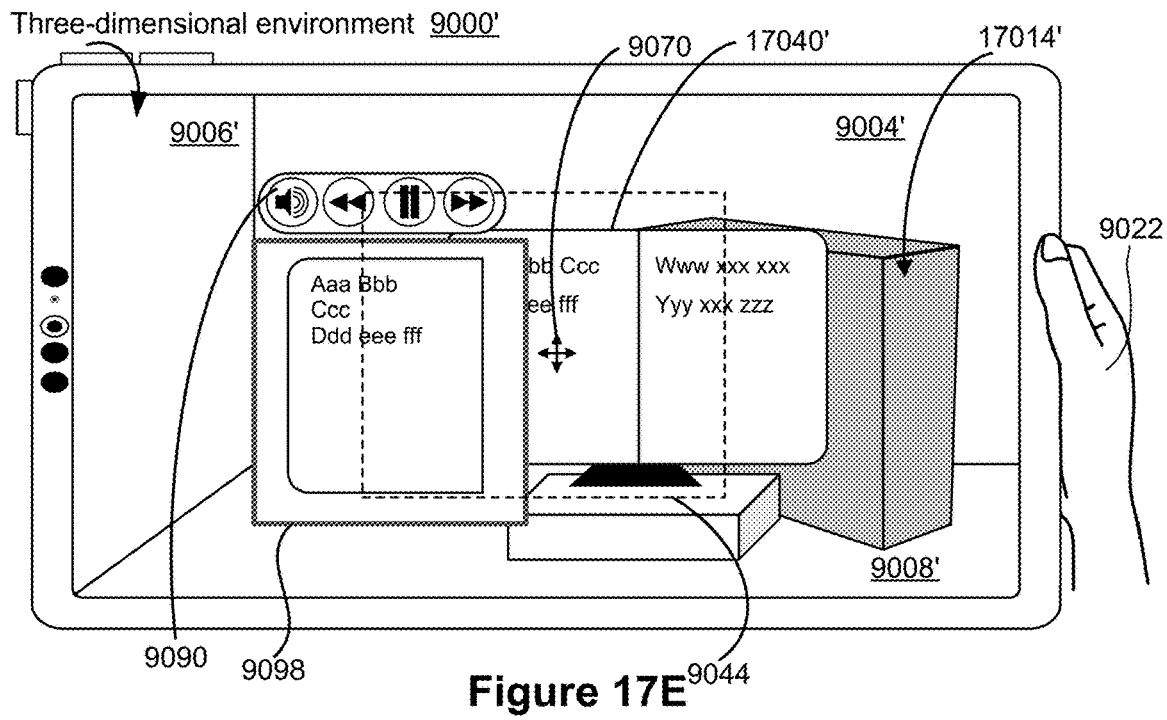
Figure 17F:
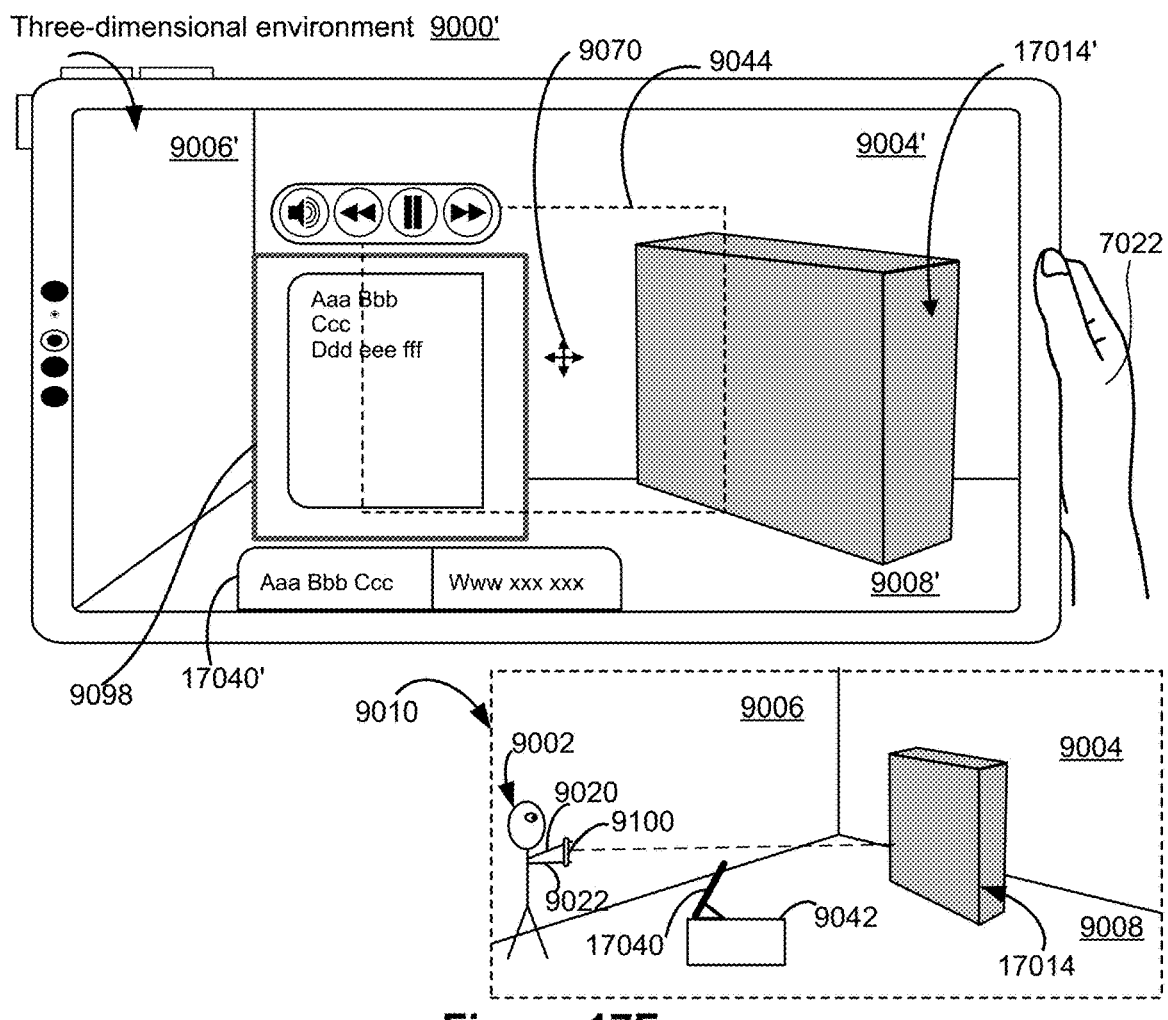

FIG. 17D (e.g., FIGS. 17D1, 17D2 and 17D3, where a user interface analogous to the user interface described in FIG. 17F1 is shown on HMD 7100a in FIG. 17D2) illustrates a transition from FIG. 17C in response to detecting that an object with textual content is within the view of three-dimensional environment 9000'. In particular, in response to detecting that the left page of the representation (or optical view) 17040' of physical book 17040 is visible within focal region 9044, one or more controls 9090, 9092, 9094, and 9096 are automatically displayed by the computer system, including a control 9090 for generating and outputting (or playing) a respective audio representation (e.g., generated by speech synthesis) of the detected textual content in the left page of the representation (or optical view) 17040' of physical book 17040, a control 9092 for moving (sometimes called fast movement) backwards through the audio representation, a control 9096 for moving (sometimes called fast movement) forward through the audio representation, and control 9094 for pausing or stopping the outputting/playing of the audio representation. In some embodiments, user 9002 can play (e.g., initiate output of) the generated audio representation by selecting (e.g., using a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) control 9090. For example, to play the audio representation, user 9002 gazes at control 9090, which moves focus selector object 9070 to a location in the view of the three-dimensional environment 9000' that corresponds to control 9090, and further performs an air pinch gesture with hand 9020 (illustrated with arrows near hand 9020) to activate control 9090. In another example, an air gesture is used to both move the focus selector object 9070 to a location in the view of the three-dimensional environment 9000' that corresponds to control 9090 and to select and thereby activate control 9090.

FIG. 17E illustrates a transition from FIG. 17D in response to detecting the selection of control 9090. In some embodiments, in addition to playing the audio representation in response to detecting the selection of control 9090, a window 9098 with a copy or image of left page of the representation (or optical view) 17040' of physical book 17040 is generated and displayed in the view of the three-dimensional environment 9000'. In some embodiments, the window 9098 is generated and displayed in response to detecting the representation (or optical view) 17040' of physical book 17040 within focal region 9044. In some embodiments, the window 9098 is generated and displayed in response to detecting that the representation (or optical view) 17040' of physical book 17040 is no longer within focal region 9044 (e.g., in response to representation 17040' moving from a location within focal region 9044 to a location outside, or at least partially outside focal region 9044).

FIG. 17F shows a transition from FIG. 17E in response to detecting a change of position of user 9002 (and display generation component 9100, respectively) in the physical environment 9000. For example, the dotted line in mini view 9010 in FIG. 17F illustrates that a viewpoint of user 9002 has changed (e.g., relative to FIG. 17E) based on the changed position (and/or orientation) of the handheld display generation component 9100 away from physical book 17040. For example, user 9002 has moved back to a previous position, away from physical book 17040, where the display generation component 9100 (and respective one or more cameras of display generation component 9100) is positioned such that representation (or optical view) 17040' of physical book 17040 is visible in the periphery and is no longer visible within focal region 9044. The view of the three-dimensional environment 9000' is changed accordingly and representation (or optical view) 17040' of a portion of physical book 17040 is no longer displayed in the focal region 9044. FIG. 17F illustrates that even though representation (or optical view) 17040' of physical book 17040 is no longer within focal region 9044, the window 9098, which includes captured textual content in the left page of representation (or optical view) 17040' of physical book 17040, remains visible (or persists) in the view of the three-dimensional environment 9000'. Furthermore, as viewpoint of user 9002 changes, window 9098 maintains the same spatial relationship relative to the viewpoint of the user 9002 (e.g., remains in the same position on the screen of the display generation component 9100, or the same position within the user 9002's field of view via a head-mounted display, also referred to as "viewpoint-locked").

Figure 17G:
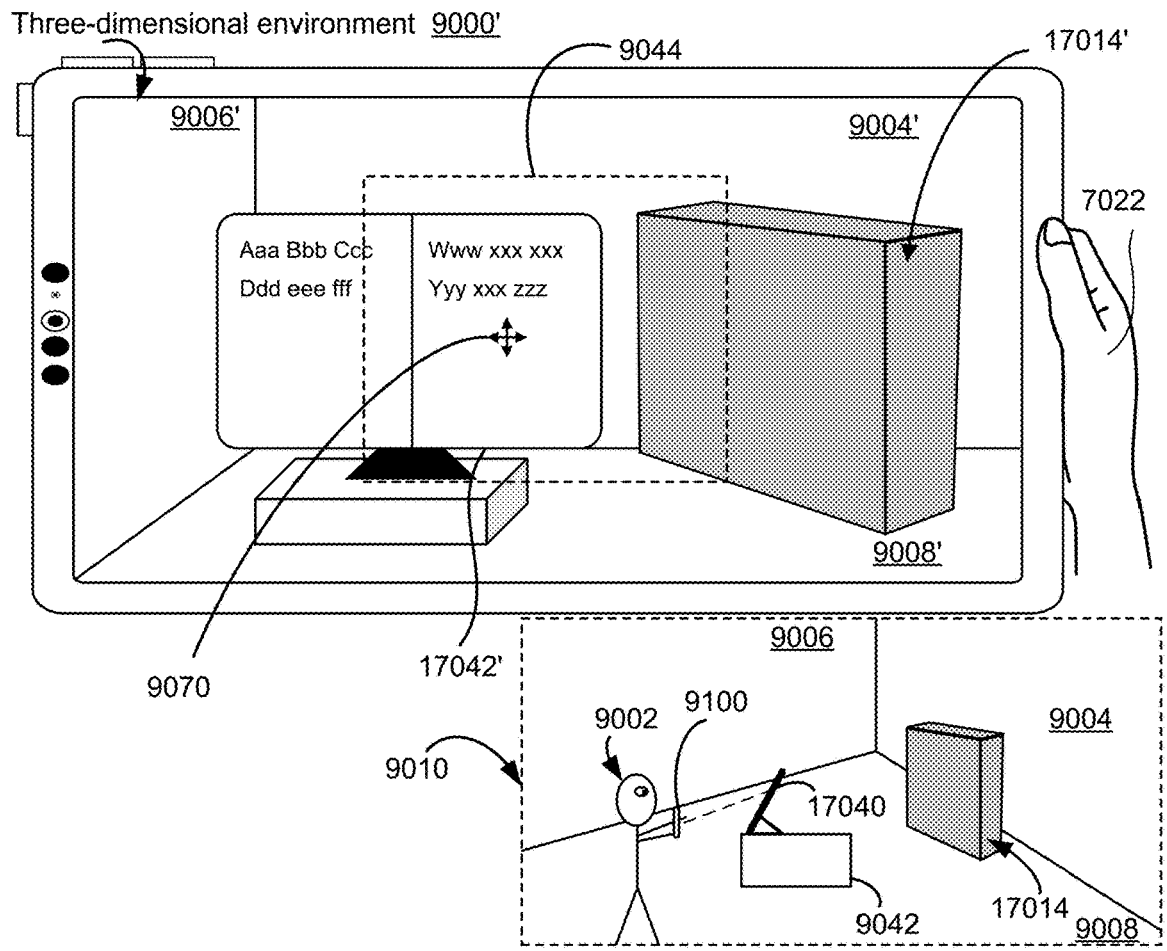

FIG. 17G shows a transition from FIG. 17B in response to detecting a change of position of user 9002 (and display generation component 9100, respectively) in the physical environment 9000, as illustrated in mini view 9010. For example, user 9002 has moved closer to physical book 17040, and has positioned the display generation component 9100 (and a respective one or more cameras of display generation component 9100) in front of physical book 17040. The view of the three-dimensional environment 9000' is changed accordingly and representation (or optical view) 17042' of a portion of physical book 17040 is displayed in the focal region 9044. For example, a representation (or optical view) 17042' of a right page of physical book 17040 is visible (e.g., entirely) within focal region 9044 and user 9002's focus is directed at the representation (or optical view) 17042' of the right page of physical book 17040, as indicated by focus selector object 9070 being located within the representation 17042'. The dotted line in mini view 9010 in FIG. 17G illustrates that user 9002's viewpoint that is based on the field of view of the one or more cameras of the handheld display generation component 9100 is directed at physical book 17040.

Figure 17H:
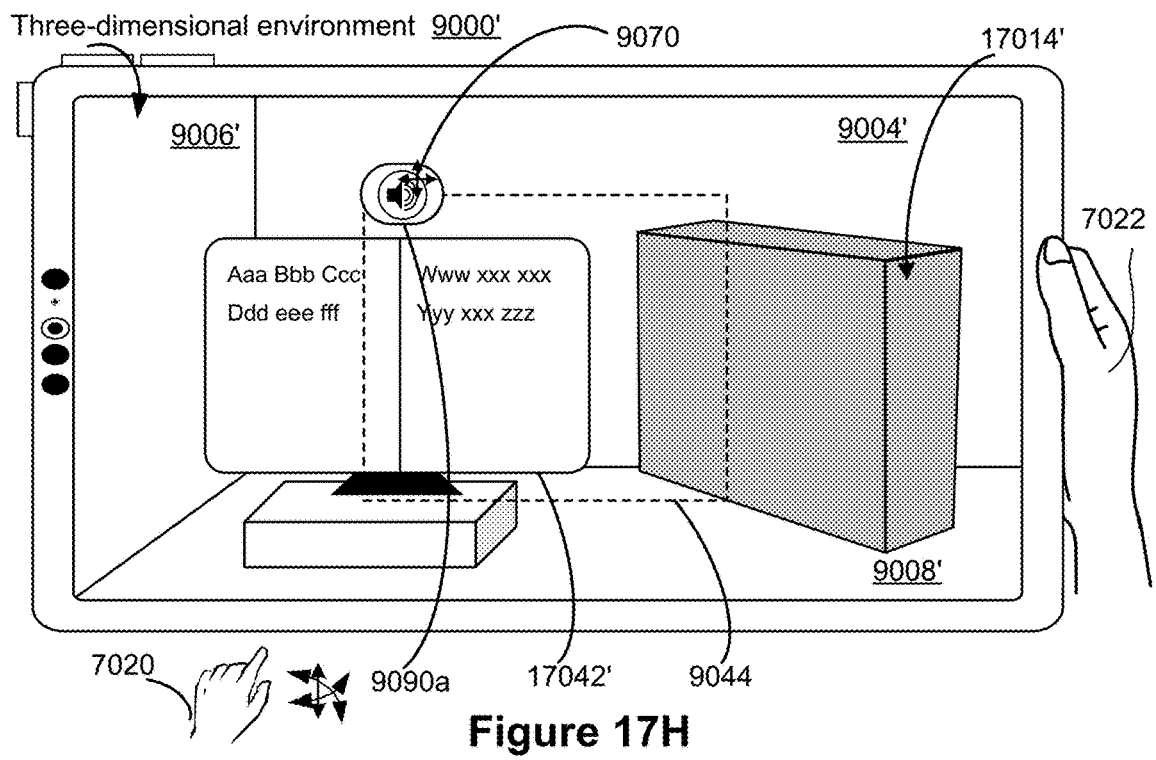

FIG. 17H illustrates a transition from FIG. 17G in response to detecting that an object with textual content is within the view of three-dimensional environment 9000'. In particular, in response to detecting that the representation (or optical view) 17042' of right page of physical book 17040 is visible within focal region 9044, a control 9090a for generating and outputting (or playing) a respective audio representation (e.g., generated by speech synthesis) of the detected textual content in the representation (or optical view) 17042' of the right page of physical book 17040, is automatically displayed. In some embodiments, user 9002 can play (e.g., initiate output of) the generated audio representation by selecting control 9090a. For example, to play the audio representation, user 9002 gazes at control 9090a, which moves focus selector object 9070 to a location in the view of the three-dimensional environment 9000' that corresponds to control 9090a, and further performs an air pinch gesture with hand 9020 (illustrated with arrows near hand 9020) to activate control 9090a. In another example, an air gesture is used to both move the focus selector object 9070 to a location in the view of the three-dimensional environment 9000' that corresponds to control 9090a and to select and thereby activate control 9090a.

Figure 17I:
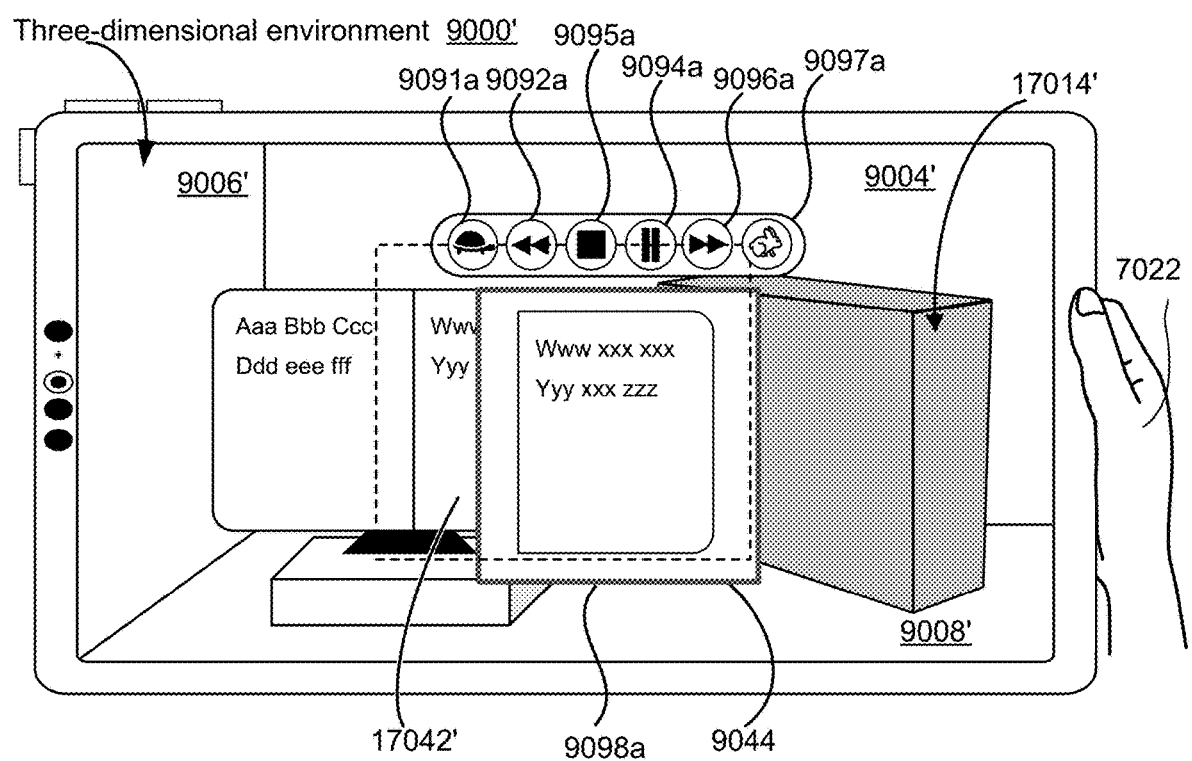

FIG. 17I illustrates a transition from FIG. 17H in response to detecting the selection of control 9090a for playing the audio representation of textual content included in the representation (or optical view) 17042' of the right page of physical book 17040. In some embodiments, in addition to playing the audio representation in response to detecting the selection of control 9090a, a window 9098a with a copy or image the representation (or optical view) 17042' of the right page of physical book 17040 is generated and displayed in the view of the three-dimensional environment 9000'. In some embodiments, the window 9098a is generated and displayed in response to detecting the representation (or optical view) 17042' of right page of physical book 17040. In some embodiments, the window 9098 is generated and displayed in response to detecting that the representation (or optical view) 17042' of right page of physical book 17040 is no longer positioned or located within focal region 9044 (e.g., in response to representation 17042' moving from a location within focal region 9044 to a location outside, or at least partially outside focal region 9044). In some embodiments, window 9098a may include portions of the view of the three-dimensional environment 9000' (e.g., portions of physical and/or virtual environment) that are captured within focal region 9044. For example, in the case where user's hand 9020 is holding the physical book 17040, a portion of user's hand 9020 is captured and included in window 9098a and/or window 9098.

In some embodiments, in response to detecting selection of control 9090a, a number of controls for navigating the audio representation are displayed, including control 9091a for slowing down or decreasing the rate of playing the audio representation, control 9097a for speeding up or increasing the rate of playing the audio representation, control 9092a for moving backwards through the audio representation, a control 9096a for moving forwards through the audio representation, control 9095a for stopping the output/playing of the audio representation, and control 9094a for pausing the output/playing of the audio representation.

Additional descriptions regarding FIGS. 17A-17I are provided below in reference to method 2000 described with respect to FIG. 20.

FIG. 18 is a flow diagram of a method 1800 for restricting various types of changes from occurring in a mixed reality three-dimensional environment when a guided access mode of operation is active, in accordance with some embodiments. In some embodiments, method 1800 is performed at a computer system (e.g., computer system 101 in FIG. 1A) including a display generation component (e.g., display generation component 120 in FIGS. 1A, 3, and 4) (e.g., a heads-up display, a display, a touchscreen, a projector, etc.) and one or more cameras (e.g., a camera (e.g., color sensors, infrared sensors, and/or depth-sensing cameras) that points downward at a user's hand or a camera that points forward from the user's head). In some embodiments, the method 1800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1800 are, optionally, combined and/or the order of some operations is, optionally, changed.

As described herein, method 1800 restricts various types of changes or actions from occurring in a mixed reality three-dimensional environment when a first mode of operation ("guided access") is active, while allowing such changes or actions to occur when a second mode is active (e.g., normal mode). For example, in the "guided access" mode, the computer system does not respond to various user requests and/or inputs including, but not limited to, requests to change an immersion level of the three-dimensional environment, to launch new applications, to move (e.g., relocate) open windows in the three-dimensional environment, and/or to play media content, as well as inputs directed to specific portions of the three-dimensional environment designated as restricted (e.g., background portions of the three-dimensional environment). Restricting changes and actions that can occur in the mixed-reality three-dimensional environment reduces the number of unintended inputs, allows a user to focus on interaction with specific portions of the three-dimensional environment or specific applications while reducing distractions and interruptions, and makes the user-system interface more efficient (e.g., by helping or guiding the user to provide proper inputs). Further, reducing access to portions, applications, or changes that can occur in the mixed-reality three-dimensional environment improves privacy, safety, and security, thereby facilitating sharing of the device by more than one user and/or with users of different age groups (e.g., children). These and other benefits of method 1800 are particularly important to help users with disabilities, especially learning or cognitive impairments, use the device.

While a view of a three-dimensional environment is visible via the display generation component, wherein the three-dimensional environment includes a foreground (e.g., application user interface 7060 is in foreground of the view of three-dimensional environment in FIGS. 15B-15J) and a background that is distinct from the foreground (e.g., virtual and/or real-world content other than application user interface 7060 (e.g., for application "A1," FIG. 15B) visible in the view of three-dimensional environment 7000' in FIGS. 15B-15J), the computer system detects (1802) occurrence of an event corresponding to a change to an appearance of the background of the three-dimensional environment. For example, the event corresponding to a change to an appearance of the background of the three-dimensional environment includes a request to activate a full-screen mode for application user interface 7060 as illustrated in FIG. 15C (e.g., hide the background environment); a request to change or increase the immersion level of the view of the three-dimensional environment 7000' as illustrated in FIG. 15E (e.g., dim, blur, or otherwise reduce prominence of the background environment); a request to move application user interface 7060 as illustrated in FIG. 15G (e.g., move the application user interface from foreground to background in the view of three-dimensional environment); or a request to launch or display an application different from application "A1" as illustrated in FIG. 15I (e.g., where launching a different application would push application user interface 7060 to the background). In response to detecting the occurrence of the event corresponding to a change to the appearance of the background of the three-dimensional environment (1804) and in accordance with a determination that the computer system is in a first mode of operation when the event was detected, the computer system updates (1806) the view of the three-dimensional environment to apply the change to the background of the three-dimensional environment separately from the foreground of the three-dimensional environment (e.g., scrolling content in a user interface displayed in the background (e.g., behind application user interface 7060) of the view of the three-dimensional environment 7000'; closing the application displayed in the background, which is different from the application "A1" displayed in the foreground, or otherwise interacting with virtual content displayed further away from user 7002 relative to application user interface 7060 in FIGS. 15C, 15E, 15G, and 15I; moving virtual objects in the background in FIGS. 15C, 15E, 15G, and 15I' and/or other changes that do not include changing content or appearance of application user interface 7060). The change to the background of the three-dimensional environment includes changing an appearance of a virtual background element (e.g., without applying the change to the foreground).

In response to detecting the occurrence of the event corresponding to a change to the appearance of the background of the three-dimensional environment and in accordance with a determination that the computer system is in a second mode of operation that is different from the first mode of operation when the event was detected, the computer system forgoes (1808) applying the change to the background of the three-dimensional environment (e.g., the computer system maintains an appearance of the background, optionally while applying a different or corresponding change to the foreground).

In some embodiments, the second mode corresponds to a mode of operation (also referred to as "guided access" mode) in which visual or auditory changes in the background environment are restricted, while such changes remain unrestricted in the foreground environment. The first mode corresponds to a mode of operation (e.g., a normal mode) in which no such restrictions are applied, and the system applies the changes to three-dimensional environment without differentiating between changes in the background and changes in the foreground. In some embodiments, the background can be selected in response to a user input (e.g., in response to a user input selecting an area in the view of three-dimensional environment). In some embodiments, the background corresponds to the three-dimensional environment beyond a threshold level of depth. For example, changes in and input directed to portions of the three-dimensional environment that are behind a foremost plane of interaction can be restricted in the second mode. In some embodiments, the background in the second mode is restricted from receiving inputs. In some embodiments, whether the computer system is in the first mode or the second mode, in response to detecting the occurrence of the event, the computer system updates the view of the three-dimensional environment to apply a different change (e.g., a different type of change) to the foreground of the three-dimensional environment that is responsive to the event that occurred (e.g., launching an application or playing media content). In some embodiments, the change to the background of the three-dimensional environment (e.g., a change corresponding to the detected occurrence of the event) does not relate to or is not caused by a change in a user's viewpoint (e.g., moving user's head) relative to the three-dimensional environment to view a different portion of the three-dimensional environment. In some embodiments, the change to the background of the three-dimensional environment does not relate to or is not caused by shifting or moving the background of the three-dimensional environment relative to the user's viewpoint (e.g., in response to a re-centering request). Stated another way, in some embodiments, the event is not a change in a user's viewpoint relative to the three-dimensional environment, and/or is not, or does not correspond to, shifting or moving of the background of the three-dimensional environment relative to the user's viewpoint.

In some embodiments, the event corresponds to adjusting (e.g., increasing or decreasing) a level or degree of immersion of the view of the three-dimensional environment (e.g., in FIG. 15E when the guided access mode is inactive, the computer system responds to the request to change the immersion level). In some embodiments, adjusting the immersion level includes changing one or more properties (e.g., audio and/or visual properties) of a mixed reality three-dimensional environment that influence a user's perception experience (e.g., the degree of perceiving the virtual world relative to the physical world). In some embodiments, adjusting the immersion level includes changing the relative prominence of virtual content and physical world content (visual and/or audio), or changing the degree to which the mixed-reality environment reduces (or eliminates) signals from a physical world relative to signals from a virtual world (e.g., audio and/or visual passthrough of a portion of the physical environment of the computer system). In some embodiments, increasing the immersion level that relates to a visual presentation of the mixed-reality environment includes increasing a proportion of a field of view that is that is occupied (e.g., taken up or used up) by the virtual content relative to the physical world; decreasing or reducing visibility or prominence of a representation (or optical view) of the external physical environment (e.g., by dimming, fading, or reducing an amount of the representation of the real world that is displayed or visible); and/or increasing an extent of fidelity and resolution with which the mixed-reality environment simulates a desired environment. In some embodiments, increasing the immersion level that relates to audio properties of the mixed-reality environment includes increasing prominence or dominance of audio related to the virtual content relative to sound or audio from the real world (e.g., by increasing noise cancellation, increasing a spatiality of spatial audio associated with the virtual environment (e.g., by moving sources to more points around the user or increasing a number and/or volume of point sources of audio), and by increasing a volume of audio associated with the virtual environment. In some embodiments, degree of immersion can also relate to a number or extent of sensory modalities that a user can use to interact with the mixed-reality three-dimensional environment, and increasing the immersion level that relates to input modalities includes switching from using additional hardware (e.g., control devices) to using the user's voice, gaze, and/or body motion to interact with the three-dimensional environment. Degree of immersion can also relate to an extent that a viewpoint of the mixed-reality environment is modified to match a user's viewpoint or perspective, e.g., through capture of the user's motion and timely adjustment of portions of the three-dimensional environment that are within a field of view.

In some embodiments, the change in the background of the three-dimensional environment also can correspond to a change in audio that is being outputted via one or more audio devices that are in communication with the computer system, and the event corresponds to adjusting a volume level.

Restricting visual and/or auditory changes in the background environment when the guided access mode is active, while such changes remain unrestricted in the foreground environment when the guided access mode is not active, makes the user-system interface more efficient, e.g., by helping the user to focus on application(s) and/or window(s) in the foreground environment and helping the user to provide proper inputs (e.g., by reducing distractions and interruptions, and by reducing user mistakes when operating/interacting with the system).

In some embodiments, the one or more input devices include a physical hardware device (e.g., a button, dial, switch, or other movable component, such as dial 7050 shown in FIG. 15B). In such embodiments, detecting the occurrence of the event corresponding to the change to the background of the three-dimensional environment includes detecting, via the physical hardware device, an input that manipulates the physical hardware device (e.g., a press of a button, a keystroke on a physical keyboard, a touch input via a touch-surface surface, rotation of a dial, knob, or other rotatable input element, actuation of a switch, or other hardware device input). The change of the immersion level optionally has a magnitude based on a magnitude of rotation of the hardware device, and the type of change (e.g., increase or decrease) is optionally based on a direction of rotation of the hardware device (e.g., second input described in relation to FIG. 15B that rotates dial 7050). In some embodiments, the input that manipulates the physical hardware device corresponds to an input requesting a change of a degree of immersion or a change in a volume level.

Restricting visual and/or auditory changes in the background environment requested in response to user input on a hardware device when the guided access mode is active, while such changes remain unrestricted in the foreground environment when the guided access mode is not active, makes the user-system interface more efficient, e.g., by helping the user to focus on content in the foreground environment (e.g., application(s) and/or window(s)) and helping the user to provide proper inputs (e.g., by reducing distractions and interruptions, and by reducing user mistakes when operating/interacting with the system).

In some embodiments, detecting the occurrence of the event corresponding to the change to the background of the three-dimensional environment includes receiving a request to launch an application (e.g., the fourth input directed at icon 7072 for launching the messages application described in relation to FIG. 15B). In some embodiments, the background of the three-dimensional environment is changed in conjunction with displaying a user interface of the application that is launched. Launching an application in the three-dimensional environment in response to a request when the computer system is a normal mode of operation (e.g., guided access mode is inactive) (as illustrated in FIG.

15I), and forgoing launching the application when the guided access mode is active (as illustrated in FIG. 15J), makes the user-system interface more efficient, e.g., by helping the user to focus their attention on an application visible in the foreground, by reducing distractions and interruptions, and by reducing user mistakes when operating/interacting with the system.

In some embodiments, detecting the occurrence of the event corresponding to the change to the background of the three-dimensional environment includes receiving a request to play media content (e.g., by displaying a video and/or a graphical representation of audio content). For example, in FIG. 15D, application user interface 7060 can include a user interface element for playing media content that when activated causes a display of another user interface with media content. Playing media content in the three-dimensional environment in response to a request when the computer system is a normal mode of operation (e.g., guided access mode is inactive) (e.g., in FIG. 15I, user interface 7062 can correspond to a window with video content that is displayed and played in response to receiving an input that activates the user interface element for playing media), and forgoing playing the media content when the computer system is in guided access mode of operation, makes the user-system interface more efficient, e.g., by helping the user to focus on content (e.g., visual and/or audio) in the foreground environment (e.g., application(s) and/or window(s)), by reducing distractions and interruptions, and by reducing user mistakes when operating/interacting with the system.

In some embodiments, the background of the three-dimensional environment includes at least a portion of a first computer-generated (e.g., virtual) three-dimensional environment, and applying the change to the background of the three-dimensional environment includes ceasing to display the portion of the first computer-generated three-dimensional environment. For example, in FIG. 15B, a user input that decreases immersion level can be detected. In some embodiments, even when changes can occur in the background environment (e.g., changes that relate to displaying applications not previously or already displayed, notifications, or other computer-generated objects; changes that relate to audio that is associated with objects visible in the view of the three-dimensional environment; changes in appearance of user interface elements of objects visible in the view of the three-dimensional environment, including animations for user interface elements or objects; changes that relate to changing the immersion level of the view of the three-dimensional environment; and/or other changes in the background environment), the background environment is persistently visible in the view of the three-dimensional environment. For example, the background environment that is not related to the changes continues to be displayed or to be visible even when the changes in the background or foreground environment occur (e.g., when a user switches between applications, the background environment is persistently displayed). Ceasing to display a virtual environment, which is otherwise visible via the display generation component, in response to a request received when the guided access mode of operation is inactive (e.g., in response to receiving an input that decreases the immersion level in FIG. 15B, application user interface 7060 and/or user interface 7042 can be removed from display leaving visible representations 7004', 7006', 7008', 7014' (or optical views) of physical walls 7004, 7006, and floor 7008, and physical object 7014) and maintaining display of the virtual environment when the guided access mode of operation is active (e.g., maintaining the view of the three-dimensional environment 7000' as illustrated in FIG. 15B), makes the user-system interface more efficient, e.g., by helping the user to focus on current task(s) or to focus on content (e.g., visual and/or audio) in the foreground environment (e.g., application(s) and/or window(s)), by reducing distractions and interruptions, and by reducing user mistakes when operating/interacting with the system.

In some embodiments, the computer system includes one or more cameras, and applying the change to the background of the three-dimensional environment includes displaying representations of one or more physical objects in a field of view of the one or more cameras that were previously hidden by the computer-generated three-dimensional environment. In some embodiments, adjustment of the background environment corresponds to revealing or displaying passthrough content (optionally while maintaining visibility of the portion of the first computer-generated three-dimensional environment or optionally in conjunction with ceasing to display the portion of the first computer-generated three-dimensional environment). In some embodiments, the display generation component includes a semi-transparent or transparent portion, and applying the change to the background of the three-dimensional environment includes revealing, in the semi-transparent or transparent portion of the display generation component (e.g., the portion of the display generation component is a pass-through portion, such that a user can see through it portions of the surrounding physical environment that are within a field of view), one or more physical objects (e.g. an optical view of the one or more physical objects) that were previously hidden. For example, applying the change to the background of the three-dimensional environment includes revealing "optical passthrough" content. For example, if in FIG. 15B representations 7004', 7006', 7008', 7014' (or optical views) of physical walls 7004, 7006, and floor 7008, and physical object 7014 were not visible, applying the change to the background environment includes revealing representations 7004', 7006', 7008', 7014' (or optical views) of physical walls 7004, 7006, floor 7008, and physical object 7014.

Displaying a representation (or revealing an optical view) of the physical environment, which is otherwise hidden, in response to a request received when the guided access mode of operation is inactive, and maintaining display of the virtual environment without displaying a representation (or revealing an optical view) of the physical environment when the guided access mode of operation is active, makes the user-system interface more efficient, e.g., by helping the user to focus on current task(s) or to focus on content (e.g., visual and/or audio) in the foreground environment (e.g., application(s) and/or window(s)), by reducing distractions and interruptions, and by reducing user mistakes when operating/interacting with the system.

In some embodiments, applying the change to the background of the three-dimensional environment includes displaying at least a portion of a second computer-generated three-dimensional environment that is different from the portion of the first computer-generated three-dimensional environment. In some embodiments, the second computer-generated three-dimensional environment is or includes different virtual scenery than in the first computer-generated three-dimensional environment. In some embodiments, displaying at least a portion of the second computer-generated three-dimensional environment includes displaying one or more different applications (e.g., as illustrated in FIG. 15I, application user interface 7062 is displayed in response to receiving input directed at icon 7072 for launching the messages application). Changing from a first virtual environment to a different virtual environment, in response to a request received when the guided access mode of operation is inactive (e.g., in FIG. 15I, application user interface 7062 is displayed, where application user interface 7062 was not previously or already displayed), and maintaining display of the first virtual environment when the guided access mode of operation is active (e.g., maintaining the view of the three-dimensional environment 7000' as illustrated in FIG. 15B), makes the user-system interface more efficient, e.g., by helping the user to focus on current task(s) or to focus on content (e.g., visual and/or audio) in the foreground environment, by reducing distractions and interruptions, and by reducing user mistakes when operating/interacting with the system.

In some embodiments, the computer system is in communication with one or more cameras, and the background of the three-dimensional environment includes a representation of a portion of a physical environment (e.g., as opposed to a virtual environment, where the portion of the physical environment includes representations of one or more physical objects) in a field of view of the one or more cameras. For example, in FIG. 15B representations 7004', 7006', 7008', 7014' (or optical views) of physical walls 7004, 7006, floor 7008, and physical object 7014. In some embodiments, the background of the three-dimensional environment includes digital passthrough content that includes the representation of the portion of the physical environment. In some embodiments, the digital passthrough content is displayed by the display generation component and images of the portion of the physical environment, including one or more objects, are captured by the one or more cameras. In some embodiments, the background of the three-dimensional environment includes optical passthrough content, where optical views of the one or more physical objects are visible through one or more transparent or semitransparent portions of the display generation component.

Restricting visual and/or auditory changes in the digital or optical passthrough content in the background of the three-dimensional environment (e.g., if an entity from the physical world moves within a current field of view of one or more cameras in FIG. 15B, appearance of the entity is prevented and the view of the three-dimensional environment 7000' remains unchanged), when the guided access mode of operation is active, while such changes remain unrestricted in a virtual environment visible in the foreground when the guided access mode of operation is not active (e.g., appearance of the entity from the physical world is permitted and a representation/view of the entity is made visible in the view of the three-dimensional environment 7000' in FIG. 15B), makes the user-system interface more efficient, e.g., by helping the user to focus on application(s) and/or window(s) in the foreground environment and helping the user to provide proper inputs (e.g., by reducing distractions and interruptions, and by reducing user mistakes when operating/interacting with the system).

In some embodiments, applying the change to the background of the three-dimensional environment includes changing one or more visual properties of the representation of the portion of the physical environment (e.g., as illustrated in FIGS. 15E, representation 7000' of the physical environment 7000 is dimmed relative to FIG. 15B). In some embodiments, changing one or more visual properties includes changing one or more of opacity, brightness, sharpness, blurring, transparency, and other visual properties of the representation (or in some embodiments, the optical view) of the portion of the physical environment. In some embodiments, applying the change to the background of the three-dimensional environment includes increasing or decreasing a proportion of the physical environment that is visible relative to a virtual environment (e.g., extent to which the virtual environment occludes the physical environment or vice versa). Changing intensity of one or more visual properties (e.g. one or more of opacity, brightness, sharpness, blurring, and/or other visual properties) in the digital or optical passthrough environment (e g, dimming or blurring representations 7004', 7006', 7008', 7014' (or optical views) of physical walls 7004, 7006, floor 7008, physical object 7014 and the space in between, as illustrated in FIG. 15E relative to FIG. 15B), in response to a request received when the guided access mode of operation is inactive, and maintaining the intensity of the one or more visual properties when the guided access mode of operation is active (e.g., visual properties of representations 7004', 7006', 7008', 7014' (or optical views) of physical walls 7004, 7006, floor 7008, physical object 7014 and the space in between is maintained as illustrated in FIG. 16B), makes the user-system interface more efficient, e.g., by helping the user to focus on current task(s) or to focus on content (e.g., visual and/or audio) in the foreground environment, by reducing distractions and interruptions, and by reducing user mistakes when operating/interacting with the system.

In some embodiments, while entering the second mode of operation or while in the second mode of operation, a first user interface element for enabling or disabling respective input is displayed via the display generation component. For example, in FIG. 15B a user input that requests activation of the guided access mode is detected, and in response, a user interface for configuring one or more parameters of the guided access mode is displayed. The user interface for configuring one or more parameters of the guided access mode includes one or more options for disabling one or more inputs or input types (e.g., a list of options can be displayed with options that can be toggled on and off. Further, an input selecting the first user interface element (e.g., the input corresponds to an air pinch gesture while focus (e.g., the user's focus, or a displayed focus indicator) is on the first user interface element, where focus can be indicated via user's gaze, a controller, a voice command, or hand interaction. The input corresponds to selection of the first user interface element with a controller, a voice command, and/or gaze (e.g., through maintaining the gaze on the second user interface element for a predetermined amount of time); or other types of inputs) is detected. Further, in response to detecting the input selecting the first user interface element and in accordance with a determination that the second mode of operation is not yet active, responses to respective inputs that are detected when the second mode of operation is active are enabled or disabled in accordance with the detected input selecting the first user interface element. For example, while entering the second mode of operation, the inputs to which the computer system responds when in the second mode of operation are configured in response to a user input. Further, in response to detecting the input selecting the first user interface element and in accordance with a determination that the second mode of operation is active, the computer system forgoes enabling or disabling responses to the respective inputs that are detected when the second mode of operation is active. For example, while already in the second mode of operation, configuring which inputs the computer system responds to while in the second mode of operation is active is forgone. In some embodiments, the first user interface element ceases to be displayed when the second mode of operation is activated. In some embodiments, in response to interacting with the first interface element, a user can control (e.g., enables or disables) whether the computer system responds to detected inputs, e.g., all detected inputs, inputs that are of specific type (e.g., air gestures or gazes), or inputs that are directed to a particular portion in the three-dimensional environment such as the background environment. In some embodiments, the first user interface element is displayed while the computer system is in the second mode of operation and in response to a user selecting a portion of the three-dimensional environment for which inputs are to be restricted. In some embodiments, the computer system enters the second mode in response to a user input, when a setting is turned on, or as a result of a calibration process.

Providing and interacting with a user interface element for enabling/disabling respective inputs (inputs detected outside a predetermined area of the three-dimensional environment or specific input types) received while the computer system is in the guided access mode of operation, provides more control options while reducing the number and/or complexity of inputs needed to restrict access to various types of changes or actions from occurring in the mixed reality three-dimensional (e.g., by reducing the need for navigating different user interfaces, menu hierarchies, and/or other inputs to needed to search for the functionality).

In some embodiments, while entering the second mode of operation or while in the second mode of operation, one or more controls (e.g., a second user interface element) for setting the duration of the second mode of operation (e.g., guided access mode) are provided or displayed via the display generation component. For example, the user can control the time, duration, or period during which the second mode of operation is active, where after the respective time, duration, or period has passed, the computer system automatically disables the second mode of operation. For example, in FIG. 15B a user input that requests that the guided access mode be activated is detected, and in response, a user interface for configuring one or more parameters of the guided access mode is displayed. The user interface for configuring one or more parameters of the guided access mode includes one or more options for setting a duration of activity for the guided access mode (e.g., a list of options with predetermined times, such 10 min, 30 min, 1 hour, 4 hours, 8 hours; or an entry field where a user can enter a user-defined duration). Further, the computer system detects an input directed at the second user interface element (e.g., the input corresponds to an air pinch gesture while focus is on the second user interface element, where focus can be indicated via user's gaze, a controller, a voice command, or hand interaction; or the input corresponds to selection of the second user interface element with a controller, a voice command, gaze (e.g., through maintaining the gaze on the second user interface element for a predetermined amount of time), or other type of input). Further, in response to detecting the input directed at the second user interface element and in accordance with a determination that the second mode of operation is not yet active, the duration (e.g., minutes, hours, days, and/or other timeframe) of activity of the second mode of operation is set. Further, in response to detecting the input directed at the second user interface element and in accordance with a determination that the second mode of operation is active, the computer system forgoes changing the duration of activity of the second mode of operation. In some embodiments, the second user interface element ceases to be displayed when the second mode of operation is activated. In some embodiments, in response to interacting with the second interface element, a user can control the time, duration, or period during which the second mode is active, where the second mode is no longer active after the respective time, duration, or period. In some embodiments, the duration of activity of the second mode of operation is determined based on direction and/or magnitude of the input directed to the second user interface element.

Providing and interacting with a user interface element for setting a time period at the end of which the computer system automatically disables the guided access mode of operation, provides more control options while reducing the number of inputs needed to reactivate a normal mode of operation (or deactivate the guided access mode of operation), e.g., by reducing the need for navigating different user interfaces and/or menu hierarchies.

In some embodiments, while entering the second mode of operation or while in the second mode of operation, a third user interface element for enabling or disabling one or more applications (e.g., currently running applications) is displayed via the display generation component. For example, in FIG. 15B a user input that requests that the guided access mode be activated is detected, and in response, a user interface for configuring one or more parameters of the guided access mode is displayed. The user interface for configuring one or more parameters of the guided access mode includes one or more options for disabling one or more applications or application types (e.g., a list of applications can be displayed with options that can be toggled on and off). Further, the computer system detects an input selecting the third user interface element (e.g., the input corresponds to an air pinch gesture while focus is on the third user interface element, where focus can be indicated via user's gaze, a controller, a voice command, or hand interaction; or the input corresponds to selection of the third user interface element with a controller; a voice command, (e.g., through maintaining the gaze on the third user interface element for a predetermined amount of time), or other type of input). Further, in response to detecting the input selecting the third user interface element and in accordance with a determination that the second mode of operation is active, the computer system forgoes enabling or disabling operations related to the one or more applications (or in some embodiments, the third user interface element ceases to be displayed when the second mode of operation is activated). Further, in response to detecting the input selecting the third user interface element and in accordance with a determination that the second mode of operation is not yet active, the computer system enables or disables operations related to the one or more applications. In some embodiments, in response to interacting with the third interface element, a user can enable or disable one or more applications (e.g., a group of application, such as nonactive applications, a type of applications, such as applications related to entertainment, or specific applications).

Providing and interacting with a user interface element for enabling/disabling one or more applications (e.g., currently running applications or specific types or groups of applications) while entering the guided access mode of operation, to configure what functionality is restricted when in the guided access mode, provides more control options while reducing the number of inputs needed to restrict access to various applications in the mixed reality three-dimensional (e.g., by reducing the need for navigating different user interfaces, menu hierarchies, and/or other inputs to needed to search for the functionality).

In some embodiments, while entering the second mode of operation or while in the second mode of operation, a fourth user interface element for controlling an immersion level of the view of the three-dimensional environment is displayed via the display generation component. For example, in FIG. 15B a user input that requests that the guided access mode be activated is detected, and in response, a user interface for configuring one or more parameters of the guided access mode is displayed. The user interface for configuring one or more parameters of the guided access mode includes a slider control for adjusting the immersion level). Further, the computer system detects an input directed at the fourth user interface element (e.g., the input corresponds to an air pinch gesture while focus is on the fourth user interface element, where focus can be indicated via user's gaze, a controller, a voice command, or hand interaction; or the input corresponds to selection of the fourth user interface element with a controller, a voice command, or the user's gaze (e.g., through maintaining the gaze on the fourth user interface element for a predetermined amount of time). Further, in response to detecting the input directed at the fourth user interface element and in accordance with a determination that the second mode of operation is active, the computer system forgoes changing the immersion level of the view of the three-dimensional environment (e.g., maintaining the currently immersion level). Further, in response to detecting the input directed at the fourth user interface element and in accordance with a determination that the second mode of operation is not yet active, the immersion level of the view of the three-dimensional environment is changed from a first immersion level to a second immersion level (e.g., the second immersion level is different from the first immersion level). In some embodiments, in response to interacting with the fourth interface element (e.g., a slider for adjusting the immersion level), a user can control the degree of immersion of the mixed-reality three-dimensional environment (e.g., including reducing noise from and visibility of the physical environment, increasing prominence of the virtual environment, and/or other changes to the degree of immersion) while entering the guided access mode (e.g., while a user interface for entering and/or configuring the guided access mode is displayed) and prior to activating the guided access mode. For example, a user can set the level of immersion for the duration of activity of the second mode of operation. In some embodiments, the fourth user interface element for controlling the immersion level is maintained after the second mode of operation is activated, however, the computer system forgoes responding to requests to change the immersion level when the second mode of operation is active. In some embodiments, the immersion level is optionally changed based on or in accordance with the direction and/or magnitude of the input directed at the fourth user interface element. For example, the change optionally has a magnitude based on a magnitude of sliding or rotating input and/or has a direction based on a direction of the sliding or rotating input.

Displaying and interacting with a user interface element for adjusting the immersion level of the three-dimensional environment while entering the guided access mode of operation to set the immersion level while the computer system is in the guided access mode, provides more control options while reducing the number of inputs needed to adjust appearance of the mixed reality three-dimensional (e.g., by allowing setting of the immersion level of the three-dimensional environment when the computer system is in the guided access mode without the need to change the immersion level of the three-dimensional environment when the computer system is in normal mode).

In some embodiments, aspects/operations of methods 1100, 1200, 1300, 1400, 1900, 2000, 2300, and 2400 may be interchanged, substituted, and/or added between these methods. For example, the method of restricting various types of changes from occurring in a mixed reality three-dimensional environment when a guided access mode of operation is active as described in method 1800 is optionally used to restrict various types of changes from occurring in a mixed reality three-dimensional environment when a guided access mode of operation is active for methods 1100, 1200, 1300, 1800, 1900, 2000, 2300, and/or 2400. For brevity, these details are not repeated here.

FIG. 19 is a flow diagram of a method 1900 for localization and visualization of sound in a mixed-reality three-dimensional environment, in accordance with some embodiments. In some embodiments, method 1900 is performed at a computer system (e.g., computer system 101 in FIG. 1A) including a display generation component (e.g., display generation component 120 in FIGS. 1A, 3, and 4) (e.g., a heads-up display, a display, a touchscreen, a projector, etc.) and one or more cameras (e.g., a camera (e.g., color sensors, infrared sensors, and/or depth-sensing cameras) that points downward at a user's hand or a camera that points forward from the user's head). In some embodiments, method 1900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1900 are, optionally, combined and/or the order of some operations is, optionally, changed.

As described herein, method 1900 provides different visual effects for visualizing sound in a mixed-reality three-dimensional environment depending on whether a location of the sound is within or outside a respective field of view (user's field of view or a field of view captured by one or more cameras). For example, if the sound occurs within the field of view, a first visual effect is provided, and if the sound occurs outside the field of view, a second visual effect is provided. Optionally, the first visual effect can be changed to the second visual effect (and vice versa) depending on whether the location of the sound is moved from within the field of view to outside the field of view, or vice versa. The first and second visual effects are provided for ambient and speech sounds that occur in a physical environment as well as for audio generated by a virtual object or virtual world. In mixed-reality virtual environments, sounds are used to augment user's perception and experience of the mixed-reality, however, information conveyed through sound may not be accessible for all users. Providing different visual effects for visualizing sound in a mixed-reality three-dimensional environment depending on whether a location of the sound is within or outside a respective field of view, provides visual feedback about sounds that occur in the mixed-reality environment (e.g., thereby augmenting user's experience of the mixed-reality environment) and provides a mechanism for spatially locating sound (e.g., by helping a user determine a position of a sound source in the mixed-reality three-dimensional environment). These and other benefits of method 1900 are particularly important to help users with disabilities, especially hearing impairments, use the device.

While a first view of a three-dimensional environment (e.g., three-dimensional environment 7000' in FIG. 16B) is visible via the display generation component (e.g., display generation component 7100), an audio (or sound) event associated with a respective portion of an object in the three-dimensional environment occurs (1902). In some embodiments, the object corresponds to a first open window of a software application executing on the computer system, where the audio is associated with (or originates from) the first window and the audio is not associated with a second open window. For example, audio occurs in the view of the three-dimensional environment 7000' in FIG. 16B, where a source of the audio is application window "W3" 7084 rather than application window "W2" 7082 or application window "W1" 7080. In some embodiments, a source of the audio is an object in a virtual game or other object from a virtual world. In some embodiments, the source of the audio is a virtual assistant, a communications application, an email application, an application for consuming media content, or an application (e.g., a browser application) for browsing the web. In some embodiments, the source of the audio/sound is an inanimate object or a living being from the physical world, including, but not limited to, a mobile phone, a human, a pet, or other object or living being that can generate sound. In some embodiments, the audio or sound event is detected, or requested by the user, or an event that also includes audio is generated by the device.

In response to the occurrence of the audio (or sound) event associated with the respective portion of the object in the three-dimensional environment (1904) and in accordance with a determination that the respective portion of the object is outside of the first view of the three-dimensional environment, a first visual effect that indicates a location of the respective portion of the object in the three-dimensional environment relative to the first view is displayed (1906) via the display generation component. The first visual effect is displayed within the first view and indicates that a location of the audio (or sound) in the three-dimensional environment is outside of the first view (e.g., the first visual effect indicates a direction of the location of the source of the audio). For example, in FIGS. 16D, visual effect 7088 is displayed in response to detecting an occurrence of sound/audio outside the view of the three-dimensional environment 7000'. Further, in response to the occurrence of the audio (or sound) event associated with the respective portion of the object in the three-dimensional environment (1904) and in accordance with a determination that the respective portion of the object is within the first view of the three-dimensional environment (e.g., the respective portion of the object is at least partially visible in the first view of the three-dimensional environment), a second visual effect (e.g., a visual effect applied to the object or the respective portion of the object) that indicates the location of the object within the first view is displayed (1908) via the display generation component. The second visual effect is different from the first visual effect. For example, in FIGS. 16C and 16D, visual effect 7086 is displayed and applied to grabber affordance 7084a of window "W3" 7084, which is within the view of the three-dimensional environment 7000', whereas the first effect, such as visual effect 7088 in FIGS. 16D, indicates a location of the respective portion of the object in the three-dimensional environment relative to the first view.

In some embodiments, the first visual effect is a different type of effect from the second visual effect. For example, the second visual effect can have a convex shape (a circle or ellipse) and can encompass or encircle the entire object or a portion of the object that is within the field of view (e.g., visual effect 7086 in FIGS. 16C-16D, and visual effect 7086a in FIG. 16E), whereas the first visual effect can be an arrow (e.g., visual effect 7088 in FIGS. 16D-16E, and visual effect 7088a in FIG. 16E), a simulated light emitting from a direction of the sound outside of the field of view, or ripples that indicate direction and location of the sound outside the field of view. In some embodiments, the first and/or second visual effect can also include textual description of the sound/audio that occurs (e.g., "footsteps," "speech," "crying baby," and other textual descriptions). In some embodiments, the first and/or second visual effects include or correspond to iconic representations of the sounds (e.g., an illustration or icon that visually illustrates the type of sound that is occurring).

In some embodiments, the computer system receives a request to change a portion of the three-dimensional environment that is visible in the first view. For example, the request can be received in response to moving the viewpoint of the user relative to the three-dimensional environment, to view a different portion of the three-dimensional environment, and/or in response to moving one or more objects (e.g., by the computer system or in response to an input) in the three-dimensional environment into a current field of view of one or more cameras in communication with the computer system. In some embodiments, the request to change the portion of the three-dimensional environment that is visible in the first view is an input that corresponds to a request to change the field of view of a user or of one or more cameras capturing the current field of view, or an input that corresponds to a request by a user to move one or more objects. In response to receiving the request to change the portion of the three-dimensional environment that is visible in the first view, the first view of the three-dimensional environment is changed. Changing the first view of the three-dimensional environment includes: in accordance with a determination that the respective portion of the object is within the changed first view of the three-dimensional environment (e.g., the viewpoint of the user has moved relative to the three-dimensional environment such that the respective portion of the object is in the user's field of view and/or the object has been moved in the three-dimensional environment into the user's field of view), the first visual effect that indicates the location of the object in the three-dimensional environment relative to the changed first view is ceased to be displayed. For example, visual effect 7088 in FIG. 16D disappears as the representation/view of the source of the sound/audio, which is speaker 7018, is moved within the view of the three-dimensional environment 7000' in FIG. 16E. In some embodiments, in accordance with a determination that the respective portion of the object is not within the changed first view of the three-dimensional environment (e.g., the respective portion of the object is still not within the user's field of view), the computer system continues to display the first visual effect indicating a location of the respective portion of the object relative to the changed first view (optionally updating one or more properties of the first visual effect to indicate a changed spatial relationship between the object and the changed first view). In some embodiments, the user's field of view corresponds to the field of view of the one or more cameras.

Ceasing to display the first visual effect, which indicates a direction of or a location of the sound outside the field of view, in accordance with a determination that the object (or respective portion of the object) is moved within the field of view, provides an improved mechanism for spatially locating a sound occurring in the mixed-reality three-dimensional environment.

In some embodiments, in conjunction with ceasing to display the first visual effect (e.g., after, before, in response to ceasing to display the first visual effect, or in response to an event that caused the device to cease to display the first visual effect), the second visual effect that indicates the location of the object within the changed first view is displayed via the display generation component. For example, in FIG. 16E, visual effect 7086a applied to the representation/view 7018' of speaker 7018 is displayed to indicate the location of the sound source within the view of the three-dimensional environment 7000'. In some embodiments, in accordance with a determination that the respective portion of the object is within the changed first view of the three-dimensional environment (e.g., the respective portion of the object is now visible within the user's field of view), the computer system displays the second visual effect indicating a location of the respective portion of the object within the changed first view and also ceases to display the first visual effect, as the location from where the audio output originates is no longer outside of the first view and is specifically pinpointed by the first visual effect.

Displaying the second visual effect in conjunction with ceasing to display the first visual effect, in accordance with a determination that the object (or respective portion of the object) is moved from outside the field of view to within the field of view, provides visual feedback about the state of the mixed-reality three-dimensional environment and provides an improved mechanism for spatially locating sounds occurring in the mixed-reality three-dimensional environment.

In some embodiments, the object corresponds to a user interface of an application (e.g., window "W3" 7084 in FIG. 16C); and the second visual effect includes visually highlighting a portion of the user interface of the application (e.g., visual effect 7086 is applied to grabber affordance 7084a in FIGS. 16C-16D). In some embodiments, the user interface of the application includes one or more portions that are optionally separated. For example, the user interface of the application can include one or more open windows, and a grabber affordance can be associated with a respective window from the one or more open windows, where the grabber affordance can be "floating" in space below or otherwise near the respective window. The grabber affordance is a user interface element that is associated with a window and is used to selected and move the window. In this example, the visual effect can be highlighting the grabber affordance of the window, which is the sound source. In some embodiments, the application is a web browsing application that includes two or more open tabs, and the second visual effect highlights a respective tab of the two or more that is a source of the sound/audio.

Applying the second visual effect (which indicates location of the object within the field of view) to a particular portion of an application user interface (e.g., a grabber affordance) rather than the entire user interface of the application (e.g., the entire application window), allows a user to spatially locate an audio source in the mixed reality three-dimensional environment while reducing visual clutter.

In some embodiments, the portion of the user interface of the application that is highlighted corresponds to a user interface element for moving the user interface of the application (e.g., visual effect 7086 is applied to grabber affordance 7084a in FIGS. 16C-16D). In some embodiments, the user interface of the application corresponds to a window of the application, and the user interface element for moving the user interface of the application corresponds to a grabber affordance. In some embodiments, the user interface of the application is moved in response to detecting direct or indirect user input that is directed at the grabber affordance. In some embodiments, when the input interacting with the grabber affordance is a direct input, a user can reach out with a hand and grab or pinch the window grabber affordance (e.g., a user can move the hand and fingers to a location in view of the three-dimensional environment that corresponds to the window grabber affordance), and move the hand and the window along with moving the hand (or in accordance with movement of the hand in the view of the three-dimensional environment). In some embodiments, when the input interacting with the grabber affordance is an indirect input, a user's attention is directed at the grabber affordance by moving user's gaze at a location in the view of three-dimensional environment that is occupied by the grabber affordance. The grabber affordance is selected in response to detecting the user's gaze directed at the grabber affordance (optionally after user's gaze is maintained directed at the grabber affordance for at least a threshold amount of time). The window is moved in response to detecting an air pinch gesture that is performed while the gaze is maintained directed at the grabber affordance in conjunction with movement of the hand from a first position to a second position in the view of the three-dimensional environment, where the window is moved along with the hand from the first position to the second position.

Applying the second visual effect (which indicates location of the object within the field of view) to a grabber affordance for moving an application window rather than the entire application window), allows a user to spatially locate an audio source in the mixed reality three-dimensional environment while reducing visual clutter.

In some embodiments, displaying the first visual effect includes changing an appearance of a portion of the first view of the three-dimensional environment that does not include the object. In some embodiments, since the first visual effect indicates that a location of the audio is outside the field of view, displaying the first visual effect includes displaying a visual indication (e.g., such an arrow or a glowing light) that indicates a direction of the location of the object outside the first view of the three-dimensional environment. For example, while speaker device 7018 is at a location outside the field of view, visual effect 7088 indicates a location of the speaker device outside the field of view, as shown in FIGS. 16D, and is not applied to the representation (or optical view) 7018' of speaker device 7018 itself.

Applying the first visual effect to a portion of a view of the three-dimensional environment to indicate location and/or direction of the sound that is located outside the field of view (and not visible in the view of the three-dimensional environment), provides visual feedback about the state of the mixed-reality three-dimensional environment and an improved mechanism for spatially locating sounds occurring in the mixed-reality three-dimensional environment.

In some embodiments, the first visual effect and/or the second visual effect are displayed in conjunction with (e.g., after, before, in response to displaying the first visual effect or the second visual effect, or in response to the audio or sound event that occurred in the three-dimensional environment) displaying an indication of a type of the audio that is detected (e.g., alert "N1" 7090 in FIG. 16E can indicate that music is playing or the type music that is playing, or the particular song that is playing, or otherwise indicate the type of audio that is occurring). In some embodiments, the indication of the type of the audio includes a name of a song or a movie that is being played. In some embodiments, the indication can be written text or description of the object and/or the audio. In some embodiments, the indication of the type of the audio includes a classification or other description of the audio (or sound). For example, if the sound comes from the physical environment, example classifications include, but are not limited to, a "background noise," "a barking dog," "a ringing phone," and/or "an alarm." In another example, if the sound comes from an email application, the description of the audio can correspond to an email notification of a received email that includes a sender and a subject line. Displaying an alert or textual description of the type of audio or sound that occurs in the mixed reality three-dimensional environment (optionally in place of or in conjunction with the first and/or second visual effects), provides visual feedback about the type of audio/sound and improves user's surrounding awareness.

In some embodiments, the first view of the three-dimensional environment includes a view of a portion of a physical environment, and the object is an inanimate physical object (e.g., speaker device 7018 in FIG. 16A) or a living being in the physical environment. In some embodiments, the audio or sound that is occurring is a sound or a noise that originates from the surrounding environment in the real world. For example, the sound can be a ringing phone, a movie playing on a TV, a crying baby, a talking human, a barking dog, or other sounds. In some embodiments, the first visual effect and/or the second visual effect are also displayed for environmental sounds in the real world. Displaying an alert or textual description for sounds that occur in the physical world of the mixed reality three-dimensional environment (optionally in place of or in conjunction with the first and/or second visual effects), provides visual feedback about the type of audio/sounds and improves user's awareness of the real world surrounding the computer system or user.

In some embodiments, in accordance with a determination that a predetermined amount of time (e.g., 0.1, 0.2, 0.5, 1, 2, or 5 seconds) has passed since displaying the first visual effect, the first visual effect fades out (e.g., visual effect 7088 in FIGS. 16D and/or visual effect 7088a in FIG. 16E fade out after the predetermined amount has passed). In some embodiments, the first visual effect is not faded out before the predetermined amount of time has passed. In some embodiments, the fading out of the first visual effect is a process that does not begin before the predetermined amount of time has passed. In some embodiments, the first visual effect is not completely hidden due to the fading out until the predetermined amount has passed. In some embodiments, the first visual effect, which indicates that the object that is a source of the sound is outside the field of view, is temporary. In some embodiments, the first visual effect fades out even if the audio continues to be detected or the audio/sound event continues to occur. For example, the computer system interprets the passage of the predetermined amount of time as indication of user's intent not to change focus (e.g., to locate the source of the sound). Maintaining the first visual effect in the first view of the three-dimensional environment only for a predetermined amount of time (e.g., as opposed to continuously while the respective sound continues to occur) avoids disrupting a user's focus on portions of the three-dimensional environment that are visible in the field of view and avoids visual clutter by reducing visualizations of sounds that are located outside the field of view. Further, fading out of the first visual effect as opposed to immediately ceasing to display the first visual effect provides visual feedback or cue to the user that the first visual effect is about to be removed, and provides the user with a window of opportunity (even if for a short period of time) to spatially locate a respective source of the sound that is occurring before the first visual effect has completely disappeared.

In some embodiments, while the audio (or sound) event is occurring, the second visual effect is maintained (e.g., while the audio from speaker device 7018 continues to occur and the representation or optical view 7018' of the speaker device is maintained within the field of view, visual effect 7086a applied to the representation or optical view 7018' is maintained rather than fading out). In some embodiments, in response to ending of the occurrence of the audio or sound, the second visual effect ceases to be displayed or is faded out, optionally after a delay of a predetermined amount of time (e.g., 0.1, 0.2, 0.5, 1, 2, or 5 seconds). In some embodiments, the second visual effect, which indicates the location of the object in the first view of the three-dimensional environment, continues to be displayed while the audio is still being detected and the respective portion of the object continues to be located within the first view of the three-dimensional environment, e.g., to indicate that the sound/audio continues and has not stopped. Maintaining the second visual effect in the first view of the three-dimensional environment while the sound is occurring provides visual feedback or cue that the sound has not ended and/or helps a user spatially locate a respective source of the sound that is occurring within the field of view.

In some embodiments, prior to displaying the first visual effect and while the audio (or sound) event is occurring, a viewpoint of a user relative to the three-dimensional environment is moved to change a respective portion of the three-dimensional environment that is visible in the first view, including ceasing to display the respective portion of the object in the first view. In response to detecting that the respective portion of the object is no longer displayed in the first view, the first visual effect is displayed. In some embodiments, the first visual effect is triggered while the audio or sound event continues to occur and in response to detecting that the respective portion of the object is no longer within the first view (e.g., in response to detecting that the audio from window "W3" 7084a continues to occur but that window "W3" 7084a is no longer within the view of the three-dimensional environment in FIGS. 16D, a visual effect 7088a is displayed, as shown in FIG. 16E). In some embodiments, the second visual effect is displayed prior to moving the viewpoint of the user, and the second visual effect ceases to be displayed in conjunction with displaying the first visual effect in response to detecting that the respective portion of the object is within the field of view.

Displaying the first visual effect (which indicates that a sound source is outside the field of view) in response to detecting that the viewpoint of the user has changed such that the sound source is no longer within the field of view, provides visual feedback or cue that the sound is still occurring and/or helps a user spatially locating the sound source that is no longer within the field of view.

In some embodiments, prior to displaying the first visual effect and while the audio (or sound) event is occurring, the respective portion of the object is moved outside the first view (e.g., in FIGS. 16D, user 7002 can move window "W3" 7084a outside the view of the three-dimensional environment). In response to detecting that the respective portion of the object is no longer displayed in the first view, the first visual effect is displayed (e.g., visual effect such as visual effect 7088 or 7088a is displayed to indicate the direction/location of window "W3" 7084a, which has been moved outside the view of the three-dimensional environment 7000'). In some embodiments, a condition to trigger or display the first visual effect in addition to the condition that the respective portion of the object is moved outside of the field of view, is that the audio or sound event continues to occur (e.g., if the sound/audio stops before moving the object outside the field of view, the first visual effect would not be applied). Displaying the first visual effect in response to detecting that the sound source has moved outside the field of view, provides visual feedback or a cue that the sound is still occurring and/or helps a user spatially locating the sound source that is no longer within the field of view.

In some embodiments, prior to displaying the first visual effect and while the respective portion of the object is outside the first view, the audio (or sound) is detected. In response to the occurrence of the audio (or sound) event and while the respective portion of the object is outside the first view, the first visual effect is displayed (e.g., in FIG. 16C visual effect 7088 is not displayed until the audio from speaker device 7018 occurs). In some embodiments, the first visual effect is trigged in response the occurrence of the audio/sound event while the sound source is outside the field of view. Displaying the first visual effect in response to the occurrence of the audio/sound event while the sound source is outside the field of view provides visual feedback or cue that a sound/audio has occurred and/or helps a user spatially locating the sound source that is outside the field of view.

In some embodiments, aspects/operations of methods 1100, 1200, 1300, 1400, 1800, 2000, 2300, and 2400 may be interchanged, substituted, and/or added between these methods. For example, the method of localizing and visualizing sound in a mixed-reality three-dimensional environment as described in method 1900 is optionally used to localize and visualize sound for methods 1100, 1200, 1300, 1400, 1800, 2000, 2300, and/or 2400. For brevity, these details are not repeated here.

FIG. 20 is a flow diagram of a method 2000 for detecting textual content in a mixed-reality three-dimensional environment and generating a respective audio representation of the detected textual content, in accordance with some embodiments. In some embodiments, method 2000 is performed at a computer system (e.g., computer system 101 in FIG. 1A) including a display generation component (e.g., display generation component 120 in FIGS. 1A, 3, and 4) (e.g., a heads-up display, a display, a touchscreen, a projector, etc.) and one or more cameras (e.g., a camera (e.g., color sensors, infrared sensors, and/or depth-sensing cameras) that points downward at a user's hand or a camera that points forward from the user's head). In some embodiments, the method 2000 is governed by instructions that are stored in a non-transitory (or transitory) computer-readable storage medium and that are executed by one or more processors 202 of a computer system, such as the one or more processors 202 of computer system 101 (e.g., control 110 in FIG. 1A). Some operations in method 2000 are, optionally, combined and/or the order of some operations is, optionally, changed.

As described herein, method 2000 automatically detects textual content in a mixed-reality three-dimensional environment, and in response, provides an input mechanism (e.g., a user interface element) for producing an audio representation of the textual content (e.g., using speech synthesis to convert the detected textual content into machine-generated speech). Automatically detecting the textual content without the need for user input indicating that textual content is present in the mixed-reality three-dimensional environment reduces the number and complexity of inputs needed to transform textual content into speech. Further, automatically displaying a control for generating and outputting speech for automatically detected textual content provides additional control options to a user (e.g., an option to play the speech rather than playing the speech without providing a user with a choice), and provides visual feedback or a cue to the user that there is textual content in the mixed-reality three-dimensional environment that is available to be read aloud by the computer system. These and other benefits of method 2000 are particularly important to help users with literacy difficulties, learning disabilities, reduced vision and those learning a language, and otherwise makes textual content more accessible to a wider population.

While a view of a three-dimensional environment is visible via the display generation component (optionally the view of the three-dimensional environment includes one or more real-world objects and one or more virtual-world objects, and the view of the three-dimensional environment is a mixed reality environment), the computer system automatically (e.g., without additional user input) detects (2002) an object (e.g., an object of the one or more real-world objects or the one or more virtual-world objects) in the three-dimensional environment. In response to detecting the object and in accordance with a determination that the object includes textual content (e.g., a real-world object that includes text or alphanumeric content, such as a document, a book, a business card, or a receipt; or a virtual-world object that includes text or alphanumeric content, such as virtual book in a virtual reality game or instructions in a virtual reality game; or digital content that includes text or alphanumeric content, such as subtitles of a movie displayed on a TV, an electronic document displayed on a monitor, content of an electronic book displayed on an electronic reader device, or other paper, digital, or computer content that includes textual and/or alphanumeric content), a user interface element for generating an audio representation of the textual content (e.g., a control or an affordance for activating a text-to-speech function, such as a "read" affordance) is automatically displayed (2004) (e.g., without further user input) via the display generation component. For example, in FIG. 17C in response to detecting representation (or optical view) of book 17040' within focal region 9044, control 9090 for generating and outputting (or playing) respective audio representation is displayed, as shown in FIG. 17D. Further, the computer system detects (2006) an input selecting the user interface element. For example, user 9002 can play the generated audio representation by selecting control 9090 in FIG. 17D. In some embodiments, the input selecting the user interface element includes a touch input, a gaze input, an air gesture, an input via a controller, or a combination of touch, gaze, input via the controller, and/or an air gesture that is directed at a location in the view of the three-dimensional environment that is occupied by the user interface element. In response to detecting the input selecting the user interface element, the computer system generates (2008) an audio representation of at least a portion of the textual content of the object. For example, a text-to-speech process is started, where the computer system detects/recognizes the textual content of the real-world object, converts it into speech (e.g., assigns phonetic transcriptions to detected words), and outputs the speech via one or more audio output devices). In some embodiments, the written information is translated into aural information, and the aural information is a computer-generated simulation of human speech that corresponds to the written information. In some embodiments, the computer system is in communication with one or more audio output devices, and either automatically or in response to a user input, the computer system outputs the generated audio representation (optionally in the form of speech) via the one or more output devices.

In some embodiments or in some circumstances, the audio representation of textual content is generated automatically in response to detecting the object that includes textual content, e.g., there is no need for an input selecting a user interface element to generate and/or play the audio representation. For example, in FIG. 17C, in response to detecting representation (or optical view) 17040' of the left page of book 17040 within focal region 9044 (e.g., in response to moving book 17040 or moving a point of view of one or more cameras of display generation component 9100, the textual content of the left page of book 17040 is detected, parsed, and a representation in audio of the textual content is generated. Additionally, control 9090 is displayed that when activated in response to user input causes outputting (or playing) of the respective audio representation, as shown in FIG. 17D. In some embodiments, audio representation of the object's textual content (or at least a portion thereof) is generated in response to detecting that the object includes textual content optionally without requiring other conditions. In some embodiments, selecting objects in the three-dimensional environment for which to generate an audio representation of respective textual content included therein requires one or more additional conditions. For example, audio representation is not generated for every object that includes textual content that is within a field of view of one or cameras included in, or in communication with, the computer system, and the computer system determines the user's intent and/or focus to filter out the objects in the three-dimensional environment for which audio representation is not to be generated. In some embodiments, the audio representation is generated for objects that are located within a predetermined virtual region within the field of view, including, but not limited to, objects located within a threshold distance of a viewpoint of a user (or a viewpoint of a heads-up display), objects facing the cameras, and/or objects having another predetermined position relative to the cameras and/or user's viewpoint. In some embodiments, other conditions that are required to generate an audio representation for a detected object that includes textual content includes detection that a user's attention or focus are directed at the object, where attention or focus can be determined in a number of ways, including gaze, gaze that is maintained for a predetermined amount of time threshold, touching (physically or virtually touching) the object, pointing at the object with a portion of a hand (e.g., a finger or wrist), or pointing at the object with a controller or other device for indicating attention.

In some embodiments, in response to detecting a second object in the three-dimensional environment and in accordance with a determination that the second object includes at least a threshold amount of textual content, a user interface element for generating an audio representation of the textual content of the second object is displayed. In response to detecting a second object in the three-dimensional environment and in accordance with a determination that the second object includes less than the threshold amount of textual content (or includes no text or no alphanumeric content), the computer system forgoes displaying the user interface element for generating the audio representation of textual content of the second object. For example, if in FIG. 17B physical object 17040 includes only a short alphanumeric code, control 9090 would not be displayed. In some embodiments, in accordance with the determination that the object (e.g., a currently visible portion of the object) includes less than the threshold amount of textual content, the computer system forgoes generating audio representation of any textual content that is below the threshold amount of textual content. Automatically displaying a user interface element for generating speech or other audio representation of textual content detected in the mixed reality three-dimensional environment when there is sufficient amount of textual content (e.g., above the predetermined amount), reduces the visual and/or sound clutter in the mixed-reality three-dimensional environment by forgoing displaying or playing the audio representation for negligible amount of text.

In some embodiments, concurrently with outputting the audio representation of the textual content of the object, the computer system displays a visual indication of the portion of the textual content of the object. For example, the text for which the audio representation is being outputted is highlighted. In some embodiments, the word that is being read by the computer system is highlighted (e.g., in a selection box, in a different color, font, boldness or otherwise highlighted relative to the rest of the textual content). For example, as the audio representation is played in FIGS. 17D, first word "Aaa" is highlighted, then as the audio progresses to the next word, then the second word "Bbb" is highlighted, after that the third word "Ccc" is highlighted, and so on. In some embodiments, highlighting the textual content is synchronized with outputting the audio of the respective highlighted text content. Highlighting or otherwise providing visual indication of respective parts of the textual content that are being read aloud (or for which the audio representation is being outputted), provides visual feedback and helps a user keep track of what portions of the textual content have been read and what portions are yet to be read. Further, highlighting the respective parts that are being read helps a user to understand the connection between the audio and the textual content.

In some embodiments, the portion of the textual content of the object is a first portion, the visual indication of the portion of the textual content is a first visual indication, and the audio representation of the portion of the textual content of the object is a first audio representation that is generated at a first time. Further, the method 2000 includes, at a second time after the first time, a second audio representation of a second portion of the textual content of the object different from the first portion of the textual content of the object is outputted. Further, concurrently with outputting the second audio representation, a second visual indication of the second portion of the textual content of the object is outputted. In some embodiments, the portion of the textual content of the object that is being read shifts over time (e.g., as one phrase is read the computer system moves automatically to the next one in a sequence) and the respective visual indication also shifts over time concurrently with text that is being read. For example, as the audio representation is played in FIGS. 17D, first word "Aaa" is highlighted and read aloud, then as the audio progresses to the next word the second word "Bbb" is highlighted and read aloud, and after that the third word "Ccc" is highlighted and read aloud, and so on. In some embodiments, the second audio representation and the first audio representation can be generated at the same time, but the computer system outputs the second audio representation after outputting the first audio representation. In some embodiments, the first portion of textual content precedes the second portion of textual content. For example, as the computer system outputs (or finishes) outputting the audio representation of the first portion, the computer system proceeds to output the audio representation of the second portion.

Highlighting or otherwise providing visual indications of respective parts of the textual content that are being read (or for which the audio representation is being outputted) and shifting the visual indication over time concurrently or in conjunction with respective progression of the audio output provides visual feedback and helps a user to understand the connection between the audio and the textual content.

In some embodiments, the portion of the textual content of the object comprises a first portion of the textual content of the object. Further, the method 2000 includes, concurrently displaying a first visual indication of two or more visual indications and a second visual indication of the two or more visual indications. The first visual indication corresponds to the first portion of the textual content of the object and the second visual indication corresponds to a second portion of the textual content of the object. In response to detecting an input selecting a respective visual indication of the two or more visual indications and in accordance with a determination that the first visual indication is selected, an audio representation of the first portion of the textual content of the object is generated. In response to detecting an input selecting a respective visual indication of the two or more visual indications and in accordance with a determination that the second visual indication is selected, generating an audio representation of the second portion of the textual content of the object (e.g., in FIGS. 17D, first line of text "Aaa Bbb Ccc" in the representation (optical view) 17040' of the left page of book 17040 would be highlighted to indicate that audio is available to be played, and the second line of text "Ddd eee fff" would also be highlighted to indicate that audio is available to be played, a user can select each line separately and have the audio for each line separately played). In some embodiments, multiple indicators that correspond to detected text in the object in the view of the three-dimensional that is available to be read are concurrently displayed. For example, if two pages of an open book are detected, a first indicator is displayed for the first page when the text of the first page is available to be read using speech synthesis, and a second indicator is displayed for the second page when the text of the second page is available to be read using speech synthesis. In other examples, distinct indicators may be displayed for different paragraphs on the same page, or for different objects that include textual content, or for different portions of the same object that include textual content. More generally, various indicators that indicate portions of textual content in the three-dimensional environment are available to be played/read are displayed. In some embodiments, multiple indicators can correspond to different objects in the view of the three-dimensional environment that include textual content and for which corresponding speech synthesis is available to be read.

Concurrently displaying multiple indicators for different portions of textual content that are available to be read (or for which speech synthesis is ready for playing) provides additional control options and allow a user to navigate through different portions of the textual content without the need to listen the textual content sequentially (e.g., the user can skip some portions and listen to other subsequent portions of the text).

In some embodiments, in response to detecting the object and in accordance with a determination that the object includes textual content, a copy of a region of the three-dimensional environment that includes at least the portion of the textual content of the object is automatically (e.g., without further user input) displayed in a computer-generated window (e.g., the window is computer-generated) that is visible in the view of the three-dimensional environment. For example, in response to detecting representation (or optical view) 17040' of book 17040 in FIG. 17E, window 9098 is displayed that includes a copy of the left page of book 17040. In some embodiments, the object that includes textual content is displayed or visible in a first location in the view of the three-dimensional environment and the copy of the region is displayed or visible in a second location in the view of the three-dimensional environment, where the first location is at least initially near the second location. For example, a snapshot of the object and/or textual content contained therein can be displayed at a location in the view of the three-dimensional environment that is near a location of the object. In some embodiments, the copy of the region of the three-dimensional environment includes the textual content, or the entire object and not just the textual content, and/or portions of the three-dimensional environment that surround the object. The computer-generated window is displayed via the display generation component.

Displaying a computer-generated window that includes a copy of a region of the mixed-reality three-dimensional environment that includes the textual content (e.g., a snapshot of the text and/or surrounding environment) of an object makes the text-to-speech process more efficient by providing an option to move the object with the textual content away from the one or more cameras while maintaining an ability to navigate through the textual content for which an audio representation is ready to be read/played.

In some embodiments, the computer system detects a first input directed at the computer-generated window (e.g., an input requesting to move the computer-generated window to a different location in the view of the three-dimensional environment). In response to detecting the first input, the computer-generated window is moved from a first position in the view of the three-dimensional environment to a second position in the view of the three-dimensional environment. For example, in FIG. 17E, window 9098 can be moved in the view of three-dimensional environment 9000' in response to a user input. In some embodiments, the input requesting to move the computer-generated window includes a gaze input directed at the computer-generated window in combination with an air pinch gesture followed by movement of a respective hand (e.g., the hand performing and maintaining the air pinch gesture) in the three-dimensional environment, such as a pinch and a drag gesture.

Moving the computer-generated window, which includes the copy of the region of the mixed-reality three-dimensional environment that includes the textual content, from one position to another in the mixed-reality three-dimensional environment, provides a user with more control over placement of objects and interfaces in the mixed-reality three-dimensional environment while continuing with the text-to-speech process (e.g., by maintaining a copy of the textual content even if the object with the textual content is moved out of the field of view).

In some embodiments, in response to detecting the first input and in conjunction with moving the computer-generated window from the first position to the second position in the view of the three-dimensional environment (e.g., after, before, in response to moving the computer-generated window, or in response to an event that caused the moving of the computer-generated window), the computer-generated window is resized (e.g., enlarged or reduced in size). In some embodiments, the computer-generated window is resized when moved in the three-dimensional environment in response to the first input. For example, in FIG. 17E, if window 9098 is moved further away from user 9002 in the view of three-dimensional environment 9000', window 9098 is reduced in size. Resizing the computer-generated window in response to or in conjunction with moving the window in the mixed-reality three-dimensional environment, without the need to provide further user input to resize the computer-generated window, reduces the number of inputs needed to resize a window or declutter the three-dimensional environment, allows a user to magnify content displayed in the window by moving the window closer, or to unblock a view of other objects occluded by the window by moving the window further away or outside the field of view.

In some embodiments, the computer system detects a second input directed at the computer-generated window. The second input is different from the first input (e.g., the second input corresponds to a user input resizing the computer-generated window). In response to detecting the second input, the computer-generated window is resized. For example, the computer-generated window is resized in accordance with the second input, such as direction and/or magnitude of the second input. In some embodiments, the second input is a resizing input, such as a pinch gesture performed with two hands (e.g., a zoom in or zoom out gesture), or a direct input grabbing a corner of the computer-generated window and moving it in a respective direction. For example, user 9002 can resize window 9098 by grabbing and moving a corner of window 9098 in FIG. 17E. Resizing the computer-generated window in response to a user input, provides a user with more control over the number of objects that are visible within a fixed field of view and improves multi-tasking in the mixed reality three-dimensional environment (e.g., by focusing on the window on the window if enlarged or by shifting focus to other objects if the window is reduced in size).

In some embodiments, the computer system detects a third input that corresponds to a request to change a viewpoint of a user relative to the computer-generated window. For example, the user can move in the three-dimensional environment and cause a change in viewpoint, or one or more cameras that capture a current field of view can be repositioned in response to a user input). In response to detecting the third input and in conjunction with changing the viewpoint of the user relative to the computer-generated window (e.g., after, before, in response to changing the viewpoint of the user, or in response to an event that caused the changing of the viewpoint of the user), the computer-generated window is resized. In some embodiments, the computer-generated window is environment-locked, and as a viewpoint of a user shifts, the location and size of the computer-generated window relative to the viewpoint of the user changes, which results in the environment-locked computer-generated window being displayed at a different location, size, and/or position in the first view. For example, if in FIG. 17E, user 9002 moves further away from book 17040, the location and size of window 9098 in the view of the three-dimensional environment 9000' change so as to illustrate that window 9098 is anchored or locked to a location in the three-dimensional environment.

Resizing the computer-generated window in response to or in conjunction with changing the viewpoint of the user relative to the computer-generated window, without the need to provide further user input to resize the computer-generated window, reduces the number of inputs needed to resize a window or declutter the three-dimensional environment, allows a user to magnify content displayed in the window by moving the window closer, or unblocking a view of other objects occluded by the window by moving the window further away or outside the field of view.

In some embodiments, the computer system includes one or more cameras, and the object and computer-generated window are visible within a field of view of the one or more cameras. Further, the computer system detects that the object is no longer within the field of view of the one or more cameras, and maintains visibility of the computer-generated window in the field of view of the one or more cameras. For example, if the book that is being held in front of the one or more cameras is lowered or otherwise moved away from the field of view of the one or more cameras, visibility of the computer-generated window persists (e.g., as illustrated in FIG. 17F, when representation (or optical view) 17040' of book 17040 is moved to the periphery (outside focal region 9044), window 9098 continues to be displayed. Maintaining visibility of the computer-generated window even after the computer-generated window is moved out of the field of view provides a user with further control over playing and/or replaying the detected textual content without the need to maintain a respective position of the object relative to the one or more cameras.

In some embodiments, the visibility of the computer-generated window in the field of view of the one or more cameras is not maintained (or at least is not automatically maintained) unless a user input is received that requests that the computer-generated window be maintained. In such case, in conjunction with moving the object, which includes the textual content, out of the field of view, the computer-generated window ceases to be displayed (e.g., disappears or is removed from the first view of the three-dimensional environment).

In some embodiments, while the computer-generated window is maintained in the view of the three-dimensional environment, the computer system forgoes displaying a user interface element for generating an audio representation of other textual content (or forgoes automatically generating an audio representation of other textual content). Further, after (e.g., while) the computer-generated window is closed, the computer system (e.g., automatically) detects textual content that was not previously detected. In response to detecting the textual content that was not previously detected, the computer system displays a user interface element for generating an audio representation of the textual content that was not previously detected. In some embodiments, when the computer-generated window is closed, the computer system is ready to detect other text to be read (e.g., another page of a book). For example, if window 9098 is closed (as illustrated in the transition from FIG. 17F to FIG. 17G), the computer system is ready to detect other textual content, such as the right page of book 17040. Automatically scanning the mixed-reality three-dimensional environment for textual content after the computer-generated window (which includes a copy of the previously detected textual content) is closed reduces the number and complexity of inputs needed to generate audio representation for textual content in the mixed-reality three-dimensional environment.

In some embodiments, while the computer-generated window is open, the computer system detects textual content that was not previously detected. In response to detecting textual content that was not previously detected, the computer system (e.g., automatically) closes the computer-generated window and opens (e.g., without the need for user input) a second computer-generated window that includes a copy of a region of the three-dimensional environment that includes the textual content that was not previously detected. For example, while a window that includes text of a first page of a book is open (e.g., window 9098 in FIG. 17F), if a new page that was previously unrecognized or undetected is within a field of view of the one or more cameras (e.g., the right page of book 17040 as illustrated in FIG. 17H), then the computer system automatically (e.g., without further user input) closes the window that includes text of the first page (e.g., window 9098 is automatically closed in FIG.

17G) and opens a new window that includes text of the new page (e.g., window 9098*a* is automatically opened in FIG. 17I).

Automatically capturing and displaying a copy of previously undetected textual content in a new window in conjunction with closing a previously generated window that includes a copy of previously generated textual content reduces the number and complexity of inputs needed to generate an audio representation of newly detected textual content while maintaining the mixed-reality three-dimensional environment uncluttered.

In some embodiments, the computer-generated window is world-locked based on (e.g., selected in reference to and/or anchored to) a location of the object in the three-dimensional environment when the object is initially (e.g., automatically) detected, is displayed at a corresponding world-locked location in the three-dimensional environment, and has a first spatial relationship relative to a viewpoint of a user. After a change of the viewpoint of a user, the world-locked location of the object has a second spatial relationship relative to the viewpoint of the user different from the first spatial relationship, but a respective spatial relationship of the world-locked location of the object relative to the three-dimensional environment remains unchanged. For example, in contrast to FIG. 17F, which illustrates that window 9098 is "viewpoint-locked," if window 9098 is "world-locked" instead, as position of user 9002 (and display generation component 9100) changes in the physical environment 9000 (e.g., from FIGS. 17C to 17F as illustrated in mini view 9010) by moving away from physical book 17040, window 9098 remains at a position near representation 17040' of book 17040 in the periphery. Anchoring the computer-generated window that includes a copy of the detected textual content to a part of the three-dimensional environment provides a user with more control and flexibility over what objects are displayed within the limited field of view of the user while reducing the number of inputs needed to maintain the three-dimensional environment uncluttered, thereby allowing a user to (e.g., more efficiently) refocus on different parts of or objects in the three-dimensional environment.

In some embodiments, the computer system includes one or more cameras, and the object is visible within the field of view of the one or more cameras. Further, in response to detecting that the object is moved outside the field of view of the one or more cameras, the computer system displays, in a computer-generated window that is visible in the view of the three-dimensional environment, a copy of a region of the three-dimensional environment that includes at least the portion of the textual content of the object. For example, window 9098 in FIG. 17E can be displayed after the representation 17040' of book 17040 is moved out of the focal region 9044, as illustrated in FIG. 17F (e.g., as opposed to displaying window 9098 in response to detecting that representation 17040' of the left page of book 17040 is located in the focal region 9044). Automatically displaying the computer-generated window that includes a copy of detected textual content in conjunction with or in response to detecting that the respective object that includes the textual content is no longer within the field of view reduces visual clutter in the mixed reality three-dimensional environment by displaying the computer-generated window when the object with textual content is no longer visible (e.g., as opposed to displaying a copy of the detected textual content as soon as the textual content is detected), and reduces the number and complexity of inputs needed to do so (e.g., the user is not required to provide input for generating the computer-generated window).

In some embodiments, in response to detecting the input selecting the user interface element, in addition to generating the audio representation of at least the portion of the textual content of the object, the computer system displays in a computer-generated window that is visible in the view of the three-dimensional environment, a copy of a region of the three-dimensional environment that includes at least the portion of the textual content of the object. For example, window 9098 in FIG. 17E can be displayed in response to a user input selecting and activating control 9090, as shown in FIG. 17D (e.g., as opposed to in response to detecting representation 17040' of the left page of book 17040 in the focal region 9044). Automatically displaying the computer-generated window, including a copy of a region of the three-dimensional environment that includes at least the portion of the textual content of the object, in response to detecting user input selecting the user interface element for generating the audio representation of the textual content, reduces the number and complexity of inputs necessary to play portions of the generated audio representation (e.g., by automatically providing a copy of the detected textual content) while at the same time allowing a user to multi-task and/or move freely in the mixed reality three-dimensional environment.

In some embodiments, the copy of the region of the three-dimensional environment that includes at least the portion of the textual content of the object further includes a representation of a portion of a user's body (e.g., a hand that was holding a book, a paper document, or other paper or digital object with textual content). For example, window 9098 can include a representation of hand 9022 if that hand was holding book 17040. Displaying in the computer-generated window not only a copy of the textual content but also a snapshot of the three-dimensional environment, including a representation of a portion of the user's body, provides visual feedback regarding a state of the mixed-reality three-dimensional environment at the time of creating the copy of the region of the three-dimensional environment while also reducing computing resources that may otherwise be necessary for extracting the textual content from other content that is captured in the snapshot.

In some embodiments, the computer system is in communication with one or more audio output devices. Further, in response to detecting the object and in accordance with the determination that the object includes the textual content, the computer system automatically displays, via the display generation component, a plurality of user interface elements, including the user interface element for generating the audio representation of textual content (e.g., control 9090 in FIGS. 17D) and/or a user interface element for playing or stopping outputting of the audio representation via the one or more audio output devices (e.g., control 9094 in FIG. 17D or controls 9095*a* and 9094*a* in FIG. 17I). The computer system detects a user input selecting the user interface element for playing or stopping outputting of the audio representation (e.g., a touch input, a gaze input, an air gesture, an input via a controller, or a combination of touch, gaze, input via the controller, and/or an air gesture that is directed at a location in the view of the three-dimensional environment that is occupied the user interface element for playing or stopping output of the audio representation). In response to detecting the user input selecting the user interface for playing or stopping output of the audio representation, the computer system plays or stops outputting of the audio representation via the one or more audio output devices. In some embodiments, the control for generating the audio representation is different from a control for starting and/or stopping a reading or outputting corresponding speech synthesis (e.g., control 9090a in FIG. 17H is different from controls 9095a and 9094a in FIG. 17I). Automatically displaying a use interface for playing or stopping output of the audio representation in response to detecting the object that includes textual content, provides more control options over the output of the audio representation while reducing the number and/or complexity of inputs needed to control the outputting of the audio representation (by reducing the need for navigating different user interfaces, menu hierarchies, and/or reduces the need for external hardware devices to control the output of the audio representation).

In some embodiments, the plurality of user interface elements include one or more controls (e.g., controls 9092 and 9096 in FIG. 17D) for selecting different portions of the textual content for which a respective audio representation is to be outputted via the one or more audio output devices. Further, the computer system detects a user input selecting a respective control from the one or more controls for selecting a different portion of the textual content. In response to detecting the user input selecting the respective control from the one or more controls for selecting a different portion of the textual content, the computer system outputs the respective audio representation via the one or more audio output devices. In some embodiments, the textual content of the object is automatically analyzed (e.g., using a classifier trained using machine learning) and different sections of the textual content are delineated, or a hierarchical structure of the textual content is recognized. For example, titles, headings, paragraphs, sentences, and/or words in a document are recognized and a user can navigate to a respective element in the hierarchy of the document (or jump to a different part of the document) via one or more inputs on one or more of the one or more controls. The computer system does not necessarily output an audio representation of all of the textual content of an object or an entire document sequentially. In some embodiments, the one or more controls include controls for reading a subsequent or previous portion of the textual content within the same hierarchy (e.g., moving from one paragraph to another paragraph, from one heading to another heading.

Automatically displaying one or more controls for selecting and navigating different portions of the textual content in response to detecting the object that includes textual content, provides control options over the output of the audio representation of the textual content, and allows a user to more efficiently select portions of the textual content to be read without the need to listen to the audio representation of the entirety of the textual content.

In some embodiments, aspects/operations of methods 1100, 1200, 1300, 1400, 1800, 1900, 2300, and 2400 may be interchanged, substituted, and/or added between these methods. For example, the method of detecting textual content in a mixed-reality three-dimensional environment and generating a respective audio representation of the detected textual content as described in method 2000 is optionally used to detect textual content in a mixed-reality three-dimensional environment and generate a respective audio representation of the detected textual content for methods 1100, 1200, 1300, 1400, 1800, 1900, 2300, and/or 2400. For brevity, these details are not repeated here.

FIGS. 21A-21J illustrate example techniques for providing non-visual information (e.g., audio description) about virtual content in a mixed-reality three-dimensional environment. FIG. 23 is a flow diagram of a method 2300 for providing non-visual information (e.g., audio description) about virtual content in a mixed-reality three-dimensional environment. The user interfaces in FIGS. 21A-21J are used to illustrate the processes described below, including the processes in FIG. 23.

As shown in the examples in FIGS. 21A-21J and 22A-22F, content that is visible via a display generation component 7100 of computer system 101 is displayed on a touch screen held by user 7002. In some embodiments, display generation component 7100 of computer system 101 is a head-mounted display worn on user 7002's head (e.g., what is shown in FIGS. 21A-21J and 22A-22F as being visible via display generation component 7100 of computer system 101 corresponds to user 7002's field of view when wearing a head-mounted display).

Figure 21A:
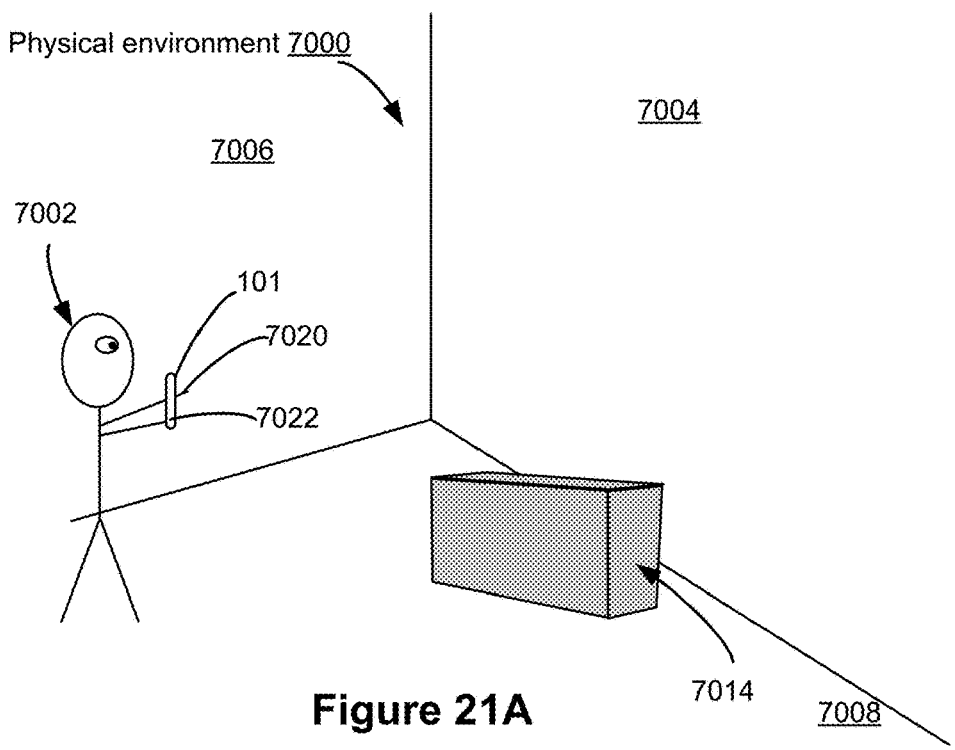

FIG. 21A illustrates an example physical environment 7000 that includes user 7002 interacting with computer system 101. Physical environment 7000 includes physical walls 7004 and 7006, floor 7008, and physical object 7014, as described herein with reference to FIGS. 15A-15B. In FIG. 21A, user 7002 is holding display generation component 7100 with the user's hand 7020 or hand 7022, or both.

Figure 21B:
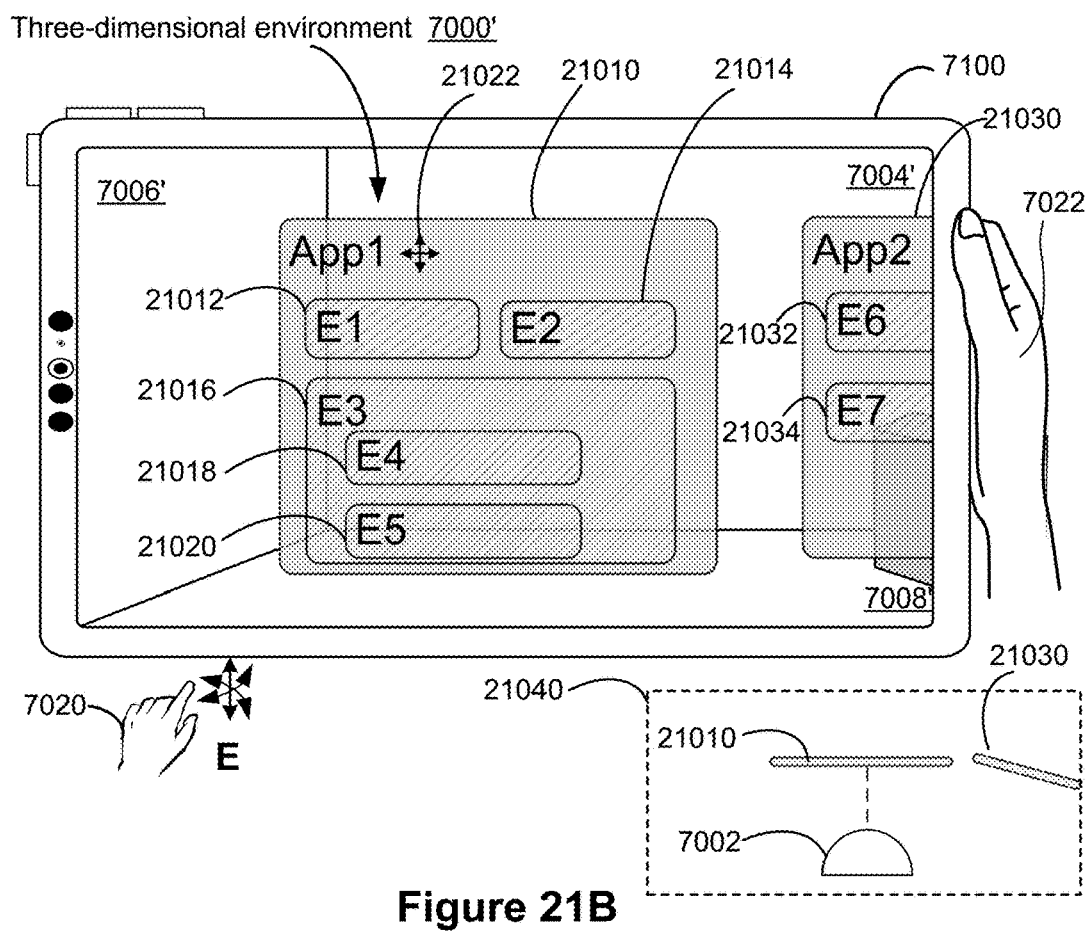

FIG. 21B illustrates a view of a three-dimensional environment 7000' (also called view 7000' for ease of reference). that is visible to user 7002 via display generation component 7100 of computer system 101. View 7000' optionally includes representations of objects in the physical environment 7000 (e.g., digital passthrough, as captured by one or more cameras of computer system 101) or optical views of objects in the physical environment (e.g., optical pass-through, as visible through one or more transparent or semi-transparent portions of display generation component 7100). For example, in FIG. 21B, the representation or optical view of three-dimensional environment 7000' includes wall 7004', wall 7006', floor 7008', and box 7014' as described herein with reference to FIGS. 15A-15B.

In addition, view 7000' includes one or more computer-generated objects, also called virtual objects (e.g., displayed via display generation component 7100), which are not representations of physical objects (e.g., physical objects in physical environment 7000). For example, application user interface 21010 and application user interface 21030 each correspond to a user interface of a respective software application executing on computer system 101 (e.g., an email application, a web browser, a messaging application, a maps application, a video player, or an audio player, and/or other software application). In some embodiments, application user interface 21010 and application user interface 21030 correspond to different user interfaces of the same software application. Application user interface 21010 includes a number of user interface elements, such as element "E1" 21012, element "E2" 21014, element "E3" 21016, element "E4" 21018, and element "E5" 21020. Application user interface 21030 includes user interface elements, such as element "E6" 21032 and element "E7" 21034. In some embodiments, user interface elements "E1" 21012, "E2" 21014, "E3" 21016, "E4" 21018, and "E6" 21020 (e.g., collectively referred to herein as elements "E1" 21012-"E6" 21020) of application user interface 21010 and interface elements "E6" 21032 and "E7" 21032 of application user interface 21030 are selectable user interface elements (e.g., controls, buttons, menu options or items, text entry fields, tabs, bars, search boxes, or other user interface elements that can be included in a user interface of a software application), that when selected cause computer system 101 to perform one or more operations with respect to the respective user interface element that is selected, or more generally with the corresponding application user interface that includes the respective user interface element that is selected.

In some embodiments, an exploration mode (e.g., sometimes referred to as "explore" mode) is activated in response to detection of a respective gesture and, while the computer system 101 continues to detect the respective gesture, the exploration mode remains active (e.g., the computer system 101 deactivates the exploration mode in response to detecting an end of the respective gesture (e.g., without requiring further conditions or inputs)). As described in further detail below with reference to FIGS. 21B-21H, in the exploration mode, the computer system 101 automatically outputs non-visual information, such as audio description, about objects that are in the three-dimensional environment, such as virtual content included in view 7000'. While the exploration mode is active, the computer system 101 outputs audio description of a respective object in accordance with a determination that the respective object has focus (optionally, without requiring other conditions or user inputs) as determined by a respective pose of a respective portion of user 7002's body that is directed toward the respective object, such as direction and/or orientation of user 7002's head, as described in further detail below with respect to FIGS. 21B-21H.

In the scenario of FIG. 21B, a gesture for activating the exploration mode is detected. In some embodiments, the gesture for activating the exploration mode is an air gesture performed with left hand 7020 (e.g., detected via one or more cameras and/or sensors), as illustrated by arrows near left hand 7020. In FIG. 21B, the gesture for activating the exploration mode is denoted by a state "E" near left hand 7020. In some embodiments, the gesture for activating the exploration mode is performed with the right hand 7022 (e.g., where the right hand is free to perform the air gesture as opposed to holding the computer system 101, including display generation component 7100). In some embodiments, the gesture for activating the exploration mode is recognized whether performed by the left hand 7020 or the right hand 7022. In some embodiments, the gesture for activating the exploration mode is a long pinch gesture or a pinch and hold gesture, e.g., an index and thumb finger of a respective hand (e.g., hand 7020 or hand 7022) making contact with one another for a threshold amount of time while the respective hand remains stationary by not moving more than a threshold amount during the threshold amount of time. In some embodiments, a different type of pinch gesture is performed (e.g., a different type of single-finger pinch, a multi-finger pinch, and/or a secondary pinch), or a different type of gesture is performed. In some embodiments, the gesture for activating the exploration mode is performed with both hands 7020 and 7022.

In response to detecting the gesture for activating the exploration mode, the exploration mode is activated in FIG. 21B. In the exploration mode, the computer system 101 automatically outputs audio description of a respective object in accordance with a determination that the respective object has focus. For example, in FIG. 21B, as illustrated by focus indicator 21022, application user interface 21010 has focus. Accordingly, the computer system 101 automatically outputs audio description of application user interface 21010. In some embodiments, the audio description is based on metadata about application user interface 21010 that the computer system 101 is enabled to access. In some embodiments, the audio description is based on visual content included in application user interface 21010 and analyzed by computer system 101 (e.g., via object recognition, image classification, or other techniques). In some embodiments, the audio description is based on textual content included in application user interface 21010. In some embodiments, the audio description provides information about what type of virtual content the object in focus is (e.g., an image, a document, a window, a video, a webpage, and/or other types of virtual or computer-generated content).

In some embodiments, in conjunction with activating the exploration mode, focus indicator 21022 is displayed in view 7000'. Focus indicator 21022 illustrates the location of user 7002's attention or focus during the exploration mode (e.g., in scenarios in which the exploration mode is not active, a different type of focus indicator is displayed, as shown in FIG. 21I-21J). In some embodiments, a location of user 7002's attention, and thus a location of focus indicator 21022, is determined by direction, orientation, and/or head elevation of user 7002's head (e.g., user 7002's forehead, eyes, face, or other portions of user 7002's head). For example, focus indicator 21022 optionally moves to or is displayed at a location toward which user 7002's head is directed. In some embodiments, a virtual ray extending from user 7002's head indicates what object or content has input focus (e.g., a visible or invisible ray is cast from a point in the three-dimensional environment 7000' that corresponds to a location of user 7002's head in the physical environment in a direction of the respective object). In some embodiments, a location of user 7002's attention is determined by a location toward which user 7002's head is directed without displaying a focus indicator (e.g., focus indicator 21022). For example, in the exploration mode, the computer system 101 optionally outputs audio description of application user interface 21010 without displaying focus indicator 21022. In some embodiments, the respective portion of user 7002's body that is used to determine a location of user 7002's attention during the exploration mode is user 7002's wrist, hand, finger, and/or other portion of user 7002's body. In some embodiments, which portion of user 7002's body is used as focus indicator during the exploration mode is selected in a settings user interface. In some embodiments, the respective gesture for activating the exploration mode is performed with the same portion of user 7002's body that is used to determine which virtual object has focus or to which virtual object user 7002's attention is directed. For example, the pinch and hold gesture can be performed with hand 7020, and the same hand 7020 can be used to point in a direction of an element in application user interface 21010 or application user interface 21030, thereby indicating which element is to be described by non-visual information. In some embodiments, the respective gesture for activating the exploration mode is performed with a different portion than the portion of user 7002's body that is used to determine which virtual object has focus or user 7002's attention.

With reference to FIGS. 21B-21J, top view 21040 illustrates user 7002's head and application user interfaces 21010 and 21030 as seen from above (e.g., from the top) (e.g., instead of seen from the front as in view 7000'). For example, in FIG. 21B, top view 21040 illustrates that, looking from above, user 7002's head is facing and/or is directed toward application user interface 21010, and application user interface 21030 is on the right side of application user interface 21010 (e.g., and not in focus, because user 7002's head is not facing toward application user interface 21030). In response to detecting the gesture for activating the exploration mode, computer system 101 generates and/or outputs (via one or more speakers, headphones, or other audio output device(s)) verbal description of virtual content that is in focus, e.g., as determined by a location toward which user 7002's head is directed in view 7000'. In FIG. 21B, because user 7002's head is directed toward a location in view 7000' where application user interface 21010 is positioned, the computer system 101 generates and/or outputs verbal description of application user interface 21010, as explained above.

In some embodiments, while the exploration mode is active, as user 7002's attention shifts (e.g., direction, orientation, and/or head elevation of user 7002's head changes) from one virtual object in view 7000' to a different virtual object, the computer system 101 generates and/or outputs verbal descriptions of the different virtual object, as described in further detail with respect to FIGS. 21C-21H.

Figure 21C:
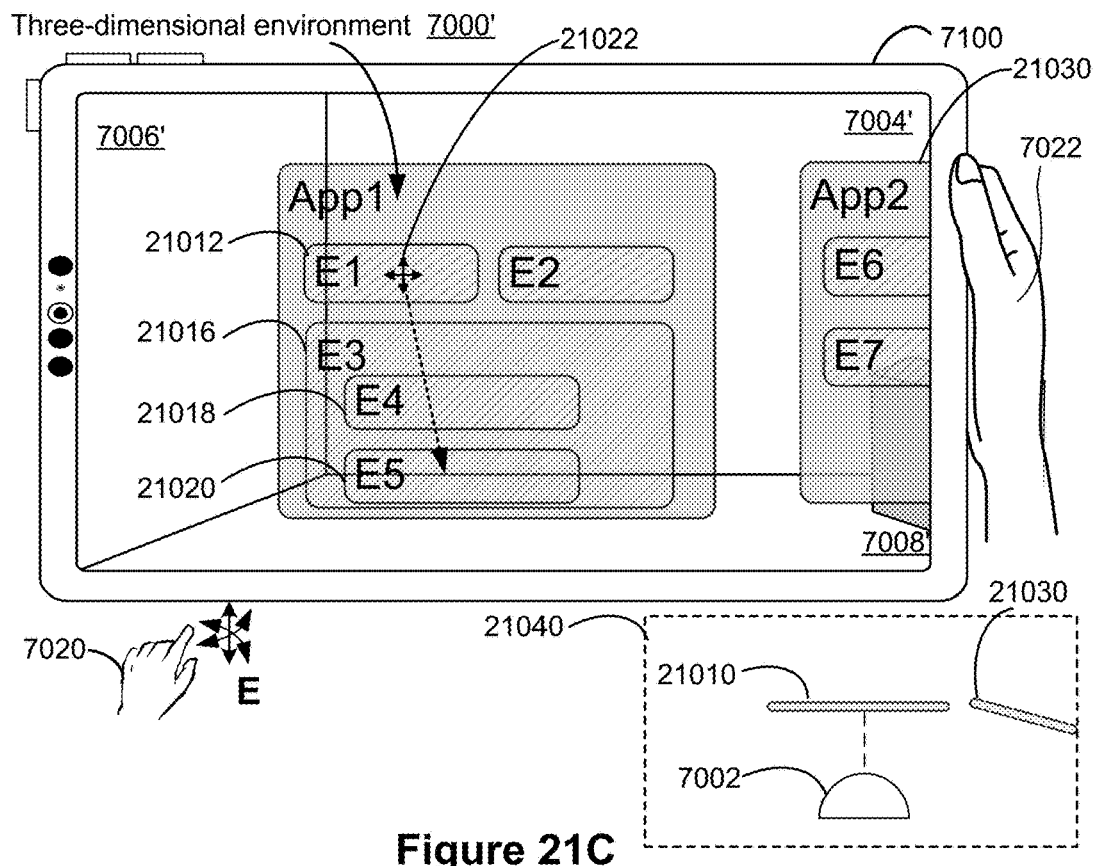

FIG. 21C illustrates that, while the respective gesture for activating exploration mode continues to be detected, user 7002's attention has shifted from application user interface 21010 (e.g., a top hierarchy level of application user interface 21010) to a specific user interface element within application user interface 21010, such as element "E1" 21012 (e.g., where element "E1" 21012 is one hierarchy level below the top hierarchy level of application user interface 21010). For example, a direction of user 7002's head changes from a direction toward application user interface 21010 in FIG. 21B to a direction toward element "E1" 21012 within application user interface 21010, as indicated by the location of focus indicator 21022 in FIG. 21C (e.g., in contrast to the location of focus indicator 21022 in FIG. 21B). Further, top view 21040 in FIG. 21C illustrates that, looking from above, user 7002's head is still facing and/or directed toward application user interface 21010 (e.g., as opposed to being directed toward application user interface 21030 as illustrated in FIGS. 21G-21J). That the respective gesture for activating the exploration mode continues to be detected is illustrated in FIG. 21C by maintaining state "E" near left hand 7020 (e.g., maintaining from FIG. 21B). In response to detecting the movement of user 7002's head in a direction toward element "E1" 21012, the computer system 101 generates and/or outputs verbal description of element "E1" 21012. For example, if element "E1" 21012 is a button that is labeled "Cancel," the verbal description of element "E1" 21012 can be simply the word "Cancel," or more verbosely, "This is a 'Cancel' button."

In some embodiments, as the user 7002's attention shifts from one location to another in view 7000', the computer system 101 forgoes outputting verbal description for virtual objects (e.g., or user interface elements) that are not in focus for more than a respective threshold amount of time. For example, the computer system 101 forgoes outputting verbal description of a respective virtual object in accordance with a determination that user 7002's head is directed toward the respective virtual object only briefly before it moves in a different direction, as described in further detail below with respect to FIGS. 21C-21D.

FIG. 21C illustrates that user 7002's attention is about to shift from element "E1" 21012 to element "E5" 21020 in application user interface 21010. In FIG. 21C, the dashed arrow illustrates a respective movement path of user 7002's attention across application user interface 21010. Specifically, the dashed arrow illustrates that user 7002's attention (e.g., as determined by direction, orientation, and/or elevation of user 7002's head) is about to pass or move through element "E3" 21016 and element "E4" 21018 before reaching element "E5" 21020.

Figure 21D:
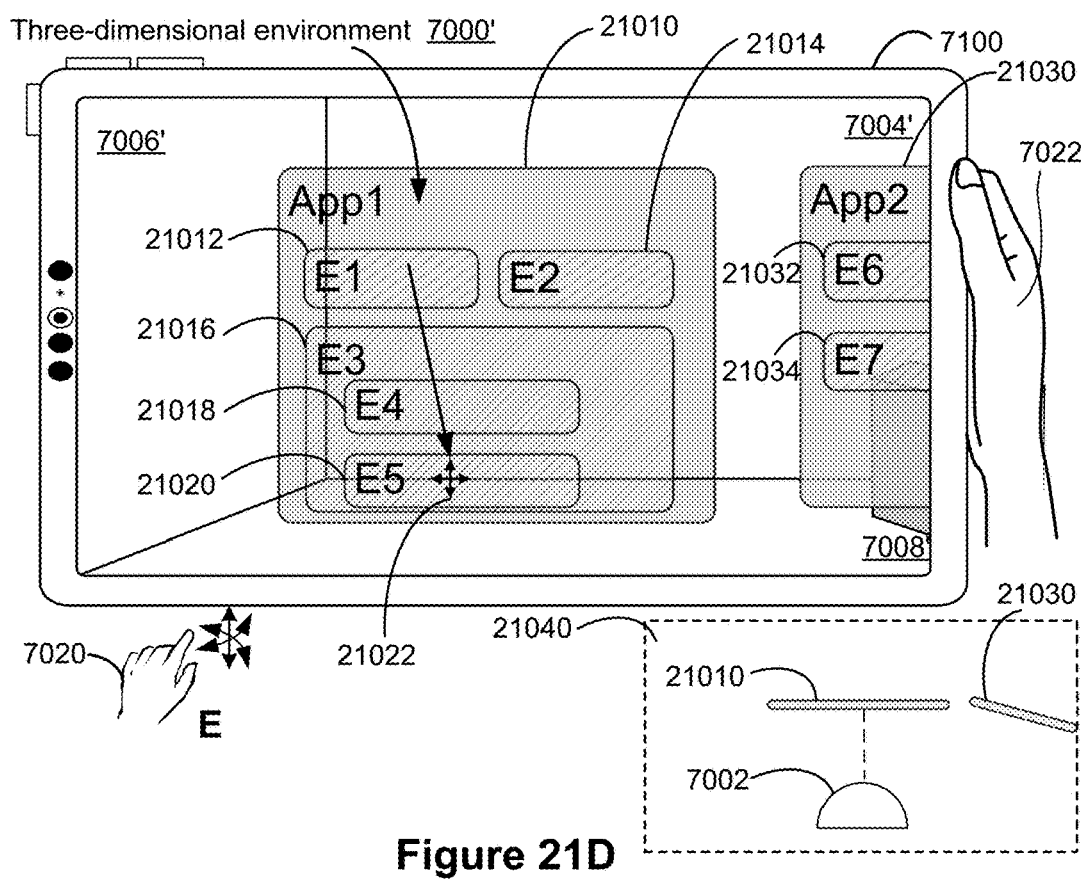

FIG. 21D shows a transition from FIG. 21C in response to detecting that user 7002's head has moved in a direction toward element "E5" 21020 (e.g., illustrated by the position of focus indicator 21022 at a location within element "E5" 21020) while the gesture for activating the exploration mode continues to be detected (e.g., illustrated by maintaining state "E" near left hand 7020 from FIG. 21C to FIG. 21D). Top view 21040 illustrates that user 7002's head remains directed toward application user interface 21010 in FIGS. 21D-21F. In response to detecting that user 7002's head has moved in the direction toward element "E5" 21020 (and optionally in accordance with a determination that the direction of user 7002's head is maintained for more than a respective amount of time while directed toward element "E5" 21020) while the gesture for activating the exploration mode continues to be detected, the computer system 101 generates and/or outputs verbal description of element "E5" 21020. In some embodiments, the computer system 101 forgoes generating and/or outputting verbal descriptions of element "E3" 21016 and element "E4" 21018, even if user 7002's head was directed, at respective times, toward element "E3" 21016 and element "E4" 21018 while the gesture for activating exploration mode was maintained (e.g., as illustrated by the arrow showing movement path of user 7002's attention from element "E1" 21012 to element "E5" 21020), because user 7002's head was directed toward element "E3" 21016 and element "E4" 21018 only briefly (e.g., for less than the respective amount of time) before moving in the different direction of element "E5" 21020.

In some embodiments, application user interface 21010 and/or application user interface 20130 are not close enough to user 7002 to be directly manipulated (e.g., application user interfaces 21010 and 20130 are out of reach for user 7002). For example, in a scenario in which application user interfaces 21010 and 20130 are displayed as XR content via an HMD or other wearable computing device, user 7002's hands and arms when extended cannot reach a position in the physical environment 7000 that corresponds to a respective position of a respective application user interface 21010 and/or application user interface 20130 in the three-dimensional environment 7000'. In a scenario in which application user interfaces 21010 and 20130 are displayed via a display generation component 7100 of a handheld device, user 7002's hands when extended cannot reach the handheld device, as the handheld device is placed far away or user 7002 has mobility impairments.

In some embodiments, a user such as user 7002 can perform a selection gesture to interact with a virtual object, such as element "E5" 21020, as described in further detail below with respect to FIGS. 21E-21F.

FIG. 21E (e.g., FIGS. 21E1, 21E2 and 21E3, where a user interface analogous to the user interface described in FIG. 21E3 is shown on HMD 7100a in FIG. 21E1) illustrates a transition from FIG. 21D in response to detecting a selection gesture (e.g., as denoted by state "S" near hand 7020 in FIG. 21E) (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) while element "E5" 21020 has input focus (e.g., indicated by the location of focus indicator 21022 in element "E5" 21020). In some embodiments, user 7002 stops performing the respective gesture for activating the exploration mode before performing the selection gesture (e.g., in situations where the selection gesture and the respective gesture for activating the exploration mode are performed with the same hand). For example, user 7002 releases the pinch gesture by breaking contact between the two or more fingers (e.g., the thumb and index finger of hand 7020). In some embodiments, user 7002 needs to cease to maintain the respective gesture for activating the exploration mode before the selection gesture can be performed, even if the selection gesture and the respective gesture are not performed with the same hand. In some embodiments, the selection gesture may be performed while the respective gesture for activating the exploration mode is maintained (e.g., by using a different portion of user 7002's body to perform the selection gesture). In some embodiments, the selection gesture (also referred to as an activation gesture) includes a pinch gesture, where optionally contact between two fingers is maintained for less than a respective threshold amount that is required for a long pinch gesture. In some embodiments, the selection gesture that is used while one or more accessibility modes (e.g., specifically accessibility modes that relate to visual impairments, such as "scene description" mode (e.g., described in further detail with relation to method 2400, and FIGS. 22A-22F and FIG. 24), "exploration" mode (e.g., described in further detail with relation to method 2300, and FIGS. 21A-21J and FIG. 23), and/or "read aloud" mode (e.g., described in further detail with relation to methods 1300 and 1400, and FIGS. 9A-9H, 10A-10F and FIGS. 13-14), and accessibility modes that relate motor impairments, such as "switch access" mode (e.g., described in further detail with relation to method 1200 and FIGS. 8A-8K and FIG. 12), "dwell access" mode, and "voice access" mode) are active is different from the selection gesture that is used while the accessibility modes are not enabled. For example, the selection gesture that is used while one or more accessibility modes is active is a single-finger pinch, such as a "left index pinch" (e.g., a single-finger air pinch between an index finger and a thumb finger on the left hand) or "right ring pinch" (e.g., a single-finger air pinch between a ring finger and a thumb finger on the right hand), and the selection gesture that is used while the accessibility modes are not enabled is a different single-finger pinch, such as "right index pinch" (e.g., a single-finger air pinch between an index finger and a thumb finger on the right hand) or a long pinch performed with the index finger and the thumb finger on the right hand. In some embodiments, the selection gesture is a direct gesture (e.g., as opposed to indirect air gesture). For example, the selection gesture includes an air tap at a location in the view 7000' that corresponds to a location of element "E5" 21020.

In some embodiments, user 7002 performs the selection gesture after computer system 101 outputs the verbal description of element "E5" 21020. In some embodiments, the selection gesture can be performed before the verbal description of element "E5" 21020 is generated and/or output or while the verbal description of element "E5" 21020 is being output. In some embodiments, in response to detecting the selection gesture while element "E5" 21020 has input focus, the computer system 101 selects element "E5" 21020 and provides visual indication of the selection of element "E5" 21020. In some embodiments, providing visual indication of the selection of element "E5" 21020 includes changing the visual appearance of element "E5" 21020 (e.g., as illustrated in FIG. 21E compared to FIG. 21D, such as by highlighting, changing color, changing brightness, changing thickness, changing spatial relationship (e.g., raising or depressing) relative to application user interface 21010, displaying a selection outline, and/or other change in visual appearance).

FIG. 21F illustrates a transition from FIG. 21E in response to detecting the selection gesture. In response to detecting the selection gesture (e.g., as denoted by state "S" near hand 7020 in FIGS. 21E), the computer system 101 performs a respective function associated with element "E5" 21020. For example, as illustrated in FIG. 21F, the computer system 101 displays application user interface 21050 associated with element "E5" and, optionally, ceases to display application user interface 21010. For example, application user interface 21050 is displayed in place of application user interface 21010.

In the scenario of FIG. 21F, user 7002's attention is directed toward application user interface 21050, as indicated by focus indicator 21052 optionally displayed at a location in application user interface 21050. Top view 21040 also illustrates that 7002's head is directed toward application user interface 21050. In some embodiments, the position of focus indicator 21052 in view 7000' corresponds to or indicates a location toward which user 7002's head is directed. In some embodiments, a first type of focus indicator is displayed while the exploration mode is active, as indicated by focus indicator 21022 in FIGS. 21B-21E and 21G-21H, and a second (e.g., different) type of focus indicator is displayed while the exploration mode is inactive (e.g., not enabled), as indicated by focus indicator 21052 in FIGS. 21F and 21I-21J.

Figure 21G:
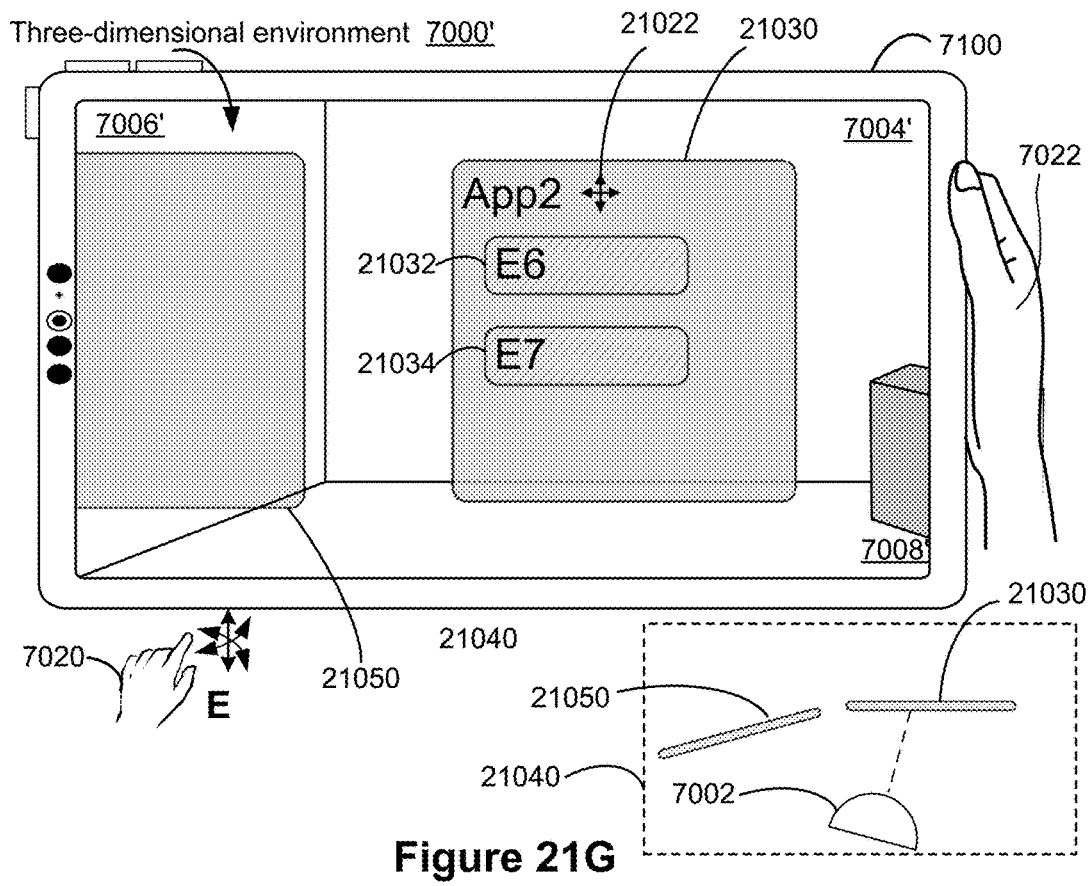
Figure 21H:
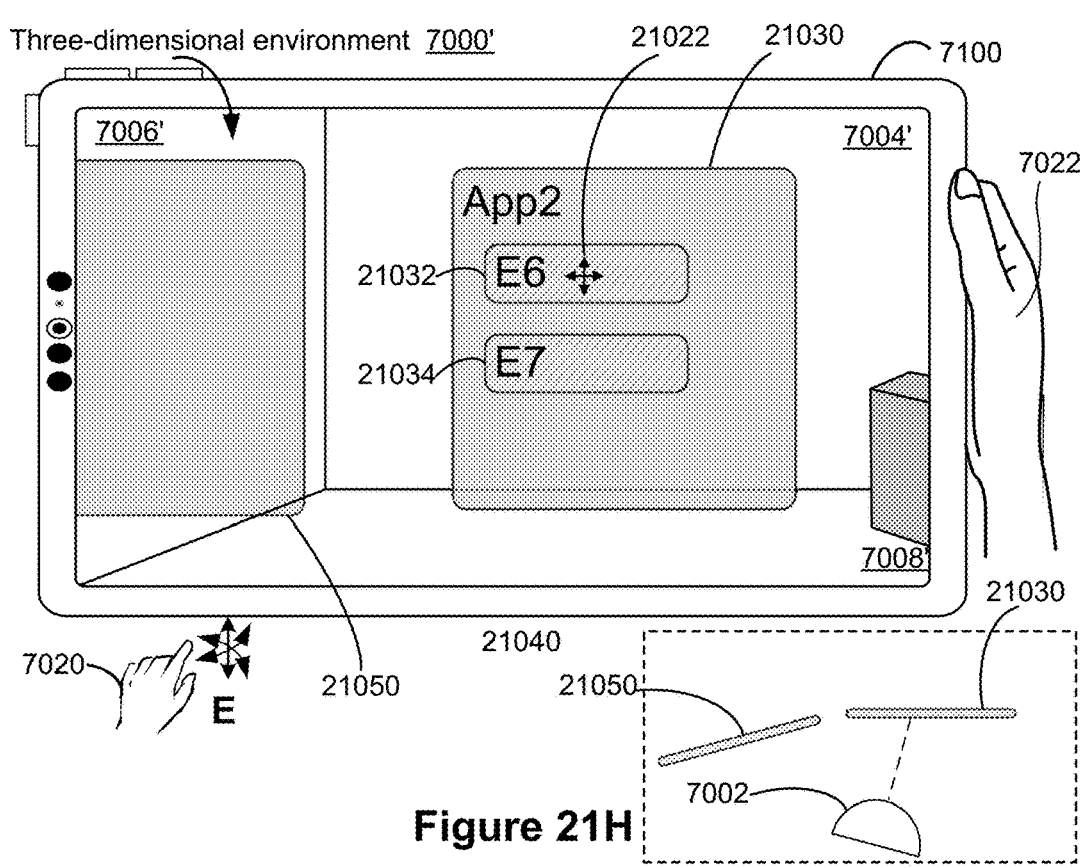
Figure 21I:
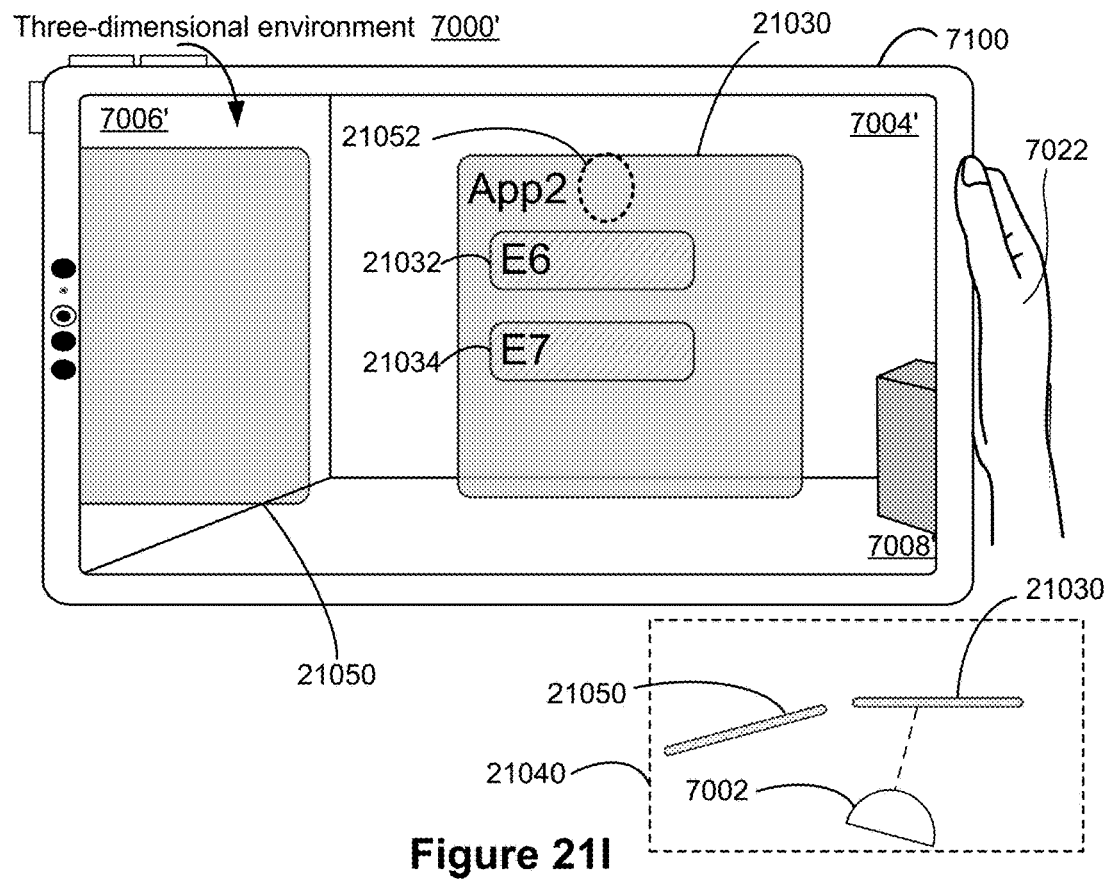
Figure 21J:
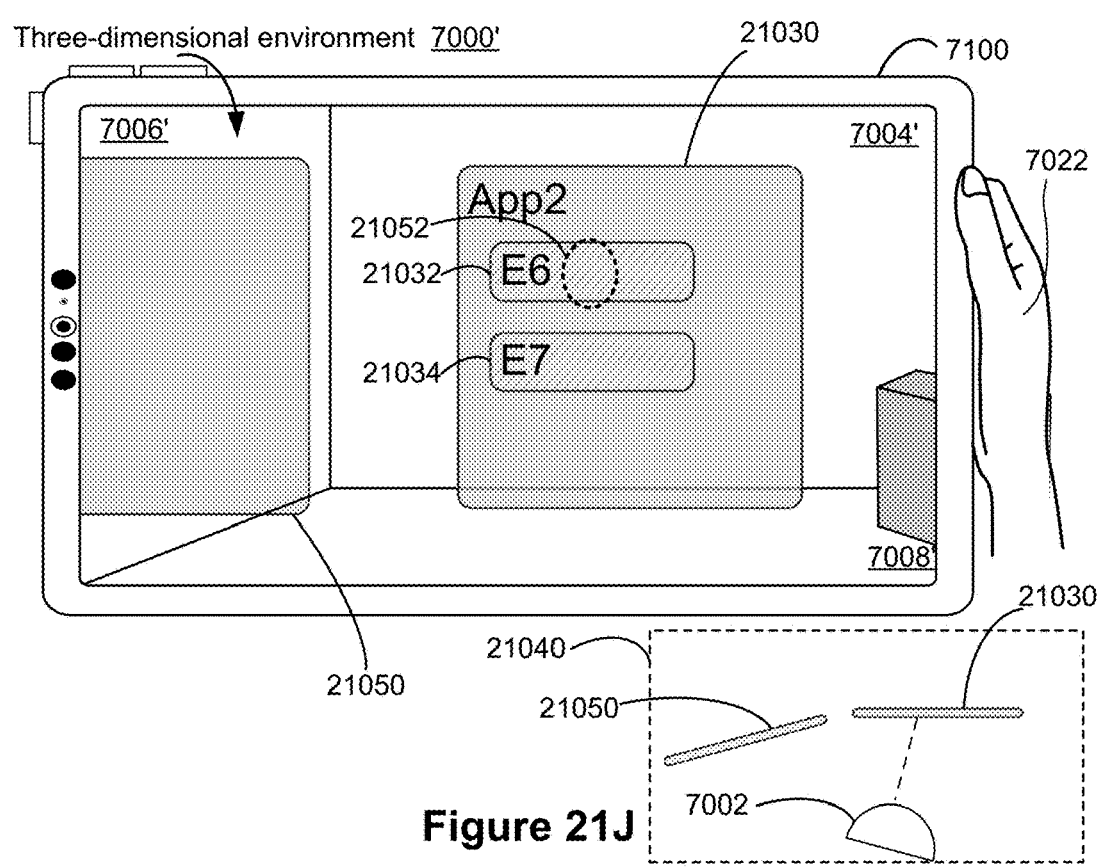

In some embodiments, while the exploration mode is active, as user 7002's attention shifts (e.g., direction, orientation, and/or head elevation of user 7002's head changes) around to different objects in the three-dimensional environment, such as application user interface 21030, the computer system 101 generates and/or outputs verbal description of the different virtual object, as described in further detail with respect to FIGS. 21G-21H.

FIG. 21G illustrates a transition from FIG. 21F in response to detecting that user 7002's head has moved in a direction toward application user interface 21030 (e.g., illustrated by position of focus indicator 21022 at a location within application user interface 21030) while the gesture for activating the exploration mode is being performed or detected (e.g., illustrated by state "E" near hand 7020 in FIG. 21G). Top view 21040 in FIG. 21G also illustrates that user 7002's head has moved in a direction toward application user interface 21030 and away from application user interface 21050. In response to detecting that user 7002's head has moved in the direction toward application user interface 21030 (e.g., to face application user interface 21030, and optionally in accordance with a determination that the direction of user 7002's head is maintained for more than a respective amount of time while directed toward application user interface 21030) while the gesture for activating the exploration mode continues to be detected, the computer system 101 generates and/or outputs verbal description of application user interface 21030. For example, if application user interface 21030 includes a website displayed in a browser application, the verbal description of application user interface 21030 optionally includes the name of the website and a verbal explanation that a home page of the website is displayed.

FIG. 21H illustrates a transition from FIG. 21G in response to detecting that user 7002's head has moved in a direction toward element "E6" 21032 in application user interface 21030 (e.g., as illustrated by the position of focus indicator 21022 at a location within element "E6" 21032) while the gesture for activating the exploration mode is being performed or detected (e.g., illustrated by maintaining state "E" near hand 7020 in FIG. 21H). In response to detecting the movement of user 7002's head in a direction toward element "E6" 21032, the computer system 101 generates and/or outputs verbal description of element "E6" 21032 specifically (e.g., instead of more general verbal description of application user interface 21030 as a whole, as is optionally the case in the scenario of FIG. 21G).

In some embodiments, as user 7002's attention shifts (e.g., direction, orientation, and/or head elevation of user 7002's head changes) while the exploration mode is inactive (e.g., not enabled), the computer system 101 forgoes generating and/or outputting verbal descriptions of different virtual objects toward which user 7002's head is directed to, as described in further detail with respect to FIGS. 21I-21J.

FIG. 21I illustrates a transition from FIG. 21H in response to detecting that user 7002's head moved in a direction toward application user interface 21030 (e.g., illustrated by the position of focus indicator 21052 at a location within application user interface 21030) without performing or maintaining the gesture for activating the exploration mode (e.g., illustrated by the absence of state "E" near hand 7020 in FIG. 21I), or an alternative scenario to that of FIG. 21G, in which, in contrast to FIG. 21G, the gesture for activating the exploration mode is not being performed. Top view 21040 in FIG. 21I also illustrates that user 7002's head faces toward application user interface 21030 and away from application user interface 21050. In response to detecting that user 7002's head has moved to face application user interface 21030 while the computer system 101 does not detect the gesture for activating the exploration mode, the computer system 101 forgoes generating and/or outputting verbal description of application user interface 21030 (e.g., in contrast to the scenario in FIG. 21G in which computer system 101 generates and/or outputs verbal description of application user interface 21030 because the gesture for activating the exploration mode continues to be detected when user 7002's head has moved to face application user interface 21030).

FIG. 21J illustrates a transition from FIG. 21I in response to detecting that user 7002's head moved in a downward direction toward element "E6" 21032 of application user interface 21030 (e.g., illustrated by the position of focus indicator 21052 at a location within element "E6" 21032) without performing or maintaining the gesture for activating the exploration mode (e.g., illustrated by the absence of state "E" near hand 7020 in FIG. 21J) (e.g., FIG. 21J illustrates an alternative scenario to that of FIG. 21H, in which, in contrast to FIG. 21H, the gesture for activating the exploration mode is not being performed). Top view 21040 in FIG. 21J also illustrates that user 7002's head is directed toward a location within application user interface 21030 and away from application user interface 21050. In response to detecting that user 7002's head has moved to face element "E6" 21032 while the computer system 101 does not detect the gesture for activating the exploration mode, the computer system 101 forgoes generating and/or outputting verbal description of element "E6" 21032 (e.g., in contrast to the scenario in FIG. 21H in which computer system 101 generates and/or outputs verbal description of element "E6" 21032 because the gesture for activating the exploration mode continues to be detected when user 7002's head is directed toward element "E6" 21032).

In some embodiments, while the exploration mode is active (e.g., as described in relation to FIGS. 21B-21D), the computer system 101 outputs non-visual information of a virtual object that is indicated by a respective pose of a respective portion of the user's body, and while the exploration mode is inactive, the computer system 101 outputs non-visual information of a virtual object that is indicated by a focus indicator in response to navigation inputs (e.g., using navigation gesture available in the "read aloud" accessibility mode as described with reference to methods 1300 and 1400), e.g., irrespective of the respective pose of the respective portion of the user's body.

Additional descriptions regarding FIGS. 21A-21J are provided below in reference to method 2300 described with respect to FIG. 23.

FIGS. 22A-22F illustrate example techniques for providing non-visual information (e.g., audio description) about a portion of a physical environment included in a view of a mixed-reality three-dimensional environment, in accordance with various embodiments. FIG. 24 is a flow diagram of a method 2400 for providing non-visual information (e.g., audio description) about a portion of a physical environment included in a view of a mixed-reality three-dimensional environment. The user interfaces in FIGS. 22A-22F are used to illustrate the processes described below, including the processes in FIG. 24.

Figure 22A:
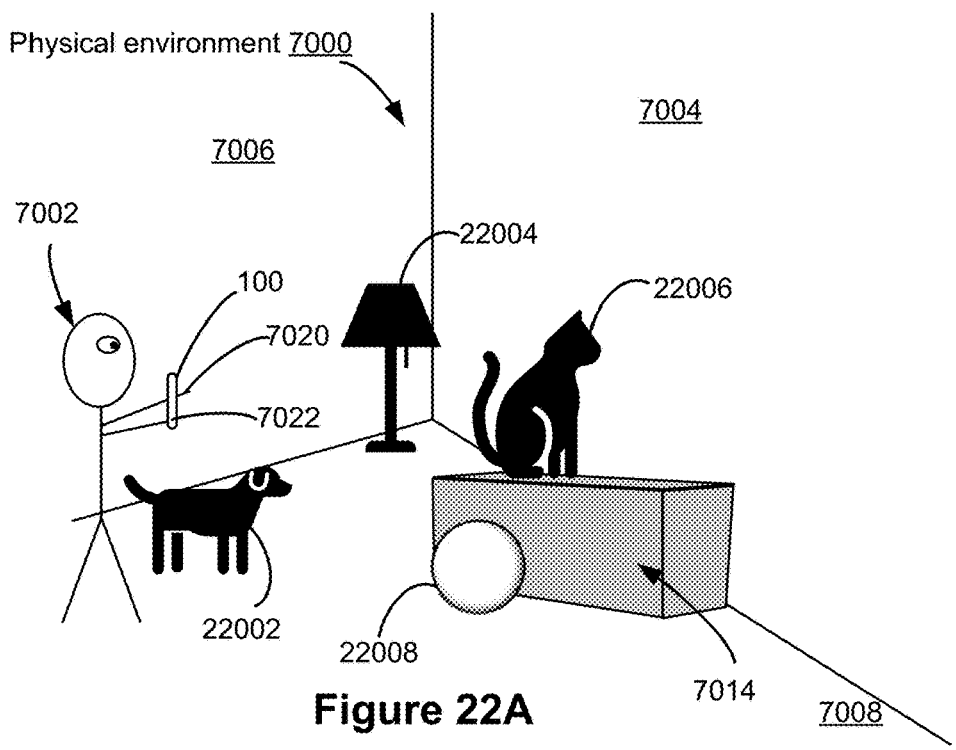

FIG. 22A illustrates an example physical environment 7000 that includes user 7002 interacting with computer system 101. Physical environment 7000 includes physical walls 7004 and 7006, floor 7008, and physical object 7014, as described herein with reference to FIG. 15A-15B. Physical environment 7000 in FIG. 22A also includes additional physical objects, such as dog 22002, lamp 22004, cat 22006, and ball 22008. Ball 22008 is placed on floor 7008, cat 22006 is on top of physical object 7014, lamp 22004 is placed on floor 7008 in a corner, and dog 22002 is located on a left side of user 7002. As in FIG. 21A, user 7002 in FIG. 22A is holding computer system 101 with the user's hand 7020 or hand 7022, or both.

Figure 22B:
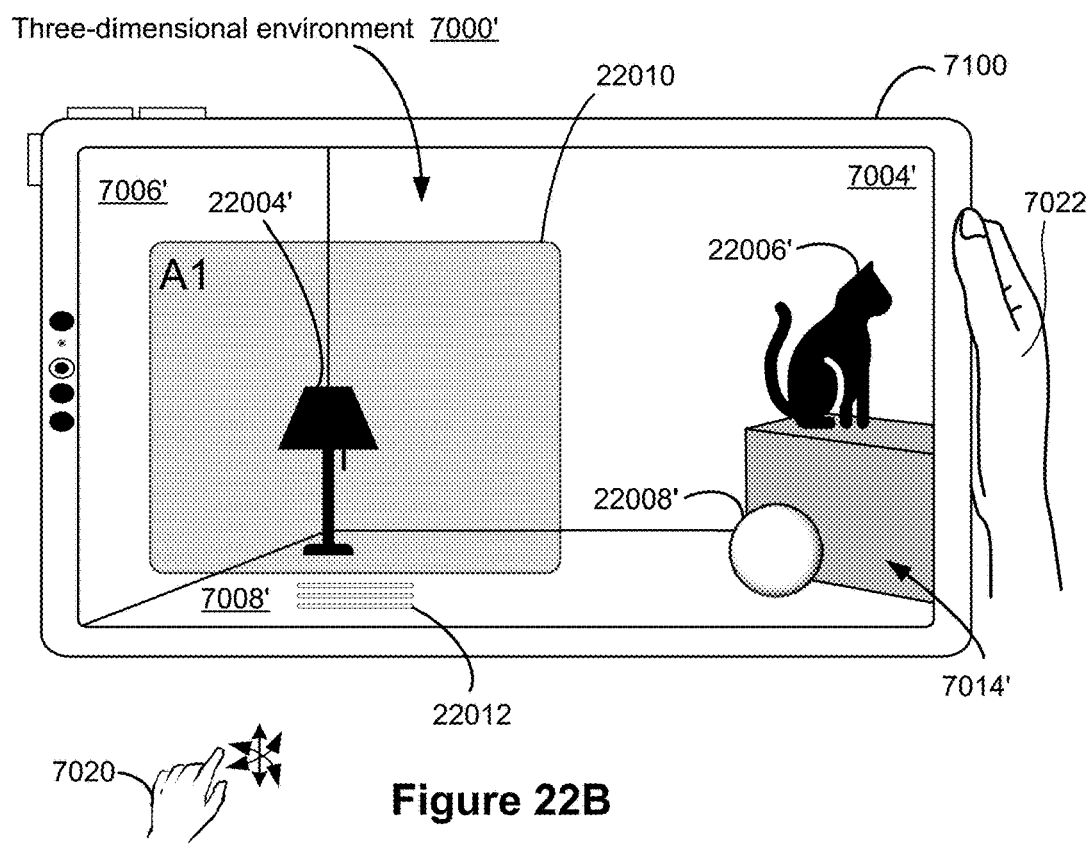

FIG. 22B illustrates view 7000' that is visible to user 7002 via display generation component 7100 of computer system 101. View 7000' is a mixed-reality (e.g., augmented reality) three-dimensional environment that includes passthrough views of portions of physical environment 7000 and one or more virtual objects overlaid on the passthrough portions of physical environment 7000 included in view 7000'.

In some embodiments, one or more portions of a view of physical environment 7000 that is visible to user 7002 via display generation component 7100 are digital passthrough portions that include representations of corresponding portions of physical environment 7000 captured via one or more image sensors of computer system 101. For example, view 7000' optionally includes representations of objects in the physical environment 7000 (e.g., as captured by one or more cameras of computer system 101), as described in further detail below with reference to FIG. 22B. In some embodiments, one or more portions of the view of physical environment 7000 that is visible to user 7002 via display generation component 7100 are optical passthrough portions, in that user 7002 can see one or more portions of physical environment 7000 through one or more transparent or semi-transparent portions of display generation component 7100. For example, view 7000' optionally includes optical views of objects in the physical environment 7000 (e.g., as visible through one or more transparent or semi-transparent portions of display generation component 7100), as described in further detail below with reference to FIG. 22B.

In FIG. 22B, like in FIG. 21B, view 7000' includes passthrough elements including wall 7004', wall 7006', floor 7008', and box 7014' as described herein with reference to FIGS. 15A-15B and 21A. Further, view 7000' includes passthrough views of physical elements such as lamp 22004, cat 22006, and ball 22008. For example, in FIG. 22B, view 7000' includes representation (or optical view) 22004' of physical lamp 2204 (referred to as lamp 22004'), representation (or optical view) 22006' of physical cat 22006 (referred to as cat 22006'), and representation (or optical view) 22008' of physical ball 22008 (referred to as ball 22008'). View 7000' in FIGS. 22C-22E additionally includes representation (or optical view) 22002' of physical dog 22002 (referred to as dog 22002') (e.g., in addition to lamp 22004', cat 22006', and ball 22008') (e.g., whereas dog 22002' is outside of the viewports shown in 22B and 22F). In addition, view 7000' includes one or more computer-generated objects, also called virtual objects (e.g., displayed via display generation component 7100), which are not representations of physical objects (e.g., physical objects in physical environment 7000). For example, view 7000' includes one or more virtual objects, such as application user interface 22010 (e.g., of a software application such as an email application, a web browser, a messaging application, a maps application, a video player, or an audio player, and/or other software application) and associated grabber affordance 22012 (e.g., for manipulating, such as by repositioning, resizing, or otherwise moving application user interface 22010, or for performing one or more other operations with application user interface 22010).

In some embodiments, a "scene description" mode is activated in response to a respective gesture, and the computer system 101 generates and/or outputs non-visual information, such as audio or verbal description, about a portion of a physical environment (e.g., as opposed to descriptions of the virtual environment that the computer system outputs in the "exploration" mode), such as physical environment 7000, that is available for viewing via display generation component 7100, as described in further detail below with reference to FIGS. 22B-22H.

In FIG. 22B, user 7002 performs the respective gesture for activating the "scene description" mode with hand 7020 (e.g., as illustrated by arrows near hand 7020). In some embodiments, the respective gesture for activating the "scene description" mode is a "left index double long pinch" (e.g., two single-finger pinches detected in immediate succession, both of which are performed with the index and thumb finger of the left hand, and the second pinch optionally a long pinch). In some embodiments, the respective gesture for activating the "scene description" mode is an air gesture. In some embodiments, the respective gesture for activating the "scene description" mode is a "right ring double long pinch" (e.g., two single-finger pinches detected in immediate succession, both of which are performed with the ring and thumb finger of the right hand, and the second pinch optionally a long pinch). In response to detecting the respective gesture for activating the "scene description" mode, the computer system 101 activates the "scene description" mode and outputs verbal description of the physical scene that is included in view 7000'. For example, in the scenario of FIG. 22B, a verbal description of the portion of physical environment 7000 that is visible in view 7000' can be a description of the scene as a whole, such as "A room with a big box on your right side" or a "A room with a cat on top of a trunk."

In some embodiments, the respective gesture for activating the "scene description" mode is different from other inputs (e.g., including inputs that are air gestures) for performing different operations with respect to virtual objects in view 7000', such as inputs with respect to application user interface 22010. For example, an air pinch and drag gesture directed to application user interface 22010 is used to scroll content (e.g., scrollable content) in application user interface 22010, and an air pinch and drag gesture directed to grabber affordance 22012 is used to move application user interface 22010 in view 7000' (e.g., in accordance with direction and/or magnitude of the drag portion of the air pinch and drag gesture).

In some embodiments, the respective gesture for activating the "scene description" mode is recognized as invoking the "scene description" mode or is otherwise enabled when one or more other accessibility modes are active (e.g., specifically accessibility modes that relate to visual impairments), such as "read aloud" mode, in which verbal description of virtual objects (e.g., user interfaces and user interface elements) is provided in response to navigation gestures or other user inputs (e.g., described in further detail with relation to methods 1300 and 1400, and FIGS. 9A-9H, 10A-10F and FIGS. 13-14), and/or "exploration" mode (e.g., described in further detail with relation to method 2300, and FIGS. 21A-21J and FIG. 23), in which verbal description of virtual objects (e.g., user interfaces and user interface elements) is provided in based on a location toward which a respective portion of user's body is directed while a respective gesture for maintaining the exploration mode continues to be detected.

In some embodiments, the verbal description of the portion of physical environment 7000 that is visible in view 7000' is independent of whether or not the portion of the physical environment 7000 in view 7000' is obscured by a virtual object, such as application user interface 22010. For example, the same verbal description is generated if application user interface 22010 is visible in view 7000' and if application user interface 22010 is not visible in view 7000'. In particular, in circumstances in which a verbal description of lamp 22004' is generated, the same verbal description of lamp 22004' is generated whether application user interface 22010 obscures lamp 22004' in view 7000' (e.g., as shown in FIG. 22B) or not.

In some embodiments, the audio or verbal description of a portion of a physical environment that is generated and/or output in response to the respective gesture for activating the "scene description" mode depends on a respective portion of the physical environment that is included or represented in a viewport of the three-dimensional environment (e.g., a current viewport) when the gesture is detected. For example, the verbal description that is generated by the computer system 101 in response to the respective gesture for activating the "scene description" mode is based on the portion of physical environment 7000 that is visible in view 7000'. For example, in the scenario of FIG. 22B, even though dog 22002 is present in physical environment 7000', a verbal description that is generated for view 7000' as shown in FIG. 22B typically does not include any reference to dog 22002, because dog 22002 is not in the portion of physical environment 7000 that is visible in view 7000' of the current viewport. In some embodiments, the verbal description depends on what is in a field of view of the one or more cameras of computer system 101 (e.g., which is optionally different from what is in the current viewport visible to user 7002). Thus, in the scenario of FIG. 22B, the verbal description that is generated does not include any reference to dog 22002 because dog 22002 is not in a field of view of the one or more cameras of computer system 101 (e.g., rather than because dog 22002' is not in the current viewport). In some embodiments, the verbal description of the portion of the physical environment 7000 includes description of portions of the physical environment 7000 that are within the field of view of the one or more cameras of computer system 101 (e.g., even if not visible in the current viewport) and optionally portions that are beyond or outside the field of view of the one or more cameras of computer system 101.

In some embodiments, the verbal description of the portion of the physical environment 7000 is based on view 7000' that is visible via a respective viewport of the three-dimensional environment without any virtual objects, such as without application user interface 22010, when the gesture for activating the "scene description" mode is detected. For example, in the scenario of FIG. 22B, the verbal description of the portion of physical environment 7000 in view 7000' includes a description of the lamp 22004' that is otherwise (at least to some degree) occluded by application user interface 22010 (e.g., "A room with a cat on top of a big box and with a lamp in the corner.") (e.g., the presence of application user interface 22010 is ignored in generating the verbal description of the physical environment).

In some embodiments, the verbal description of the portion of the physical environment 7000 is provided while maintaining display of virtual content, such as application user interface 22010, that is displayed over (e.g., overlaid onto) the representation of the portion of the physical environment 7000 (or superimposed over an optical view of the representation of the portion of the physical environment 7000). For example, the computer system 101 does not hide application user interface 22010 in order to generate and/or output the verbal description of the portion of the physical environment 7000.

In some embodiments, the degree of verbosity of the verbal description of the portion of the physical environment 7000 in view 7000' is determined based on preferences that are pre-selected (e.g., by configuring settings). For example, user 7002 can select an option from a plurality of options corresponding to different degrees of verbosity. In some embodiments, in the scenario of FIG. 22B, in response to detecting the gesture activating the "scene description" mode while a first option corresponding to a first degree of verbosity is selected, the computer system 101 generates, in accordance with the selected first option, a first verbal description having the first degree of verbosity, and in response to detecting the gesture activating the "scene description" mode while a different, second option corresponding to a different, second degree of verbosity is selected, the computer system 101 generates, in accordance with the selected second option, a different, second verbal description having the second degree of verbosity. For example, while an option with a lower degree of verbosity is selected in the scenario of FIG. 22B, the verbal description can include a brief description of the scene as a whole without details with respect to what objects are visible and/or where those objects are located (e.g., "You are in a room with a large object on your right."). In contrast, while an option with a higher degree of verbosity is selected in the scenario of FIG. 22B, the verbal description can include details with respect to what objects are visible and/or where those objects are located (e.g., "You are in a room that has a lamp in the corner in front of you, a large box to the right with a cat on top, and a ball near the box.").

In some embodiments, repeating the gesture for activating the "scene description" mode causes the computer system 101 to generate different verbal descriptions of the portion of the physical environment 7000 in view 7000'. For example, performing the gesture for activating the "scene description" mode at a first time causes the computer system 101 to generate a first verbal description of the portion of the physical environment 7000 in view 7000', and performing the gesture for activating the "scene description" mode at a second time, e.g., after the first time, causes the computer system 101 to generate a second verbal description of the portion of the physical environment 7000 in view 7000' (e.g., the first and second verbal descriptions are different). In some embodiments, the change in the verbal description in response to repeating the gesture for activating the "scene description" mode is based on different factors or conditions, as described in further detail with respect to FIGS. 22C-22E.

FIG. 22C illustrates a transition from FIG. 22B as a result of user 7002 shifting or moving computer system 101 (and display generation component 7100) in a leftward direction, such that dog 22002 is now in the viewport of the three-dimensional environment (e.g., whereas dog 22002 was not in the viewport in FIG. 22B before the moving of computer system 101) and cat 22006 is no longer in the viewport (e.g., whereas cat 22006 was in the viewport in FIG. 22B before the moving of computer system 101). In the scenario of FIG. 22C, the gesture for activating the "scene description" mode is performed again (e.g., after computer system 101 previously detected the gesture for activating the "scene description" mode in FIG. 22B). In response to detecting the gesture for activating the "scene description" mode again after computer system 101 was moved, the computer system 1010 generates a different verbal description that includes dog 22002. An example of the verbal description is "A room with a cat on top of a big box, a lamp, and a dog" or, if excluding elements that are no longer in the viewport (e.g., cat 22006), "A room with a lamp and a dog." In some embodiments, the different verbal description is phrased to indicate what has changed (e.g., "A different portion of the room, with the lamp and now a dog in view.").

In some embodiments, the change in the verbal description in response to repeating the gesture for activating the "scene description" mode is not based on a changed state of the physical environment 7000 or a change of what is visible in the current field of view of the one or more cameras or in the viewport. For example, the verbal description in response to repeating the gesture for activating the "scene description" mode can change even if what is visible in view 7000' remains the same (e.g., the change can be based on selected user preferences for verbosity, or verbal descriptions with different levels of verbosity can be successively generated as the gesture for activating the "scene description" mode is repeated).

In some embodiments, the verbal description indicates what has changed since the gesture for activating the "scene description" mode was detected the previous time (e.g., first time) or other information about the change that has occurred (e.g., as opposed to repeating what was already provided in the first verbal description of the scene as a whole). An example of the verbal description generated in such scenario is "A dog appeared on your left side" (e.g., because what has changed relative to the scenario in FIG. 22B is the dog 22002' being visible in view 7000').

FIG. 22D (e.g., FIGS. 22D1, 22D2 and 22D3, where a user interface analogous to the user interface described in FIG. 22D1 is shown on HMD 7100a in FIG. 22D2), illustrating a transition from FIG. 22B, shows that view 7000' is changed as a result of dog 22002 walking into the field of view of the one or more cameras of computer system 101 such that dog 22002' appears in view 7000' (e.g., whereas dog 22002' was not visible in view 7000' in FIG. 22B before the dog 22002 walked into the field of view of the one or more cameras of computer system 101). In some embodiments, in response to detecting the gesture (e.g., a direct air gesture such as an air tap or air pinch at a location with which the user is interacting, an indirect air gesture such as an air pinch while attention of the user or gaze of the user is directed toward at a location with which the user is interacting, a tap input, a gaze input, a drag input, and/or another type of user input) for activating the "scene description" mode again (e.g., as illustrated by arrows near hand 7020 in FIG. 22D) after dog 22002 walked into the field of view of the one or more cameras, the verbal description indicates what physical objects in physical environment 7000 recently moved (e.g., as opposed to repeating what was already provided in the first verbal description of the scene). An example of the verbal description generated in such a scenario is "A dog walked in and is in front of you" (e.g., because what has changed relative to the scenario in FIG. 22B is the dog 22002' entering view 7000').

Figure 22E:
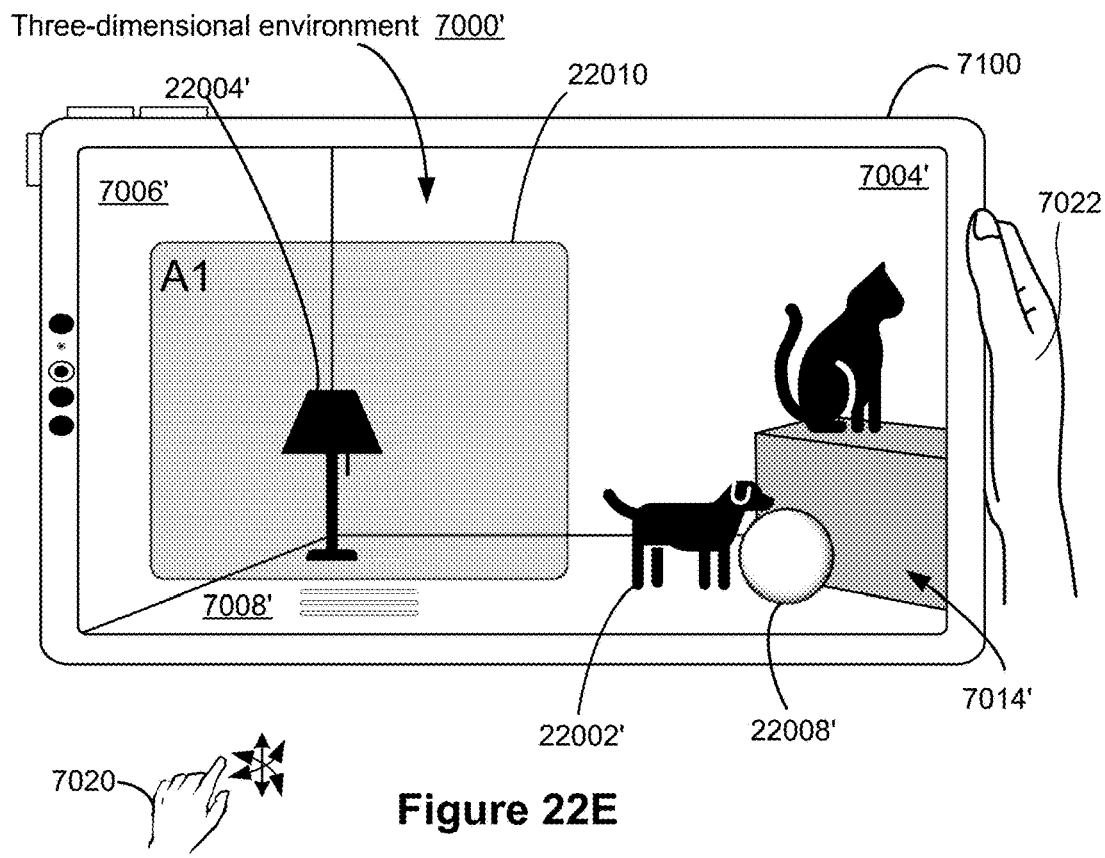

FIG. 22E, illustrating a transition from FIGS. 22D, shows that view 7000' is changed as a result of dog 22002 walking up to ball 22008 in a righthand portion of the viewport (e.g., whereas in the scenario of FIGS. 22D, dog 22002' is near the middle of view 7000'). In some embodiments, in response to detecting the gesture for activating the "scene description" mode again (e.g., as illustrated by arrows near hand 7020 in FIG. 22E) after dog 22002 approached ball 22008, the computer system 101 generates yet another verbal description of the portion of physical environment 7000 in view 7000'. For example, in the scenario of FIG. 22E, the verbal description can indicate that the dog 22002 recently moved, e.g., the verbal description can explain that dog 22002 walked to the right side near ball 22008 (e.g., as opposed to repeating what was already provided in the verbal description of the scene). An example of the verbal description generated in such a scenario is "The dog walked past you to the ball" (e.g., because what has changed relative to the scenario in FIG. 22D is dog 22002' walking across user 7002's view 7000' to ball 22008'). In circumstances in which FIG. 22E illustrates a transition from FIG. 22B directly (e.g., without transitioning via FIGS. 22D), an example of the verbal description generated in such a scenario is "The dog walked in and past you toward the ball" (e.g., because what has changed relative to the scenario in FIG. 22B is the dog 22002' both entering view 7000' and walking across view 7000' up to ball 22008').

In some embodiments, the verbal description of the physical environment 7000 is based on a snapshot of the physical environment (e.g., an image of a state of the physical environment at a particular time) when the gesture for activating the "scene description" mode is detected. For example, in the scenario in FIG. 22B, if the gesture for activating the "scene description" mode is detected while lamp 22004', cat 22006', and ball 22008' but not dog 22002' are in view 7000', a contemporaneous snapshot of view 7000' is used to generate the verbal description of the portion of physical environment 7000 in view 7000', including descriptions of lamp 22004', cat 22006', and ball 22008' but not dog 22002' (optionally, even if dog 22002' enters view 7000' while the verbal description is being output), whereas in the scenarios in FIGS. 22C-22E, the verbal description additionally includes description of dog 22002' in accordance with the gesture for activating the "scene description" mode being detected while dog 22002' is already in view 7000'.

In some embodiments, user 7002 can switch between obtaining verbal description of the physical environment, such as physical environment 7000, and obtaining verbal description of the virtual content in view 7000'. For example, different gestures are used to activate different accessibility modes that pertain to visual impairments. For example, a first gesture is used to activate a "read aloud" mode, a second gesture is used to activate the "explore" mode, and yet another third gesture is used to activate the "scene description" mode. The respective gestures for each mode are enabled (or recognized) when any one of the "read aloud", "explore", and/or "scene description" modes is currently being used. For example, user 7002 can perform the first gesture to activate the "read aloud" mode and navigate a respective user interface hierarchy of application user interface 22010 in response to navigation user inputs (e.g., as described in further detail with respect to methods 1300 and 1400), and then perform the third gesture to switch to "scene description" mode to obtain verbal description of the portion of the physical environment that is included in view 7000' (e.g., in FIGS. 22B-22E).

In some embodiments, the verbal description of the physical environment 7000 that is generated in response to the gesture for activating the "scene description" mode is independent of a degree of immersion in view 7000' (e.g., degree of immersion of user 7002 in virtual content relative to passthrough of the physical environment 7000), as described in further detail below with reference to FIG. 22F.

Figure 22F:
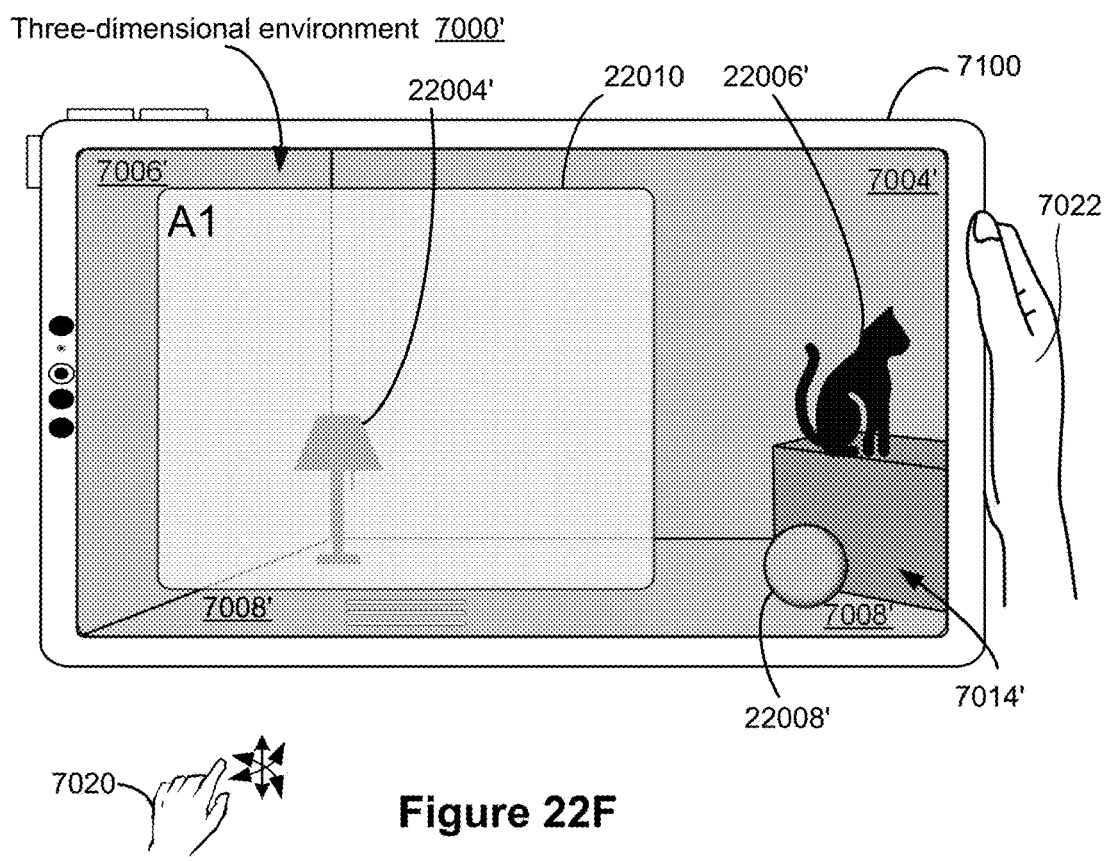

FIG. 22F illustrates the same view 7000' that is illustrated in FIG. 22B but with a different (e.g., higher) degree of immersion. For example, user 7002 is more immersed in virtual content in view 7000' (e.g., application user interface 22010 is more prominently displayed) relative to the portion of the physical environment 7000 visible in view 7000' (e.g., the passthrough of the physical environment 7000 is darkened, dimmed, blurred, physical elements (e.g., lamp 22004', cat 22006', ball 22008', and/or box 7014') reduced in size, and/or other visual deemphasis, one or more passthrough elements of physical environment 7000 cease to be visible (e.g., are not displayed, if digital passthrough, or are overlaid or obscured by virtual content, if optical passthrough), and the application user interface 22010 is enlarged). In the scenario in FIG. 22F, user 7002 performs the respective gesture for activating the "scene description" mode with hand 7020 (e.g., as illustrated by arrows near hand 7020). In response to detecting the respective gesture for activating the "scene description" mode, the computer system 101 activates the "scene description" mode and outputs verbal description of the physical environment 7000 that is included in view 7000'. In some embodiments, the verbal description that is generated in the scenario in FIG. 22B is the same as the verbal description that is generated in the scenario of FIG. 22F, because only the level of immersion is different between FIG. 22B and FIG. 22F.

Additional descriptions regarding FIGS. 22A-22F are provided below in reference to method 2400 described with respect to FIG. 24.

FIG. 23 is a flow diagram of a method 2300 for providing non-visual information (e.g., audio description) about virtual content in a mixed-reality three-dimensional environment in accordance with various embodiments. Method 2300 is performed at a computer system (e.g., computer system 101 in FIG. 1A) that is in communication with one or more input devices (e.g., cameras, controllers, touch-sensitive surfaces, joysticks, buttons, one or more optical sensors, eye-tracking devices, and/or other input devices). In some embodiments, the computer system is in communication with a display generation component (e.g., a heads-up display, a head-mounted display (HMD), a display, such as the display generation component in FIGS. 1A, 3, and 4, a touchscreen, a projector, a tablet, a smartphone, or other display or device that includes a display). In some embodiments, the method is performed while a view of a three-dimensional environment (e.g., the environment being a three-dimensional environment that includes one or more computer-generated portions (e.g., virtual content overlaid onto, projected onto, and/or replacing display of one or more portions of a representation or view of a physical environment) and optionally one or more passthrough portions (e.g., camera view, or direct passthrough)) is visible via the display generation component. In some embodiments, the method 2300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 2300 are, optionally, combined and/or the order of some operations is, optionally, changed.

As described herein, method 2300 provides a verbal description of virtual content in a mixed-reality three-dimensional environment. The techniques used in method 2300 relate to an accessibility mode for people with visual impairments referred to as an "exploration" mode (also sometimes referred to as "explore" mode). In method 2300, what content is described verbally is indicated by a location in the mixed-reality three-dimensional environment toward which a respective portion of a user's body is directed (e.g., direction and/or orientation of a user's head, face, eyes, forehead, hand, and/or another portion of the user's body). The computer system uses the respective portion of the user's body as an indicator of what content to verbally describe while a respective gesture is continuously detected and, if the computer system ceases to detect the respective gesture, the computer system ceases providing verbal descriptions based on a location toward which the respective portion of user's body is directed. While the exploration mode is enabled, the verbal descriptions of the virtual content are automatically output based on the respective portion of the user's body without the need for the user to provide additional user inputs. Automatically outputting verbal descriptions of virtual content selected based on a location toward which the respective portion of user's body is directed assists the user with exploring the mixed-reality three-dimensional environment without the need for the user to provide additional inputs and navigate complex user interfaces (e.g., with multiple user interface elements across multiple hierarchy levels), thereby reducing the number, complexity, and extent of user inputs. These and other benefits of method 2300 are particularly beneficial to users with reduced vision (or other visual impairments), making user interaction with a mixed-reality three-dimensional environment more accessible to a wider population.

The computer system detects (2302), via the one or more input devices, an input that includes a respective gesture (e.g., a pinch gesture, a long pinch gesture, a single-finger pinch gesture, a multi-finger pinch gesture, or secondary pinch gesture (single-finger, a multi-finger, or secondary pinch are gestures described in more detail with reference to FIGS. 9A-9H, 10A-10F, and FIGS. 13-14, and methods 1300 and 1400), and/or other gesture that requires a respective hand configuration, and/or that meets a respective duration criterion). The detected gesture is sometimes called an ongoing respective gesture because, in some embodiments, as described in more detail below, continued detection of the gesture is a precondition for providing non-visual information that describes objects (e.g., virtual objects) in the three-dimensional environment in accordance with the pose of a portion of the user's body.

While detecting (2304) the input that includes the respective gesture (e.g., in accordance with a determination that the input includes the respective gesture): the computer system detects (2306), via the one or more input devices, that a respective portion of a user's body has a first pose (e.g., position, orientation, and/or indication of direction) that is directed toward one or more first objects in a three-dimensional environment (e.g., the portion of the user's body has a first pose in a physical environment that corresponds to or is directed toward a first simulated location in the three-dimensional environment that overlaps or is within a threshold distance of the one or more first objects in the three-dimensional environment). In some embodiments, the portion of the user's body that has a pose corresponding to one or more objects in the three-dimensional environment is different from a portion of the user's body that is used to perform the ongoing respective gesture (e.g., different hands or other different body parts).

While detecting (2304) the input that includes the respective gesture (e.g., in accordance with a determination that the input includes the respective gesture): in response to detecting that the respective portion of the user's body has the first pose that is directed toward the one or more first objects, the computer system outputs (2308) non-visual information (e.g., audio and/or tactile output) that describes the one or more first objects. In some embodiments, the computer system displays, in the three-dimensional environment, a focus indicator corresponding to the one or more first objects (e.g., a cursor, selection outline, highlight, or other indication that the one or more first objects have input focus for subsequent interaction).

The computer system detects (2310), via the one or more input devices, movement of the respective portion of the user's body from the first pose corresponding to the one or more first objects to a second pose that is directed toward one or more second objects in the three-dimensional environment (e.g., the portion of the user's body shifts to a second pose in the physical environment that corresponds to or is directed toward a second simulated location in the three-dimensional environment that overlaps or is within a threshold distance of the one or more second objects in the three-dimensional environment). For example, the first pose corresponds to object "E1" 21012, FIG. 21C, and the second pose corresponds to objection "E5" 21020, FIG. 21D.

In response to detecting the movement of the respective portion of the user's body to the second pose that is directed toward the one or more second objects, in accordance with a determination that the input that includes the respective gesture continues to be detected, the computer system outputs (2312) non-visual information (e.g., audio and/or tactile output) that describes the one or more second objects. For example, in FIGS. 21B-21E, while the gesture for activating the exploration mode continues to be detected (e.g., denoted by a state "E" near left hand 7020 of user 7002), the computer system 101 automatically outputs verbal descriptions of respective objects, such as application user interface 21010 (FIG. 21B), element "E1" 21012 (FIG. 21C), or element "E5" 21020 (FIG. 21E), in accordance with a determination that the respective objects have focus, e.g., as determined by a direction of user 7002's head.

In some embodiments, the computer system displays, in the three-dimensional environment, a focus indicator (e.g., focus indicator 21022, FIG. 21D) corresponding to the one or more second objects (e.g., a cursor, selection outline, highlight, or other indication that the one or more second objects have input focus for subsequent interaction). In some embodiments, in response to and while the respective gesture continues to be detected, an exploration mode is active. In some embodiments, in the exploration mode, the computer system automatically outputs audio description(s) of objects that are in the three-dimensional environment (optionally visible via or in the virtual viewport) in accordance with a determination that the objects have focus (optionally, without requiring other conditions or user inputs) as determined based on a respective pose of the user's body. For example, the computer system provides an audio description of an object that has focus but forgoes providing audio descriptions of other objects in the three-dimensional environment that are not in focus. In some embodiments, no additional inputs are required for generating the audio descriptions of objects in the three-dimensional environment.

In some embodiments, gestures that meet first gesture criteria include: a "right index long pinch" (e.g., a single-finger long air pinch performed with the index and thumb finger of the right hand, where the term "single-finger" in this context indicates that the pinch gesture is performed by a single finger making contact with the thumb), where the "right index long pinch" activates the exploration mode and a release of the "right index long pinch" deactivates or ends the exploration mode; and/or a "left index long pinch" (e.g., a single-finger long air pinch performed with the index and thumb finger of the left hand), where the "left index long pinch" activates the exploration mode and a release of the "left index long pinch" deactivates or ends the exploration mode. These and other gestures and corresponding mappings of gestures to commands are described in Table 1 (above) and Table 2 (below).

Table 2 herein provides descriptions of available commands that are mapped to corresponding gestures for invoking the commands, including a gesture for activating the exploration mode, in accordance with some embodiments. Commands can be mapped to different gestures specified in Table 2, or other gestures that are not specified in Table 2. Further, the commands in Table 2 are non-exhaustive examples, and there are other commands that are available, in accordance with some embodiments.

TABLE 2

| Command | Command description | Gesture | Gesture description |
|---|---|---|---|
| Activate | Activate a primary option associated with a user interface element that is in focus | Left Index Pinch | A single-finger air pinch between an index finger and a thumb finger on the left hand |
| | | Right Ring Pinch | A single-finger air pinch between a ring finger and a thumb finger on the right hand |
| Move to Next Element | Move focus selector forward to a next user interface element (e.g., in a sequence of user interface elements) | Right Index Pinch | A single-finger air pinch between an index finger and a thumb finger on the right hand |
| Move to Previous Element | Move focus selector backward to a previous user interface element (e.g., in a sequence of user interface elements) | Right Middle Pinch | A single-finger air pinch between a middle finger and a thumb finger on the right hand |
| Explore | Activate explore mode | Right Index Long Pinch *Starts the gesture, release to end exploring | A single-finger air pinch between an index finger and a thumb finger on the right hand, where the pinch is maintained for more than a threshold time |
| Escape | Escape | Right Middle Long Pinch | A single-finger air pinch between a middle finger and a thumb finger on the right hand, where the pinch is maintained for more than a threshold time |
| Toggle Speech | Enable/Disable speech of a screen-reader application (e.g., toggle speech) | Left Middle Pinch | A single-finger air pinch between a middle finger and a thumb finger on the left hand |
| Next Rotor Item | Move focus selector forward to a next element of a selected type of user interface elements (e.g., next item for a selected rotor option) | Left Index Modifier Right Index Pinch | A secondary air pinch that includes maintaining air pinch between an index finger and a thumb finger on the left hand when an air pinch between an index finger and a thumb finger is performed on the right hand (e.g., performed one or more times) |
| Previous Rotor Item | Move focus selector backward to a previous element of a selected type of user interface elements (e.g., previous item for a selected rotor option) | Left Index Modifier Right Middle Pinch | A secondary air pinch that includes maintaining air pinch between an index finger and a thumb finger on the left hand when an air pinch between a middle finger and a thumb finger is performed on the right hand (e.g., performed one or more times) |

TABLE 2-continued

| Command | Command description | Gesture | Gesture description |
|---|---|---|---|
| Next Rotor | Move focus selector forward to a next type of user interface element that can be navigated (e.g., next rotor option) | Left Middle Modifier Right Index Pinch | A secondary air pinch that includes maintaining an air pinch between a middle finger and a thumb finger on the left hand when an air pinch between an index finger and a thumb finger is performed on the right hand (e.g., performed one or more times) |
| Previous Rotor | Move focus selector backward to a previous type of user interface element that can be navigated (e.g., previous rotor option) | Left Middle Modifier Right Middle Pinch | A secondary air pinch that includes maintaining air pinch between a middle finger and a thumb finger on the left hand when an air pinch between a middle finger and a thumb finger is performed on the right hand (e.g., performed one or more times) |
| Switch to Next App | Switch focus to a next application (e.g., in a sequence of open applications) | Left Ring Modifier Right Index Pinch | A secondary air pinch that includes maintaining an air pinch between a ring finger and a thumb finger on the left hand when an air pinch between an index finger and a thumb finger is performed on the right hand (e.g., performed one or more times) |
| Switch to Previous App | Switch focus to a previous application (e.g., in a | Left Ring Modifier Right Middle Pinch | A secondary air pinch that includes maintaining an air pinch between a ring finger and a thumb finger on the left hand when an air pinch between a middle finger and a thumb finger is performed on the right hand (e.g., performed one or more times) |
| Summarize Element | Provide summary description of a respective user interface element | Left Ring Pinch | A single-finger air pinch between a ring finger and a thumb finger on the left hand |
| Scroll Down | Scroll Down | Right Index Pinch Swipe Down | A pinch-slide gesture, where a pinch is performed between an index and a thumb finger of the right hand followed by movement of the right hand downwards while maintaining the pinch |
| Scroll Up | Scroll Up | Right Index Pinch Swipe Up | A pinch-slide gesture, where a pinch is performed between an index and a thumb finger of the right hand followed by movement of the right hand upwards while maintaining the pinch |
| Scroll Left | Scroll Left | Right Index Pinch Swipe Left | A pinch-slide gesture, where a pinch is performed between an index and a thumb finger of the right hand followed by movement of the right hand leftward while maintaining the pinch |
| Scroll Right | Scroll Right | Right Index Pinch Swipe Right | A pinch-slide gesture, where a pinch is performed between an index and a thumb finger of the right hand followed by movement of the right hand rightward while maintaining the pinch |

TABLE 2-continued

| Command | Command description | Gesture | Gesture description |
|---|---|---|---|
| Read All | Read All (e.g., read a page from a cursor to bottom) | Right Middle Pinch Swipe Down | A pinch-slide gesture, where a pinch is performed between a middle and a thumb finger of the right hand followed by movement of the right hand down while maintaining the pinch |
| Read from Top | Read All (e.g., read a page from top to bottom) | Right Middle Pinch Swipe Up | A pinch-slide gesture, where a pinch is performed between a middle and a thumb finger of the right hand followed by movement of the right hand upwards while maintaining the pinch |
| Show Read Aloud Quick Settings | Show a user interface with setting for configuring the "read aloud" mode | Left Index Modifier Right Ring Pinch | A secondary air pinch that includes maintaining an air pinch between an index finger and a thumb finger on the left hand when an air pinch between a ring finger and a thumb finger is performed on the right hand (e.g., performed one or more times) |
| Show Item Chooser | Show a menu with options of types of user interface elements that, if selected, can be quickly navigated to using other commands that navigate through elements (e.g., move to next element or move to previous element) | Left Middle Modifier Right Ring Pinch | A secondary air pinch that includes maintaining an air pinch between a middle finger and a thumb finger on the left hand when an air pinch between a ring finger and a thumb finger is performed on the right hand (e.g., performed one or more times) |
| Label Element | Add a label to a user interface element | Left Ring Modifier Right Ring Pinch | A secondary air pinch that includes maintaining an air pinch between a ring finger and a thumb finger on the left hand when an air pinch between a ring finger and a thumb finger is performed on the right hand (e.g., performed one or more times) |
| Secondary Activate | Activate a secondary option associated with a user interface element that is in focus | Left Index Quadruple Pinch | A single-finger air pinch between an index finger and a thumb finger on the left hand that is performed four times in a quick succession |
| | | Right Ring Quadruple Pinch | A single-finger air pinch between a ring finger and a thumb finger on the right hand that is performed four times in a quick succession |
| Perform Long Press | Perform Long Press | Left Index Double Pinch | A single-finger air pinch between an index finger and a thumb finger on the left hand that is performed twice in a quick succession |
| | | Right Ring Double Pinch | A single-finger air pinch between a ring finger and a thumb finger on the right hand that is performed twice in a quick succession |
| Begin Passthrough Gesture | Activate the "scene description" mode | Left Index Double Long Pinch | A single-finger air pinch between an index finger and a thumb finger on the left hand that is maintained for more than a threshold time |

TABLE 2-continued

| Command | Command description | Gesture | Gesture description |
|---|---|---|---|
| | | Right Ring Double Long Pinch | A single-finger air pinch between a ring finger and a thumb finger on the right hand that is maintained for more than a threshold time |
| Begin Direct Gesture Mode | Activate an interaction mode in which direct air gestures are used (e.g., as opposed to indirect) | Left Index Triple Long Pinch | A single-finger air pinch between an index finger and a thumb finger on the left hand that when performed is maintained for a threshold amount of time and is also performed three times in a quick succession (e.g., each time maintaining the pinch for more than the threshold time) |
| | | Right Ring Triple Long Pinch | A single-finger air pinch between a ring finger and a thumb finger on the right hand that when performed is maintained for a threshold amount of time and is also performed three times in a quick succession (e.g., each time maintaining the pinch for more than the threshold time) |
| Copy Speech to Clipboard | Copy Speech to Clipboard | Left Middle Double Pinch | A single-finger air pinch between a middle finger and a thumb finger on the left hand performed twice in a quick succession |
| Magic Tap | Perform a special action that depends on the application that is being used (e.g., in a phone application, the magic tap answers and ends phone calls) | Left Index Triple Pinch | A single-finger air pinch between an index finger and a thumb finger on the left hand performed three times in a quick succession |
| | | Right Ring Triple Pinch | A single-finger air pinch between a ring finger and a thumb finger on the right hand performed three times in a quick succession |

In some embodiments, the three-dimensional environment that includes the one or more first objects and the one or more second objects is a virtual reality environment or an augmented reality environment. In some embodiments, a view of the three-dimensional environment is visible via a display generation component that is in communication with the computer system, where the view of the three-dimensional environment changes in accordance with movement of a viewpoint of a user. For example, the portion of three-dimensional environment 7000' that is included in (e.g., visible in) the viewport of display generation component 7100 in FIGS. 21B-21J changes as display generation component 7100 is moved in the physical environment 7000. Automatically outputting verbal descriptions of virtual content selected based on a location toward which the respective portion of the user's body is directed assists the user with exploring a mixed-reality three-dimensional environment without the need for additional user inputs and navigation of complex user interfaces (e.g., with multiple user interface elements across multiple hierarchy levels), thereby reducing the number, complexity, and extent of user inputs.

In some embodiments, detecting the input that includes the respective gesture includes detecting performance of the respective gesture by a hand of the user, for example, an air pinch performed with left hand 7020 in FIGS. 21B-21D. In some embodiments, the respective gesture includes a change in configuration of a body part of the user, such as a hand of the user. In some embodiments, detecting (e.g., continuous) performance of the respective gesture by the hand of the user is used as a condition to determine whether to maintain the exploration mode as active. For example, in FIGS. 21B-21D, state "E" near left hand 7020 denotes that the gesture for activating the exploration mode continues to be detected. Using continuous performance of the respective gesture to maintain the exploration mode active disambiguates between using the changing pose of the respective portion of the user's body as an indication of what content to verbally describe and performing a different operation or ignoring the changing pose of the respective portion of the user's body. The disambiguation of user's intent reduces accidental or unintended inputs and reduces the number of inputs and the amount of time needed to explore virtual content in a mixed-reality three-dimensional environment.

In some embodiments, the respective portion of the user's body is a head of the user (e.g., user 7002's head in FIGS. 21B-21J). In some embodiments, the pose of the user's head is determined by elevation of the user's head, orientation of the user's head, and/or what direction is the user's face is facing. For example, objects toward which user 7002's head is directed to in FIGS. 21B-21E and FIGS. 21G-21H are verbally described by the computer system 101 (e.g., whereas objects toward which user 7002's head is not directed to are not verbally described). Automatically outputting verbal descriptions of virtual content selected based on a location toward which a user's head is directed assists the user with exploring a mixed-reality three-dimensional environment without the need for additional user inputs and navigation of complex user interfaces (e.g., with multiple user interface elements across multiple hierarchy levels), thereby reducing the number of user inputs and/or the amount of time needed to explore virtual content in a mixed-reality three-dimensional environment.

In some embodiments, the respective portion of the user's body includes an eye of the user (e.g., the respective portion of the user's body is one or both eyes of the user). In some embodiments, the pose of the user's eyes includes the position and/or movement of the user's gaze (or more broadly, the user's face, or head) with respect to the three-dimensional environment (e.g., with respect to the physical and/or mixed-reality environment). For example, objects toward which user 7002's gaze is directed in FIGS. 21G-21H are verbally described by the computer system 101 (e.g., whereas objects toward which user 7002's gaze is not directed to are not verbally described). Automatically outputting verbal descriptions of virtual content selected based on a location toward which a user's eyes are directed assists the user with exploring a mixed-reality three-dimensional environment without the need for additional user inputs and navigation of complex user interfaces (e.g., with multiple user interface elements across multiple hierarchy levels), thereby reducing the number of user inputs and/or the amount of time needed to explore virtual content in a mixed-reality three-dimensional environment.

In some embodiments, the respective portion of the user's body is a wrist of the user. In some embodiments, the pose of the user's wrist is determined by the position of the user's wrist, orientation, and/or the configuration of the user's wrist (e.g., which way the user's wrist is facing and/or how the user's wrist is bent). For example, objects toward which user 7002's left hand or right hand wrist is directed to in FIGS. 21G-21H are verbally described by the computer system 101 (e.g., whereas objects toward which user 7002's left hand or right hand wrist is not directed to are not verbally described). Automatically outputting verbal descriptions of virtual content selected based on a location toward which a user's wrist is directed assists the user with exploring a mixed-reality three-dimensional environment without the need for additional user inputs and navigation of complex user interfaces (e.g., with multiple user interface elements across multiple hierarchy levels), thereby reducing the number of user inputs and/or the amount of time needed to explore virtual content in a mixed-reality three-dimensional environment.

In some embodiments, the respective portion of the user's body is a finger of the user. In some embodiments, the pose of the user's finger is determined by the position of the user's finger, orientation, and/or the configuration of the user's finger (e.g., which way the user's finger is pointing to or directed toward and/or how the user's finger is bent, if at all). For example, objects toward which a respective finger (e.g., on left hand 7020 or right hand 7022) of user 7002 is directed to in FIGS. 21G-21H are verbally described by the computer system 101 (e.g., whereas objects toward which the respective finger of user 7002 are not verbally described). Automatically outputting verbal descriptions of virtual content selected based on a location toward which a user's finger is directed assists the user with exploring a mixed-reality three-dimensional environment without the need for additional user inputs and navigation of complex user interfaces (e.g., with multiple user interface elements across multiple hierarchy levels), thereby reducing the number of user inputs and/or the amount of time needed to explore virtual content in a mixed-reality three-dimensional environment.

In some embodiments, the respective portion of the user's body is selected as a focus indicator from one or more options in a settings user interface, and the one or more options correspond to one or more portions of the user's body. In some embodiments, the respective portion of the user's body is selected as focus indicator in a settings user interface whereas one or more other portions of the user's body, including a second portion of the user's body, are not selected as the focus indicator. In some embodiments, in conjunction with detecting movement of the respective portion of the user's body, movement of a second portion of the user's body is detected, and in response to detecting that the second portion of the user's body is directed toward the one or more second objects while the respective portion of the user's body has the first pose that is directed toward the one or more first objects, the computer system forgoes outputting non-visual information (e.g., audio and/or tactile output) that describes the one or more second objects. For example, if user 7002's head is selected in settings as a focus indicator for the purposes of indicating which objects are to be verbally described during the exploration mode in FIGS. 22B-22E and FIGS. 21G-21H, movements with hand 7022 that indicate objects in view 7000' are ignored for the purposes of providing a verbal description. Enabling the user to configure what portion of the user's body is used in the exploration mode as a focus indicator (e.g., used to indicate what virtual content is verbally described by the computer system) provide users with control over the way the users are interacting with the mixed-reality three-dimensional environment and enable the users to tailor the interaction to the users' particular needs. These and other benefits are particularly beneficial to users with reduced mobility, vision, and/or other special needs, making user interaction with in a mixed-reality three-dimensional environment more accessible to a wider population.

In some embodiments, in response to detecting the movement of the respective portion of the user's body to the second pose corresponding to the one or more second objects, in accordance with a determination that the input that includes the respective gesture has ceased to be detected (e.g., the input that includes the respective gesture has ended or the input no longer includes the respective gesture), the computer system forgoes outputting the non-visual information (or, optionally, any non-visual information) that describes the one or more second objects. For example, even though user 7002's head is directed towards user interface 21030 in FIG. 21I and towards element E6 21052 in FIG. 21J, the computer system forgoes providing verbal descriptions of those objects because the respective gesture for invoking the exploration mode is not detected when user 7002's head is directed towards user interface 21030 or element E6 21052. In some embodiments, detecting (e.g., continuous) performance of the respective gesture is used as a condition to determine whether to maintain the exploration mode, and when the computer system no longer detects the respective gesture, the computer ceases to use the respective pose of the respective portion of the user's body (e.g., as the respective portion of the user's body is moving, changing orientation, and/or direction) as an indication of what content to verbally describe. Using continuous performance of the respective gesture as a condition for maintaining the exploration mode allows a user to quickly activate and deactivate the exploration mode, thereby reducing the amount of time and/or the number of inputs needed to navigate and interact with virtual content in the mixed-reality three-dimensional environment.

In some embodiments, the computer system detects, via the one or more input devices, a first selection input (e.g., a pinch gesture or a long pinch gesture optionally in conjunction with another input that determines what object in the three-dimensional environment has input focus, such as a gaze input, navigation input, pointing of a portion of user's body in a direction toward the target object, pointing of a virtual ray extending from a portion of user's body (e.g., a same portion as the respective portion or a different portion), or extending from a separate input device, toward the target object (e.g., described in further detail with reference to FIGS. 8A-8L and method 1200) directed to a respective object (e.g., of the one or more first objects or the one or more second objects)). In some embodiments, in response to detecting the first selection input, in accordance with a determination that the respective gesture is no longer detected, the computer system performs an operation with respect to the respective object (e.g., the respective object is selected, is put into focus, becomes the currently active object, or otherwise receives input focus for subsequent interaction, or other operation is performed that is associated with the respective object). In some embodiments, the operation performed with respect to the respective object is an operation other than outputting non-visual information that describes the respective object. In some embodiments, prior to detecting the first selection input, the computer system optionally detects an end of the respective gesture (e.g., release of a pinch gesture, release of a long pinch gesture, and/or change in a respective configuration of one or more hands of the user, such that characteristics of the respective gesture no longer meet respective conditions for activating and maintaining the exploration mode as active). For example, in FIGS. 21E, in response to the detection of a selection gesture (e.g., as denoted by state "S" near hand 7020 in FIG. 21E) while element "E5" 21020 has input focus, the computer system 101 selects element "E5" 21020 and provides visual indication of the selection of element "E5" 21020. Deactivating the exploration mode by ceasing to perform the respective gesture enables the user to quickly switch between exploring the virtual content in the mixed reality three-dimensional environment (e.g., using the respective portion of the user's body to indicate what content is to be verbally described) and interacting with, selecting and/or activating functions of the virtual content (e.g., performing an operation with respect to the virtual content that is different from outputting a verbal description of the virtual content), thereby making the user-device interaction more efficient.

In some embodiments, the first selection input includes an air pinch gesture followed by a release of the air pinch gesture before a threshold amount of time has passed (e.g., as opposed to a long air pinch gesture where the air pinch is maintained or held for at least the threshold amount of time). For example, the selection gesture in FIG. 21E that is denoted by state "S" near hand 7020 includes an air pinch gesture. Deactivating the exploration mode by ceasing to perform the respective gesture enables the user to quickly switch between exploring the virtual content in the mixed reality three-dimensional environment (e.g., using the respective portion of the user's body to indicate what content is to be verbally described) and selecting and/or interacting with the virtual content (e.g., performing an operation with respect to the virtual content that is different from outputting verbal description of the virtual content) via air pinch gestures, thereby making the user-device interaction more efficient.

In some embodiments, the respective gesture is an air pinch gesture that is being maintained (e.g., an air pinch and hold gesture, such as index and thumb finger of a hand making contact with one another without a break in contact while the hand remains stationary (e.g., by not moving more than a threshold amount during the threshold amount of time)). In some embodiments, detecting the end of the respective gesture includes ceasing to maintain the pinch gesture. For example, in FIGS. 21B-21D and FIGS. 21G-21H, state "E" near hand 7020 indicates that the air pinch gesture that activates the exploration mode continues to be maintained. Using an air pinch and hold gesture to enable the exploration mode and a release of the pinch to deactivate the exploration mode allows a user to quickly switch from exploring to interacting with the virtual content in the mixed reality three-dimensional environment.

In some embodiments, the one or more first objects have one or more respective positions in the three-dimensional environment that are more than a threshold distance away from a viewpoint of a user, and the threshold distance is determined based on the reach of one or more hands of the user. In some embodiments, the one or more first objects are not close enough to the user or the viewpoint of the user to be directly manipulated (e.g., the one or more first objects are out of reach of direct interaction by the user), where the user's hand and arm when extended cannot reach a position in the three-dimensional environment that corresponds to a position of a respective object of the one or more first objects in the three-dimensional environment. For example, user interface 21050 and/or user interface 21030 are out of reach of user 7002 in FIGS. 21B-21J. Enabling a user to explore virtual content (e.g., by obtaining verbal description of target virtual content) that is out of reach (e.g., far away from the user) by directing a respective portion of the user's body toward the virtual content, reduces the number of inputs and the amount of time needed to explore virtual content in a mixed-reality three-dimensional environment. These and other benefits are particularly beneficial to users with reduced mobility, vision, and/or other special needs, making user interaction with in a mixed-reality three-dimensional environment more accessible to a wider population.

In some embodiments, the one or more second objects have one or more respective positions in the three-dimensional environment that are more than a threshold distance away from a viewpoint of a user, and the threshold distance is determined based on reach of hands of the user. In some embodiments, the one or more second objects are not close enough to the user or the viewpoint of the user to be directly manipulated (e.g., the one or more second objects are out of reach of direct interaction by the user), where the user's hand and arm when extended cannot reach a position the three-dimensional environment that corresponds to a position of a respective object of the one or more second objects in the three-dimensional environment. In some embodiments, the one or more first objects and the one or more second objects are out of reach of direct interaction by the user. For example, user interface 21050 and/or user interface 21030 are out of reach of user 7002 in FIGS. 21B-21J. Enabling a user to explore virtual content (e.g., by obtaining verbal description of target virtual content) that is out of reach (e.g., far away from the user) by directing a respective portion of the user's body toward the virtual content, reduces the number of inputs and the amount of time needed to explore virtual content in a mixed-reality three-dimensional environment. These and other benefits are particularly beneficial to users with reduced mobility, vision, and/or other special needs, making user interaction with in a mixed-reality three-dimensional environment more accessible to a wider population.

In some embodiments, the respective gesture is performed with the respective portion of the user's body. In some embodiments, the respective gesture (e.g., the gesture that is used to activate the exploration mode) is performed with one hand, and the same hand is used to point to or indicate which object of the one or more first objects or the one or more second objects is to be described by non-visual information. For example, the pinch and hold gesture that activates the exploration mode in FIGS. 21B-21D and FIGS. 21G-21H is performed with hand 7020, and the same hand 7020 can be used to point in a direction of a target element in application user interface 21010 and/or application user interface 21030 to instruct the computer system to provide verbal description for the target element. Using the same portion of the user's body (e.g., same hand) for activating the exploration mode and for pointing to or indicating which virtual object is to be verbally described, frees other portions of the user's body to interact with the mixed-reality three-dimensional environment and/or makes the mixed-reality three-dimensional environment more accessible to a wider population (e.g., beneficial to users with reduced mobility, vision, and/or other special needs).

In some embodiments, the respective gesture is performed with a portion of the user's body that is different from the respective portion of the user's body. In some embodiments, the respective gesture (e.g., the gesture that is used to activate the exploration mode) is performed with one hand and a different body part or portion of the user's body (e.g., head, wrist of another hand different from the one performing the respective gesture, eyes, or other portion of the user's body that can be used to indicate objects in the three-dimensional) is used to point to or indicate which object of the one or more first objects or the one or more second objects is to be described by non-visual information. For example, the pinch and hold gesture that activates the exploration mode in FIGS. 21B-21D and FIGS. 21G-21H is performed with hand 7020, and user 7002's head is used to point in a direction of a target element in application user interface 21010 and/or application user interface 21030 to instruct the computer system to provide a verbal description for the target element. Using one portion of the user's body (e.g., a first hand) for activating (and optionally maintaining active) the exploration mode and another portion of the user's body (e.g., the opposite hand of the user) for indicating which virtual object is to be verbally described reduces the number of inputs and the amount of time needed to explore virtual content in a mixed-reality three-dimensional environment. These and other benefits are particularly beneficial to users with reduced vision, and/or other special needs, making user interaction with in a mixed-reality three-dimensional environment more accessible to a wider population.

In some embodiments, the computer system detects a second gesture performed with a second portion of the user's body (e.g., the respective gesture that is used to activate the explore mode is performed with one hand of the user and the second gesture is performed with the opposite hand of the user), wherein the second gesture is performed directly on a first object of the one or more first objects. For example, the pinch and hold gesture that activates the exploration mode in FIGS. 21B-21D and FIGS. 21G-21H is performed with hand 7020, and the opposite hand 7022 can be used to air tap directly on a target element in application user interface 21010 and/or application user interface 21030 to instruct the computer system to provide verbal description for the target element. In some embodiments, in response to detecting the second gesture (e.g., performed with the second portion of the user's body), the computer system outputs non-visual information (e.g., audio and/or tactile output) that describes the first object irrespective of whether the respective gesture continues to be detected. In some embodiments, performing the second gesture directly on the first object includes extending hands and/or fingers in the physical environment to a location that corresponds to the respective location of the first object in the three-dimensional environment (and optionally performing a tap input or other direct input). In some embodiments, the second gesture is enabled for exploring virtual content (e.g., generating verbal descriptions of virtual content selected in response to the second gesture) while the exploration mode is active. In some embodiments, the second gesture is enabled for exploring virtual content (e.g., generating verbal descriptions of virtual content selected in response to the second gesture) even if the exploration mode is inactive. In some embodiments, an indirect air gesture is used to maintain the exploration mode as active (e.g., an air pinch and hold) and a direct air gesture (e.g., an air tap or an air touch performed directly on a target object) directed to a target element is used to instruct the computer system to provide a verbal description of the target element. Using a direct air gesture (e.g., an air tap, an air touch, and/or air touch and hold) performed on a target virtual object to instruct the computer system to generate a verbal description of the target virtual object irrespective of whether the exploration mode is active, reduces the number of inputs and the amount of time needed to explore virtual content in a mixed-reality three-dimensional environment.

In some embodiments, respective gestures are evaluated to determine if they meets first gesture criteria or second gesture criteria. In some embodiments, the computer system detects a third gesture (e.g., a single-finger pinch, a multi-finger pinch, and/or a secondary pinch), and in response to detecting the third gesture: in accordance with a determination that the third gesture meets the first gesture criteria (e.g., gesture criteria, such as configuration of one or more hands, for activating the exploration mode and/or maintaining the exploration mode) and that, while the third gesture continues to be detected, the respective portion of the user's body has a pose that is directed toward a first respective object (e.g., of the one or more first objects or the one or more second objects), the computer system outputs non-visual information (e.g., audio and/or tactile output) that describes the first respective object. In some embodiments, the computer system displays, in the three-dimensional environment, a focus indicator at a location of the respective object (e.g., a cursor, selection outline, highlight, or other indication that the respective object has input focus for subsequent interaction). In some embodiments, in response to detecting the third gesture: in accordance with a determination that the third gesture meets second gesture criteria (e.g., configuration of one or more hands), different from the first gesture criteria, the computer system moves a focus indicator to a second respective object (e.g., included in the one or more first objects, included in the one or more second objects, or included in one or more third objects different from the one or more first objects and the one or more second objects), and outputs non-visual information (e.g., audio and/or tactile output) that describes or otherwise corresponds to the second respective object. For example, a gesture that meets the second gesture criteria is used to activate a "read aloud" mode and a different gesture that meets the first gesture criteria is used to activate the "explore" mode in FIGS. 21A-21J.

In some embodiments, different gestures are used to activate different accessibility modes that pertain to visual impairments. For example, a gesture that meets the second gesture criteria is used to active a "read aloud" mode, and a gesture that meets the first gesture criteria is used to activate the "exploration" mode. For example, gestures that meet second gesture criteria include: "a right index pinch" (e.g., a "single-finger" air pinch between an index finger and a thumb finger on the right hand) that is used to move the focus indicator forward and describe verbally a next user interface element in a sequence of user interface elements, and a "right middle pinch" (e.g., a "single-finger" air pinch between a middle finger and a thumb finger on the right hand) that is used to move the focus indicator backward and describe verbally a previous user interface element in the sequence of user interface elements. For example, gestures that meet the first gesture criteria include: a "right index long pinch" (e.g., a "single-finger" long air pinch performed with the index and thumb finger of the right hand) or a "left index long pinch" (e.g., a "single-finger" long air pinch performed with the index and thumb finger of the left hand), where the "right index long pinch" or "left index long pinch" activates the exploration mode and a release of the "right index long pinch" or "left index long pinch," deactivates or ends the exploration mode. These and other gestures and corresponding mappings of gestures to commands are described in Table 1 and Table 2. In some embodiments, moving the focus indicator to the second respective object in response to a gesture meeting the second gesture criteria is performed irrespective of the pose of the respective portion of the user's body (e.g., location of the focus indicator is not selected based on the pose of the respective portion of the user's body, such that even if the respective portion of the user's body is directed toward an object that is different from the second respective object, the computer system outputs non-visual information about the second respective object). In some embodiments, using the second gesture that meets the second gesture criteria to instruct the computer system to generate a verbal description of, or corresponding to, the second respective object is performed in accordance with navigation techniques of the "read aloud" accessibility mode (e.g., described in further detail with respect to FIGS. 9A-9H and 10A-10F and methods 1300 and 1400 of FIGS. 13-14, respectively). Using one type of gesture to active the "exploration" mode and another type of gesture to activate the "read aloud" mode, where both modes enable different input mechanisms to provide verbal descriptions of the virtual content in the mixed reality environment, allows a user to quickly switch between scanning the environment's virtual content and navigating complex user interfaces, thereby making user interaction with a mixed-reality three-dimensional environment more efficient (e.g., by reducing the number of needed inputs to explore and navigate virtual content) and more accessible to a wider population (e.g., by providing verbally contextual information), such as users with reduced vision or other visual impairments.

In some embodiments, aspects/operations of methods 1100, 1200, 1300, 1400, 1800, 1900, 2000, and 2400 may be interchanged, substituted, and/or added between these methods. For example, the method for providing non-visual information (e.g., audio description) about virtual content in a mixed-reality three-dimensional environment as described in method 2300 is optionally used to describe virtual content for methods 1100, 1200, 1300, 1400, 1800, 1900, 2000, and/or 2400. For brevity, these details are not repeated here.

FIG. 24 is a flow diagram of a method for providing non-visual information (e.g., audio description) about a view of a physical environment part of a mixed-reality three-dimensional environment, in accordance with various embodiments. Method 2400 is performed at a computer system (e.g., computer system 101 in FIG. 1A) that is in communication with a display generation component (e.g., a heads-up display, a head-mounted display (HMD), a display, such as display generation component in FIGS. 1A, 3, and 4, a touchscreen, a projector, a tablet, a smartphone, and other displays) and one or more input devices (e.g., one or more optical sensors, eye-tracking devices, and/or one or more physical buttons). In some embodiments, the method 2400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 2400 are, optionally, combined and/or the order of some operations is, optionally, changed.

As described herein, method 2400 provides verbal descriptions of a physical scene (e.g., a portion of a physical environment) included a mixed-reality three-dimensional environment. The techniques used in method 2400 relate to an accessibility mode for people with visual impairments referred to as a "scene description" mode. In method 2400, in response to detecting a respective gesture for activating the "scene description" mode, the computer system generates and/or outputs verbal description of a portion of a physical environment, optionally irrespective of whether virtual content occludes the portion of physical environment. In some embodiments, performing the respective gesture for activating the "scene description" mode more than once causes the computer system to generate different verbal descriptions of the physical scene based on various factors, such as changes that occurred in the physical environment, changes in what is visible in a field of view of one or more cameras of the computer system, pre-selected settings (e.g., settings with respect to degree of verbosity) and other factors. In some embodiments, one gesture is used (e.g., by a user of the computer system) to obtain a verbal description of the physical environment and a different gesture is used to explore the virtual content in the mixed-reality three-dimensional environment that includes the physical environment (e.g., by obtaining a verbal description of the virtual content). Outputting a verbal description of a portion of a physical environment included in a mixed-reality three-dimensional environment in response to detecting a respective gesture assists the user with exploring a state of the physical environment while also allowing the user to interact with virtual content in the mixed-reality three-dimensional environment, thereby making user interaction with a mixed-reality three-dimensional environment more accessible to a wider population (e.g., by providing verbally contextual information), including to users with reduced vision or other visual impairments. For example, the verbal description of the physical environment can help users navigate the physical environment, avoid collisions, and otherwise orient themselves in the physical world without the need to cease interaction with the virtual world that is part of the mixed-reality environment.

While a three-dimensional environment is available for viewing (e.g., the three-dimensional environment has been generated by the computer system), wherein the three-dimensional environment includes one or more virtual objects and a view of a physical environment (e.g., an optical view or computer-generated representation or image of the physical environment) that includes one or more physical objects, the computer system detects (2402) a gesture (e.g., direct or indirect air gesture) via the one or more input devices. Optionally, while the three-dimensional environment is available for viewing, the display generation component is turned off (e.g., to save power), and thus the three-dimensional environment is available for viewing but not visible via the display generation component. Optionally, the display generation component is powered on and the three-dimensional environment is visible via the display generation, optionally in conjunction with an input that indicates what object in the three-dimensional environment has input focus.

In response to detecting the gesture (2404): in accordance with a determination that the gesture meets first gesture criteria (e.g., the gesture is a first type of gesture, including a configuration of user's hand (e.g., a single finger pinch, multiple finger pinch, a secondary pinch, or other configuration of the hand as a whole, such as a direction that a palm of the hand is facing, and/or elevation of one or more hands of the user), a duration criterion, movement criterion, and/or other gesture criteria)), the computer system outputs (2406) (e.g., via one or more output devices in communication with the display generation component) an audio description of the view of the physical environment that includes information about the one or more physical objects (e.g., the audio description includes an overall description of the view of the physical environment, e.g., as opposed to individual audio descriptions of objects of the one or more physical objects). In some embodiments, the audio description of the physical environment is based on one or more characteristics of the view of the physical environment. In some embodiments, the gesture meets criteria for activating an accessibility mode (e.g., a "scene description" mode) that, when enabled, provides a verbal or audible description of the physical environment included in a viewport. In some embodiments, the gesture is different from specifying, moving, or changing a field of view of the three-dimensional environment (e.g., different from changing position and/or orientation of the one or more cameras that capture images of the physical environment).

In response to detecting the gesture (2404): in accordance with a determination that the gesture does not meet the first gesture criteria (e.g., the gesture is a second type of gesture that is different from the first type of gesture), the computer system forgoes (2408) outputting an audio description of the view of the physical environment. For example, in FIGS. 22A-22F, the computer system 101 generates and/or outputs a verbal description of a portion of a physical environment 7000 in response detecting a respective gesture for activating the "scene description" mode (e.g., performed with hand 7020 of user 7002 in the scenario of FIGS. 22A-22F), and the computer system 101 forgoes generating the verbal description of the portion of the physical environment 7000 if the detected gesture does not meet gesture criteria for activating the "scene description" mode.

In some embodiments, the display generation component includes a see-through or pass-through display, and the virtual objects are displayed superimposed on the physical environment that is visible through the see-through or pass-through display. In some embodiments, a digital representation or image of the physical environment is displayed via the display generation component and the one or more virtual objects are displayed overlaid or superimposed on the digital representation or image of the physical environment. In some embodiments, one or more images of the physical environment, including the one or more physical objects, are obtained or captured in response to detecting the air gesture, and the audio description is based on the one or more images of the physical environment. In some embodiments, the audio description is generated by the computer system and is made available without being output (e.g., via one or more output devices in communication with the display generation component). In some embodiments, the respective gesture for activating the "scene description" mode is an air gesture. In some embodiments, a respective gesture that meets the first gesture criteria for activating the "scene description" mode is a "left index double long pinch" (e.g., two single-finger pinches detected in immediate succession, both of which are performed with the index and thumb finger of the left hand, and the second pinch is optionally a long pinch). In some embodiments, a respective gesture that meets the first gesture criteria for activating the "scene description" mode is a "right ring double long pinch" (e.g., two single-finger pinches detected in immediate succession, both of which are performed with the ring and thumb finger of the right hand, and the second pinch is optionally a long pinch).

In some embodiments, in response to detecting the gesture (2404): in accordance with a determination that the gesture meets second gesture criteria (e.g., the gesture is a second type of gesture, including a configuration of user's hand (e.g., a single finger pinch, multiple finger pinch, a secondary pinch, or other configuration of the hand as a whole, such as a direction that a palm of the hand is facing, and/or elevation of one or more hands), a duration criterion, movement criterion, and/or other gesture criteria optionally in conjunction with an input that indicates what object in the environment has input focus), distinct from the first gesture criteria, the computer system performs an operation that is distinct from outputting an audio description of the view of the physical environment (e.g., the operation performed is with respect to one or more virtual objects in the three-dimensional environment, with respect to the three-dimensional environment as whole, with respect to the computer system, such as performing a system-level operation, with respect with one or more applications available on the computer system, or an operation that includes outputting audio information about virtual objects in the three-dimensional environment (e.g., as described in more detail with respect to FIGS. 9A-9H, 10A-10F, 21A-21J, 13, 14, and 23, and methods 1300, 1400, and 2300), or other operation). For example, inputs with respect to application user interface 22010 in FIGS. 22B-22F that are different from the gesture used to activate the scene description mode are used to perform a different operation (e.g., an air pinch and drag gesture directed to application user interface 22010 is used to scroll content in application user interface 22010, and an air pinch and drag gesture directed to grabber affordance 22012 in FIG. 22B is used to move application user interface 22010 in view 7000'). Using one type of gesture to instruct the computer system to provide a verbal description of a portion of the physical environment and other types of gestures to interact with the mixed-reality virtual environment allows a user to quickly switch from exploring a current state of the physical environment to interacting with virtual objects in the mixed reality three-dimensional environment, thereby making user interaction with the mixed-reality three-dimensional environment more accessible to a wider population (e.g., by providing verbally contextual information), such as users with reduced vision or other visual impairments. For example, the verbal description of the physical environment can help users navigate the physical environment, avoid collisions, and otherwise orient in the physical world without the need to cease interaction with the virtual world that is part of the mixed-reality environment.

In some embodiments, in response to detecting the gesture (2404): in accordance with a determination that the gesture meets third gesture criteria (e.g., criteria different from the first gesture criteria and/or the second gesture criteria, that the gesture is a third type of gesture, including a configuration of user's hand (e.g., a single finger pinch, multiple finger pinch, a secondary pinch, or other configuration of the hand as a whole, a direction that a palm of the hand is facing, and/or elevation of one or more hands of the user), a duration criterion, a movement criterion, and/or other gesture criteria optionally in conjunction with an input that indicates what object in the environment has input focus), the computer system outputs an audio description of the one or more virtual objects (optionally without outputting an audio description of the view of the physical environment). In some embodiments, outputting the audio description of the one or more virtual objects is performed in accordance with methods 1300, 1400, and 2300). In some embodiments, what virtual objects are selected for audio description is determined based on a location toward which a respective body part is directed (e.g., as described in further detail with respect to method 2300). In some embodiments, what virtual objects are selected for audio description is determined in accordance with a navigation input that causes the computer system to move a focus indicator from one virtual object to another (optionally across hierarchy levels of a respective user interface), as described in further detail with respect to method 1400. For example, in FIGS. 22A-22F, a first gesture is used to activate the "scene description" mode in which verbal description of a portion of physical environment 7000 is generated, and a different second gesture is used to active the "read aloud" mode in which verbal descriptions of user-selected or user-specified interface elements are generated. Using one type of gesture to instruct the computer system to provide a verbal description of a portion of the physical environment (e.g., by activating the "scene description" mode) and other type of gestures to instruct the computer system to provide a verbal description of virtual content in the mixed-reality three-dimensional environment (e.g., by activating the "exploration" mode and/or the "read aloud" mode) allows a user to quickly switch from exploring a current state of the physical environment to exploring virtual objects in the mixed reality three-dimensional environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, outputting an audio description of the view of the physical environment (e.g., that includes information about the one or more physical objects) includes outputting an audio description of a portion of the view of the physical environment irrespective of whether the portion of the view of the physical environment is occluded by a virtual object of the one or more virtual objects when viewed from a viewpoint of a user (e.g., whether a verbal description of the view of the physical environment is provided is independent of whether or not the portion of the physical environment is obscured by the virtual object or other virtual content). In some embodiments, outputting audio description of the view of the physical environment (e.g., that includes information about the one or more physical objects) includes outputting an audio description of a respective portion of the view of the physical environment that is not occluded by a virtual object of the one or more virtual objects when viewed from a viewpoint of a user. In some embodiments, outputting audio description of the view of the physical environment (e.g., that includes information about the one or more physical objects) includes outputting audio description of a portion of the view of the physical environment that is occluded by a virtual object of the one or more virtual objects when viewed from a viewpoint of a user. For example, in circumstances in which a verbal description of lamp 22004' is generated, the same verbal description of lamp 22004' is generated whether application user interface 22010 obscures lamp 22004' in view 7000' (e.g., as shown in FIG. 22B) or not. Outputting verbal description of a portion of a physical environment included in a mixed-reality three-dimensional environment in response to detecting a respective gesture irrespective of whether or not the portion of the physical environment is obscured by one or more virtual objects, assists the user with exploring a state of the physical environment while also allowing the user to interact with virtual content in the mixed-reality three-dimensional environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the three-dimensional environment is available for viewing via the display generation component in different degrees of immersion, and the audio description of the view of the physical environment (e.g., that includes information about the one or more physical objects) is output irrespective of (or without regard to) a selected degree of immersion. For example, the verbal description of the portion of physical environment 7000 that is generated in the scenario in FIG. 22B is the same as the verbal description of the same portion of physical environment 7000 that is generated in the scenario of FIG. 22F because only the level of immersion is different between FIG. 22B and FIG. 22F. Outputting a verbal description of a portion of a physical environment included in a mixed-reality three-dimensional environment in response to detecting a respective gesture, irrespective of (or without regard to) a degree of immersion of the user in the virtual content, assists the user with exploring a state of the physical environment while also allowing the user to interact with virtual content in the mixed-reality three-dimensional environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, in response to detecting the gesture: in accordance with a determination that the gesture meets the first gesture criteria and a first portion of the three-dimensional environment is included in a viewport of the three-dimensional environment (e.g., the first portion of the three-dimensional environment is included in the viewport of the three-dimensional environment when the gesture that meets the first gesture criteria is detected), outputting an audio description of the view of the physical environment includes outputting an audio description of the first portion of the physical environment that is included in the viewport of the three-dimensional environment (e.g., a current field of view that is available for viewing via the display generation component) at the time that the gesture is detected. In some embodiments, in response to detecting the gesture: in accordance with a determination that the gesture meets the first gesture criteria and a second portion of the three-dimensional environment is included in the viewport of the three-dimensional environment (e.g., the second portion of the three-dimensional environment is included in the viewport of the three-dimensional environment at the time that the gesture that meets the first gesture criteria is detected), outputting an audio description of the view of the physical environment includes outputting an audio description of the second portion of the physical environment that is included in the viewport of the three-dimensional environment (e.g., a current viewport) at the time that the gesture is detected, wherein the second portion of the physical environment is different from the first portion of the physical environment. In some embodiments, the audio description of the view of the physical environment that is output depends on a respective portion of three-dimensional environment that is included in a viewport of the three-dimensional environment (e.g., a current viewport) when (e.g., at the time that) the gesture is detected. For example, in the scenario of FIG. 22B, even though dog 22002 (shown in FIG. 22A) is present in physical environment 7000', a verbal description that is generated for view 7000' as shown in FIG. 22B does not include any reference to dog 22002, because dog 22002 is not in the portion of physical environment 7000 that is visible in view 7000' of the current viewport. Outputting verbal description of a portion of a physical environment that is included in a viewport of the three-dimensional environment while forgoing verbally describing portions of the physical environment that are not included the current viewport of the three-dimensional environment, provides contextually relevant information without overwhelming the user with verbal descriptions of contextually irrelevant portions of the physical environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, in response to detecting the gesture: in accordance with a determination that the gesture meets the first gesture criteria and a first subset of the one or more physical objects is included in a respective viewport of the three-dimensional environment (e.g., the first subset of the one or more physical objects is included in the viewport of the three-dimensional environment when (e.g., at the time that) the gesture that meets the first gesture criteria is detected), outputting an audio description of the view of the physical environment includes outputting an audio description of the first subset of the one or more physical objects, wherein (e.g., even though) one or more virtual objects in the three-dimensional environment occlude at least a portion of the first subset of the one or more physical objects. In some embodiments, in response to detecting the gesture: in accordance with a determination that the gesture meets the first gesture criteria and a second subset of the one or more physical objects is included in a respective viewport of the three-dimensional environment (e.g., the second subset of the one or more physical objects is included in the viewport of the three-dimensional environment when (e.g., at the time that) the gesture that meets the first gesture criteria is detected), outputting an audio description of the view of the physical environment includes outputting an audio description of the second subset of the one or more physical objects, wherein (e.g., even though) one or more virtual objects in the three-dimensional environment occlude at least a portion of the second subset of the one or more physical objects. In some embodiments, the audio description of the view of the physical environment that is output depends on what portion of the three-dimensional environment would be visible in the respective viewport of the three-dimensional environment (e.g., a current viewport), when (e.g., at the time that) the gesture is detected, if the one or more virtual objects were removed from the respective viewport of the three-dimensional environment. In particular, in circumstances in which a verbal description of view 7000' is generated, the same verbal description of view 7000' is generated whether application user interface 22010 is visible in view 7000' (e.g., as shown in FIG. 22B) or not. Outputting a verbal description of a portion of a physical environment included in a mixed-reality three-dimensional environment in response to detecting a respective gesture while ignoring virtual content included in the current viewport of the three-dimensional environment, assists the user with exploring a state of the physical environment while also allows the user to interact with virtual content in the mixed-reality three-dimensional environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, in response to detecting the gesture: in accordance with a determination that the gesture meets the first gesture criteria and the gesture is detected at a first time, outputting an audio description of the view of the physical environment includes outputting an audio description that is based on a first state of the physical environment at the first time; and, in accordance with a determination that the gesture meets the first gesture criteria and the gesture is detected at a second time, different from the first time, outputting an audio description of the view of the physical environment includes outputting an audio description that is based on a second state of the physical environment at the second time, wherein first state of the physical environment at the first time is different from the second state of the physical environment at the second time. For example, the audio description of the view of the physical environment is based on a state (e.g., image) of the physical environment when (e.g., at the time that) the gesture is detected. In some embodiments, the audio (e.g., verbal) description of the view of the physical environment is based on a snapshot of the physical environment (e.g., an image of a state of the physical environment at a particular time). For example, in the scenario in FIG. 22B, if the gesture for activating the "scene description" mode is detected while lamp 22004', cat 22006', and ball 22008' but not dog 22002' are in view 7000', a contemporaneous snapshot of view 7000' is used to generate the verbal description of the portion of physical environment 7000 in view 7000', including descriptions of lamp 22004', cat 22006', and ball 22008' but not dog 22002' (optionally, even if dog 22002' enters view 7000' while the verbal description is being output), whereas in the scenarios in FIGS. 22C-22E, the verbal description additionally includes a description of dog 22002' in accordance with the gesture for activating the "scene description" mode being detected while dog 22002' is already in view 7000'. Outputting a verbal description of a portion of a physical environment in response to detecting a respective gesture (e.g., for activating the "scene description" mode), where the verbal description is based on a state (e.g., an image) of the physical environment when (e.g., at the time that) the gesture is detected, allows the user to explore the physical environment at different times while continuing to interact with virtual content in the mixed-reality three-dimensional environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the gesture is an air gesture (e.g., a direct or indirect air gesture, e.g., as opposed to an input performed using a hardware device, a hardware button, and/or other physical controller or input mechanism) performed with one or more hands of a user. In some embodiments, the gesture is an input performed on a hardware (e.g., solid-state) button. In some embodiments, different functions are associated with the hardware button depending on what mode is active. For example, if a respective accessibility mode is active (e.g., one or more accessibility modes), a respective input detected on the hardware button provides an audio description of the physical and/or virtual portions of the three-dimensional environment. In some embodiments, if the computer system is in a normal mode (e.g., non-accessibility mode, where the respective accessibility mode and other accessibility modes that are available are not active), a respective input detected on the hardware button causes the computer system to perform a different function from providing an audio description of the three-dimensional environment. For example, an air gesture, such as "left index double pinch" or "right ring double pinch" (e.g., detected while an accessibility mode is active) is used to activate the "scene description" mode in FIGS. 22B-22F. Using an air gesture to instruct the computer system to output a verbal description of a portion of a physical environment included in a mixed-reality three-dimensional environment assists the user with exploring a state of the physical environment while also allowing the user to interact with virtual content in the mixed-reality three-dimensional environment, thereby making user interaction with the mixed-reality three-dimensional environment more efficient (e.g., by reducing the number of inputs to needed explore and navigate a mixed-reality environment) and more accessible to a wider population (e.g., by providing verbally contextual information), such as users with reduced vision or other visual impairments.

In some embodiments, the gesture is included in an input that is different from other inputs for performing one or more operations with respect to the one or more virtual objects (e.g., movement, selection and/or scrolling of the one or more virtual objects or content of the one or more virtual objects). For example, a respective gesture that is used to scroll content of application user interface 22010 is different from the gesture that is used to activate the scene description mode (e.g., in the scenario of FIGS. 22B-22F). Using one type of input to instruct the computer system to output a verbal description of a portion of a physical environment included in a mixed-reality three-dimensional environment while allowing the user to use other types of inputs to interact with virtual content in the mixed-reality three-dimensional environment, makes user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the audio description of the view of the physical environment (e.g., that includes information about the one or more physical objects) is output in response to detecting the gesture, wherein (e.g., in accordance with a determination that) the gesture meets first gesture criteria, and in accordance with a determination that a respective accessibility mode (e.g., an accessibility mode that provides verbal or audio descriptions of virtual elements in response to user inputs, such as navigation and/or selection inputs, as described in further detail with reference to method 13 and FIGS. 9A-9H) is active. In some embodiments, the computer system forgoes outputting the audio description of the view of the physical environment in response to detecting the gesture, wherein the gesture meets first gesture criteria, in accordance with a determination that the respective accessibility mode is inactive. In some embodiments, the gesture that meets criteria for activating the scene description mode is enabled when the "read aloud" mode is enabled, and the gesture that meets criteria for activating the scene description mode is not enabled when the "read aloud" mode is not enabled. For example, the respective gesture for activating the scene description mode is enabled (or recognized) when the "read aloud" or the "explore mode is currently being used. Allowing a user to obtain a verbal description of the physical environment using a respective air gesture even when a different accessibility mode is enabled (e.g., "read aloud" mode for obtaining verbal description of the virtual environment), allows a user to efficiently switch between scanning the environment's physical content and exploring the environment's virtual content, thereby making user interaction with a mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the gesture is included in a first input, and the audio description of the view of the physical environment that includes information about the one or more physical objects is a first audio description of the view of the physical environment (e.g., that includes information about the one or more physical objects). In some embodiments, while the three-dimensional environment is available for viewing via the display generation component, the computer system detects a second input (e.g., an air gesture, such as a "left index double long pinch," a "right ring double long pinch," other single-finger pinch, multi-finger pinch, and/or secondary pinch) that includes the gesture, wherein the gesture meets the first gesture criteria; and, in response to the second input that includes the gesture, the computer system outputs a second audio description of the view of the physical environment (e.g., that includes information about the one or more physical objects), wherein the second audio description of the view of the physical environment is different from the first audio description of the view of the physical environment. In some embodiments, repeating the respective gesture for activating the "scene description" mode to request the computer system to generate different verbal descriptions of the physical scene allows the user to explore the physical scene at different times to detect changes in the physical scene, to obtain different types of descriptions (e.g., object recognition, scene description, obstacle detection, human detection, and/or other types of descriptions), or to obtain descriptions with varying level of detail. For example, in the scenario of FIGS. 22D, after dog 22002 has walked into the field of view of the one or more cameras, the verbal description that is generated in response to repeating the gesture for activating the scene description mode indicates what physical objects in physical environment 7000 recently moved (e.g., as opposed to repeating what was already provided in the first verbal description of the scene). Generating a different verbal description of the physical environment, in response to repeating the gesture for activating the "scene description" mode, assists the user with exploring a state of the physical environment while also allowing the user to interact with virtual content in the mixed-reality three-dimensional environment, thereby making user interaction with a mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the second audio description of the view of the physical environment is output in accordance with a determination (or, optionally, in response to determining) that a state of the physical environment has changed (e.g., due to an event that occurred in the physical environment, or other change of the state of the physical environment). For example, in the scenario of FIGS. 22D, after dog 22002 has walked into the field of view of the one or more cameras, the verbal description that is generated in response to repeating the gesture for activating the scene description mode indicates what physical objects in physical environment 7000 recently moved (e.g., as opposed to repeating what was already provided in the first verbal description of the scene). Generating a different verbal description, in response to repeating the gesture for activating the "scene description" mode, if a state of the physical environment has changed, allows the user to explore the physical environment as it changes over time, thereby making user interaction with a mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the first audio description of the view of the physical environment is output at a first time and the physical environment has a first state at the first time. Further, the second audio description of the view of the physical environment is output at a second time, after the first time, and the physical environment has (e.g., continues to have) the first state at the second time. In some embodiments, the second audio description of the view of the physical environment is output in response to the second input even when a state of the physical environment is maintained or has not changed at the time the second input is detected. In some embodiments, in response to repeating the gesture (e.g., the gesture for activating the scene description mode), the computer system generates and/or outputs a different audio (or optionally verbal) description of the physical environment even though a state of the physical environment has not changed, or the viewpoint of the user has not changed. For example, the different description of the physical environment includes a description based on a different granularity (e.g., with more or less details about the scene, more or less verbosity) or includes a different type of description (e.g., a description based on object recognition (e.g., description of objects detected in the scene based on characteristics of the respective objects), scene description (e.g., description of the scene as a whole based on characteristics of the scene as a whole or the collection of objects detected in the scene), face recognition, obstacle detection, or text recognition) of the same scene. In some embodiments, the type, granularity, or verbosity of the audio description that is generated by the computer system in response to the gesture is based on what settings are selected or enabled (e.g., optionally in a setting user interface or during an onboarding process or other system configuration process). For example, in the scenario of FIG. 22B, the verbal description that is output in response to detecting the gesture for activating the scene description mode for a first time may include (e.g., only) a brief description of the scene as a whole without details with respect to what objects are visible and/or where those objects are located (e.g., "You are in a room with a large object on your right."), and the verbal description provided in response to detecting the gesture for activating the scene description mode for a second time may include details with respect to what objects are visible and/or where those objects are located (e.g., "You are in a room that has a lamp in the corner in front of you, a large box to the right with a cat on top, and a ball near the box."), where the scene has not changed in between the first and the second time. Generating different types of descriptions (e.g., descriptions based on object recognition, scene description, obstacle detection, human detection, and/or other types of descriptions) or descriptions with varying level of detail, in response to repeating the gesture for activating the "scene description" mode, even if the portion of the physical environment has not changed, allows the user to explore different aspects and details of the physical environment, thereby making user interaction with a mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, when the first input is detected, a first portion of the three-dimensional environment is included in a viewport of the three-dimensional environment, and the first audio description of the view of the physical environment is based on the first portion of the three-dimensional environment (e.g., includes information about a first one or more physical objects included in the three-dimensional environment). In some embodiments, when the second input is detected, a second portion of the three-dimensional environment is included in the viewport of the three-dimensional environment, and the second audio description of the view of the physical environment is based on the second portion of the three-dimensional environment (e.g., includes information about a second one or more physical objects included in the three-dimensional environment). In some embodiments, after the first input is detected and the first audio description of the view of the physical environment is output, a viewpoint of the user changes (e.g., a direction in which a user is looking has changed relative to the physical environment), and when the second input is detected (e.g., after the first input was detected), the second audio description of the physical environment that is output is based on what is visible or available to be viewed in the field of view of the user based on the changed viewpoint of the user. For example, in the scenario of FIG. 22C, in response to detecting the gesture for activating the "scene description" mode again after computer system 101 was moved, the computer system 1010 generates a different verbal description that includes dog 22002, where dog 22002 was not in the viewport in FIG. 22B before the moving of computer system 101 and was not referred to in the verbal description generated in the scenario of FIG. 22B before the computer system 101 was moved. Generating a different verbal description, in response to repeating the gesture for activating the "scene description" mode, if the portion of the physical environment that is included in a viewport of the three-dimensional environment has changed (e.g., because a direction in which a user is looking has changed relative to the physical environment) allows the user to explore different portions of the physical environments, thereby making user interaction with a mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the audio description of the view of the physical environment that includes information about the one or more physical objects is based on a first degree of verbosity of a plurality of degrees of verbosity in accordance with a determination that a first setting corresponding to the first degree of verbosity of the plurality of degrees of verbosity is enabled (e.g., selected) (e.g., by the user, optionally in a settings user interface, during an onboarding process, and/or a configuration process) when (e.g., at the time that) the gesture is detected. In some embodiments, the audio description of the view of the physical environment that includes information about the one or more physical objects is based on a second degree of verbosity of the plurality of degrees of verbosity in accordance with a determination that a setting corresponding the second degree of verbosity of the plurality of degrees of verbosity is enabled (e.g., selected) (e.g., by the user, optionally in a settings user interface, during an onboarding process, and/or a configuration process) when the gesture is detected. In some embodiments, a degree of verbosity with respect to verbal descriptions of the physical environment refers to the level of detail that is included in the verbal description and/or length of the verbal description (e.g., the number of words). For example, a first degree of verbosity can include a brief description of the scene as a whole, a second degree of verbosity can also mention the presence of more prominent physical objects in the scene, a third degree of generations can include additional details, such as locations of the physical objects relative to each other or relative to the space where the physical objects are located, distances of respective physical objects from the user, directions on how to reach the respective physical objects, warnings with respect to the physical environment, and/or other details. For example, while an option with a lower degree of verbosity is selected in the scenario of FIG. 22B, the verbal description can include a brief description of the scene as a whole without details with respect to what objects are visible and/or where those objects are located (e.g., "You are in a room with a large object on your right."). In contrast, while an option with a higher degree of verbosity is selected in the scenario of FIG. 22B, the verbal description can include details with respect to what objects are visible and/or where those objects are located (e.g., "You are in a room that has a lamp in the corner in front of you, a large box to the right with a cat on top, and a ball near the box."). Enabling the user to select or configure the degree of verbosity that is used in verbal descriptions of the physical environment allows the user to reduce the amount of time needed to explore the physical environment or to increase the extent to which the physical environment is verbally described, provide users with control over the way the users are interacting with the mixed-reality three-dimensional environment and enable the users to tailor the interaction to the users' particular needs, making user interaction with in a mixed-reality three-dimensional environment more accessible to a wider population.

In some embodiments, the gesture meets the first gesture criteria and is included in a first input, and the audio description of the view of the physical environment that is output in response to the first input is a first audio description of the view of the physical environment (e.g., that includes information about the one or more physical objects) that is based on the first degree of verbosity of the plurality of degrees of verbosity in accordance with a determination that the first degree of verbosity (e.g., of the plurality of degrees of verbosity) is enabled when (e.g., at the time that) the first input is detected. In some embodiments, while the three-dimensional environment is available for viewing via the display generation component, the computer system detects a second input that includes the gesture that meets the first gesture criteria. In some embodiments, in response to the second input that includes the gesture: in accordance with a determination that a second setting corresponding to a second degree of verbosity of the plurality of degrees of verbosity is enabled (e.g., selected) (e.g., by the user, optionally in a settings user interface, during an onboarding process, and/or a configuration process) when (e.g., at the time that) the second input that includes the gesture is detected, the computer system outputs a second audio description of the view of the physical environment (e.g., that includes information about the one or more physical objects) that is based on the second degree of verbosity. In some embodiments, the first audio description of the view of the physical environment includes information about a first subset of the one or physical objects without including information about a second subset of the one or more physical objects (e.g., the first audio description of the view of the physical environment has a first level of fidelity to objects in the view of the physical environment). In some embodiments, the second audio description of the physical environment includes information about the first subset of the one or physical objects and the second subset of the one or physical objects (e.g., the second audio description of the view of the physical environment has a second level of fidelity to objects in the view of the physical environment, and the second level of fidelity is different from the first level of fidelity). In some embodiments, the second degree of verbosity is higher than the first degree, and the second audio description includes information about physical objects that the first audio description does not include, as the first audio description is less verbose (e.g., and lower fidelity) than the second audio description. For example, while an option with a lower degree of verbosity is selected in the scenario of FIG. 22B, the verbal description can include a brief description of the scene as a whole without details with respect to what objects are visible and/or where those objects are located (e.g., "You are in a room with a large object on your right."). In contrast, while an option with a higher degree of verbosity is selected in the scenario of FIG. 22B, the verbal description can include details with respect to what objects are visible and/or where those objects are located (e.g., "You are in a room that has a lamp in the corner in front of you, a large box to the right with a cat on top, and a ball near the box."). Repeating the gesture for activating the "scene description" mode to generate a verbal description of the physical environment with a different degree of verbosity allows a user to obtain descriptions of the physical environment with varying level of detail, thereby reducing the amount of time needed to explore the physical environment or increasing the extent to which the physical environment is described without the need to select user interface controls, and enabling users to tailor the interaction to the users' particular needs, making user interaction with in a mixed-reality three-dimensional environment more accessible to a wider population In some embodiments, a first virtual object of the one or more virtual objects has a first location in the three-dimensional environment, and the first virtual object at the first location occludes (e.g., overlays, is displayed over, or otherwise makes unavailable for viewing) a respective portion of the view of the physical environment (e.g., for which the audio description is provided in accordance with the determination that the gesture meets the first gesture criteria) when viewed from a respective viewpoint of a user. In some embodiments, the audio description of the view of the physical environment (e.g., that includes information about the one or more physical objects) is output while maintaining the first virtual object at the first location in the three-dimensional environment (e.g., that is available for viewing via the display generation component). In some embodiments, a verbal description of a portion of a physical environment is output while maintaining display of virtual content, such as the first virtual object, in the three-dimensional environment. For example, in the scenarios of FIGS. 22B-22F, the computer system 101 does not hide application user interface 22010 in order to generate and/or output the verbal description of the portion of the physical environment 7000. Outputting a verbal description of the portion of a physical environment in the "scene" description mode while maintaining display of the virtual content in the three-dimensional environment assists the user with exploring a state of the physical environment while also allowing the user to interact with virtual content in the mixed-reality three-dimensional environment, thereby making user interaction with the mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the computer system detects a third gesture (e.g., a single-finger pinch, multiple-finger pinch, a secondary pinch, and/or other air gesture) that meets the first gesture criteria (e.g., for activating the "scene description" mode) (e.g., criteria that requires a particular configuration of the hand or both hands, other criteria such as direction that a palm of a hand of the user is facing, elevation of one or more hands, a duration criterion for performing the gesture or a portion of the gesture, a movement criterion, and/or other gesture criteria). In some embodiments, in response to detecting the third gesture, in accordance with a determination that a change occurred in the physical environment (e.g., one or more physical objects have moved, such as a new physical object that has entered the scene and/or an existing physical object that has left the scene, one or more objects have changed location within the scene, and/or a combination thereof) after (e.g., since) the audio description of the view of the physical environment (e.g., that includes information about the one or more physical objects) was output, the computer system outputs a different audio description of the view of the physical environment that includes information about the change in the physical environment that has occurred (e.g., that includes information about which objects of the one or more physical objects moved and where the objects moved to). In some embodiments, the third gesture is an air gesture. In some embodiments, the third gesture that meets the first gesture criteria (e.g., for activating the "scene description" mode) is a "left index double long pinch" (e.g., two single-finger pinches detected in immediate succession, both of which are performed with the index and thumb finger of the left hand, and the second pinch is optionally a long pinch). In some embodiments, a respective gesture that meets the first gesture criteria for activating the "scene description" mode is a "right ring double long pinch" (e.g., two single-finger pinches detected in immediate succession, both of which are performed with the ring and thumb finger of the right hand, and the second pinch is optionally a long pinch). For example, in the scenario of FIGS. 22D, after dog 22002 walks into the field of view of the one or more cameras, the verbal description generated in response to detecting a new instance of the gesture for activating the "scene description" mode indicates what physical objects in physical environment 7000 recently moved (e.g., as opposed to repeating what was already provided at a prior time in the first verbal description of the scene). Generating a different verbal description, in response to repeating the gesture for activating the "scene description" mode, if a state of the physical environment has changed, allows the user to explore the physical environment as it changes over time, thereby making user interaction with a mixed-reality three-dimensional environment more efficient (e.g., by reducing the number of inputs needed to explore and navigate a mixed-reality environment) and more accessible to a wider population (e.g., by providing verbally contextual information), such as users with reduced vision or other visual impairments.

In some embodiments, the computer system detects a fourth gesture (e.g., a single-finger pinch, multiple-finger pinch, a secondary pinch, and/or other air gesture) that meets the first gesture criteria (e.g., for activating the "scene description" mode) (e.g., criteria that requires a particular configuration of the hand or both hands, other criteria that specify a direction that a palm of a hand of the user is facing, elevation of one or more hands of the user, a duration criterion for performing the gesture or a portion of the gesture; movement criterion, and/or other gesture criteria). In some embodiments, in response to detecting the fourth gesture, in accordance with a determination that a respective object of the one or more physical objects has moved in the physical environment (e.g., a new physical object has entered the scene, an existing physical object has left the scene, one or more objects changed location within the scene, and/or a combination thereof) after (e.g., since) the audio description of the view of the physical environment (e.g., that includes information about the one or more physical objects) was output, the computer system outputs a respective audio description of the view of the physical environment that includes information about the respective object of the one or more physical objects that moved in the physical environment (e.g., that includes information about which objects of the one or more physical objects moved and where the objects moved to). In some embodiments, the fourth gesture is an air gesture. In some embodiments, the fourth gesture that meets the first gesture criteria (e.g., for activating the "scene description" mode) is a "left index double long pinch" (e.g., two single-finger pinches detected in immediate succession, both of which are performed with the index and thumb finger of the left hand, and the second pinch is optionally a long pinch). In some embodiments, a respective gesture that meets the first gesture criteria for activating the "scene description" mode is a "right ring double long pinch" (e.g., two single-finger pinches detected in immediate succession, both of which are performed with the ring and thumb finger of the right hand, and the second pinch is optionally a long pinch). For example, in the scenario of FIGS. 22D, after dog 22002 walks into the field of view of the one or more cameras, the verbal description generated in response to detecting the gesture for activating the "scene description" mode again indicates what physical objects in physical environment 7000 recently moved (e.g., as opposed to repeating what was already provided at a prior time, in a prior (e.g., first) verbal description of the scene). Generating a verbal description (e.g., in response to repeating the gesture for activating the "scene description" mode) that indicates what portions of the physical environment have (e.g., recently) changed allows the user to explore the physical environment as it changes over time more efficiently (e.g., by reducing the number of needed inputs to explore and navigate a mixed-reality environment).

In some embodiments, the computer system detects a fifth gesture (e.g., a single-finger pinch, multiple-finger pinch, a secondary pinch, and/or other air gesture) that meets second gesture criteria (e.g., for activating the "exploration" mode) (e.g., criteria that requires a particular configuration of the hand or both hands, e.g., where the configuration of the hand specifies a direction that a palm of the hand is facing, an elevation of one or more hands of the user, or other hand configuration criteria; a duration criterion for performing the gesture or a portion of the gesture, a movement criterion, and/or other gesture criteria). In some embodiments, in response to detecting the fifth gesture that meets the second gesture criteria, the computer system outputs non-visual information about a first virtual object of the one or more virtual objects included in the three-dimensional environment, wherein a respective portion of a user's body is directed toward the first virtual object. In some embodiments, an exploration mode is activated in response to detecting the fifth gesture that meets the second gesture criteria. In some embodiments, outputting the non-visual information about the first virtual object is performed while the exploration mode is active. The exploration mode is described in further detail with respect to method 2300 and FIGS. 21A-21J. In some embodiments, gestures that meet the second gesture criteria include: a "right index long pinch" (e.g., a single-finger long air pinch performed with the index and thumb finger of the right hand), where the "right index long pinch" activates the exploration mode and a release of the "right index long pinch" deactivates or ends the exploration mode; and/or a "left index long pinch" (e.g., a single-finger long air pinch performed with the index and thumb finger of the left hand), where the "left index long pinch" activates the exploration mode and a release of the "left index long pinch" deactivates or ends the exploration mode. For example, in the scenario of FIGS. 22B-22F, user 7002 can obtain a verbal description of virtual content in view 7000', such as user interface 22010, in response to a respective gesture for activating the exploration more. Using one type of gesture to output a verbal description of virtual content (e.g., in the "exploration" mode) and another type of gesture to output a verbal description of a portion of the physical environment (e.g., in the "scene description" mode), allows a user to quickly switch between scanning the environment's virtual content and scanning the environment's physical scene (e.g., and physical objects), thereby making user interaction with a mixed-reality three-dimensional environment more efficient (e.g., by reducing the number of inputs needed to explore the mixed-reality environment) and more accessible to a wider population (e.g., by providing verbally contextual information), such as users with reduced vision or other visual impairments.

In some embodiments, the computer system detects a sixth gesture (e.g., a single-finger pinch, multiple-finger pinch, a secondary pinch, and/or other air gesture). In some embodiments, in response to detecting the sixth gesture: in accordance with a determination that the sixth gesture meets the first gesture criteria (e.g., criteria for activating a "scene description" mode) (e.g., criteria that requires a particular configuration of the hand or both hands, other criteria such as a direction that a palm of the hand is facing, elevation of one or more hands, a duration criterion for performing the gesture or a portion of the gesture, a movement criterion, and/or other gesture criteria), the computer system outputs (e.g., via one or more output devices in communication with the display generation component) an audio description of a portion of the view of the physical environment that is included in a respective viewport of the three-dimensional environment. In some embodiments, in response to detecting the sixth gesture: in accordance with a determination that the sixth gesture meets third gesture criteria (e.g., for activating the "read aloud" mode) (e.g., criteria that requires a particular configuration of the hand or both hands, other criteria such as a direction that a palm of the hand is facing, elevation of one or more hands, a duration criterion for performing the gesture or a portion of the gesture, movement criterion, and/or other gesture criteria) (e.g., the sixth gesture corresponds to a navigation request to move from one user interface element to another in the three-dimensional environment while a respective accessibility mode that provides verbal or audio descriptions of virtual elements is active), the computer system moves a focus indicator to a second virtual object of the one or more virtual objects and outputs non-visual information about the second virtual object included in the three-dimensional environment. In some embodiments, an accessibility mode that provides verbal or audio descriptions of virtual elements in response to user inputs, such as navigation and/or selection inputs is activated in response to the sixth gesture. The accessibility mode is described in further detail with reference methods 1300 and 1400 and corresponding FIGS. 9A-9H and FIGS. 10A-10F. In some embodiments, examples of gestures that meet the third gesture criteria (e.g., criteria for navigating user interface elements in the "read aloud" mode) include a "right index pinch" or a "right middle pinch," where a focus selector moves forward or backward in a sequence of elements in response to the sixth gesture and the computer system generates an audio description of the respective element that is indicated by the focus selector. For example, in the scenario of FIGS. 22B-22F, user 7002 can obtain a verbal description of virtual content in view 7000', such as user interface 22010, in response to a respective gesture for activating the read aloud mode. Using one type of gesture to output verbal description of a portion of the physical environment (e.g., in the "scene description" mode) and other types of gestures to navigate and generate verbal descriptions of complex user interfaces (e.g., with multiple user interface elements across multiple hierarchy levels), allows a user to quickly switch between exploring the environment's virtual content and exploring the environment's physical scene (e.g., and physical objects), thereby making user interaction with a mixed-reality three-dimensional environment more efficient (e.g., by reducing the number of inputs needed to explore the mixed-reality environment) and more accessible to a wider population (e.g., by providing verbally contextual information), such as users with reduced vision or other visual impairments.

In some embodiments, aspects/operations of methods 1100, 1200, 1300, 1400, 1800, 1900, 2000, and 2300 may be interchanged, substituted, and/or added between these methods. For example, the method for providing non-visual information (e.g., audio description) about a portion of a physical environment include in a mixed-reality three-dimensional environment as described in method 2400 is optionally used to describe passthrough content for methods 1100, 1200, 1300, 1400, 1800, 1900, 2000, and/or 2300. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A method, comprising:
at a computer system that is in communication with a display generation component and one or more input devices:
while a view of a three-dimensional environment is visible via the display generation component, receiving one or more first user inputs from a user corresponding to selection of a respective direction in the three-dimensional environment relative to a reference point associated with the user;
displaying, via the display generation component, a ray in the three-dimensional environment extending in the respective direction away from the reference point in the three-dimensional environment;
while displaying the ray, displaying a selection cursor moving along the ray independently of user input;
when the selection cursor is at a respective position along the ray, receiving one or more second user inputs corresponding to a request to stop the movement of the selection cursor along the ray; and
in response to receiving the one or more second user inputs corresponding to a request to stop the movement of the selection cursor, setting a target location for a next user interaction to a location in the three-dimensional environment that corresponds to the respective position of the selection cursor along the ray.

2. The method of claim 1, wherein the computer system displays the ray extending in the respective direction away from the reference point in the three-dimensional environment after ceasing to receive the one or more first user inputs selecting the respective direction.

3. The method of claim 1, including, while displaying the selection cursor moving along the ray independently of user input, displaying a stop affordance that is activatable to stop the movement of the selection cursor along the ray, wherein the one or more second user inputs corresponding to the request to stop the movement of the selection cursor along the ray include an activation of the stop affordance.

4. The method of claim 1, including, prior to receiving the one or more first user inputs corresponding to selection of the respective direction:
displaying, via the display generation component, a direction indication in the three-dimensional environment extending away from the reference point in the three-dimensional environment and moving through a plurality of candidate directions including the respective direction;
wherein the one or more first user inputs correspond to a selection input while the direction indication indicates the respective direction as a candidate direction.

5. The method of claim 4, wherein the movement of the selection cursor along the ray begins in response to receiving the one or more first user inputs corresponding to selection of the respective direction.

6. The method of claim 4, wherein the direction indication extends away from the reference point while moving through the plurality of candidate directions.

7. The method of claim 1, wherein displaying the selection cursor moving along the ray independently of user input includes displaying the selection cursor moving through a plurality of intermediate locations along the ray independently of user input.

8. The method of claim 1, including:
in response to receiving the one or more second user inputs corresponding to the request to stop the movement of the selection cursor along the ray, displaying one or more user interface elements representing one or more options for interacting with the target location, wherein a respective user interface element is activatable to perform a respective operation associated with the target location.

9. The method of claim 1, including, while displaying the ray, displaying an interaction menu moving along the ray with the selection cursor.

10. The method of claim 1, including:
after receiving the one or more second user inputs, and while the target location for the next user interaction is set to the location in the three-dimensional environment that corresponds to the respective position of the selection cursor along the ray, receiving an interaction input; and
in response to receiving the interaction input, performing in the three-dimensional environment a respective operation associated with the target location.

11. The method of claim 10, wherein:
in accordance with a determination that the target location for the next user interaction is set to a first location in the three-dimensional environment, the respective operation is a first operation that is associated with the first location; and
in accordance with a determination that the target location for the next user interaction is set to a second location in the three-dimensional environment, wherein the second location is different from the first location, the respective operation is a second operation that is associated with the second location.

12. The method of claim 10, wherein:
in accordance with a determination that the interaction input is a first type of interaction input, the respective operation is a first operation associated with the target location; and
in accordance with a determination that the interaction input is a second type of interaction input that is different from the first type of interaction input, the respective operation is a second operation that is associated with the target location, and that is different from the first operation.

13. The method of claim 1, wherein:
the method is performed while a switch interaction mode of the computer system is enabled;
inputs are received via an assistive input device, and the method includes:
detecting communication being established between the computer system and the assistive input device;
wherein the switch interaction mode of the computer system is enabled in response to detecting the communication being established between the computer system and the assistive input device.

14. A computer-readable storage medium storing one or more programs configured to be executed by one or more processors of a computer system that is in communication with a display generation component and one or more input devices, the one or more programs including instructions for:
while a view of a three-dimensional environment is visible via the display generation component, receiving one or more first user inputs from a user corresponding to selection of a respective direction in the three-dimensional environment relative to a reference point associated with the user;
displaying, via the display generation component, a ray in the three-dimensional environment extending in the respective direction away from the reference point in the three-dimensional environment;

while displaying the ray, displaying a selection cursor moving along the ray independently of user input;

when the selection cursor is at a respective position along the ray, receiving one or more second user inputs corresponding to a request to stop the movement of the selection cursor along the ray; and in response to receiving the one or more second user inputs corresponding to a request to stop the movement of the selection cursor, setting a target location for a next user interaction to a location in the three-dimensional environment that corresponds to the respective position of the selection cursor along the ray.

15. The computer-readable storage medium of claim 14, wherein the computer system displays the ray extending in the respective direction away from the reference point in the three-dimensional environment after ceasing to receive the one or more first user inputs selecting the respective direction.

16. The computer-readable storage medium of claim 14, wherein the one or more programs include instructions for, while displaying the selection cursor moving along the ray independently of user input, displaying a stop affordance that is activatable to stop the movement of the selection cursor along the ray, wherein the one or more second user inputs corresponding to the request to stop the movement of the selection cursor along the ray include an activation of the stop affordance.

17. The computer-readable storage medium of claim 14, wherein the one or more programs include instructions for, prior to receiving the one or more first user inputs corresponding to selection of the respective direction:

displaying, via the display generation component, a direction indication in the three-dimensional environment extending away from the reference point in the three-dimensional environment and moving through a plurality of candidate directions including the respective direction;

wherein the one or more first user inputs correspond to a selection input while the direction indication indicates the respective direction as a candidate direction.

18. The computer-readable storage medium of claim 14, wherein displaying the selection cursor moving along the ray independently of user input includes displaying the selection cursor moving through a plurality of intermediate locations along the ray independently of user input.

19. The computer-readable storage medium of claim 14, wherein the one or more programs include instructions for:

in response to receiving the one or more second user inputs corresponding to the request to stop the movement of the selection cursor along the ray, displaying one or more user interface elements representing one or more options for interacting with the target location, wherein a respective user interface element is activatable to perform a respective operation associated with the target location.

20. The computer-readable storage medium of claim 14, wherein the one or more programs include instructions for, while displaying the ray, displaying an interaction menu moving along the ray with the selection cursor.

21. The computer-readable storage medium of claim 14, wherein the one or more programs include instructions for:

after receiving the one or more second user inputs, and while the target location for the next user interaction is set to the location in the three-dimensional environment that corresponds to the respective position of the selection cursor along the ray, receiving an interaction input; and in response to receiving the interaction input, performing in the three-dimensional environment a respective operation associated with the target location.

22. The computer-readable storage medium of claim 14, wherein:

the instructions are configured to be executed while a switch interaction mode of the computer system is enabled;

inputs are received via an assistive input device, and the one or more programs further include instructions for:

detecting communication being established between the computer system and the assistive input device;

wherein the switch interaction mode of the computer system is enabled in response to detecting the communication being established between the computer system and the assistive input device.

23. A computer system that is in communication with a display generation component and one or more input devices, the computer system comprising:

one or more processors; and memory storing one or more programs configured to be executed by the one or more processors, the one or more programs including instructions for:

while a view of a three-dimensional environment is visible via the display generation component, receiving one or more first user inputs from a user corresponding to selection of a respective direction in the three-dimensional environment relative to a reference point associated with the user;

displaying, via the display generation component, a ray in the three-dimensional environment extending in the respective direction away from the reference point in the three-dimensional environment;

while displaying the ray, displaying a selection cursor moving along the ray independently of user input;

when the selection cursor is at a respective position along the ray, receiving one or more second user inputs corresponding to a request to stop the movement of the selection cursor along the ray; and in response to receiving the one or more second user inputs corresponding to a request to stop the movement of the selection cursor, setting a target location for a next user interaction to a location in the three-dimensional environment that corresponds to the respective position of the selection cursor along the ray.

24. The computer system of claim 23, wherein the computer system displays the ray extending in the respective direction away from the reference point in the three-dimensional environment after ceasing to receive the one or more first user inputs selecting the respective direction.

25. The computer system of claim 23, wherein the one or more programs include instructions for, while displaying the selection cursor moving along the ray independently of user input, displaying a stop affordance that is activatable to stop the movement of the selection cursor along the ray, wherein the one or more second user inputs corresponding to the request to stop the movement of the selection cursor along the ray include an activation of the stop affordance.

26. The computer system of claim 23, wherein the one or more programs include instructions for, prior to receiving the one or more first user inputs corresponding to selection of the respective direction:

displaying, via the display generation component, a direction indication in the three-dimensional environment extending away from the reference point in the three-dimensional environment and moving through a plurality of candidate directions including the respective direction;

wherein the one or more first user inputs correspond to a selection input while the direction indication indicates the respective direction as a candidate direction.

27. The computer system of claim 23, wherein displaying the selection cursor moving along the ray independently of user input includes displaying the selection cursor moving through a plurality of intermediate locations along the ray independently of user input.

28. The computer system of claim 23, wherein the one or more programs include instructions for:

in response to receiving the one or more second user inputs corresponding to the request to stop the movement of the selection cursor along the ray, displaying one or more user interface elements representing one or more options for interacting with the target location, wherein a respective user interface element is activatable to perform a respective operation associated with the target location.

29. The computer system of claim 23, wherein the one or more programs include instructions for, while displaying the ray, displaying an interaction menu moving along the ray with the selection cursor.

30. The computer system of claim 23, wherein the one or more programs include instructions for:

after receiving the one or more second user inputs, and while the target location for the next user interaction is set to the location in the three-dimensional environment that corresponds to the respective position of the selection cursor along the ray, receiving an interaction input; and in response to receiving the interaction input, performing in the three-dimensional environment a respective operation associated with the target location.

31. The computer system of claim 23, wherein:

the instructions are configured to be executed while a switch interaction mode of the computer system is enabled;

inputs are received via an assistive input device, and the one or more programs further include instructions for:

detecting communication being established between the computer system and the assistive input device;

wherein the switch interaction mode of the computer system is enabled in response to detecting the communication being established between the computer system and the assistive input device.

\* \* \* \* \*